US012538261B2

United States Patent
Parker et al.

(10) Patent No.: US 12,538,261 B2
(45) Date of Patent: Jan. 27, 2026

(54) SYSTEMS, APPARATUS, AND METHODS FOR TRIGGERABLE DATA DRIVEN LOCATION DETERMINATION

(71) Applicant: Intel Corporation, Santa Clara, CA (US)

(72) Inventors: Valerie Parker, Portland, OR (US); Pranali Jhaveri, Hillsboro, OR (US); Stephen Palermo, Chandler, AZ (US); John Belstner, Scottsdale, AZ (US); Masoud Sajadieh, Fremont, CA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 18/176,992

(22) Filed: Mar. 1, 2023

(65) Prior Publication Data

US 2023/0284178 A1    Sep. 7, 2023

Related U.S. Application Data

(63) Continuation-in-part of application No. PCT/US2022/042340, filed on Sep. 1, 2022.
(Continued)

(51) Int. Cl.
*H04W 64/00* (2009.01)
(52) U.S. Cl.
CPC ....... *H04W 64/003* (2013.01); *H04W 64/006* (2013.01)
(58) Field of Classification Search
CPC . H04W 64/003; H04W 64/006; H04W 64/00; H04W 4/029; H04W 24/10;
(Continued)

(56) References Cited

U.S. PATENT DOCUMENTS

2012/0020320 A1*  1/2012  Issakov ............... G01S 5/02213
                                                            370/330
2016/0071024 A1   3/2016  Amer et al.
(Continued)

FOREIGN PATENT DOCUMENTS

| KR | 20130039578 A | 4/2013 |
| KR | 20190122423 A | 10/2019 |
| WO | 2021155952 A1 | 8/2021 |

OTHER PUBLICATIONS

Netherlands Patent Office, "Decision on formal defects," issued in connection with Dutch Patent Application No. 2032942, mailed on Sep. 9, 2022, 4 Pages. [Machine English Translation Included].
(Continued)

*Primary Examiner* — Nimesh Patel
(74) *Attorney, Agent, or Firm* — Hanley, Flight & Zimmerman, LLC

(57) ABSTRACT

Methods, apparatus, systems, and articles of manufacture are disclosed for triggerable data driven location determination. An example apparatus is to cause transmission of a sounding reference signal (SRS) configuration to a radio access network (RAN), the SRS configuration for a target device in communication with a radio unit (RU) associated with the RAN. Additionally, the example apparatus is to cause transmission of a value to cause the RAN to compute at least one set of time-of-arrival (TOA) measurements or time-difference-of-arrival (TDOA) measurements for the target device based on detection of SRS data in cellular data received by antennas of the RU from the target device, the at least set one of the TOA measurements or the TDOA measurements based on the SRS configuration. The example apparatus is to estimate a location of the target device based on the at least one set of the TOA measurements or the TDOA measurements.

20 Claims, 80 Drawing Sheets

Related U.S. Application Data

(60) Provisional application No. 63/421,458, filed on Nov. 1, 2022, provisional application No. 63/316,880, filed on Mar. 4, 2022, provisional application No. 63/290,040, filed on Dec. 15, 2021, provisional application No. 63/240,266, filed on Sep. 2, 2021.

(58) Field of Classification Search
CPC ....... H04W 24/08; H04W 4/02; H04W 92/18; H04W 4/70; H04W 72/542; H04W 4/023; H04W 4/027; H04W 60/04; H04W 28/0226; H04W 4/025; H04W 28/0236; H04W 48/20; H04W 56/004; H04W 8/245; H04W 48/12; H04W 72/12; H04W 28/18; H04W 36/326; H04W 56/0045; H04W 56/0055; H04W 56/0065; H04W 12/63; H04W 12/69; H04W 28/06; H04W 48/04; H04W 52/0209; H04W 52/0212; H04W 52/0225; G01S 5/01; G01S 5/0278; G01S 5/0263; G01S 5/0268; G01S 5/0036; G01S 5/0236; G01S 5/10; G01S 13/765; G01S 5/0244; G01S 2205/007; G01S 5/0054; G01S 5/02; G01S 5/02213; G01S 5/0289; G01S 5/0009; G01S 5/0072; G01S 5/0221; G01S 5/06; G01S 5/0218; G01S 5/14; G01S 2205/008; G01S 5/0284; G01S 5/0294; G01S 5/0018; G01S 5/0027; G01S 5/017; G01S 5/0249; G01S 5/0252; G01S 5/02521; G01S 5/02585; G01S 1/08; G01S 11/06; G01S 13/36; G01S 13/46; G01S 19/46; G01S 2013/462; G01S 5/0063; G01S 5/011; G01S 5/02216; H04L 5/0048; H04L 5/0035; H04L 5/001; H04L 25/0224; H04L 25/0226; H04L 27/2613; H04L 27/2602; H04L 27/261; H04L 5/0098; H04L 5/0023; H04L 5/0091; H04L 63/0876; H04L 2209/80; H04L 5/0005; H04L 5/0016
See application file for complete search history.

(56) References Cited

U.S. PATENT DOCUMENTS

| | | | |
|---|---|---|---|
| 2016/0316325 A1 | 10/2016 | Sadr et al. | |
| 2017/0091617 A1 | 3/2017 | Baughman et al. | |
| 2020/0196298 A1* | 6/2020 | Edge | H04W 4/029 |
| 2021/0109188 A1* | 4/2021 | Kumar | H04W 64/00 |
| 2021/0160812 A1* | 5/2021 | Manolakos | H04W 4/025 |
| 2021/0255304 A1 | 8/2021 | Fontijne et al. | |
| 2022/0322277 A1* | 10/2022 | Duan | H04B 17/27 |

OTHER PUBLICATIONS

Netherlands Patent Office, "Priority Claim Report," in connection with Dutch Patent Application No. 2032942, mailed on Sep. 9, 2022, 2 Pages. [Machine English Translation Included].

International Searching Authority, "International Search Report," issued in connection with International Patent Application No. PCT/US2022/042340, mailed on Dec. 27, 2022, 4 pages.

International Searching Authority, "Written Opinion of the International Searching Authority," issued in connection with International Patent Application No. PCT/US2022/042340, mailed on Dec. 27, 2022, 5 pages.

Netherlands Intellectual Property Office, "Search Report and Written Opinion," issued in connection with Dutch Patent Application No. 2032942, mailed on Jul. 28, 2023, 12 Pages. [Machine English Translation Included].

International Searching Authority, "International Preliminary Report on Patentability," issued in connection with International Application No. PCT/US2022/042340, mailed on Mar. 14, 2024, 7 pages.

European Patent Office, "Extended European Search Report," issued in connection with European Patent Application No. 22865556.9, dated Jun. 16, 2025, 7 pages.

European Patent Office, "Communication pursuant to Article 94(3) EPC," issued in connection with European Patent Application No. 22865556.9, dated Nov. 28, 2025, 5 pages.

\* cited by examiner

| PHASE | SERVICE AREA | POSITION ACCURACY | UE SPEED | AVAILABILITY | LATENCY/ RUNTIME | #UE/RU | # COMPUTE 2GHz CORES | #RU/ #ANTENNA |
|---|---|---|---|---|---|---|---|---|
| 1 | INDOOR | [<1m] HOR. [BENCHMARK] VER. | 20 km/hr. | 95% HOR. 95% VER. | <120ms/ 1 hrs | 2+UEs/RU | <1 ME | 1/4 |
| 2 | INDOOR | [<0.75m] HOR. [BENCHMARK] VER. | 20 km/hr. | 95% HOR. 95% VER. | <100ms/ 12 hrs | 2+UEs/RU | <1 ME < 2 LE | 1/4 |
| 3 | INDOOR/ OUTDOOR | [<0.75m] HOR. [BENCHMARK] VER. | 20 km/hr. | 95% HOR. 95% VER. | <100ms/ 12 hrs | 4+UEs/RU (SHOW SCALE UP TO 32 UEs) | <1 ME < 2 LE | 2/8 |
| 4 | INDOOR/ OUTDOOR | [<0.75m] HOR. [-1.5M] VER. | 20 km/hr. | 95% HOR. 95% VER. | <100ms/ 12 hrs | 4+UEs/RU (SHOW SCALE UP TO 32 UEs) | <1 ME < 2 LE | 3/10 |

FIG. 15C

| | | |
|---|---|---|
| GET | /CAPABILITIES/SRS/{UEID} [LMF/LE->RAN/ME] | OBTAIN THE SRS CAPABILITIES FOR THIS UE |
| POST | /CONFIGURATION/SRS/{UEID} [LMF/LE->RAN/ME] | PROVIDE THE SRS CONFIGURATION FOR THIS UE |
| PUT | /ENABLE/TOA/{UEID} [LMF/LE->RAN/ME] | ENABLE TOA SRS MEASUREMENTS FOR THIS UE |
| GET | /IDLIST/ANTENNAS/{CELLID} [LMF/LE->RAN/ME] | OBTAIN A LIST OF ANTENNA ID'S FOR THIS CELL |
| GET | /IDLIST/CELLS/{UEID} [LMF/LE->RAN/ME] | OBTAIN A LIST OF CELL ID'S CONNECTED TO THE UE |
| GET | /IDLIST/UE [LMF/LE->RAN/ME] | OBTAIN A LIST OF ALL KNOWN UE'S |
| GET | /LOCATION/ANTENNA/{CELLID}/{ANTENNAID} [LMF/LE->RAN/ME] | OBTAIN THE LOCATION FOR THE SPECIFIED ANTENNA |
| GET | /LOCATION/UE/{UEID} [APP->LMF/LE] | OBTAIN UE LOCATION ESTIMATE |
| POST | /LOCATION/UE/{UEID} [LMF/LE->APP] | PROVIDE UE LOCATION ESTIMATE |
| POST | /MEASUREMENTS/TOA/{UEID} [RAN/ME->LMF/LE] | PROVIDE THE TOA MEASUREMENTS FOR THIS UE |

SYSTEMS, APPARATUS, AND METHODS FOR TRIGGERABLE DATA DRIVEN LOCATION DETERMINATION

RELATED APPLICATIONS

This patent arises from a continuation-in-part of International Patent Application No. PCT/US2022/042340, which was filed on Sep. 1, 2022, which claims the benefit of U.S. Provisional Patent Application No. 63/316,880, which was filed on Mar. 4, 2022, U.S. Provisional Patent Application No. 63/290,040, which was filed on Dec. 15, 2021, and U.S. Provisional Patent Application No. 63/240,266, which was filed on Sep. 2, 2021. International Patent Application No. PCT/US2022/042340; U.S. Provisional Patent Application No. 63/316,880; U.S. Provisional Patent Application No. 63/290,040; and U.S. Provisional Patent Application No. 63/240,266 are hereby incorporated herein by reference in their entireties. Priority to International Patent Application No. PCT/US2022/042340; U.S. Provisional Patent Application No. 63/316,880; U.S. Provisional Patent Application No. 63/290,040; and U.S. Provisional Patent Application No. 63/240,266 is hereby claimed.

This patent also claims the benefit of U.S. Provisional Application No. 63/421,458, which was filed on Nov. 1, 2022. U.S. Provisional Patent Application No. 63/421,458 is hereby incorporated herein by reference in its entirety. Priority to U.S. Provisional Patent Application No. 63/421,458 is hereby claimed.

FIELD OF THE DISCLOSURE

This disclosure relates generally to location determination and, more particularly, to systems, apparatus, and methods for triggerable data driven location determination.

BACKGROUND

Billions of devices rely on some form of location-aware capabilities instrumental to several industries and sectors that leverage terrestrial techniques in cellular networks and/or non-terrestrial techniques in satellite-based networks. Location detection capabilities have shortcomings that challenge positioning, navigation, and timing resilience in various applications, wireless spectrums, and/or communication modes.

BRIEF DESCRIPTION OF THE DRAWINGS

FIG. 15C depicts example parameters to implement examples disclosed herein.

FIG. 15F depicts example implementations of cellular data messages to implement the cellular network architecture of FIG. 15B.

1 and/or 4 to determine a location of a device and/or an object based on at least one of radio access network or satellite communication data.

Figure 1:
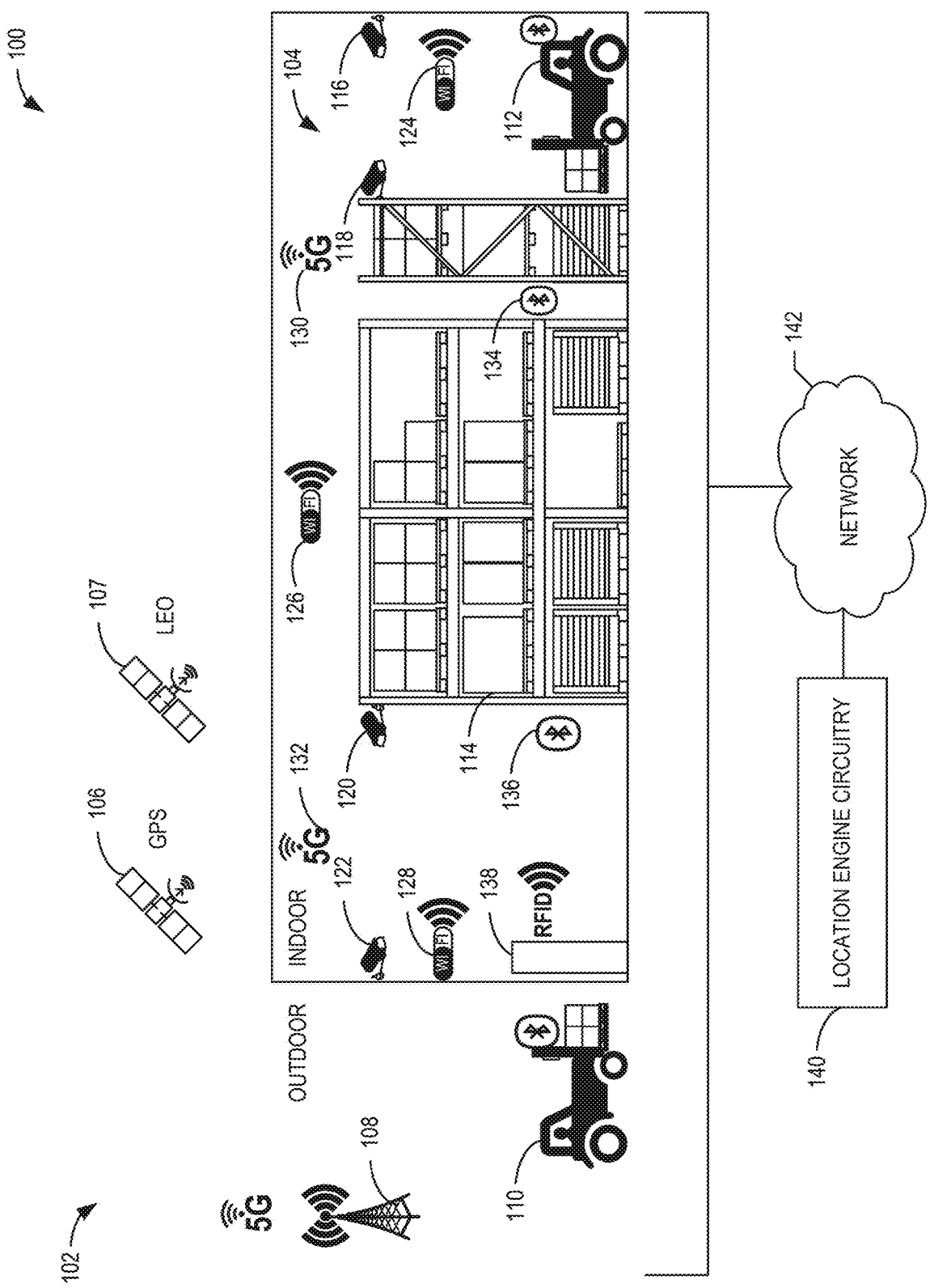
FIG. 1 is an illustration of an example location determination environment including devices and/or objects whose locations may be determined by example location engine circuitry.
Figure 56:
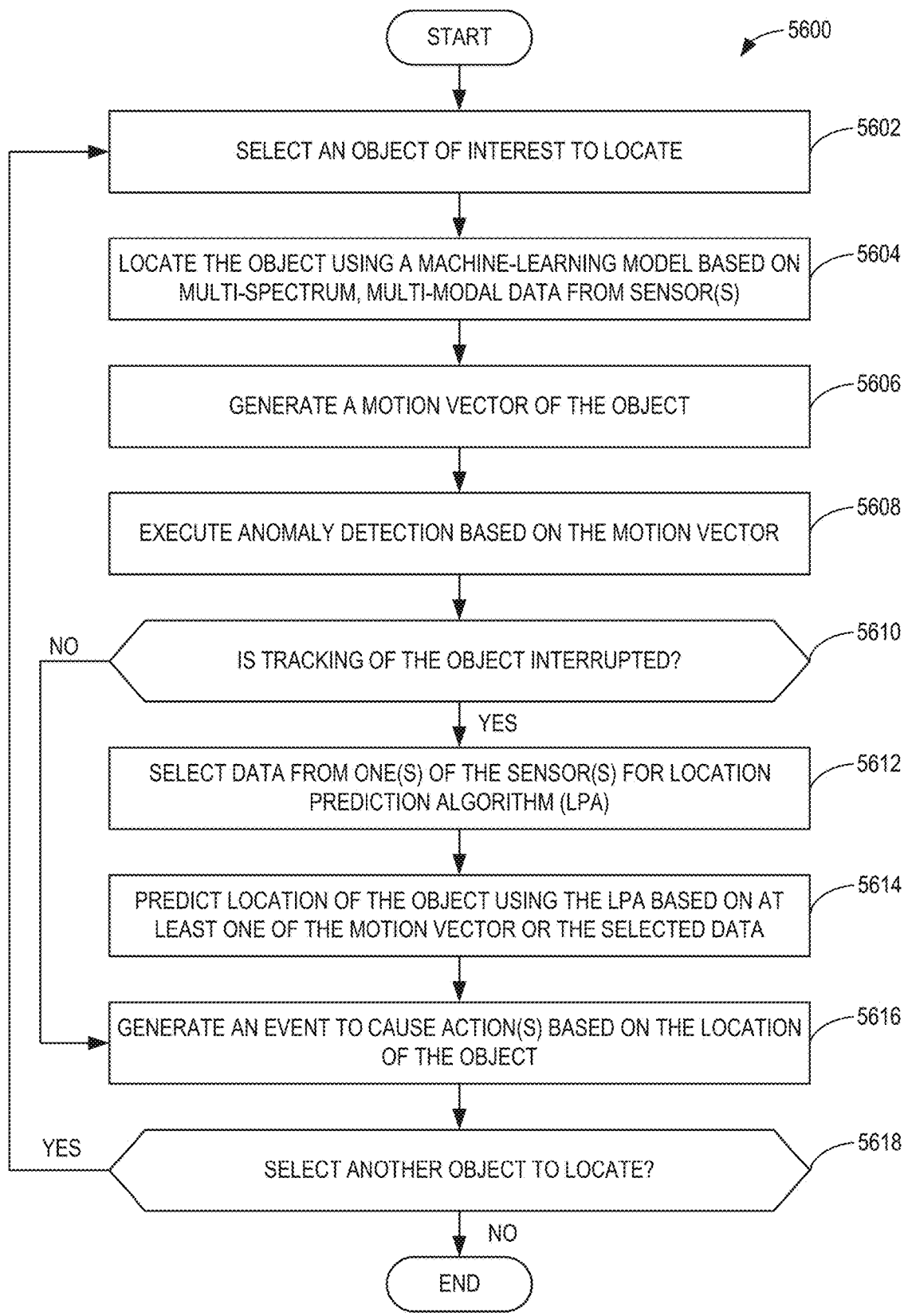

FIG. 56 is a flowchart representative of example machine-readable instructions and/or example operations that may be executed and/or instantiated by example processor circuitry to implement the example location engine circuitry of FIGS. 1 and/or 4 to track a location of a device and/or an object.

Figure 57:
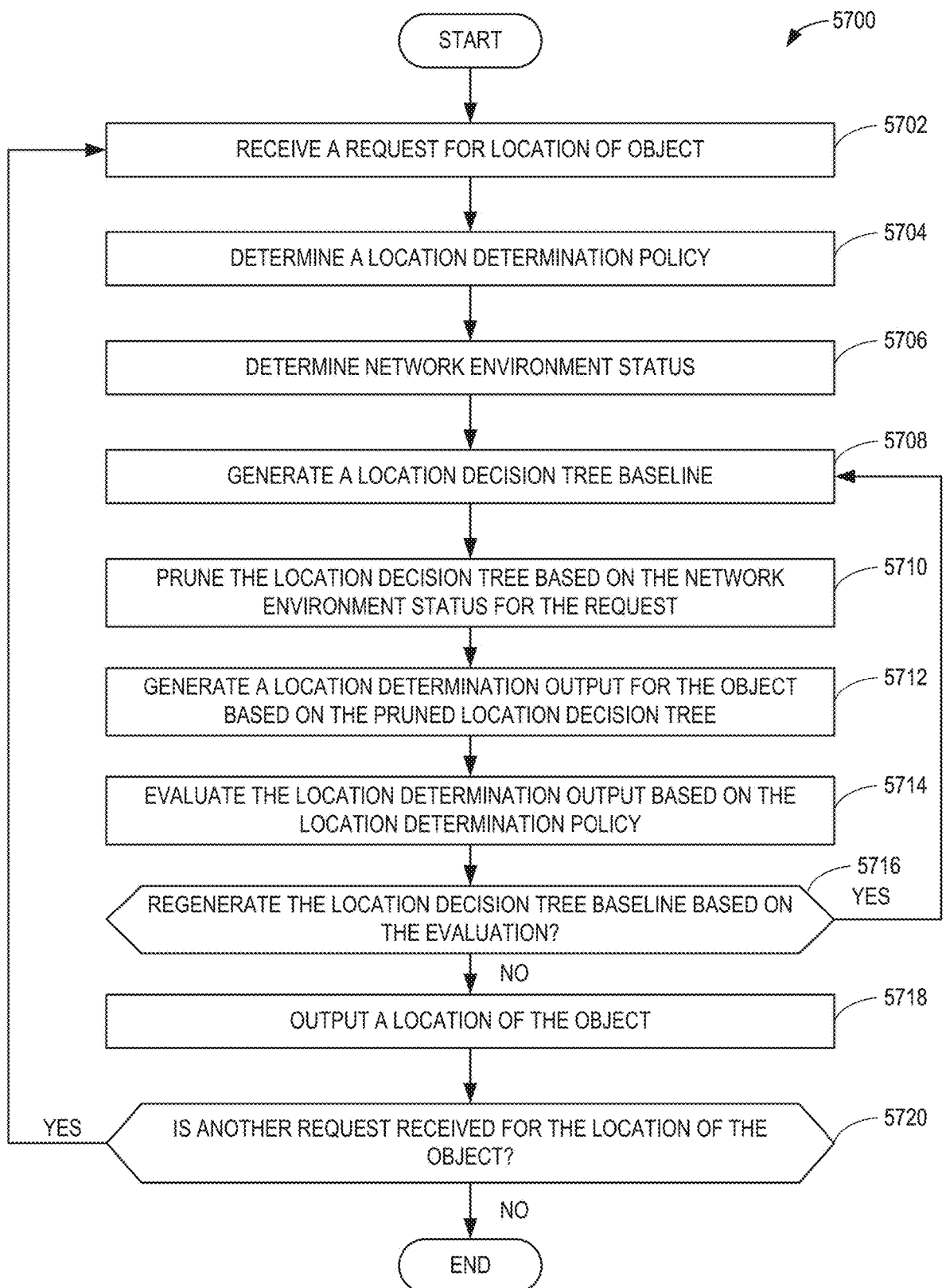

FIG. 57 is a flowchart representative of example machine-readable instructions and/or example operations that may be executed and/or instantiated by example processor circuitry to implement the example location engine circuitry of FIGS. 1 and/or 4 to output a location of a device and/or an object based on weights of information from available input sources.

Figure 58:
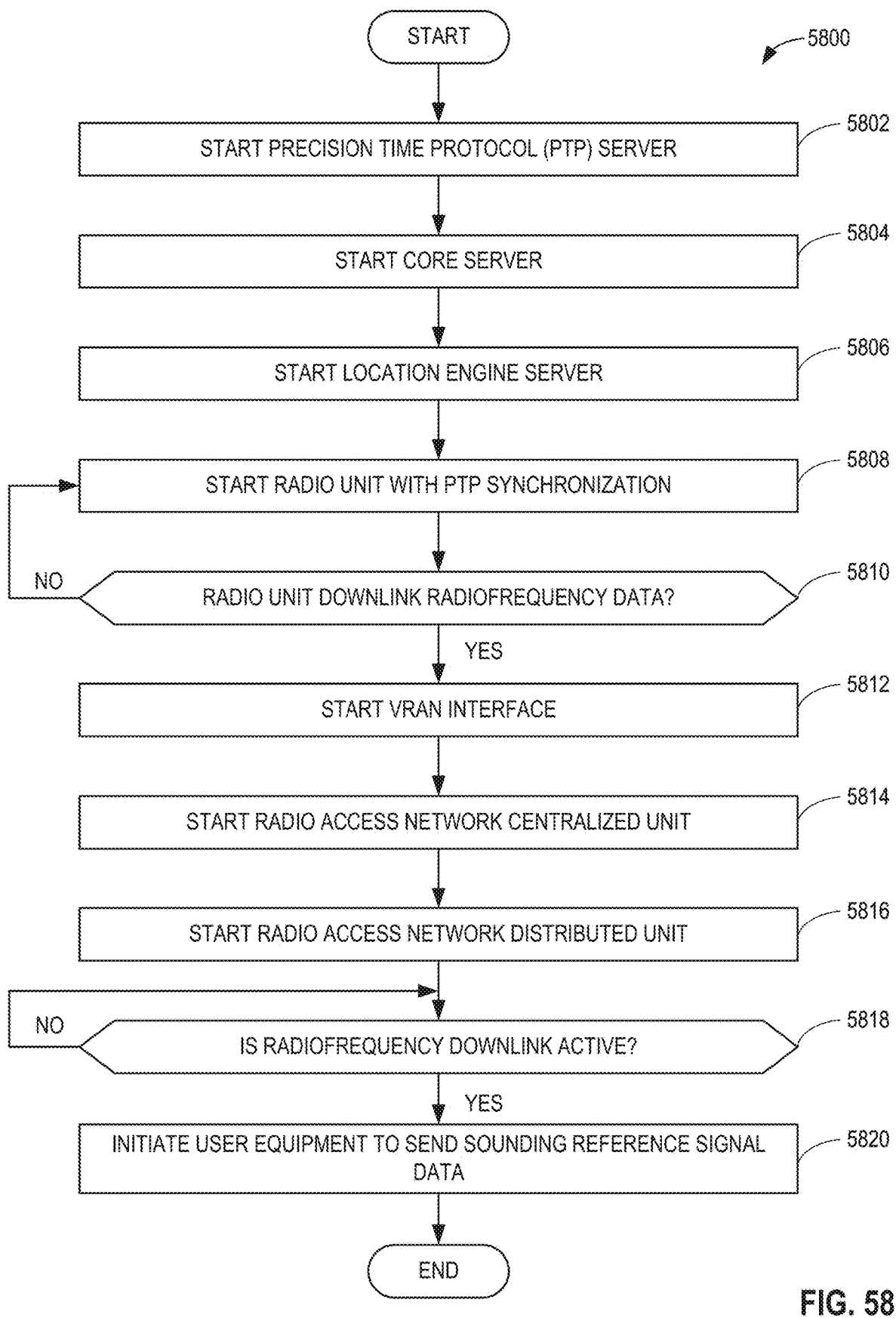

FIG. 58 is a flowchart representative of example machine-readable instructions and/or example operations that may be executed and/or instantiated by example processor circuitry to implement the example location engine circuitry of FIGS. 1 and/or 4 to initialize an example location determination system.

Figure 59:
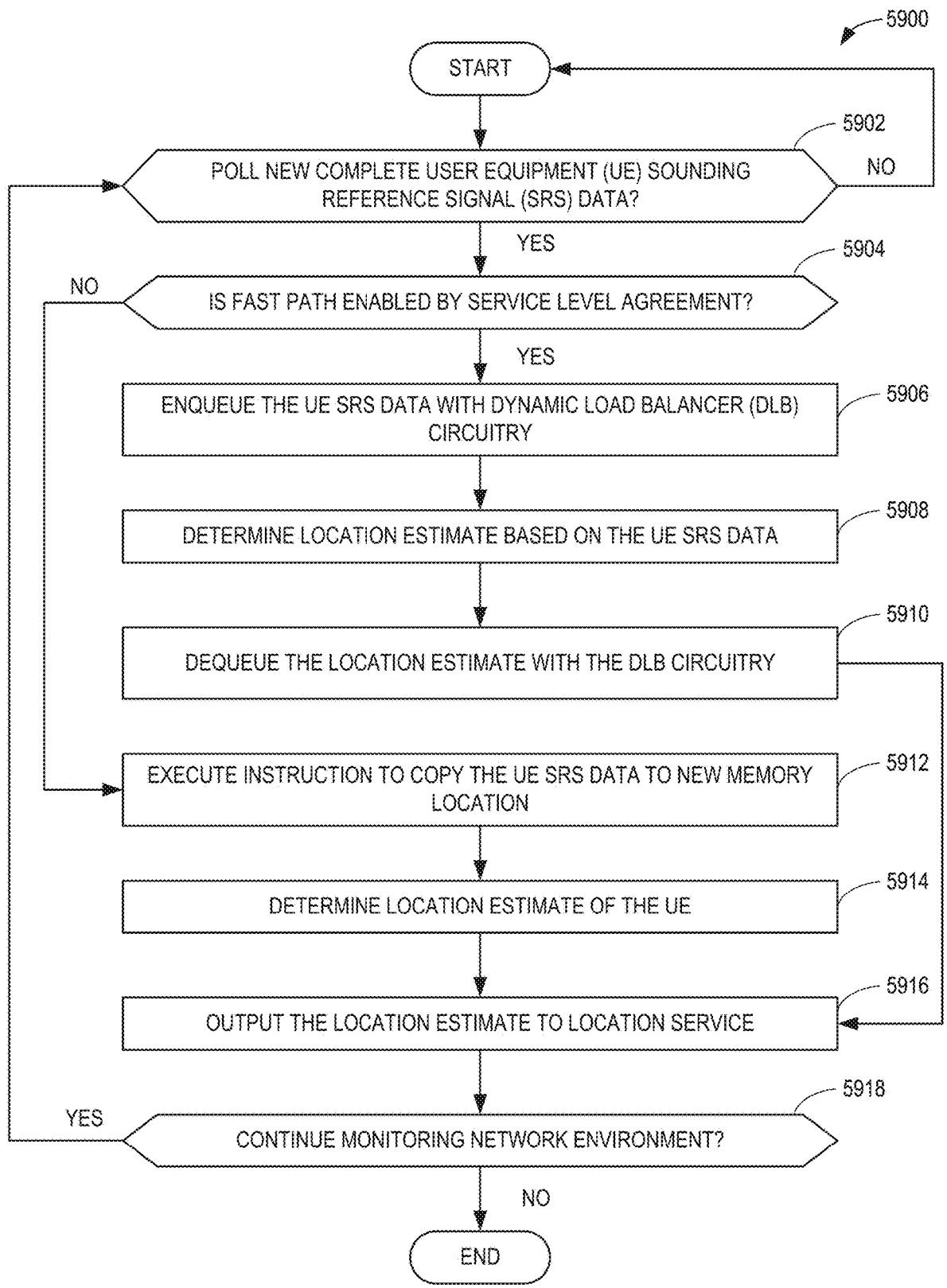

FIG. 59 is a flowchart representative of example machine-readable instructions and/or example operations that may be executed and/or instantiated by example processor circuitry to implement the example location engine circuitry of FIGS. 1 and/or 4 to determine a location of a device and/or an object based on a service level agreement.

Figure 60:
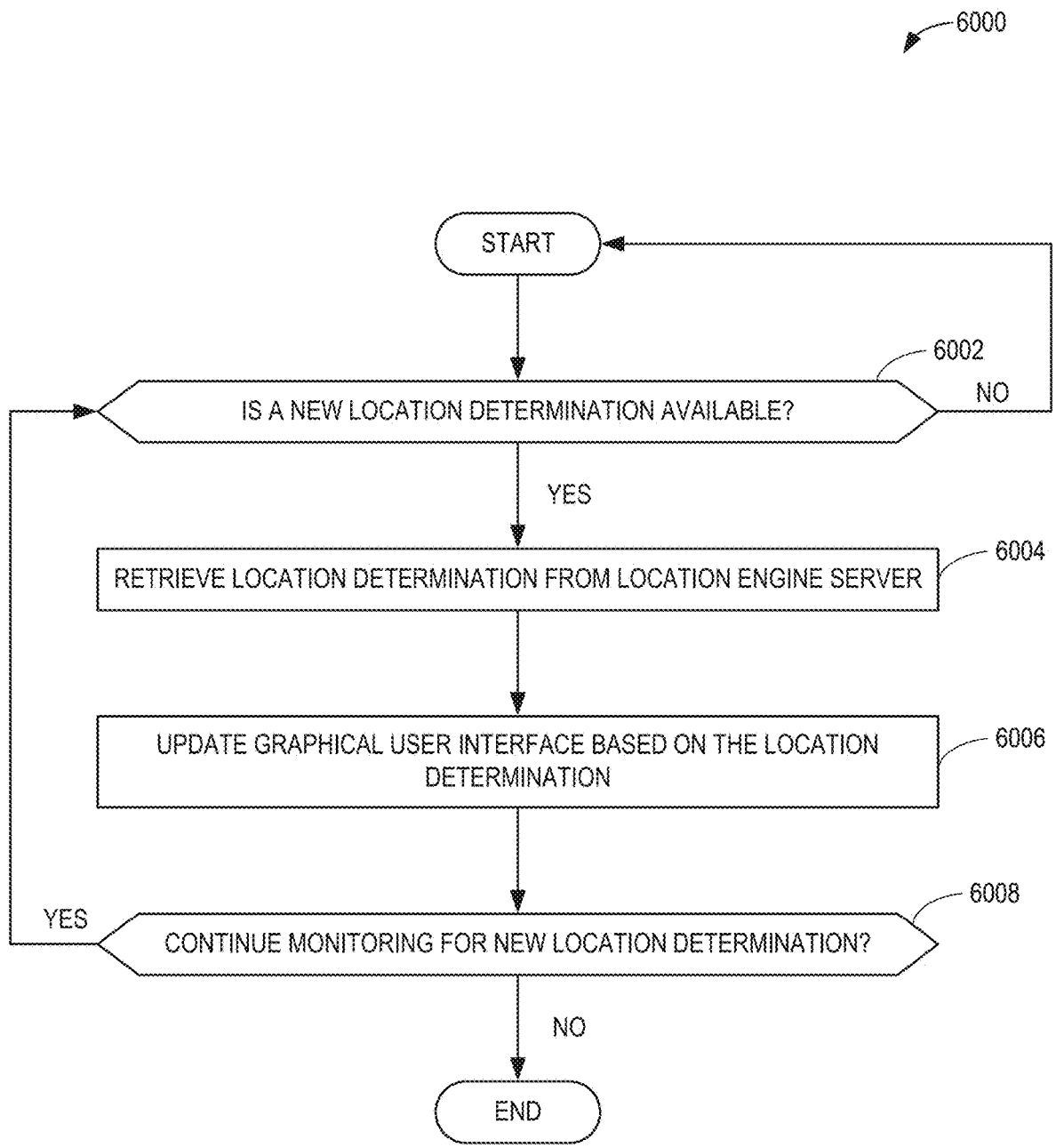

FIG. 60 is a flowchart representative of example machine-readable instructions and/or example operations that may be executed and/or instantiated by example processor circuitry to implement the example location engine circuitry of FIGS. 1 and/or 4 to output a location determination to a graphical user interface.

Figure 61:
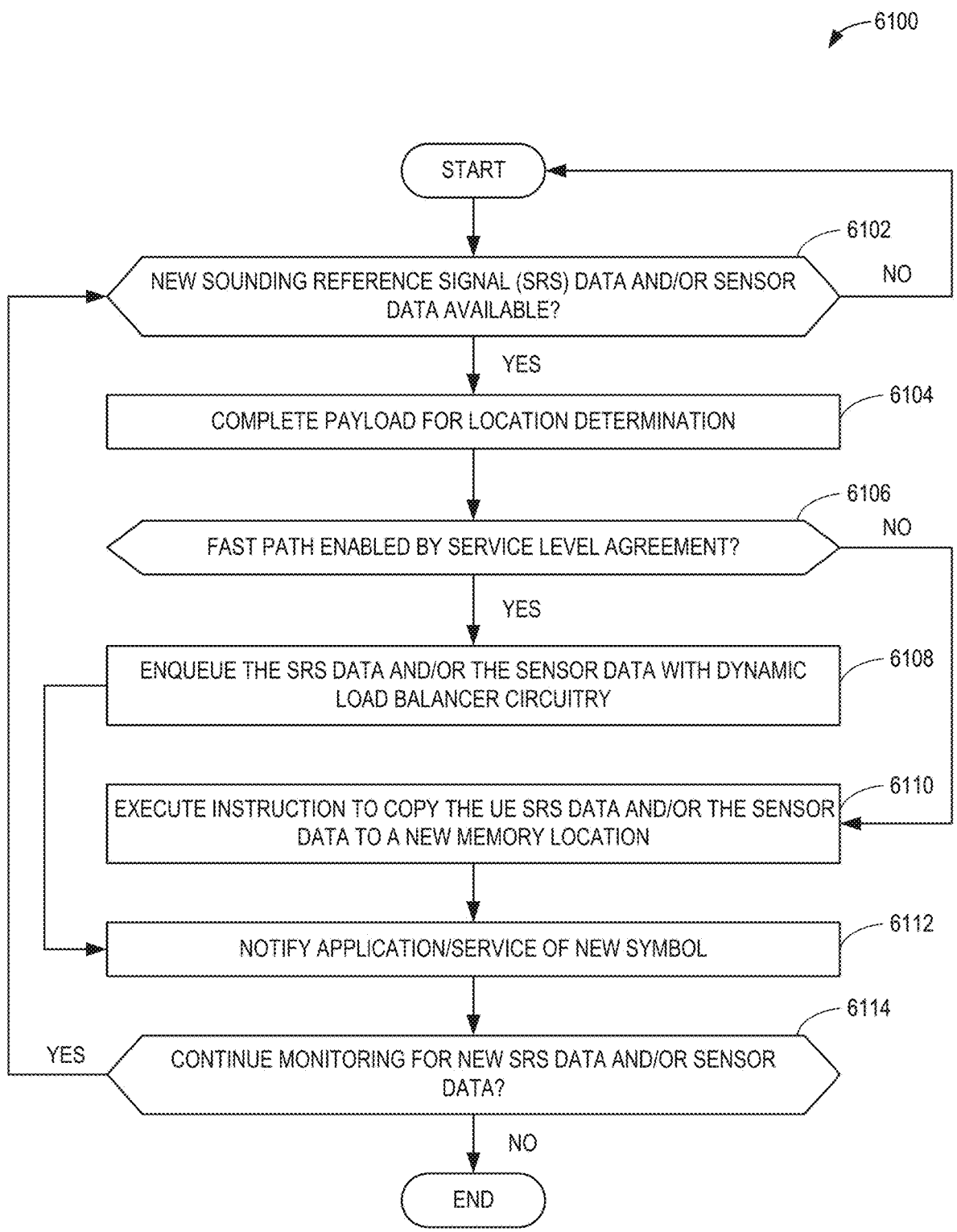

FIG. 61 is a flowchart representative of example machine-readable instructions and/or example operations that may be executed and/or instantiated by example processor circuitry to implement the example location engine circuitry of FIGS. 1 and/or 4 to generate a notification that communication data is available for consumption.

Figure 62:
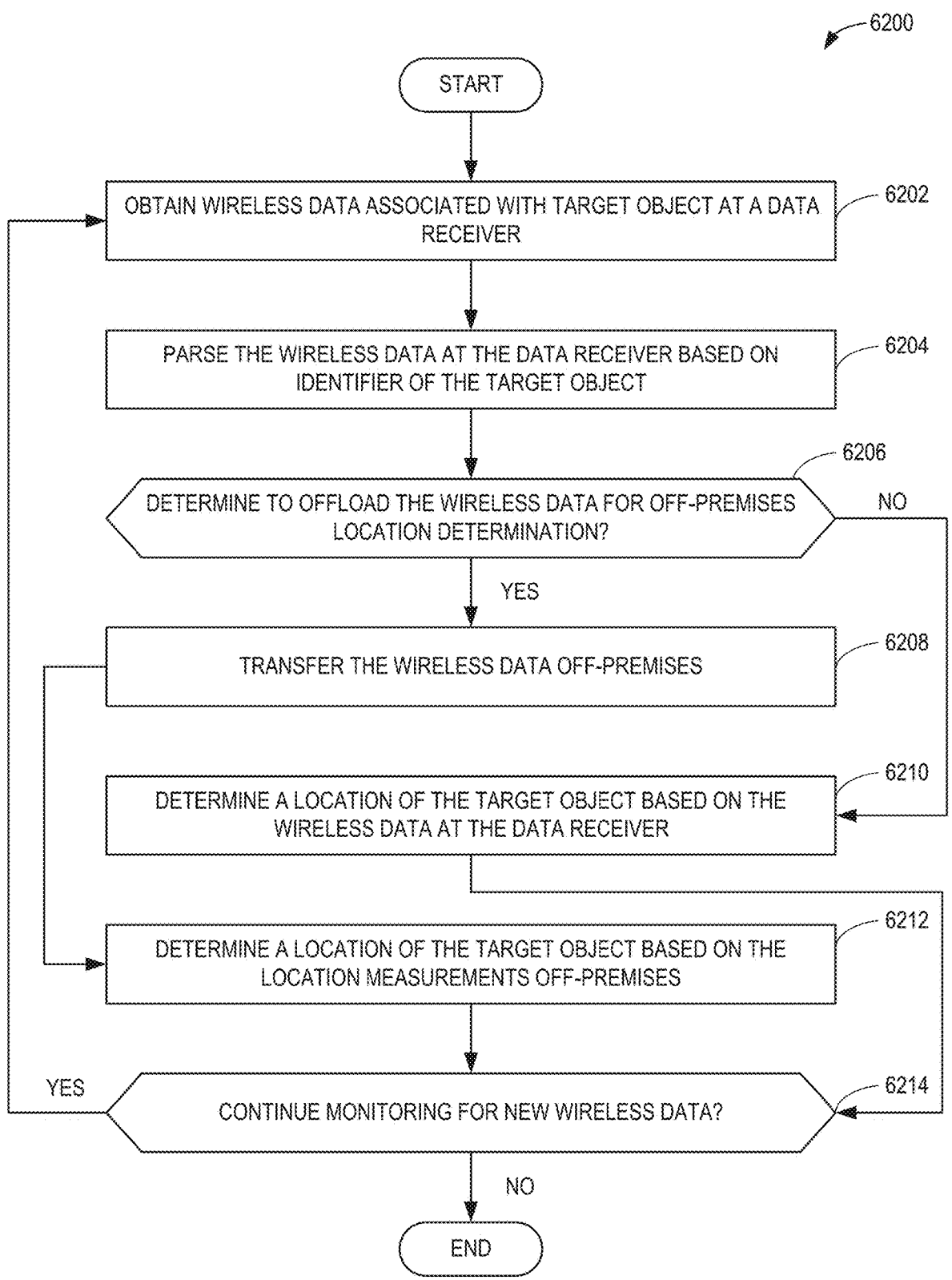

FIG. 62 is a flowchart representative of example machine-readable instructions and/or example operations that may be executed and/or instantiated by example processor circuitry to implement the example location engine circuitry of FIGS. 1 and/or 4 to determine a location of a device and/or an object based on at least one of on-premises or off-premises determination(s).

Figure 63A:
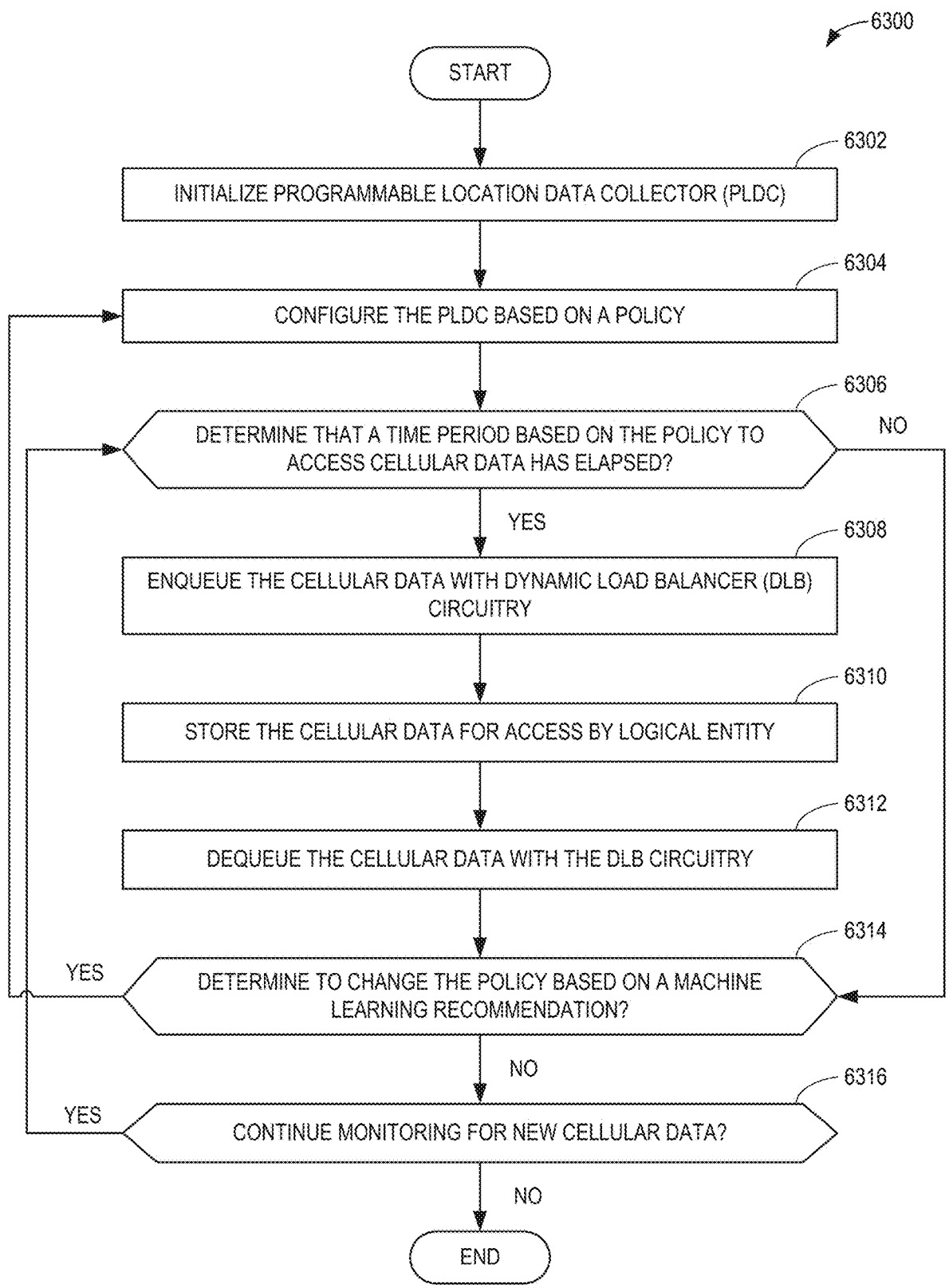

FIG. 63A is a flowchart representative of example machine-readable instructions and/or example operations that may be executed and/or instantiated by example processor circuitry to implement the example location engine circuitry of FIGS. 1 and/or 4 to access cellular data based on a policy.

Figure 63B:
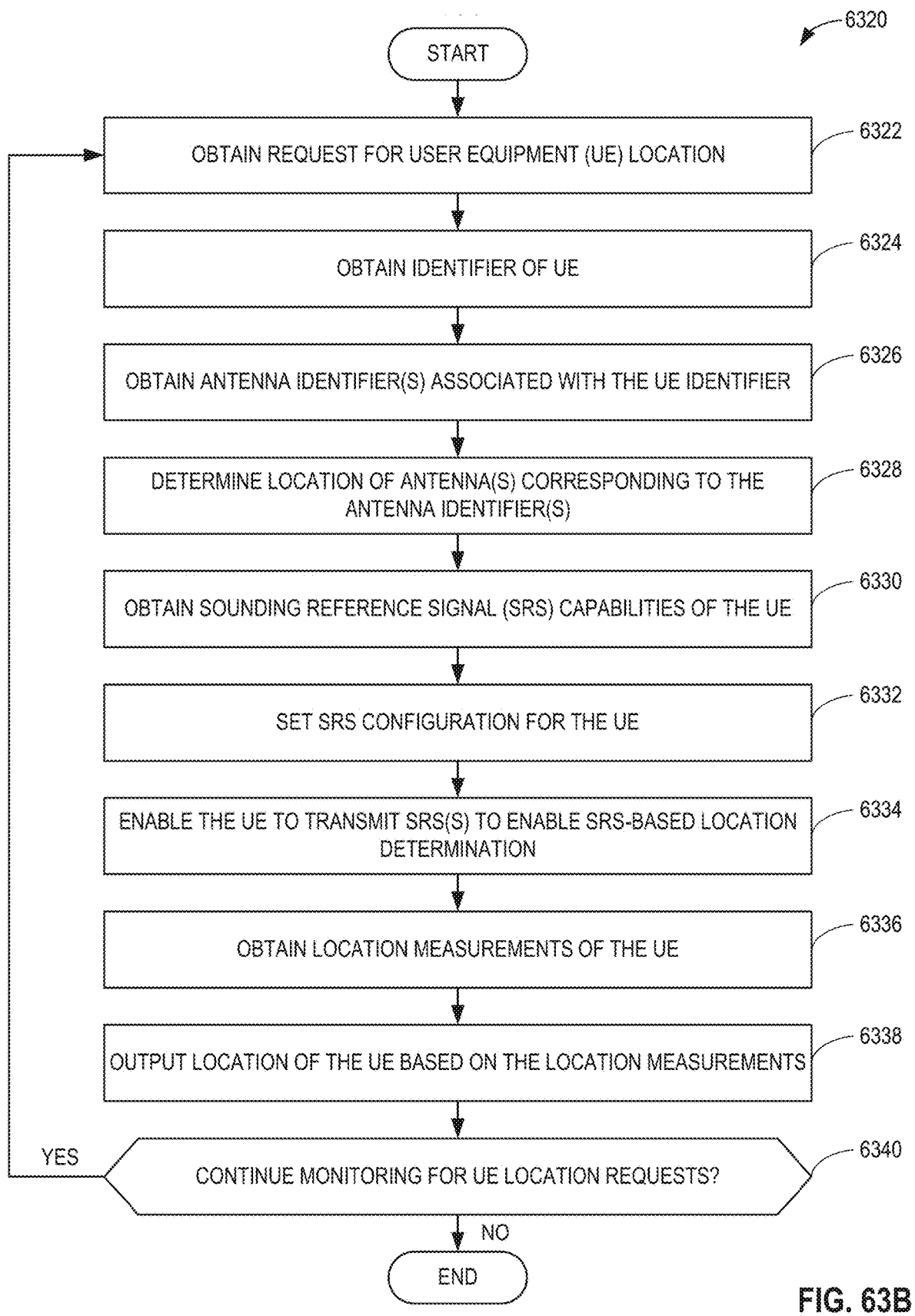

FIG. 63B is a flowchart representative of example machine-readable instructions and/or example operations that may be executed and/or instantiated by example processor circuitry to implement the example location engine circuitry of FIGS. 1 and/or 4 to output a location of user equipment based on a location measurement.

Figure 63C:
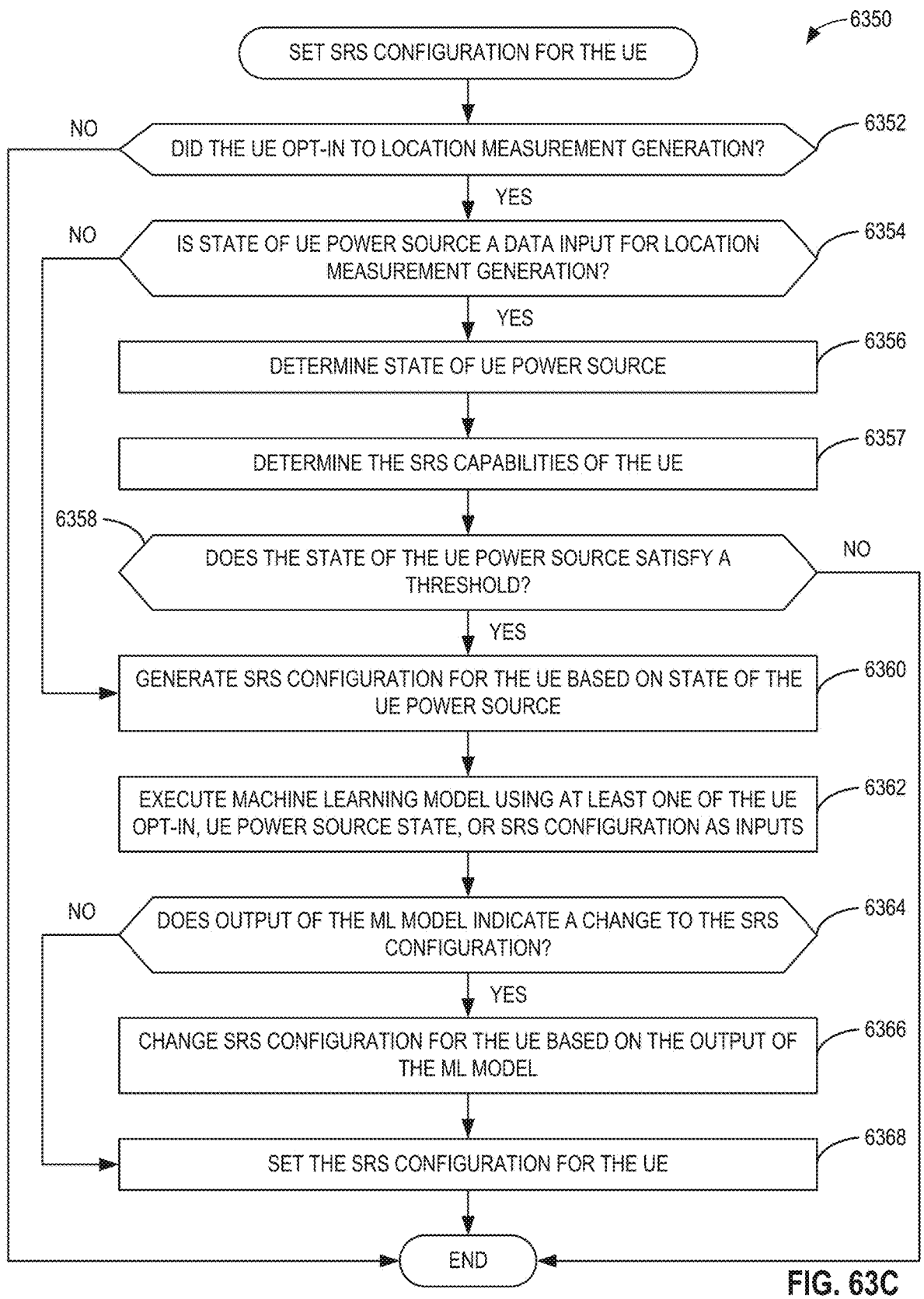

FIG. 63C is a flowchart representative of example machine-readable instructions and/or example operations that may be executed and/or instantiated by example processor circuitry to implement the example location engine circuitry of FIGS. 1 and/or 4 to set a sounding reference signal configuration for user equipment.

Figure 63D:
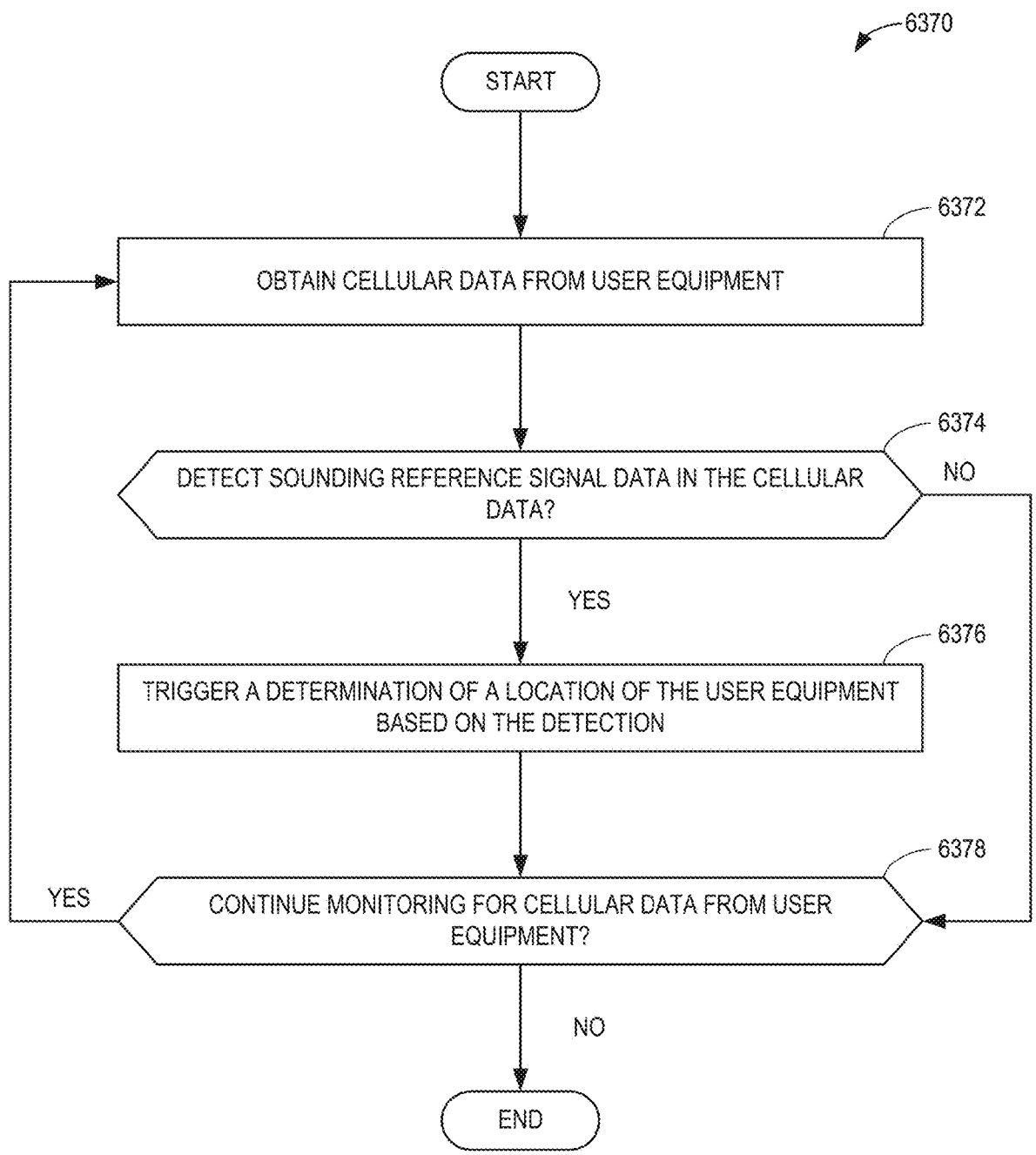

FIG. 63D is a flowchart representative of example machine-readable instructions and/or example operations that may be executed and/or instantiated by example processor circuitry to implement the example location engine circuitry of FIGS. 1 and/or 4 to trigger location determination of user equipment based on a detection of sounding reference signal data.

Figure 64:
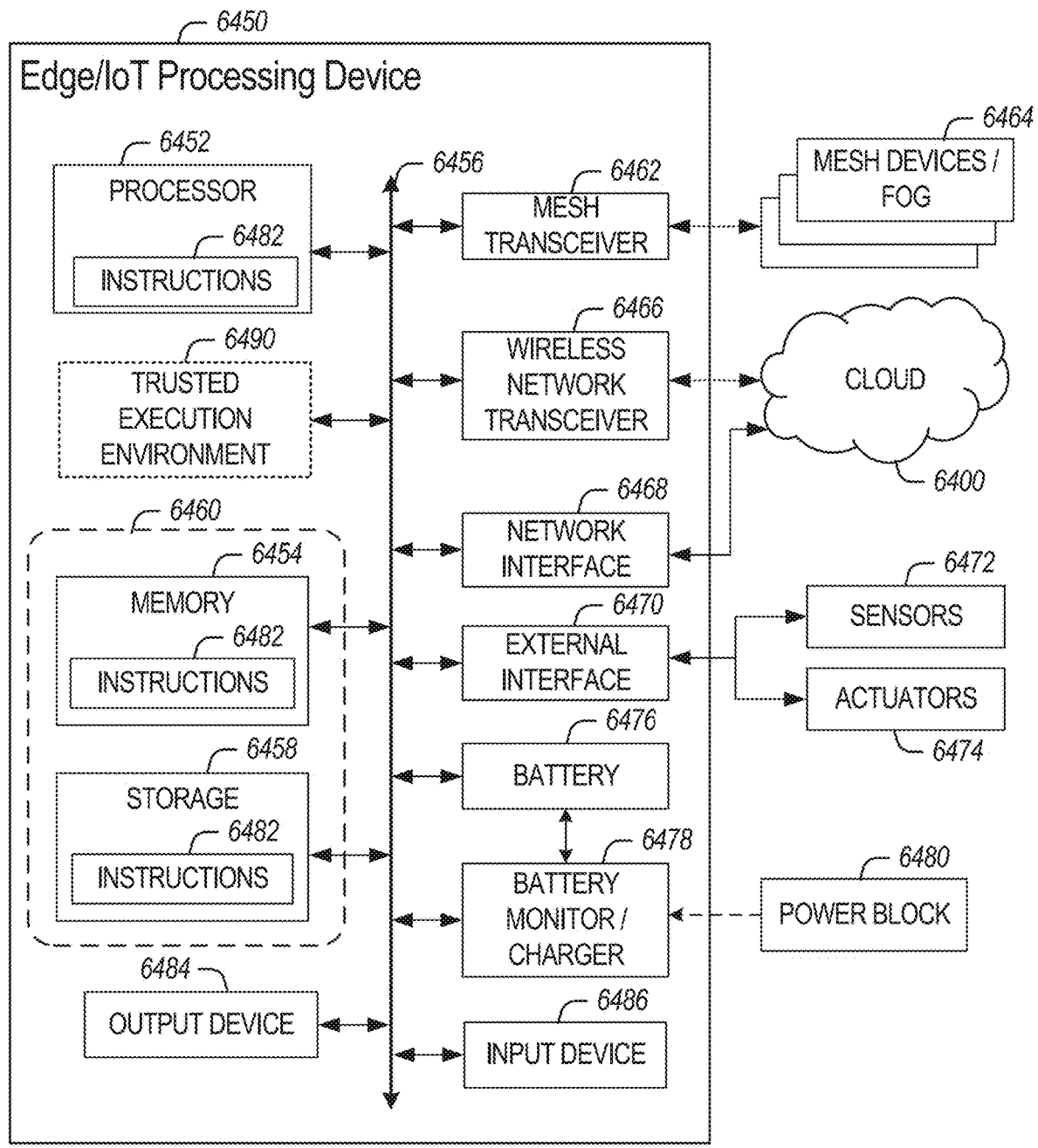

FIG. 64 illustrates a block diagram for an example IoT processing system architecture upon which any one or more of the techniques (e.g., operations, processes, methods, and methodologies) discussed herein may be performed, according to an example.

Figure 65:
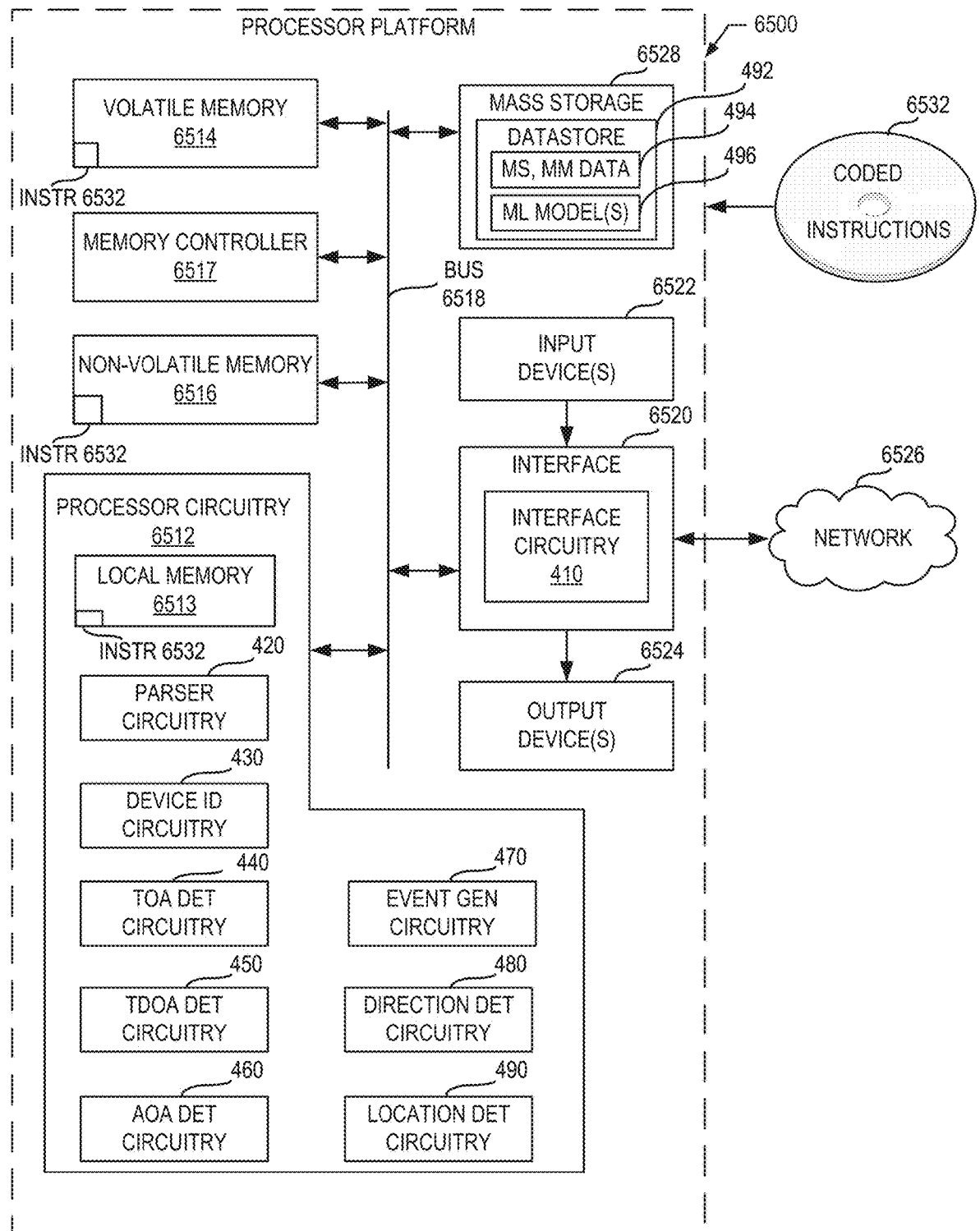

FIG. 65 is a block diagram of an example processing platform including processor circuitry structured to execute and/or instantiate the example machine-readable instructions and/or the example operations of FIGS. 48-63D to implement the example location engine circuitry of FIGS. 1 and/or 4.

Figure 66:
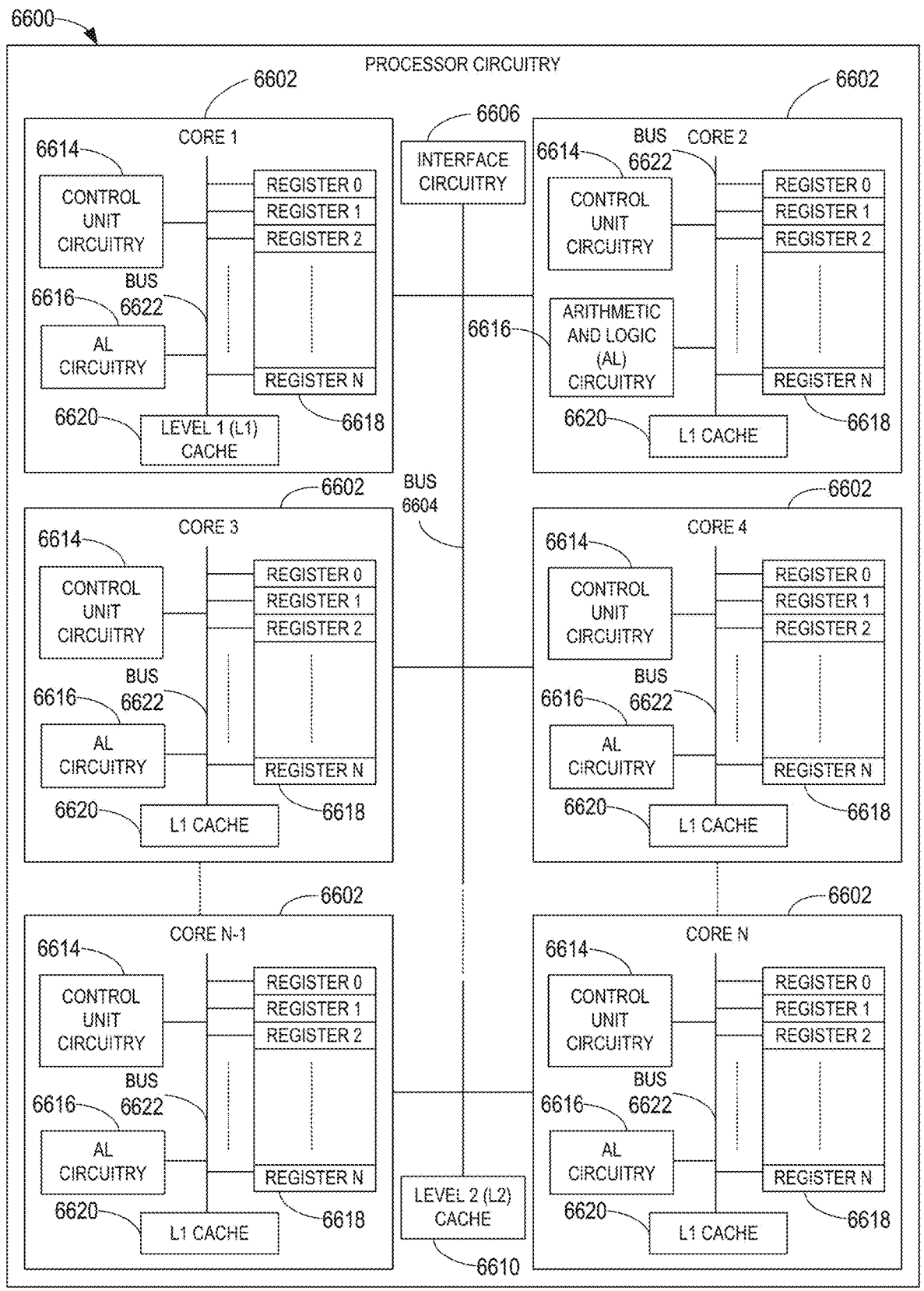

FIG. 66 is a block diagram of an example implementation of the example processor of FIG. 64 and/or the example processor circuitry of FIG. 65.

Figure 67:
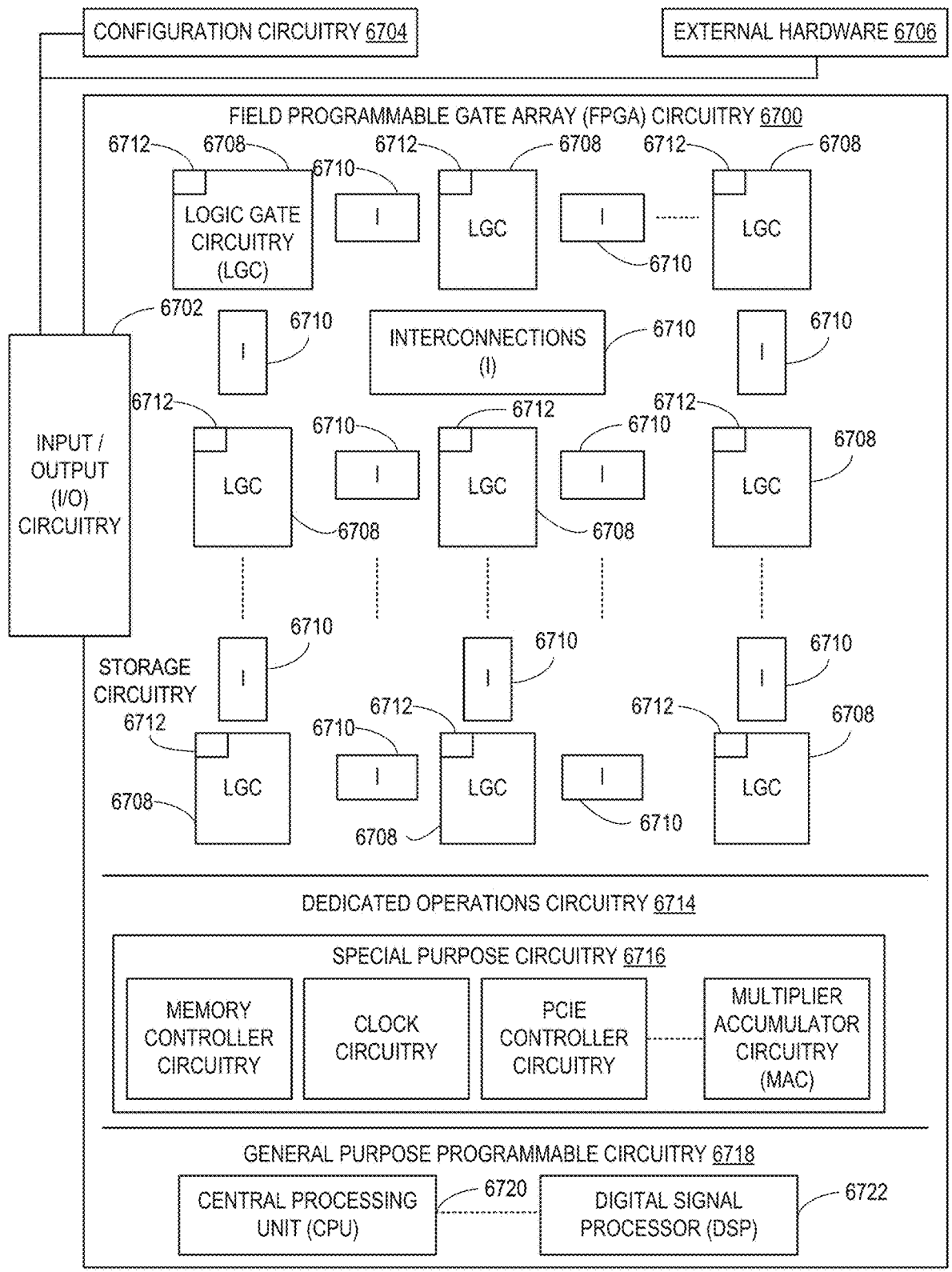

FIG. 67 is a block diagram of another example implementation of the example processor of FIG. 64 and/or the example processor circuitry of FIG. 65.

Figure 68:
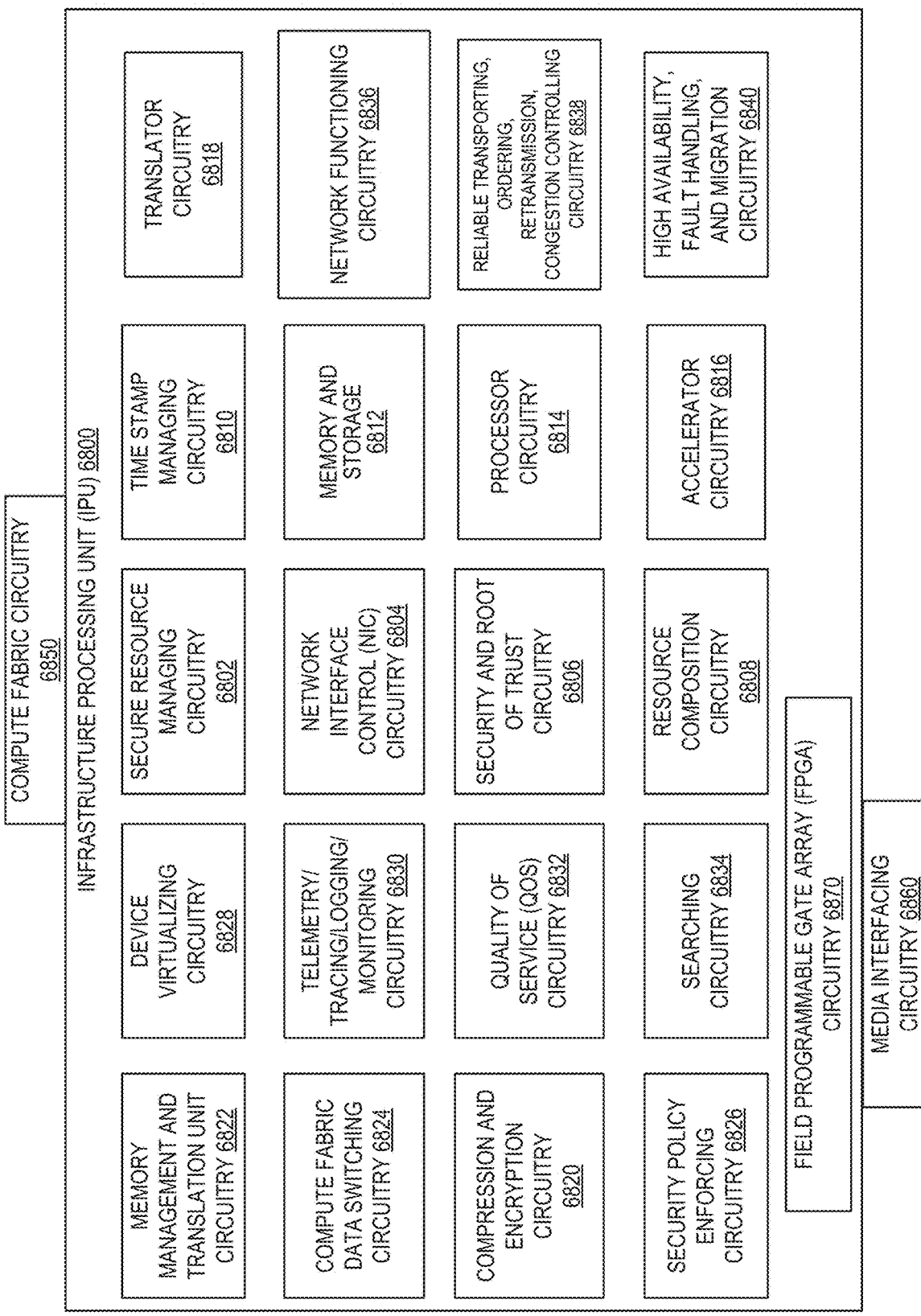

FIG. 68 is a schematic diagram of an example infrastructure processing unit (IPU).

Figure 69:
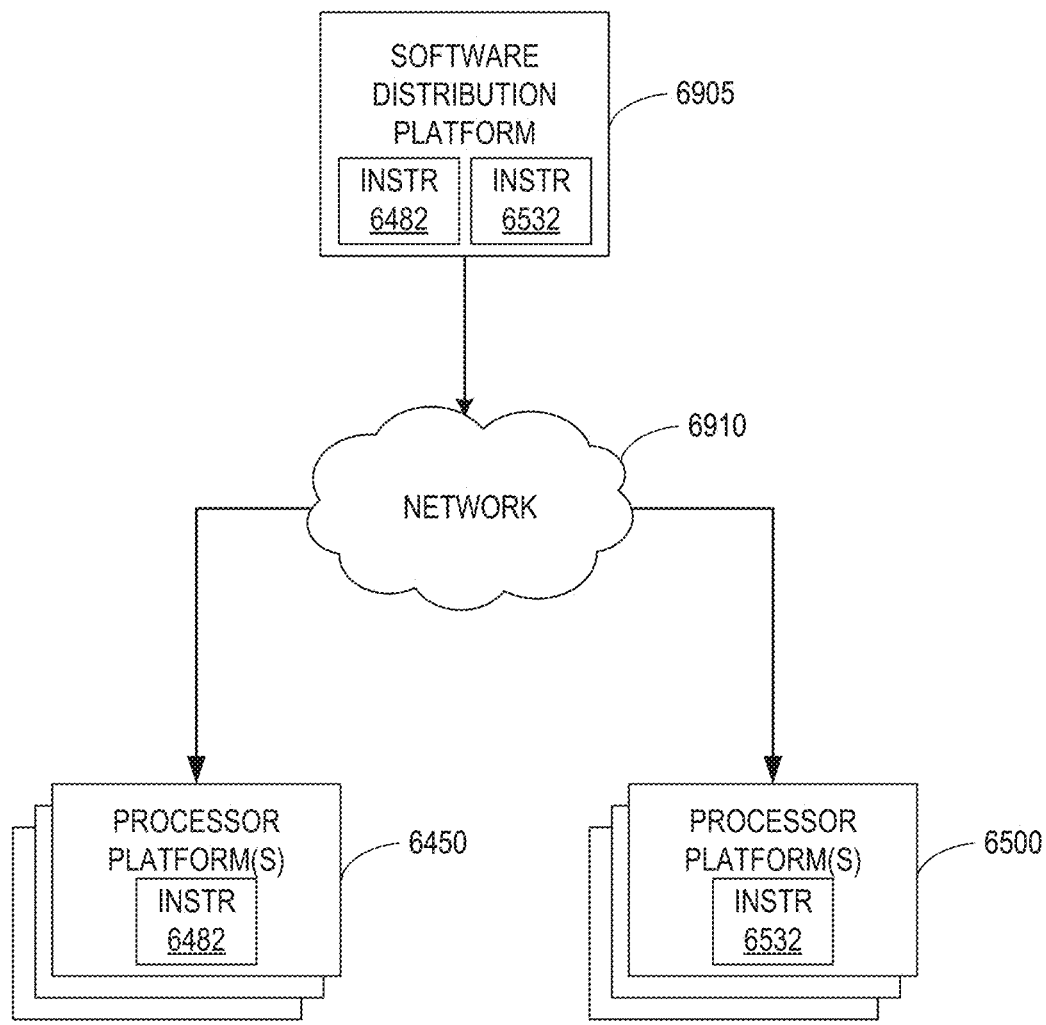

FIG. 69 is a block diagram of an example software distribution platform (e.g., one or more servers) to distribute software (e.g., software corresponding to the example machine-readable instructions of FIGS. 48-63D) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

DETAILED DESCRIPTION

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" and "substantially real-time" refer to occurrence in a near instantaneous manner recognizing there may be real-world delays for computing time, transmission, etc. Thus, unless otherwise specified, "substantially real time" and "substantially real-time" refer to being within a 1-second time frame of real time. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

5G new radio (5G NR) brings forward new radio sounding and beam forming technologies into mainstream service provider deployments that provide the infrastructure to break the reliance on satellite-based location technologies and move toward complete (i.e., 100%) terrestrial-based location capabilities. Specifically, 5G NR infrastructure together with the techniques disclosed herein enable service providers to move toward terrestrial indoor precise positioning using terrestrial radio techniques, such as location services that are calculated and computed from a network that utilize existing 5G user equipment (UE).

Multi-spectrum (or multispectral or multi-spectral), multi-modal terrestrial and non-terrestrial sensors and/or communication connection technologies may be used to determine (e.g., continuously determine, periodically determine, aperiodically determine, etc.) locations of objects. For example, objects may include persons (e.g., pedestrians, humans or persons in an industrial or manufacturing setting, etc.) and/or animals, along with devices (e.g., electronic, electrical, or computing devices), equipment, tools, vehicles, and/or other physical or tangible assets. Billions of devices (e.g., electronic, electrical, or computing devices) rely on some form of location-aware capabilities instrumental to several industries and sectors that leverage terrestrial techniques in cellular networks and/or non-terrestrial techniques in satellite-based networks. Example devices can include fourth generation Long-Term Evolution (i.e., 4G LTE) enabled devices, fifth or sixth generation cellular (i.e., 5G or 6G) enabled devices, Citizens Broadband Radio Service (CBRS) enabled devices, category 1 (CAT-1) devices, category M (CAT-M) devices, Narrowband Internet of Things (NB-IoT) devices, etc., and/or any combination(s) thereof. Example terrestrial techniques may include time-of-arrival (TOA), time-difference-of-arrival (TDOA), angle-of-arrival (AOA), round-trip time (RTT), etc. Example non-terrestrial techniques may include sync pulse generator (SPG) techniques, global navigation satellite system (GNSS) techniques, etc.

Location detection and/or determination capabilities have many shortcomings including varying signal strength of location devices associated with active or mobile objects, or executing continuous coverage of passive or non-moving objects. Such shortcomings may challenge positioning, navigation, and timing (PNT) resilience in important applications (e.g., asset inventory management, infrastructure (e.g., non-civilian, civilian, and commercial applications, systems, and infrastructure), manufacturing, transportation, etc.). For example, in applications that rely on Global Positioning System (GPS) services for location detection/determination, potential signal loss, unverified or unauthenticated receipt of GPS data and ranging signals, etc., may be detrimental to such applications with varying degrees of consequences. In some examples, applications relying on satellite GPS/GNSS location determination may be limited because of signal strength used for doppler frequency shift signatures. For example, weak signals from geosynchronous equatorial orbit (GEO) (also referred to as geostationary orbit) satellites may be susceptible to malicious activity (e.g., jamming and spoofing) or inherent electromagnetic challenges such as noise and/or interference. In some examples, terrestrial-based location determination may be limited by discontinuous global coverage (e.g., gaps between networks), local obstructions to sensors causing a break in object tracking, etc., and/or any combination(s) thereof.

Examples disclosed herein include data driven location detection and/or data driven location determination using multi-spectrum, multi-modal terrestrial and/or non-terrestrial techniques and sensors to achieve continuous coverage of devices and/or objects. In some disclosed examples, a device can be an electronic and/or computing device, such as a handset device (e.g., a smartphone), a tablet, an Internet-of-Things device, industrial equipment, a wearable device, a vehicle, etc. In some disclosed examples, a device can be active by being powered and/or enabled to transmit and/or receive data. In some disclosed examples, a device can be passive by being nonpowered, unpowered, and/or disabled to transmit and/or receive data. In some disclosed examples, a device that is nonpowered, unpowered, etc., can be an object. For example, a smartphone that is turned off, has a dead battery, has a battery removed, etc., can be a device and/or an object. In some disclosed examples, a Bluetooth-enabled hand-operated power drill with an electronic display (e.g., an electronic display that can present a percentage of battery life, an electronic display to facilitate Bluetooth communication, etc.) can be a device and/or an object. For example, the hand-operated power drill can be a device when the hand-operated power drill is transmitting and/or receiving wireless data, such as Bluetooth data. In some disclosed examples, the hand-operated power drill can be an object when the hand-operated enables the electronic display and disables Bluetooth (e.g., is not transmitting and/or receiving Bluetooth data). In some disclosed examples, the hand-operated power drill can be an object when the hand-operated disables the electronic display and Bluetooth (e.g., is not transmitting and/or receiving Bluetooth data).

In some disclosed examples, an object can be equipment (e.g., a bulldozer, a forklift, a robot, a vehicle, etc.), a person, a tool (e.g., a hammer, a screwdriver, etc.), etc. In some disclosed examples, an object can be an active object, such as an object that is in motion (e.g., equipment that is moving, a vehicle in motion, etc.). In some disclosed examples, an object can be a passive object, such as a tool that is not in use and/or in storage. In some disclosed examples, an object that is powered (e.g., powered on) can be a device. For example, a nonpowered, unpowered, etc., Bluetooth and/or Wi-Fi-capable screwdriver can be a device and/or an object. In some disclosed examples, a powered Bluetooth and/or Wi-Fi capable screwdriver can be a device and/or an object. In some disclosed examples, a device is an object. In some disclosed examples, an object may not be a device.

As used herein, the terms "location" and "position" are used interchangeably and refer to at least one of a qualitative or quantitative description or representation of where a device, an object, etc., can be found. For example, a qualitative description or representation can be an address (e.g., a number, street name, city, state, country, and/or zip code), a description of a type of structure (e.g., an airport, a hangar, an office, a school, a warehouse, etc.) that houses a device, an object, etc., and/or any combination(s) thereof. In some examples, a quantitative description or representation can be array(s) including alphanumeric data, coordinates (e.g., Cartesian coordinates, celestial coordinates, geographic coordinates, GPS coordinates, N-sphere coordinates, spherical coordinates, etc.), vectors including alphanumeric data, etc., and/or any combination(s) thereof.

Multi-spectrum (or multispectral or multi-spectral) may refer to two or more ranges of frequencies or wavelengths in the electromagnetic spectrum. For example, multi-spectrum data can include data based on two or more different ranges of frequencies or wavelengths in the electromagnetic spectrum. In some examples, the two or more ranges of frequencies or wavelengths can be heterogeneous (e.g., corresponding to different frequency/wavelength ranges processed by different connection technologies or wireless communication protocols), homogeneous (e.g., corresponding to different frequency/wavelength ranges processed by a specific type of connection technology or wireless communication protocol), or any combination(s) thereof. For example, heterogeneous, multi-spectrum location detection may be implemented as disclosed herein by determining a location of an object based on first data from light sensing (e.g., sensing based on light detection and ranging (LIDAR) techniques, sensing based on light frequencies in the electromagnetic spectrum, etc.) and second data from radio and/or microwave sensing (e.g., sensing based on Wireless Fidelity (Wi-Fi), cellular, Bluetooth®, etc., techniques, wireless communication protocols, etc.). In some examples, homogeneous, multi-spectrum location detection may be implemented as disclosed herein by determining a location of an object based on first data from a first type of cellular connection technology (e.g., 4G LTE), second data from a second type of cellular connection technology (e.g., 5G, 6G, etc.), etc., and/or any combination(s) thereof. In some examples, homogeneous, multi-spectrum location detection may be implemented as disclosed herein by determining a location of an object based on first data from a first type of Bluetooth connection technology (e.g., Bluetooth® low energy (BLE)), second data from a second type of Bluetooth connection technology (e.g., Bluetooth version 3.0 (v3.0), Bluetooth version 4.0 (v4.0), etc.), and/or any combination(s) thereof.

Multi-modal may refer to the utilization of multiple, different types of data (or data sources), which may be homogeneous, heterogeneous, or combination(s) thereof. For example, multi-modal data can include information from one or multiple sources that may be aggregated, fragmented, interleaved, and/or otherwise constructed. In some examples, multi-modal data can include data from different data sources, which can be of the same or different type. In some examples, multi-modal location detection may be implemented as disclosed herein by determining a location of an object based on data from multiple, different (e.g., heterogeneous) data sources (e.g., a LIDAR sensor, a video camera, a wireless communication beacon, etc.). In some examples, multi-modal location detection may be implemented as disclosed herein by determining a location of an object based on data from multiple, similar or same (e.g., homogeneous) data sources. For example, multi-modal location detection may be determined based on data from multiple cameras of the same or similar type (e.g., same manufacturer and/or vendor, same type of data input(s) and/or data output(s) but from different manufacturers/vendors, different make or model number from same manufacturer/vendor, etc.). In some examples, multi-modal location detection may be determined based on data from multiple beacons of the same or similar type. In some examples, multi-modal location detection may be determined based on data from multiple base stations. In some examples, multi-modal location detection may be determined based on data from multiple Wi-Fi access points.

Advantageously, in examples disclosed herein, any connection technology, such as Bluetooth, cellular, LIDAR, satellite, Wi-Fi, wired line or wireline Ethernet, etc., along with other (multi-modal) sensor information, such as cameras, motion detectors or motion sensors, and environmental sensors (e.g., an air pressure sensor, a carbon monoxide sensor, a humidity sensor, a light sensor, a temperature sensor, a water sensor, a wind speed sensor, etc.), and/or any combination(s) thereof, may be utilized to leverage legacy equipment, reduce installation costs and complexity, and/or improve accuracy of location detection. For example, sensors as disclosed herein can generate and/or output sensor data, which can be used for location determination. Any other type and/or quantity of sensors are contemplated. For example, accelerometers, audio sensors, biometric sensors (e.g., facial recognition detectors, fingerprint sensors, heartbeat sensors, iris recognition sensors, speech recognition sensors, etc.) capacitive sensors (e.g., fingerprint sensors, floor-based sensors to detect when a device and/or an object is on a portion of a floor, etc.), chemical and/or gas sensors, direction sensors (e.g., radio direction finders), electro-optical sensors, encoders (e.g., rotary encoders), geophones, gyroscopes, harmonic sensors, hydrophones, infrared sensors (e.g., infrared position sensors, infrared temperature sensors, etc.), laser rangefinders, laser surface velocimeters, map sensors, microphones, millimeter wave scanners, nanosensors, optical position sensors, photodetectors, pickup sensors, pressure sensors (e.g., floor-based and/or wall-based pressure sensors to detect when a device and/or an object is on a portion of a floor or in contact with a portion of a wall), position sensors, proximity sensors, radar systems (e.g., doppler, ground speed radar ultra-wideband radar), seismometers, shock detectors, sound locators, strain gauges (e.g., floor-based and/or wall-based strain gauges to detect when a device and/or an object is on a portion of a floor or in contact with a portion of a wall), time-of-flight sensors (e.g., time-of-flight cameras), triangulation and LIDAR Automated Rendezvous and Docking (TriDAR), tilt sensors, vibration sensors, etc., and/or any combination(s) thereof can be utilized for location detection and/or determination (e.g., utilized as input(s) to a location engine and/or a model, such as an AI/ML model, as disclosed herein). Advantageously, in some disclosed examples, the utilization of any connection technology, or any combination(s) thereof, may generate a diversity and/or sufficiency of data to improve location, identification, machine learning, and/or dynamic sensor utilization applications to reduce a total cost of ownership and thereby provide a higher return on investment (ROI) for civilian, commercial, and/or industrial stakeholders.

In some disclosed examples, a location engine can locate (e.g., position) (i) an active device or object or (ii) a passive device or object based on data (e.g., location data, sensor data, etc.) generated from multiple sensors. In some disclosed examples, the location engine can leverage the participation of active and/or passive devices or objects in the location detection of themselves. For example, an active device/object, such as a powered UE (e.g., a mobile handset device, a wearable device, etc.), can generate and transmit location data (e.g., sounding reference signal (SRS) data, 5G NR SRS data, 5G Layer 1 (L1) data, 5G data of a physical layer or Layer 1 (L1) of an Open Systems Interconnection (OSI) model, etc.) to the location engine.

In some disclosed examples, the location engine can utilize homogeneous data, heterogeneous data, etc., and/or any combination(s) thereof, based on at least one of need or availability. For example, the location engine may utilize homogeneous data for the computation and/or otherwise determination of location data while, in other disclosed examples, the location engine may utilize heterogeneous data for the computation and/or otherwise determination of the location data. In some disclosed examples, the location engine may utilize homogeneous data to determine location data and, after determination that the location data has an accuracy, a reliability, etc., that is less than a threshold (e.g., an accuracy threshold, a reliability threshold, etc.), the location engine may utilize heterogeneous data to determine the location data to improve the accuracy, the reliability, etc. In some examples, the location engine may utilize heterogeneous data to determine location data and, after determination that the location data has an accuracy, a reliability, etc., that is less than a threshold (e.g., an accuracy threshold, a reliability threshold, etc.), the location engine may utilize homogeneous data to determine the location data to improve the accuracy, the reliability, etc.

In some disclosed examples, the location engine may determine a measurement periodicity associated with an object based on a location of the object. For example, the location engine can generate an association of (i) UE, such as a smartphone, (ii) a measurement periodicity of 1 measurement calculation/determination/obtaining per second (or measurement calculation/determination/obtaining frequency of 1 Hertz (Hz)), and (iii) a location, such as a first floor of an automated warehouse (e.g., a warehouse that includes a plurality of robots or automated vehicles to carry out). In some disclosed examples, after a determination that the UE changed locations, such as from the first floor to a second floor of the automated warehouse, the location engine can change the measurement periodicity of 1 time per second (i.e., 1 Hz) to 5 times per second (i.e., 5 Hz) because the second floor can be a restricted area or an area with increased safety requirements. As used herein, the term "measurement frequency" may be used interchangeably with "sampling frequency" and/or "data sampling frequency."

In some disclosed examples, the location engine can be implemented by and/or use dynamic load balancers, which can be implemented by dynamic load balancer circuitry, to enqueue and/or dequeue received data for location determination outputs. In some examples, received data is persistent in memory for a time period necessary to avoid memory copies during the location determination. For example, a time period may be bound by specifying the number of 3GPP Transmission Time Interval (TTI) intervals. In some examples, TTIs are composed of consecutive orthogonal frequency-division multiplexing (OFDM) symbols in the time domain in a particular transmit direction. As used herein, the terms "dynamic load balance circuitry," "dynamic load balancing circuitry," and "dynamic load balancer circuitry" are used interchangeably. Advantageously, the location engine can utilize the dynamic load balancers to effectuate location determination of objects, which may have different measurement periodicities, measurement frequencies, or other requirements, with reduced latency and increased throughput.

In some disclosed examples, the location engine can determine a location of an object based on one or more example terrestrial techniques, such as TOA, TDOA, AOA, and/or RTT. In some disclosed examples, the location engine can determine a location of an object based on one or more example non-terrestrial techniques, such as SPG and/or GNSS. In some disclosed examples, the location engine can determine a location of an object locally at the location engine. In some disclosed examples, the location engine can offload and/or otherwise transfer data to a logical entity different from the location engine for location determination.

In some disclosed examples, the location engine can utilize machine-learning techniques to detect, identify, and/or otherwise determine a location of an object (e.g., an active object, a passive object, etc.). For example, the location engine can use different video pixels generated by a video camera, which can be one of multiple sensors tracking the object. In some disclosed examples, the location engine can execute a machine-learning model using the video pixels as inputs (e.g., data inputs, machine-learning inputs, machine-learning-model inputs, sensor inputs, video sensor inputs, video inputs, video data inputs, etc.) to generate outputs (e.g., data outputs, machine-learning outputs, machine-learning-model outputs, sensor outputs, video sensor outputs, video outputs, video data outputs, etc.). In some disclosed examples, the location engine can execute the machine-learning model to generate the outputs, which can include a prediction and/or otherwise a determination of an instant or instantaneous location of the object, a future or subsequent location of the object, etc., and/or any combination(s) thereof. In some disclosed examples, the location engine can execute the machine-learning model to generate the outputs to include detections of changes in an environment including the object. For example, the location engine can detect that another object or item is blocking the camera and/or the object of interest. By way of example, in an industrial environment including an autonomous robot having a robotic arm, the robotic arm may need to pick up a tool but the tool may have been previously moved away from the robotic arm. In some disclosed examples, the location engine can execute a machine-learning model to locate the tool and provide the location (e.g., the precise location, a location within a specified tolerance, etc.) of the tool to the robot so that the robot may re-find or locate the tool, pick up the tool, and/or execute an operation with the tool. Advantageously, the location engine can utilize machine-learning techniques, which can include the use of one or more machine learning models, by ingesting any and all data types from multiple spectrums, multiple modes, etc., as disclosed herein.

Examples disclosed herein can utilize any type of wireless communication, technology, technique, or schema. For example, location detection and/or determination techniques as disclosed herein can utilize and/or be based on ANT®, ANT+®, Dash 7, DigiMesh, EnOcean®, Global System for Mobile Communication (GSM), third generation cellular (i.e., 3G), Long-Term Evolution (e.g., LTE Category or Cat 0, LTE Cat 1, LTE Cat 3, LTE-M1, 4G LTE, etc.), 5G, 6G, Bluetooth®, Bluetooth Low-Energy (LE) (or also referred to as BLE), code division multiple access (CDMA), IPv6 over Low-Power Wireless Personal Area Networks (6LoWPAN), LoRaWAN™ (Long Range Wide Area Network), infrared, Narrowband IoT (NB-IoT®), near field communication (NFC®), radiofrequency identification (RFID), random phase multiple access (RPMA), satellite communication (e.g., GPS, a satellite communication protocol based on L-Band, S-Band, C-Band, Ka-Band, Ku-Band, Very High Frequency (VHF), Ultra High Frequency (UHF), etc.) SigFox®, Thread®, Weightless-N, Weightless-P, Weightless-W, Wi-Fi®, Wi-Fi® Direct, WiFi-ah (HaLow), WirelessHART, Zigbee®, Z-Wave®, etc. For example, the terms "wireless," "wireless connection," "wireless communication," wireless data," and/or the like as used herein can refer to one(s) of the above list. For example, "wireless communication" as used herein can be Wi-Fi® communication, Zigbee® communication, etc. The aforementioned list is not exhaustive but provided as an illustrative range of wireless technologies, techniques, or schemas that are contemplated to effectuate example location detection and/or determination techniques as disclosed herein.

Examples disclosed herein include automatic triggerable location determination of UE in cellular networks, such as 5G private and/or standalone networks. For example, after a detection of SRS data received at a radio unit, the location engine can be triggered to perform location determination of UE. In some disclosed examples, the location engine can determine a location of UE based on whether the UE opted-in to the location determination. For example, a user associated with a UE can determine to opt-out from location determination and, thus, achieve enhanced privacy by disabling location determination of the user's UE. In some disclosed examples, a user associated with a UE can determine to opt-in to location determination and, thus, achieve enhanced performance of applications that utilize location data.

In some disclosed examples, the location engine can determine a location of UE based on a characteristic and/or parameter of the UE. For example, the location engine can disable and/or otherwise turn off location determination of a UE after a determination that a power source of the UE, such as a battery, has a battery level below a battery level threshold. In some disclosed examples, the location engine can enable and/or otherwise turn on a location of a UE after a determination that a battery of the UE satisfies a battery level threshold, such as by meeting and/or being above the battery level threshold. Advantageously, the location engine can enable a user associated with a UE to achieve an improved user experience associated with the UE by improving and/or optimizing battery life in connection with location determination services. In some disclosed examples, the location engine can execute and/or instantiate machine-learning models using the opt-in data and/or the UE characteristics/parameters as data inputs to generate data outputs, which can include a configuration of the UE to generate and/or transmit SRS data to facilitate location determination of the UE.

FIG. 1 is an illustration of an example location determination environment 100 including an example outdoor environment 102 and an example indoor environment 104. The outdoor environment 102 includes an example global positioning system (GPS) satellite 106, an example low-Earth orbit (LEO) satellite 107, an example fifth generation cellular (i.e., 5G) system 108 (e.g., a fifth generation cellular network), and a first example industrial machine 110. In some examples, the 5G cellular system 108 may be implemented by one or more radio antennas, remote radio units (RRUs) radio towers, radio access network (RAN) devices, distributed units (DUs), central or centralized units (CUs), etc., and/or any combination(s) thereof. Additionally or alternatively, the outdoor environment 102 may include any other type of satellite (e.g., a high-Earth orbit (HEO) satellite), a Global System for Mobile Communications (GSM) network, a Long-Term Evolution (LTE) network, a sixth generation cellular (i.e., 6G) network or system, etc. The first industrial machine 110 is a connection-technology-enabled forklift. For example, the first industrial machine 110 can be a Bluetooth-enabled forklift. Additionally or alternatively, the first industrial machine 110 may be enabled to connect to other device(s) via any other connection technology (e.g., 5G/6G, Wireless Fidelity (Wi-Fi), etc.). For example, the first industrial equipment 110 can include a cellular transceiver (e.g., a 4G LTE, 5G, 6G, etc., transceiver), a Wi-Fi transceiver, etc.

The indoor environment 104 of the illustrated example includes a second example industrial machine 112, example storage containers (e.g., boxes, crates, etc.) 114, example video cameras (e.g., infrared cameras, surveillance cameras, etc.) 116, 118, 120, 122, example Wi-Fi devices (e.g., Wi-Fi beacons, Wi-Fi enabled sensors, routers, modems, gateways, access points (APs), hotspots, tags, etc.) 124, 126, 128, example 5G devices (e.g., 5G beacons, 5G enabled sensors, access points, hotspots, etc.) 130, 132, example Bluetooth devices (e.g., Bluetooth beacons, Bluetooth enabled sensors, APs, hotspots, tags, etc.) 134, 136, and an example radiofrequency identification (RFID) system 138. In the illustrated example, the second industrial machine 112 is a connection technology enabled forklift. For example, the second industrial machine 112 can be a Bluetooth-enabled forklift. In some examples, the second industrial machine 112 can implement a Bluetooth system as a Bluetooth-enabled forklift. In some examples, the Bluetooth devices 134, 136 can separately be Bluetooth systems and/or combine to form a Bluetooth system. Additionally or alternatively, the industrial machine 112 may be enabled to connect to other device(s) via any other connection technology (e.g., 5G/6G, Wi-Fi, infrared wireless communication, etc.). For example, the industrial machine 112 can implement a Wi-Fi system as a Wi-Fi enabled forklift.

In some examples, one(s) of the storage containers 114 can be enabled with connection technology. For example, one(s) of the storage containers 114 can be affixed with, coupled to, and/or otherwise include an RFID device (e.g., an RFID tag), an antenna (e.g., a Bluetooth antenna, a Wi-Fi antenna, a 5G/6G antenna, etc.), a transmitter (e.g., a Bluetooth transmitter, a Wi-Fi transmitter, a 5G/6G transmitter, etc.), etc., and/or any combination(s) thereof. In some examples, the RFID system 138 may be implemented by one or more radio transponders, receivers, transmitters, etc., and/or any combination(s) thereof.

The location determination environment 100 includes example location engine circuitry 140 to determine location(s) of object(s) based on data (e.g., multi-spectrum, multi-modal data) from data producer(s). In some examples, data producer(s) (e.g., electronic device(s), sensor(s), processor circuitry, etc.) can be clustered. For example, one(s) of the video cameras 116, 118, 120, 122 can be coupled to one(s) of the industrial machines 110, 112. In some examples, other sensors, such as audio sensors (e.g., harmonic sensors, microphones, speakers, vibration sensors, etc.), can be coupled to the industrial machines 110, 112, one(s) of the storage container(s) 114, etc. For example, the location engine circuitry 140 can obtain audio-related data, such as Delivered Audio Quality (DAQ) data, amplitude data, frequency data, etc., and/or any combination(s) thereof, from the audio sensor(s) from which location data may be determined. In some examples, the data producer(s) of the illustrated example are not singular in function and can be used in connection with one(s) of the other data producer(s). For example, the location engine circuitry 140 can obtain video data from the video cameras 116, 118, 120, 122, and provide the video data as input(s) (e.g., video data input(s), video sensor input(s), etc.) to an autonomous driving system of the industrial machines 110, 112 to cause the autonomous driving system to change a direction, speed, etc., of the industrial machines 110, 112 based on the video data.

In some examples, the location engine circuitry 140 can utilize portion(s) of data to achieve location detection and/or determination. By way of example, the location engine circuitry 140 can obtain audio data from an audio sensor, such as a vibration sensor. In some examples, the location engine circuitry 140 can perform digital signal processing on the audio data to output amplitude data, frequency data, etc. For example, the location engine circuitry 140 can identify different amplitudes and/or frequencies in the audio data; associated the different amplitudes and/or the frequencies with a device and/or an object; and determine a location of the device and/or the object based on the associations. For example, the location engine circuitry 140 can execute and/or instantiate an AI/ML model with the amplitudes and/or the frequencies as inputs to generate outputs, which can include identifications of possible or potential matches to sources of the amplitudes and/or the frequencies. For example, the location engine circuitry 140 can determine that the outputs are representative of a horn of the second industrial machine 112 as the source of the amplitudes and/or the frequencies. In some examples, the location engine circuitry 140 can determine a location of the second industrial machine 112 based on a determination that the source of the amplitudes and/or the frequencies (or a subset of the amplitudes and/or the frequencies) belong to the second industrial machine 112. In some examples, the location engine circuitry 140 can store the amplitudes and/or the frequencies as a signature to be associated with the second industrial machine 112. In some examples, the signature (e.g., the audio-based signature) can be stored in a datastore for access and/or utilization by the location engine circuitry 140 for comparison purposes. For example, the location engine circuitry 140 can generate a signature based on obtained audio data and compare the signature to a reference signature in a datastore; determine that the signature matches (or partially matches) the reference signature; and determine that the signature is associated with the second industrial machine 112 based on the matching (or partial matching).

In the illustrated example, one(s) of the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 can be in communication with one(s) of each other via one or more connection technologies (e.g., Bluetooth, Wi-Fi, RFID, 5G/6G, etc.). In some examples, one(s) of the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 can be in communication with the location engine circuitry 140 via an example network 142. In some examples, the network 142 can be the Internet. In some examples, the network 142 can be implemented using any suitable wired and/or wireless network(s) including, for example, one or more data buses, one or more Local Area Networks (LANs), one or more wireless LANs (WLANs), one or more cellular networks, one or more private networks, one or more public networks, one or more optical networks, one or more satellite networks, one or more line-of-site (LOS) networks, one or more beyond-line-of-site (BLOS) networks, etc.

In the illustrated example of FIG. 1, the outdoor environment 102 and/or the indoor environment 104, and/or, more generally, the location determination environment 100, can implement a smart warehouse (e.g., an automated or smart commercial warehouse, an automated or smart industrial warehouse, etc.). For example, the outdoor environment 102, the indoor environment 104, and/or, more generally, the location determination environment 100, can implement one(s) of the computational use cases 4305 of FIG. 43, such as manufacturing, smart building, logistics, vehicle, and/or video computational use cases. In some examples, the smart warehouse of the illustrated example can include the first industrial machine 110 and/or the second industrial machine 112 moving one(s) of the storage containers 114 from location to location (e.g., from a first shelf to a second shelf, from the first shelf to a pallet, from the first shelf to a truck, etc.). In some examples, the first industrial machine 110 and/or the second industrial machine 112 can transport one(s) of the storage containers 114 between the indoor environment 104 and the outdoor environment 102s.

Although a single instance of the location engine circuitry 140 is depicted in the illustrated example, in some examples, more than one instance of the location engine circuitry 140 can be utilized. For example, the location engine circuitry 140 depicted in FIG. 1 can be a first instance of the location engine circuitry 140 associated with a first spatial relational space and the location determination environment 100 can include a second instance of the location engine circuitry 140 associated with a second spatial relational space (e.g., a different indoor environment, a different portion of the indoor environment 104, a different outdoor environment, a different portion of the outdoor environment 102, etc.). In some examples, the first and second instances of the location engine circuitry 140 can exchange, share, and/or otherwise provide each other with multi-spectrum, multi-modal data that they have respectively obtained and/or processed. In some examples, the first and second instances of the location engine circuitry 140 can combine, fuse, and/or otherwise merge data from the different spatial relational spaces, domains, etc., to generate result(s), such as location(s) of object(s) desired to be tracked and/or otherwise located.

In some examples, one(s) of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 can include the location engine circuitry 140, or portion(s) thereof. For example, the RFID system 138 (or any other electronic device or UE of FIG. 1) can include and/or implement the location engine circuitry 140 to determine a location of the RFID system 138 and/or one(s) of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, and/or the Bluetooth devices 134, 136. In some examples, a first device, such as a first one of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138, can output its own location to a second device, such as a first one of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138, to determine a location of the second device. For example, the second industrial machine 112 can output a location of the first industrial machine 112 to the first Wi-Fi device 124 to cause the first Wi-Fi device 124 to determine a location of the first Wi-Fi device 124. In some examples, the second industrial machine 112 can execute and/or instantiate the location engine circuitry 140 to output a first location of the second industrial machine 112 to the first Wi-Fi device 124. In some examples, the first Wi-Fi device 124 can execute and/or instantiate the location engine circuitry 140 to determine a second location of the first Wi-Fi device 124 based on the first location.

In some examples, the location engine circuitry 140 can determine locations of objects of the location determination environment 100 based on multi-spectrum, multi-modal data sources. For example, the location engine circuitry 140 can obtain GPS data from the GPS satellite 106, location data from the LEO satellite 107, 5G data from the 5G cellular system 108, Bluetooth data from the first industrial machine 110 and/or the second industrial machine 112, image data from one(s) of the video cameras 116, 118, 120, 122, RFID data from the RFID system 138 (e.g., RFID data representative of a detection of the first industrial machine 110 and/or one(s) of the storage containers 114 passing within a detection range of the RFID system 138), etc., and/or any combination(s) thereof. In some examples, the location engine circuitry 140 can execute one or more machine-learning models using the multi-spectrum, multi-modal data as inputs (e.g., multi-spectrum, multi-modal data inputs) to generate outputs (e.g., multi-spectrum, locations, location results, location outputs, etc.). In some examples, the outputs can include, be representative of, and/or otherwise correspond to locations, predictions of locations, etc., of devices and/or objects of interest in the outdoor environment 102, the indoor environment 104, and/or, more generally, the location determination environment 100.

Advantageously, in some examples, the location engine circuitry 140 can determine locations of devices/objects in the location determination environment 100 based on homogeneous and/or heterogeneous data sources. For example, the location engine circuitry 140 can determine a location of a first storage container of the storage containers 114 based on homogeneous data sources. In some examples, the location engine circuitry 140 can determine the location of the first storage container based on data from (i) multiple one(s) of the video cameras 116, 118, 120, 122, (ii) multiple one(s) of the RFID system 138, (iii) multiple one(s) of the Wi-Fi devices 124, 126, 128, etc. In some examples, the location engine circuitry 140 can determine the location of the first storage container based on heterogeneous data sources. For example, the location engine circuitry 140 can determine the location of the first storage container based on data from (i) the first video camera 116 (ii) the RFID system 138, and/or (iii) the first Wi-Fi device 124. In some examples, the location engine circuitry 140 can determine the location of the first storage container based on homogeneous and heterogeneous data sources. For example, the location engine circuitry 140 can determine the location of the first storage container based on data from (i) multiple one(s) of the video cameras 116, 118, 120, 122 (ii) the RFID system 138, and (iii) the first Wi-Fi device 124 and the third Wi-Fi device 128.

Advantageously, in some examples, the location engine circuitry 140 can determine a location of a device/object using Wi-Fi positioning via fingerprinting. For example, fingerprinting can involve using a database that records, stores, etc., the location and signal strengths of surrounding APs, as well the coordinates of a Wi-Fi device, such as a smartphone or tracking tag in an inactive phase. In some examples, fingerprinting is received signal strength indicator (RSSI) based. In some examples, the location engine circuitry 140 can create and/or otherwise generate a fingerprinting database, which can involve a calibration process that may need to be repeatedly or iteratively performed. In some examples, the location engine circuitry 140 can compare RSSI values to fingerprint(s) in the database to estimate, determine, etc., a location of the device/object while the location engine circuitry 140 is actively tracking the device/object. Advantageously, the location engine circuitry 140 can use fingerprinting as a low-cost (e.g., computationally low cost, resource (e.g., hardware, software, and/or firmware resource) low cost, etc.) technique for Wi-Fi positioning, but fingerprinting may require updating (e.g., continuous updating, periodically updating, etc.) to trained radiofrequency patterns in the database. In some examples, fingerprinting is affected by signal attenuation, absorption, reflection, and/or interference. Advantageously, the location engine circuitry 140 can utilize triangulation or proximity techniques to mitigate and/or otherwise overcome such effects.

Advantageously, in some examples, the location engine circuitry 140 can determine a location of a device/object using light detection and ranging (LIDAR) techniques. LIDAR is an optical remote-sensing technique that uses laser light to densely sample a surface of a device/object to produce highly accurate x-, y-, and/or z-coordinate measurements. In some examples, LIDAR is used in airborne laser mapping applications, but is emerging as a cost-effective alternative to traditional surveying techniques. For example, the outdoor environment 102, the indoor environment 104, and/or, more generally, the location determination environment 100, can include LIDAR sensors, systems, etc., to output LIDAR data to the location engine circuitry 140. In some examples, mobile systems can include LIDAR sensor(s), camera(s), GPS, and/or inertial navigation system (INS) devices. In some examples, the location engine circuitry 140 can use mobile LIDAR data to analyze infrastructure (e.g., road infrastructure) and locate encroaching objects (e.g., overhead wires, light poles, and road signs near roadways or rail lines). In some examples, the location engine circuitry 140 can use static LIDAR data to generate LIDAR point clouds associated with a static location or object. For example, laser-based ranging and imaging systems can generate the static LIDAR data. In some examples, the laser-based ranging and imaging systems can collect LIDAR point clouds associated with inside buildings as well as exteriors. In some examples, the location engine circuitry 140 can obtain LIDAR data generated in various applications such as engineering, mining, surveying, and archaeology.

Advantageously, in some examples, the location engine circuitry 140 can determine a location of a device/object by using vision sensors (e.g., one(s) of the cameras 116, 118, 120, 122), motion detectors, optical sensors, etc.) to detect an orientation (e.g., a position) and/or accuracy of devices/objects. For example, a vision sensor can capture an image using a sensor head (e.g., a camera) and pass the image through a lens of the vision sensor to convert the image to an electrical signal by a light receiving element (e.g., a CMOS light sensor). In some examples, the converted image can be image data, image data inputs, image inputs, etc., which can be stored in memory and/or mass storage and/or provided to the location engine circuitry 140. In some examples, the vision sensor can determine a brightness and/or a shape of the device/object based on brightness and intensity information from pixel(s) of the light receiving element. In some examples, the light receiving element is based on a color type. For example, the received light information can be separated into multiple colors (e.g., red, green, blue (RGB)). In some examples, the vision sensor can identify an intensity range of each of the multiple colors, which makes it possible to distinguish between device/objects even when their colors have minimal intensity differences.

Advantageously, in some examples, the location engine circuitry 140 can determine a location of a device/object by using data generated by cellular connection technology (e.g., data from a RAN) and/or satellite connection technology. An example use case can involve a company or enterprise tracking a package by monitoring a delivery driver's route to deliver the package to a destination. In such an example use case, the delivery driver can utilize user equipment (UE), such as mobile device, that sends signals (e.g., wireless signals) to two example services: (1) a GPS location service implemented by the mobile device and the GPS satellite 106 and (2) a cellular location service implemented by the mobile device and the 5G cellular system 108. In optimal weather conditions (e.g., no clouds or few clouds, no precipitation or minimal precipitation, etc.), the GPS receiver in the mobile device can ping multiple ones of the GPS satellite 106 to cause generation of triangulation data with an example accuracy of approximately one to three meters. In some examples, the location engine circuitry 140 can obtain the location data (e.g., the triangulation data) to output location prediction(s) of the mobile device, and/or, more generally, the delivery driver.

Advantageously, in some examples, the location engine circuitry 140 can determine a location of a device/object based on one or more disclosed techniques. For example, the location engine circuitry 140 can determine a location of a device/object, such as the first industrial machine 110, based on data generated by a non-cellular technique or non-cellular connection technology, such as Wi-Fi, BLUETOOTH® low energy (BLE), Ultra-wideband (UWB), long range (LORA®) wireless networks, long range wide area networking (LORAWAN®), satellite, etc. In some examples, the location engine circuitry 140 can determine a location of a device/object based on data generated by a cellular technique or cellular connection technology, such as LTE, 5G, 6G, etc. In some examples, the location engine circuitry 140 can determine a location of a device/object based on data generated by a time-based technique, such as time-of-arrival (TOA), time-difference-of-arrival (TDOA), angle-of-arrival (AOA), round-trip-time (RTT), etc. In some examples, the location engine circuitry 140 can determine a location of a device/object based on data generated by a signal-based technique, such as using LTE positioning reference signals (PRS) (e.g., downlink LTE PRS), 5G sounding reference signals (SRSs) (e.g., uplink 5G SRS), UE-based technique(s), network-based technique(s), etc. In some examples, the location engine circuitry 140 can determine a location of a device/object based on data generated by a system technique, such as first data from a first technique (e.g., Wi-Fi) and second data from a second technique (e.g., uplink 5G SRS).

In some examples, the location engine circuitry 140 can determine a location of a device/object using a network-based technique. For example, a network-based technique can include a network (e.g., the 5G cellular system 108, the network 142, etc.) calculating measurements based on data (e.g., cellular data) and determining a location of a device/object based on the calculated measurements.

In some examples, the location engine circuitry 140 can determine a location of a device/object with a UE-based technique. For example, a UE-based technique can include a UE (e.g., a smartphone, the first Wi-Fi device 124, the first Bluetooth device 134, etc.) calculating measurements based on data (e.g., cellular data, Wi-Fi data, Bluetooth data, etc.) and determining a location of a device/object based on the calculated measurements without changes to associated network(s).

In some examples, the location engine circuitry 140 can determine a location of a device/object with a network-assisted technique or a UE-assisted based technique. For example, in network and UE-assisted techniques, the network and the UE can coordinate the generation of data, calculation of measurements, and location determination between each other. For example, in such techniques, the UE can calculate the measurements and the network can determine the location of a device/object based on the measurements. In some examples, such techniques are advantageous because the UE can have less calculation/computation power than the network and thereby leverage the resources of the network to effectuate location determination of object(s) of interest.

Continuing with the example use case, in some examples, the GPS location service (or portion(s) thereof) can be deployed through a mobile application executed by the mobile device. In some examples, the location engine circuitry 140 can track the mobile device through cellular base stations, such as the 5G system 108. For example, the mobile device can send signals to the closest instance of the 5G system 108 to access cellular network services, and the data based on the signals can be stored in a datastore (e.g., a datastore accessible to the location engine circuitry 140) for location detection of the mobile device. As used herein, the term "base station" refers to a device and/or is a device that can transmit and/or receive data via one or more wired connections and/or one or more wireless connections. For example, a base station can be implemented by a device that can transmit first data and/or receive second data. For example, a base station can be any type of device, such as an IoT device, a RAN, an RU, a satellite, etc. In some examples, a base station can be implemented by a device that can transmit first data and receive second data in response to the transmission of the first data.

In some examples, if previous location data is available for a similar delivery route, the location engine circuitry 140 can utilize the previous location data to generate an improved location detection prediction associated with the mobile device, and/or, more generally, the delivery driver. In some examples, if there is no previous location data available, the location engine circuitry 140 can assign a lower score (e.g., a confidence score, a data score, a trustworthiness score, etc.) as a weight (e.g., a confidence weight, a data weight, a trustworthiness weight, etc.) to the cellular tracking data. In some examples, the location engine circuitry 140 can assign weights at every instance of location gathering to allow for improved location detection predictions. In some examples, the cellular tracking of the mobile device is a less accurate location tracking technique than GPS location tracking, but the location engine circuitry 140 can utilize the cellular tracking data to cross-reference and/or otherwise verify GPS location tracking data or other data for improved location detection of objects, such as the mobile device associated with the delivery driver in the above-referenced example use case.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the location engine circuitry 140 can train a machine-learning model with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the location engine circuitry 140 generates machine-learning models as neural network models. The location engine circuitry 140 can use a neural network model to execute an AI/ML workload (e.g., an AI/ML compute or computational workload), which, in some examples, can be executed using one or more hardware accelerators. In general, machine-learning models/architectures that are suitable to use in the example approaches disclosed herein include recurrent neural networks. However, other types of machine learning models could additionally or alternatively be used such as supervised learning ANN models, clustering models, classification models, etc., and/or any combination(s) thereof. Example supervised learning ANN models can include two-layer (2-layer) radial basis neural networks (RBN), learning vector quantization (LVQ) classification neural networks, etc. Example clustering models can include k-means clustering, hierarchical clustering, mean shift clustering, density-based clustering, etc. Example classification models can include logistic regression, support-vector machine or network, Naive Bayes, etc. In some examples, the location engine circuitry 140 can compile, generate, and/or otherwise output a machine-learning model as a lightweight machine-learning model.

In general, implementing an AI/ML system involves two phases, a learning/training phase and an inference phase. In the learning/training phase, the location engine circuitry 140 can use a training algorithm to train a machine-learning model to operate in accordance with patterns and/or associations based on, for example, training data. In general, a machine-learning model include(s) internal parameters (e.g., configuration register data) that guide how input data is transformed into output data, such as through a series of nodes and connections within the machine-learning model to transform input data into output data. Additionally, the location engine circuitry 140 can use hyperparameters as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of AI/ML model and/or the expected output. For example, the location engine circuitry 140 can invoke supervised training to use inputs and corresponding expected (e.g., labeled) outputs to select parameters (e.g., by iterating over combinations of select parameters) for the machine-learning model that reduce model error. As used herein, "labeling" refers to an expected output of the machine learning model (e.g., a classification, an expected output value, etc.). Additionally or alternatively, the location engine circuitry 140 may invoke unsupervised training (e.g., used in deep learning, a subset of machine learning, etc.) that involves inferring patterns from inputs to select parameters for the machine-learning model (e.g., without the benefit of expected (e.g., labeled) outputs).

In some examples, the location engine circuitry 140 can train a machine-learning model using unsupervised clustering of operating observables. For example, the operating observables can include a certificate (e.g., a digital certificate), an Internet Protocol (IP) address, a manufacturer and/or vendor identifier, a media access control (MAC) address, a serial number, a universally unique identifier (UUID), etc., of a device (e.g., an electronic device, an enterprise device, an Internet-of-Things (IoT) device, etc.). In some examples, the operating observables can be an object identifier, a visual data representation (e.g., a picture, a point cloud, etc.), a serial number, etc., of an object. However, the location engine circuitry 140 may additionally or alternatively use any other training algorithm such as stochastic gradient descent, Simulated Annealing, Particle Swarm Optimization, Evolution Algorithms, Genetic Algorithms, Nonlinear Conjugate Gradient, etc., and/or any combination(s) thereof.

In some examples, the location engine circuitry 140 can train the machine-learning model until the level of error is no longer reducing. In some examples, the location engine circuitry 140 can train the machine-learning model locally on the location engine circuitry 140 and/or remotely at an external computing system communicatively coupled to and/or otherwise in communication with the network 142. In some examples, the location engine circuitry 140 can train the machine-learning model using hyperparameters that control how the learning is performed (e.g., a learning rate, a number of layers to be used in the machine learning model, etc.). In some examples, the location engine circuitry 140 can use hyperparameters that control model performance and training speed such as the learning rate and regularization parameter(s). The location engine circuitry 140 can select such hyperparameters by, for example, trial and error to reach an optimal model performance. In some examples, the location engine circuitry 140 can utilize Bayesian hyperparameter optimization to determine an optimal and/or otherwise improved or more efficient network architecture to avoid model overfitting and improve the overall applicability of the machine-learning model. Alternatively, the location engine circuitry 140 may execute and/or instantiate any other type of optimization. In some examples, the location engine circuitry 140 can perform re-training. For example, the location engine circuitry 140 can execute such re-training in response to override(s) by a user of the location engine circuitry 140, a receipt of new training data, etc.

In some examples, the location engine circuitry 140 can facilitate the training of the machine-learning model using training data. In some examples, the location engine circuitry 140 can utilize training data that originates from locally generated data, such as 5G Layer 1 (L1) data, audio data, image data, IP addresses, MAC addresses, radio identifiers, RFID scans, SRS data, etc. In some examples, the location engine circuitry 140 can utilize training data that originates from externally generated data. For example, the location engine circuitry 140 can utilize L1 data from any data source (e.g., an audio sensor, a camera, a RAN system, a satellite, etc.). In some examples, the L1 data can correspond to L1 data associated with an OSI model. In some examples, the L1 data associated with an OSI model can correspond to the physical layer of the OSI model, L2 data of the OSI model can correspond to the data link layer, L3 data of the OSI model can correspond to the network layer, and so forth. In some examples, the L1 data can correspond to the transmitted raw bit stream over a physical medium (e.g., a wired line physical structure such as coax or fiber, an antenna, a receiver, a transmitter, a transceiver, etc.). For example, the L1 data can be implemented by binary transmission, electromagnetic signals, etc. In some examples, the L2 data can correspond to physical addressing of the data, which can include Ethernet data, logical link control (LLC) data, MAC addresses, etc. In some examples, the L3 data can correspond to the functional and procedural means of transferring variable-length data sequences from a source to a destination host via one or more networks, while maintaining the quality of service functions.

In some examples where supervised training is used, the location engine circuitry 140 can label the training data (e.g., label training data or portion(s) thereof as location data, object identification data, etc.). For example, labeling can be applied to the training data by the location engine circuitry 140, a user manually, and/or by an automated data pre-processing system. In some examples, the location engine circuitry 140 can pre-process the training data using, for example, an interface (e.g., interface circuitry, network interface circuitry, etc.) to (i) extract and/or identify data of interest for location determination and/or (ii) discard data not of interest for location determination to improve computational efficiency. In some examples, the location engine circuitry 140 can sub-divide the training data into a first portion of data for training the machine-learning model and a second portion of data for validating the machine-learning model.

Once training is complete, the location engine circuitry 140 can deploy and/or otherwise output the machine-learning model for use as an executable construct that processes an input and provides output(s) based on the network of nodes and connections defined in the machine-learning model. The location engine circuitry 140 can store the machine-learning model in a datastore that may be accessed by the location engine circuitry 140, a cloud repository, etc., and/or any combination(s) thereof. In some examples, the location engine circuitry 140 can transmit the machine-learning model to external computing system(s) via the network 142. In some examples, after transmission of the machine-learning model to the external computing system(s), the external computing system(s) can execute the machine-learning model to execute AI/ML workloads with at least one of improved efficiency or performance to achieve improved object tracking, location detection, etc., and/or any combination(s) thereof.

Once trained, the deployed machine-learning model can be operated (e.g., executed, instantiated, etc.) in an inference phase to process data. In the inference phase, data to be analyzed (e.g., live data) is input to the machine-learning model, and the machine-learning model executes to create output(s). This inference phase can be thought of as the AI "thinking" to generate the output based on what it learned from the training (e.g., by executing the machine-learning model to apply the learned patterns and/or associations to the live data). In some examples, input data undergoes pre-processing before being used as an input to the machine-learning model. Moreover, in some examples, the output data can undergo post-processing after it is generated by the machine-learning model to transform the output(s) into useful result(s) (e.g., a display of data, a detection and/or identification of a device/object, a location determination of a device/object, an instruction to be executed by a machine, etc.).

In some examples, output(s) of the deployed machine-learning model can be captured and provided as feedback (e.g., as feedback to the machine-learning model). By analyzing the feedback, an accuracy of the deployed machine-learning model can be determined. If the feedback indicates that the accuracy of the deployed model is less than a threshold or other criterion, training of an updated model can be triggered using the feedback and an updated training data set, hyperparameters, etc., to generate an updated, deployed model. For example, the location engine circuitry 140 can retrain the machine-learning model after a determination that the accuracy of the deployed model is less than a threshold or other criterion.

Other applications, examples, use cases, etc., are contemplated. For example, it is contemplated that the location engine circuitry 140 can effectuate examples such as asset tracking (e.g., tracking a location of the industrial equipment 110, 112, the storage containers 114, etc.), movement tracking (e.g., tracking movement of the industrial equipment 110, 112), just-in-time inventory processes (e.g., causing supply chain application(s) to order and/or ship goods when goods associated with the storage containers 114 leave the indoor environment 104), distance tracking (e.g., monitoring travel distances associated with the industrial equipment 110, 112), people or person proximity (e.g., determining a distance between a human operator and the industrial equipment 110, 112 for safety and/or operational purposes), autonomous control (e.g., effectuating self-driving or self-control tasks of the industrial equipment 110, 112, etc.), etc., and/or any combination(s) thereof.

As used herein, "data" is information in any form that may be ingested, processed, interpreted and/or otherwise manipulated by processor circuitry to produce a result. The produced result may itself be data. As used herein, a "dataset" is a set of one or more collections of information in any form that may be ingested, processed, interpreted and/or otherwise manipulated by processor circuitry to produce a result. The produced result may itself be data. As used herein, a "model" is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data. As used herein "threshold" is expressed as data such as a numerical value represented in any form, that may be used by processor circuitry as a reference for a comparison operation.

Figure 2:
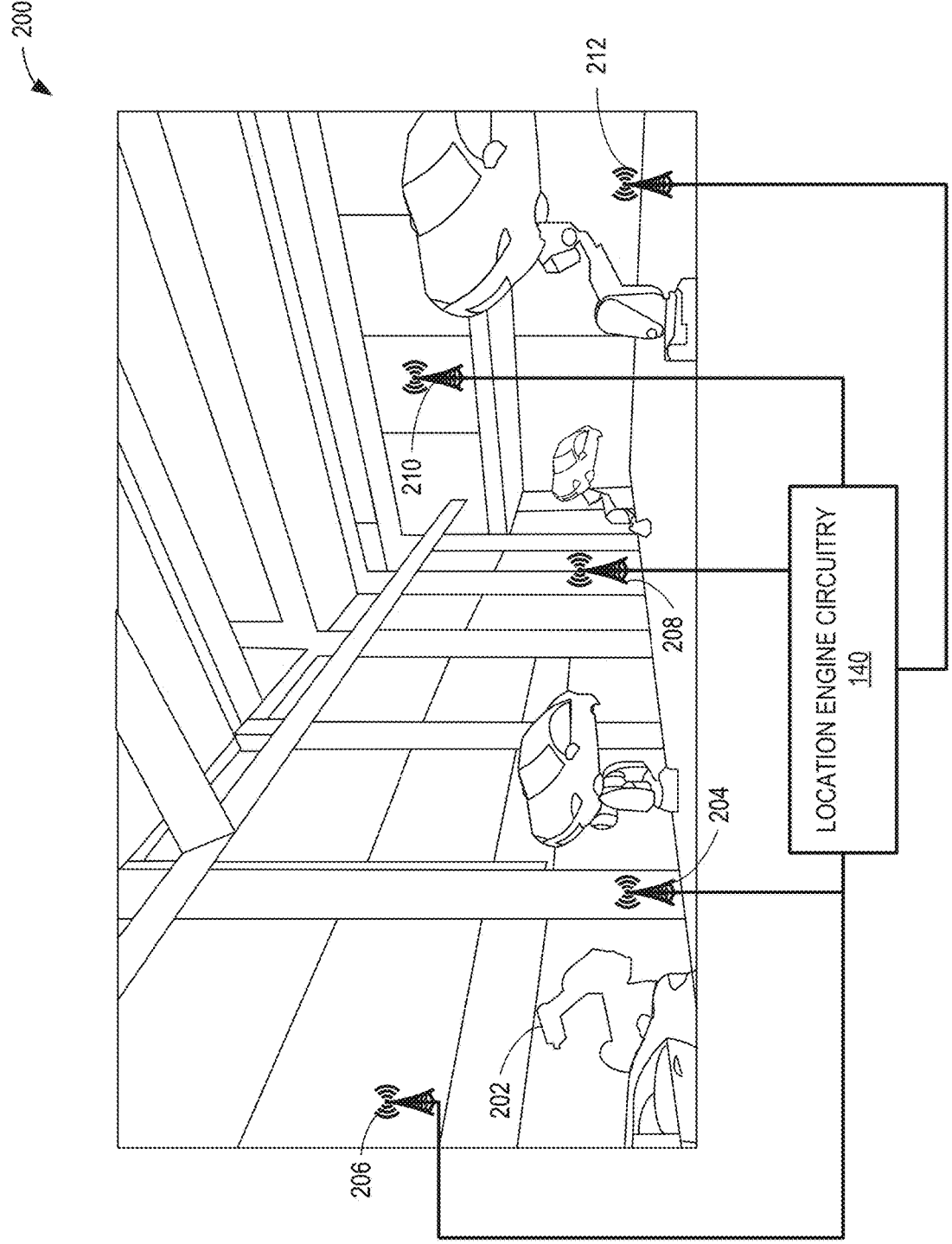
FIG. 2 is a first example environment including the example location engine circuitry of FIG. 1 to determine a location of a device and/or an object in the first environment.

FIG. 2 is a first example environment 200 including the example location engine circuitry 140 of FIG. 1 to determine a location of a device and/or an object, such as an example device 202, in the first environment 200. The first environment 200 of the illustrated example is an automobile factory (e.g., an autonomous automobile factory, a smart automobile factory, etc.). The device 202 of the illustrated example is a robot (e.g., an autonomous robot, a robot arm, a robotic device, etc.) that can be utilized to manufacture (e.g., autonomously manufacture, collaboratively manufacture with humans or other robots, etc.) automobiles in a manufacturing assembly line. The device 202 of the illustrated example is a robot that can transmit and/or receive wireless data. For example, the device 202 can be a robot that includes processor circuitry and/or interface circuitry to transmit and/or receive wireless data (e.g., cellular data, Wi-Fi data, etc.).

In example operation, the device 202 can transmit cellular data (e.g., 5G SRS data) to example base stations 204, 206, 208, 210, 212 (e.g., cellular base stations, 5G cellular base stations, etc.). The base stations 204, 206, 208, 210, 212 include a first example base station 204, a second example base station 206, a third example base station 208, a fourth example base station 210, and a fifth example base station 212. In this example, the base stations 204, 206, 208, 210, 212 are radio units (RUs). Alternatively, the base stations 204 may be and/or implemented by any other type of wireless interface (e.g., a wireless interface implemented by interface circuitry). In some examples, one or more of the base stations 204, 206, 208, 210, 212 can be implemented by the location engine circuitry 140 of FIG. 1. In some examples, one or more of the base stations 204, 206, 208, 210, 212 can be separate and/or otherwise different from the location engine circuitry 140 of FIG. 1.

In example operation, the location engine circuitry 140 can determine first location measurements, such as TOA measurements, based on cellular data received by the base stations 204, 206, 208, 210, 212. For example, the first base station 204, the second base station 206, and the third base station 208 can obtain SRS data from the device 202. In some examples, the first base station 204 can determine a first TOA measurement based on the SRS data, the second base station 206 can determine a second TOA measurement based on the SRS data, and the third base station 208 can determine a third TOA measurement based on the SRS data. In some examples, the location engine circuitry 140 can obtain the first, second, and/or third TOA measurements from respective ones of the first base station 204, the second base station 206, and the third base station 208; determine a TDOA measurement based on the first, second, and/or third TOA measurements; and determine a location of the device 202 in the first environment 200 based on the TDOA measurement. Additionally or alternatively, the location engine circuitry 140 may determine a location of the device 202 in the first environment 200 based on the TOA measurements (e.g., the first TOA measurement, the second TOA measurement, etc.), and/or, more generally, the cellular data, from the device 202.

In some examples, the location engine circuitry 140 can determine first location measurements, such as TOA measurements, based on cellular data received by different antennas of the same base station. For example, a first antenna, a second antenna, and a third antenna of the first base station 204 can obtain SRS data from the device 202. In some examples, the first base station 204 can determine a first TOA measurement based on the SRS data received by the first antenna, a second TOA measurement based on the SRS data received by the second antenna, and a third TOA measurement based on the SRS data received by the third antenna. In some examples, the location engine circuitry 140 can obtain the first, second, and/or third TOA measurements from the first base station 204, and determine a TDOA measurement based on the first, second, and/or third TOA measurements. In example operation, the location engine circuitry 140 can determine a location of the device 202 in the first environment 200 based on the TDOA measurement. Additionally or alternatively, the location engine circuitry 140 can obtain the SRS data received by the first, second, and third antennas; determine respective TOA measurements based on the SRS data; determine a TDOA measurement based on the TOA measurements; and determine a location of the device 202 based on the TDOA measurement.

Figure 3:
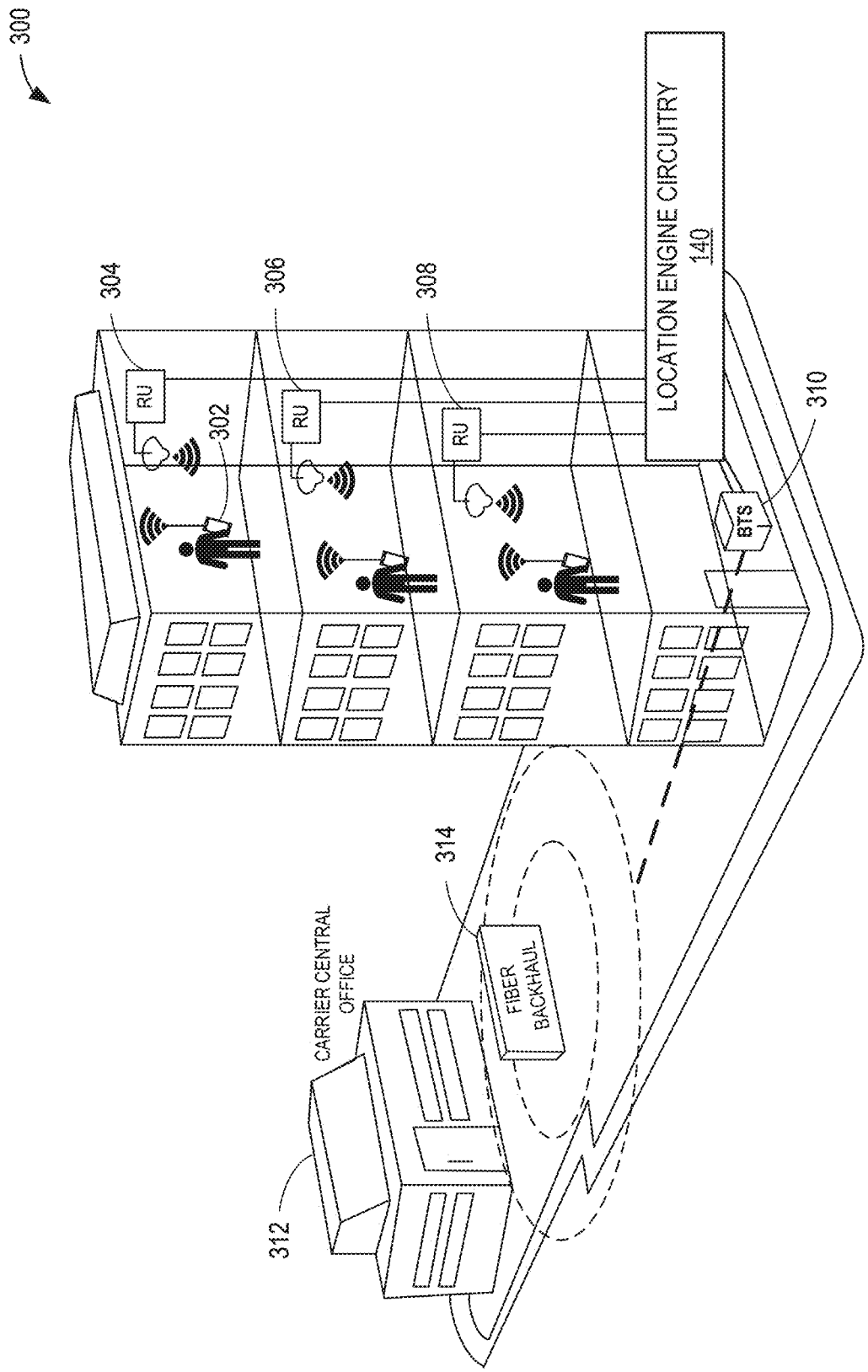
FIG. 3 is a second example environment including the example location engine circuitry of FIG. 1 to determine a location of a device and/or an object in the second environment.

FIG. 3 is a second example environment 300 including the example location engine circuitry 140 of FIG. 1 to determine a location of a device and/or an object, such as an example device 302 in the second environment 300. The second environment 300 of the illustrated example is an office building. Alternatively, the second environment 300 may be any other type of environment, such as a commercial building, a hospital or other medical facility, a research facility, a school or other education facility, etc. The device 302 of the illustrated example is a UE, such as an Internet-enabled smartphone, associated with a person, a user, etc., associated with the office building. In some examples, the device 302 is assigned and/or scheduled to at least one of a terrestrial network or a non-terrestrial network.

In example operation, the device 302 can transmit cellular data (e.g., 5G SRS data) to one or more example base stations 304, 306, 308. The base stations 304, 306, 308 of the illustrated example are RUs, which can be implemented by one or more types of interface circuitry. The base stations 304, 306, 308 include a first example base station 304, a second example base station 306, and a third example base station 308. The first base station 304 is on a top floor of the office building, the second base station 306 is on a floor beneath the top floor, and the third base station 308 is on a floor beneath the second base station 306. Alternatively, one(s) of the base stations 304, 306, 308 may be any other type of wireless interface (e.g., a wireless interface implemented by interface circuitry).

In some examples, the device 302 can transmit cellular data to multiple ones of the base stations 304, 306, 308. In example operation, the multiple ones of the base stations 304, 306, 308 can determine a respective TOA measurement based on the received cellular data (e.g., cellular input data, cellular data inputs, etc.) from the device 302. The base stations 304, 306, 308 can provide the TOA measurements to the location engine circuitry 140 of FIG. 1. The location engine circuitry 140 can determine a TDOA measurement based on the TOA measurements. In example operation, the location engine circuitry 140 can determine a location of the device 302 in the second environment 300 based on the TDOA measurement. For example, the location engine circuitry 140 can determine that the device 302 is on the top floor of the office building based on the TDOA measurement. For example, the location engine circuitry 140 can determine that the device 302 is on the top floor of the office building based on the TOA measurements, the TDOA measurement, and/or, more generally, the cellular data. Additionally or alternatively, one(s) of the base stations 304, 306, 308 may determine a location of the device 302 based on cellular data from the device 302. For example, one or more of the base stations 304, 306, 308 can include and/or be implemented by the location engine circuitry 140, or portion(s) thereof.

In some examples, the first base station 304, the second base station 306, and/or the third base station 308 can transmit cellular data from the device 302 to the location engine circuitry 140. For example, the location engine circuitry 140 can determine a first TOA measurement based on cellular data received by the first base station 304, a second TOA measurement based on cellular data received by the second base station 306, and/or a third TOA measurement based on cellular data received by the third base station 308. In some examples, the location engine circuitry 140 can determine a location of the device 302 in the second environment 300 based on the TDOA measurement. For example, the location engine circuitry 140 can determine that the device 302 is on the top floor of the office building based on the first TOA measurement, the second TOA measurement, the third TOA measurement, the TDOA measurement, and/or, more generally, the cellular data.

In example operation, the location engine circuitry 140 can provide the location result (e.g., data representative of the location of the device 302) to an example base transceiver station (BTS) 310. In example operation, the BTS 310 can provide the location result to an example carrier central office 312 via an example backhaul network 314. The backhaul network 314 of the illustrated example is a fiber backhaul network. Alternatively, the backhaul network 314 may be any other type of backhaul network (e.g., a coax backhaul, a wireless backhaul, etc.). In some examples, the location result is a Cartesian coordinate location of the device 302.

In some examples, the location engine circuitry 140 can determine that the device 302 is associated with a first measurement periodicity of 1 time per second or a first measurement frequency of 1 Hz. For example, the first measurement frequency of 1 Hz can correspond to the location engine circuitry 140 instructing the device 302 to transmit cellular data to the location engine circuitry 140 at a frequency of 1 Hz, which can cause the location engine circuitry 140 to determine a location of the device 302 at the frequency of 1 Hz or a substantially similar frequency (e.g., 1.1 Hz, 1.5 Hz, etc.). In the illustrated example, the location engine circuitry 140 can determine that the device 302 is associated with personnel that typically occupies the top floor of the office building. If, for example, the device 302 moves to a different floor of the office building that is associated with a different level of authorization, such as a level of authorization associated with increased security and/or safety requirements, then the location engine circuitry 140 can reevaluate whether the first measurement periodicity is valid for the change in location of the device 302. For example, the location engine circuitry 140 can determine to change the first measurement periodicity to a second measurement periodicity after a determination that the location of the device 302 has changed. In some examples, the location engine circuitry 140 can determine to change and/or reconfigure the association of the device 302 from the first measurement periodicity of 1 time per second (i.e., 1 Hz) to the second measurement periodicity, which can be 10 times per second (i.e., 10 Hz). For example, the second measurement periodicity can be greater than the first measurement periodicity based on a determination that the new location of the device 302 is associated with increased security and/or safety requirements, which can thusly incur increased location determination frequency to ensure that the personnel associated with the device 302 complies with the increased security and/or safety requirements. Advantageously, the location engine circuitry 140 can configure (or reconfigure), modify, adjust, and/or otherwise change a measurement periodicity associated with the device 302 based on the location of the device 302.

Figure 4:
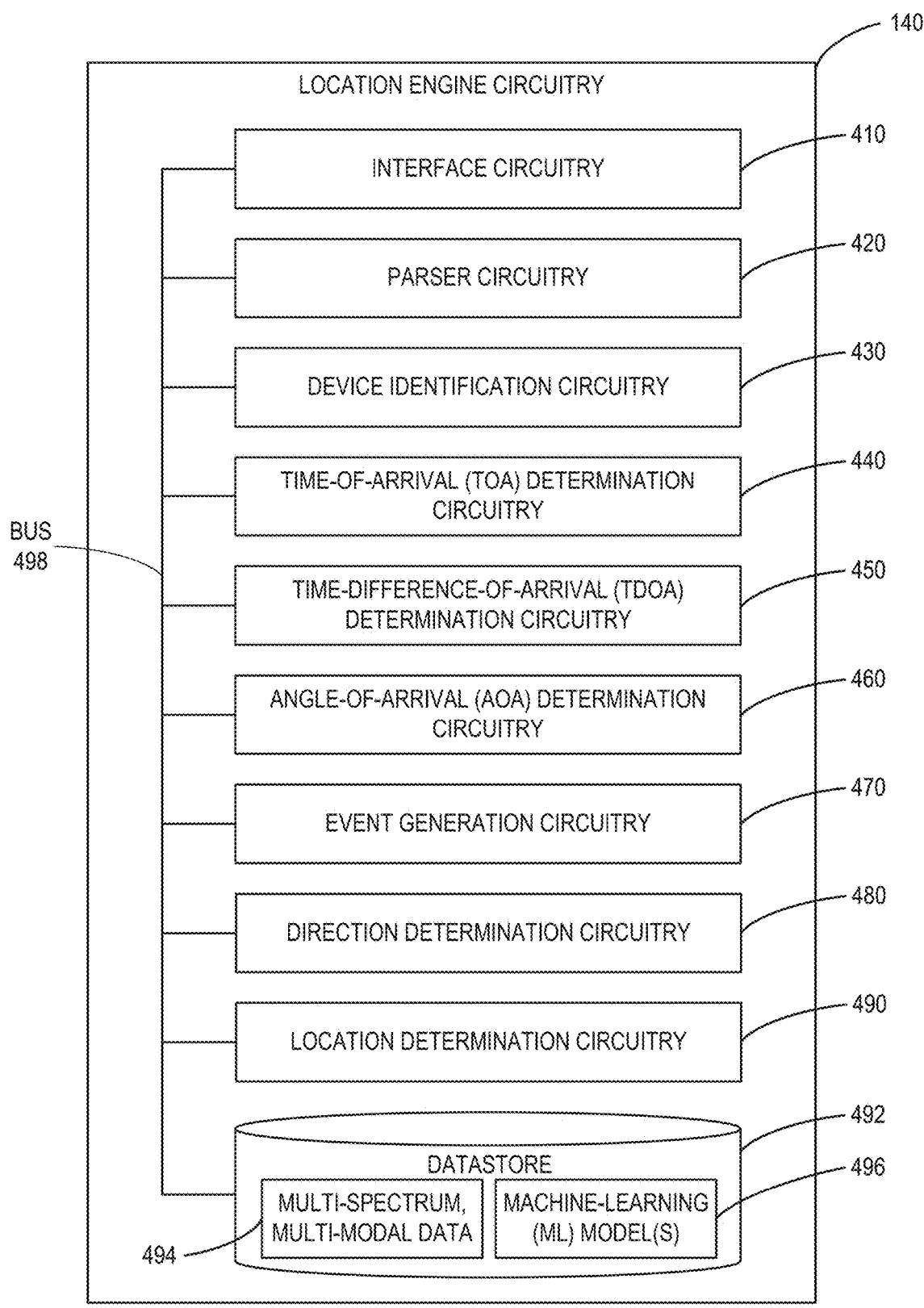
FIG. 4 is a block diagram of an example implementation of the example location engine circuitry of FIG. 1.

FIG. 4 is a block diagram of an example implementation of the location engine circuitry 140 of FIG. 1 to detect locations of devices and/or objects with decreased latency and increased accuracy and/or reliability. The location engine circuitry 140 of FIG. 1 may be instantiated (e.g., creating an instance of, bring into being for any length of time, materialize, implement, etc.) by processor circuitry such as a central processing unit executing instructions. Additionally or alternatively, the location engine circuitry 140 of FIG. 1 may be instantiated (e.g., creating an instance of, bring into being for any length of time, materialize, implement, etc.) by an ASIC or an FPGA structured to perform operations corresponding to the instructions. It should be understood that some or all of the location engine circuitry 140 of FIG. 1 may, thus, be instantiated at the same or different times. Some or all of the location engine circuitry 140 of FIG. 1 may be instantiated, for example, in one or more threads executing concurrently on hardware and/or in series on hardware. Moreover, in some examples, some or all of the location engine circuitry 140 of FIG. 1 may be implemented by microprocessor circuitry executing instructions to implement one or more virtual machines and/or containers.

The location engine circuitry 140 of the illustrated example of FIG. 4 includes example interface circuitry 410, example parser circuitry 420, example device identification circuitry 430, example time-of-arrival (TOA) determination circuitry 440, example time-difference-of-arrival (TDOA) determination circuitry 450, example angle-of-arrival (AOA) determination circuitry 460, example event generation circuitry 470, example direction determination circuitry 480, example location determination circuitry 490, an example datastore 492, and an example bus 498. In this example, the datastore 492 includes example multi-spectrum, multi-modal data 494 and example machine-learning (ML) model(s) 496.

In the illustrated example, the interface circuitry 410, the parser circuitry 420, the device identification circuitry 430, the TOA determination circuitry 440, the TDOA determination circuitry 450, the AOA determination circuitry 460, the event generation circuitry 470, the direction determination circuitry 480, the location determination circuitry 490, and/or the datastore 492, are in communication with one(s) of each other via the bus 498. For example, the bus 498 can be implemented with at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCI-E) bus. Additionally or alternatively, the bus 498 may be implemented with any other type of computing or electrical bus.

The location engine circuitry 140 of the illustrated example includes the interface circuitry 410 to receive data (e.g., wired or wireline data, wireless data or wireless data inputs, etc.) from device(s), and, in some examples, store the received data as the multi-spectrum, multi-modal data 494. In some examples, the interface circuitry 410 is instantiated by processor circuitry executing interface instructions and/or configured to perform operations such as those represented by one(s) of the flowcharts of FIGS. 48-63D.

In some examples, the interface circuitry 410 can receive data from one(s) of the GPS satellite 106, the LEO satellite 107, the 5G cellular system 108, the first industrial machine 110, the second industrial machine 112, the storage containers 114 (e.g., wireless devices associated with the storage containers 114), the video cameras 116, 118, 120, 122, the Wi-Fi devices 124, 126, 128, the 5G devices 130, 132, the Bluetooth devices 134, 136, and/or the RFID system 138 of FIG. 1. In some examples, the interface circuitry 410 can receive data from the device 202 and/or one(s) of the base stations 204, 206, 208, 210, 212 of FIG. 2. In some examples, the interface circuitry 410 can receive data from the device 302 and/or one(s) of the base stations 304, 306, 308 of FIG. 3.

The location engine circuitry 140 of the illustrated example includes the interface circuitry 410 to transmit data (e.g., wired or wireline data, wireless data, etc.) to device(s), and, in some examples, store the transmitted data as the multi-spectrum, multi-modal data 494. For example, the interface circuitry 410 can transmit data to one(s) of the GPS satellite 106, the LEO satellite 107, the 5G cellular system 108, the first industrial machine 110, the second industrial machine 112, the storage containers 114 (e.g., wireless devices associated with the storage containers 114), the video cameras 116, 118, 120, 122, the Wi-Fi devices 124, 126, 128, the 5G devices 130, 132, the Bluetooth devices 134, 136, and/or the RFID system 138 of FIG. 1. In some examples, the interface circuitry 410 can transmit data to the device 202 and/or one(s) of the base stations 204, 206, 208, 210, 212 of FIG. 2. In some examples, the interface circuitry 410 can transmit data to the device 302 and/or one(s) of the base stations 304, 306, 308 of FIG. 3.

In some examples, the interface circuitry 410 can be implemented by hardware in accordance with any type of interface standard, such as an Ethernet interface, a universal serial bus (USB) interface, a BLUETOOTH® interface, a near field communication (NFC) interface, a PCI interface, a PCIe interface, an SPG interface, a GNSS interface, a 4G/5G/6G interface, a CBRS interface, a CAT-1 interface, a CAT-M interface, an NB-IoT interface, etc., and/or any combination(s) thereof. In some examples, the interface circuitry 410 can be implemented by one or more communication devices such as one or more receivers, one or more transceivers, one or more modems, one or more gateways (e.g., residential, commercial, or industrial gateways), one or more wireless access points (WAPs), and/or one or more network interfaces to facilitate exchange of data with external machines (e.g., computing devices of any kind) by a network, such as the network 142 of FIG. 1. In some examples, the interface circuitry 410 can implement the communication by, for example, an Ethernet connection, a DSL connection, a telephone line connection, a coaxial cable system, a satellite system, a LOS wireless system, a BLOS wireless system, a cellular telephone system, an optical connection, etc., and/or any combination(s) thereof.

The location engine circuitry 140 of the illustrated example includes the parser circuitry 420 to extract portion(s) of data received by the interface circuitry 410. In some examples, the parser circuitry 420 is instantiated by processor circuitry executing parser instructions and/or configured to perform operations such as those represented by one(s) of the flowcharts of FIGS. 48-63D.

In some examples, the parser circuitry 420 can extract portion(s) from data such as cell site or cell tower data, location data (e.g., coordinate data, such as azimuth angle, zenith angle, x—(horizontal), y—(vertical), and/or z—(altitude) coordinate data), registration data (e.g., cellular registration data), sensor data (e.g., analog (e.g., voltage, current, etc.) and/or digital (e.g., logic zero, logic one, etc.) values or measurements, motion measurements, pressure measurements, speed measurements, temperature measurements, etc.), image data (e.g., camera data, video data, pixel data, etc.), device identifiers (e.g., vendor identifiers, manufacturer identifiers, device name identifiers, etc.), object identifiers (e.g., alphanumeric identifiers, serial numbers, image data such as images, pictures, pixels, or point clouds, etc.), headers (e.g., IP addresses and/or ports, media access control (MAC) addresses and/or ports, etc.), payloads (e.g., protocol data units (PDUs), Hypertext Transfer Protocol (HTTP) payloads, Hypertext Transfer Protocol Secure (HTTPS) payloads, Hypertext Transfer Protocol Secure Attestable (HTTPA) payloads, Security Protocol and Data Model (SPDM) data or payloads, etc.), cellular data (e.g., OSI L1 data, OSI Layer 2 (L2) data, User Datagram Protocol/Internet Protocol (UDP/IP) data, General Packet Radio Services (GPRS) tunnel protocol user plane (GTP-U) data, SRS data, CIR data, SNR data, etc.), etc., and/or any combination(s) thereof. In some examples, the parser circuitry 420 can store one(s) of the extracted portion(s) in the datastore 492 as the multi-spectrum, multi-modal data 494.

In some examples, the parser circuitry 420 includes and/or implements dynamic load balancer (DLB) circuitry to extract data received by and/or otherwise associated with the interface circuitry 410. In some examples, the DLB circuitry can be implemented by a Dynamic Load Balancer provided by Intel® Corporation of Santa Clara, California Additionally or alternatively, the parser circuitry 420 may implement a queue management service, which can be implemented by hardware, software, and/or firmware. In some examples, the parser circuitry 420 generates queue events (e.g., data queue events, enqueue events, dequeue events, etc.). In some examples, the queue events can be implemented by an array of data (e.g., a data array). Alternatively, the queue events may be implemented by any other data structure. For example, the parser circuitry 420 can generate a first queue event, which can include a data pointer that references data (e.g., ephemeral data) stored in memory, a priority (e.g., a value indicative of the priority, a data priority, etc.) of the data, etc., and/or any combination(s) thereof. In some examples, the events can correspond to, be indicative of, and/or otherwise be representative of workload(s) (e.g., compute or computational workload(s), data processing workload(s), etc.) to be facilitated by the DLB circuitry, which can be implemented by the parser circuitry 420. For example, the parser circuitry 420 can generate a queue event as an indication of data to be enqueued and/or inserted to the DLB circuitry to generate output(s) based on the enqueued data.

In some examples, a queue event, such as the first queue event, can be implemented by an interrupt (e.g., a hardware, software, and/or firmware interrupt) that, when generated and/or otherwise invoked, can indicate to the DLB circuitry (and/or DLB service) that there is/are workload(s) associated with the multi-spectrum, multi-modal data 494 to be performed or carried out. In some examples, the DLB circuitry can enqueue and/or insert the queue event by enqueueing, loading, inserting, and/or storing the data pointer, the priority, etc., into first hardware queue(s) (e.g., producer or data producer queue(s), load balancer queue(s), hardware implemented load balancer queue(s), etc.) included in and/or otherwise implemented by the DLB circuitry. Additionally or alternatively, the DLB service can enqueue and/or insert the queue event by enqueueing, loading, and/or otherwise storing the data pointer, the priority, etc., into the first hardware queue(s).

In some examples, the DLB circuitry can dequeue and/or remove the queue event by dequeuing, loading, and/or otherwise storing the data pointer, the priority, etc., into second hardware queue(s) (e.g., consumer or data consumer queue(s), load balancer queue(s), hardware implemented load balancer queue(s), etc.) that may be accessed by compute cores (e.g., consumer cores of processor circuitry, worker cores of processor circuitry, etc.) for subsequent processing. In some examples, the compute cores are included in and/or otherwise implemented by the parser circuitry 420, and/or, more generally, the location engine circuitry 140. In some examples, the compute cores are included in and/or otherwise implemented by the DLB circuitry. In some examples, one or more of the compute cores are separate from the DLB circuitry. Additionally or alternatively, the DLB service can dequeue and/or remove the queue event by dequeuing, loading, and/or otherwise storing the data pointer, the priority, etc., into the second hardware queue(s).

In some examples, a compute core can write data to the queue event. For example, the queue event can be implemented by a data array. In some examples, the compute core can write data into one or more positions of the data array. For example, the compute core can add data to one or more positions of the data array that does not include data, modify existing data of the data array, and/or remove existing data of the data array. By way of example, the parser circuitry 420 can dequeue and/or remove a queue event from the DLB circuitry. The parser circuitry 420 can determine that the queue event includes a data pointer that references wireless data, such as SRS data. The parser circuitry 420 can complete (and/or cause completion of) a computation operation or workload on the wireless data, such as identifying data portion(s) of interest from the wireless data, extracting data portion(s) of interest from the wireless data, etc. After completion of the computation operation/workload (e.g., the computational operation, the computational workload, the computational operation and/or workload, etc.), the parser circuitry 420 can cause a compute core to write a completion bit, byte, etc., into the queue event. After the completion bit, byte, etc., is written to the queue event, the parser circuitry 420 can enqueue and/or provide the queue event back to the DLB circuitry. In some examples, the DLB circuitry can determine that the computation operation has been completed by identifying the completion bit, byte, etc., in the queue event.

The location engine circuitry 140 of the illustrated example includes the device identification circuitry 430 to identify a device, such as an object that is adapted to effectuate wireless electronic communication. In some examples, the device identification circuitry 430 is instantiated by processor circuitry executing device identification instructions and/or configured to perform operations such as those represented by one(s) of the flowcharts of FIGS. 48-63D.

In some examples, the device identification circuitry 430 can identify one(s) of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 of FIG. 1 based on the multi-spectrum, multi-modal data 494. In some examples, the device identification circuitry 430 can identify the device based on an identifier (e.g., a UE identifier, a manufacturer identifier, a vendor identifier, etc.), an address (e.g., an IP address, a MAC address, etc.), etc., and/or any combination(s) thereof. In some examples, the device identification circuitry 430 can store the device identification(s) in the datastore 492 as the multi-spectrum, multi-modal data 494.

In some examples, the device identification circuitry 430 can generate association(s) (e.g., data association(s)) of a device (e.g., an identification of a device), a measurement periodicity, and a location. For example, the device identification circuitry 430 can generate one or more data associations of the first industrial machine 110, a measurement periodicity of determining a location of the first industrial machine 110 two times per second (i.e., 2 Hz), and a location of the first industrial machine 110 of external to the indoor environment 104 of FIG. 1. In some examples, the device identification circuitry 430 can store the one or more associations in the datastore 492 as the multi-spectrum, multi-modal data 494.

In some examples, the measurement periodicity can be a data collection periodicity of obtaining cellular data from a device, such as obtaining data from the first industrial machine 110 three times per second (i.e., 3 Hz). For example, the device identification circuitry 430 can generate one or more data associations of the first industrial machine 110, a data collection periodicity of requesting and/or obtaining wireless data from the first industrial machine 110 three times per second (i.e., 3 Hz), and/or a location of the first industrial machine 110 of the outdoor environment 102 of FIG. 1 (e.g., external to a building, a campus, a residential home, a warehouse, etc.). In some examples, the device identification circuitry 430 can store the one or more data associations in the datastore 492 as the multi-spectrum, multi-modal data 494.

The location engine circuitry 140 of the illustrated example includes the TOA determination circuitry 440 to determine a TOA associated with data, or portion(s) thereof In some examples, the TOA determination circuitry 440 is instantiated by processor circuitry executing TOA determination instructions and/or configured to perform operations such as those represented by one(s) of the flowcharts of FIGS. 48-63D.

As used herein, "time-of-arrival" and "TOA" refer to the time instant (e.g., the absolute time instant) when a signal (e.g., a radio signal, an electromagnetic signal, an acoustic signal, an optical signal, etc.) emanating from a transmitter (e.g., transmitter circuitry, transmitter interface circuitry, etc.) reaches a remote receiver (e.g., a transmission reception point, remote receiver circuitry, receiver interface circuitry, etc.). For example, the TOA determination circuitry 440 can determine a TOA of portion(s) of the multi-spectrum, multi-modal data 494.

In some examples, the TOA determination circuitry 440 processes (e.g., pre-processes) TOA data associated with a UE using SRS data, signal-to-noise ratio (SNR) data (e.g., signal-to-noise ratio data), channel impulse response (CIR) data (e.g., channel impulse response data), etc., and/or any combination(s) thereof, that exists and/or otherwise is available at a base station. As used herein, "channel impulse response" and "CIR" refers to the bandwidth that is allocated to a logical connection. For example, the CIR associated with a UE and a base station can be a minimum data transmission speed to be maintained between the UE and the base station.

In some examples, the TOA determination circuitry 440 can determine the TOA based on the time span that has elapsed since the time-of-transmission (TOT). In some examples, the time span that has elapsed since the TOT is referred to as the time-of-flight (TOF). For example, the TOA determination circuitry 440 can determine the TOA of data received by the interface circuitry 410 based on a first time at which a signal is sent from a device, a second time at which the signal is received at the interface circuitry 410, and the speed at which the signal travels (e.g., the speed of light). In some examples, the first time and the second time is TOA data. In some examples, a difference between the first time and the second time and/or a data association of the difference and the device is/are TOA measurements. In some examples, the TOA determination circuitry 440 can store the TOA data, the TOA measurements, etc., and/or any combination(s) thereof, in the datastore 492 as the multi-spectrum, multi-modal data 494.

The location engine circuitry 140 of the illustrated example includes the TDOA determination circuitry 450 to determine a TDOA associated with TOA data, TOA measurements, or portion(s) thereof. In some examples, the TDOA determination circuitry 450 is instantiated by processor circuitry executing TDOA determination instructions and/or configured to perform operations such as those represented by one(s) of the flowcharts of FIGS. 48-63D.

As used herein, "time-difference-of-arrival" and "TDOA" refer to a difference of times (e.g., time values, timestamps, time signatures, etc.) at which signals (e.g., radio signals, electromagnetic signals, acoustic signals, optical signals, etc.) emanating from a transmitter (e.g., transmitter circuitry, transmitter interface circuitry, etc.) reach different remote receivers (e.g., multiple instances of remote receiver circuitry, receiver interface circuitry, base stations, anchor devices, etc.). By way of example, a UE can transmit cellular data, such as 5G SRS data, to at least three different 5G cellular base stations (e.g., ones of the base stations 204, 206, 208, 210, 212 of FIG. 2, ones of the base stations 304, 306, 308 of FIG. 3, etc.). In some examples, the at least three different 5G cellular base stations are synchronized in time to capture the corresponding cellular data from the UE. In some examples, the TDOA determination circuitry 450 can shift the time signature of each set of cellular data received by the at least three different 5G cellular base stations to generate a set of curved lines, parabolas, curves, etc., that represent solutions to distance equations. For example, the actual location of the UE can sit and/or otherwise be located or positioned at the intersection of the set of curved lines, parabolas, curves, etc.

In some examples, the TDOA determination circuitry 450 can determine the TDOA between individual elements of a sensing array (e.g., an antenna array) of the same base station (e.g., the TDOA of data received at multiple antennas of the first base station 304, the TDOA of data received at multiple antennas of the second base station 306, etc.). For example, the TDOA determination circuitry 450 can measure the difference in received phase at element(s) in the sensing array, and convert the delay of arrival at the element(s) to TDOA measurement(s).

In some examples, the time signatures of each set of cellular data is TDOA data. In some examples, first difference(s) between the time signatures and/or data association(s) of the first difference(s) and the device is/are TDOA measurements. In some examples, second difference(s) between the received phase(s) and/or data association(s) of the second difference(s) and the device is/are TDOA measurements. In some examples, the TDOA determination circuitry 450 can store the TDOA data, the TDOA measurements, etc., in the datastore 492 as the multi-spectrum, multi-modal data 494.

In some examples, the TDOA determination circuitry 450 can determine a TDOA based on TOA data from different base stations and/or from different antennas of the same base station. For example, the TDOA determination circuitry 450 can obtain (i) a first TOA measurement associated with a UE, such as the device 302 of FIG. 3, from a first base station, such as the first base station 304 of FIG. 3, (ii) a second TOA measurement associated with the UE from a second base station, such as the second base station 306 of FIG. 3, and (iii) a third TOA measurement associated with the UE from a third base station, such as the third base station 308 of FIG. 3. In some examples, the TDOA determination circuitry 450 can determine a TDOA based on the first through third TOA measurements.

In some examples, the TDOA determination circuitry 450 can obtain (i) a first TOA measurement associated with a UE, such as the device 202, from a first antenna of a base station, such as a first antenna of the first base station 204 of FIG. 2, (ii) a second TOA measurement associated with the UE from a second antenna of the first base station 204, and a third TOA measurement associated with the UE from a third antenna of the first base station 204. In some examples, the TDOA determination circuitry 450 can determine a TDOA based on the first through third TOA measurements.

The location engine circuitry 140 of the illustrated example includes the AOA determination circuitry 460 to determine an AOA associated with data, or portion(s) thereof. In some examples, the AOA determination circuitry 460 is instantiated by processor circuitry executing AOA determination instructions and/or configured to perform operations such as those represented by one(s) of the flowcharts of FIGS. 48-63D.

As used herein, the "angle-of-arrival" and "AOA" of a signal refer to the direction from which the signal (e.g., a radio signal, an electromagnetic signal, an acoustic signal, an optical signal, etc.) is received. In some examples, the AOA determination circuitry 460 can determine the AOA of a signal based on a determination of the direction of propagation of the signal incident on a sensing array (e.g., an antenna array). In some examples, the AOA determination circuitry 460 can determine the AOA of a signal based on a signal strength (e.g., a maximum signal strength) during antenna rotation. In some examples, the AOA determination circuitry 460 can determine the AOA of a signal based on a TDOA between individual elements of a sensing array. In some examples, the AOA determination circuitry 460 can measure the difference in received phase at each element in the sensing array, and convert the delay of arrival at each element to an AOA measurement.

In some examples, the direction of propagation of a signal incident on a sensing array, a signal strength measurement, etc., is/are AOA data. For example, AOA data can include a measured azimuth angle-of-arrival (A-AOA), a measured zenith angle-of-arrival (Z-AOA), etc., and/or any combination(s) thereof. In some examples, the AOA of a signal, a TDOA between individual elements of a sensing array, a difference in received phase of element(s) in a sensing array, etc., is/are AOA measurements. In some examples, data association(s) of (i) AOA data, or portion(s) thereof, (ii) AOA measurement(s), or portion(s) thereof, and/or (iii) a device that transmitted cellular data leading to the AOA data and/or the AOA measurements is/are AOA measurements. In some examples, the AOA determination circuitry 460 can store the AOA data, the AOA measurements, etc., in the datastore 492 as the multi-spectrum, multi-modal data 494.

The location engine circuitry 140 of the illustrated example includes the event generation circuitry 470 to generate an event to cause action(s), operation(s), etc., to be executed. In some examples, the event generation circuitry 470 is instantiated by processor circuitry executing event generation instructions and/or configured to perform operations such as those represented by one(s) of the flowcharts of FIGS. 48-63D.

In some examples, an event can be implemented by data representative of a command, a direction or directive, an instruction, etc. In some examples, an event can be implemented by data representative of an alert, an indication, a notification, a warning, etc. In some examples, the event generation circuitry 470 can generate an event to invoke and/or otherwise cause one(s) of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 of FIG. 1 to execute action(s), operation(s), etc. For example, the event generation circuitry 470 can generate an event that, when received and/or otherwise identified by the first industrial machine 110, can cause the first industrial machine 110 to adjust a direction, a speed, etc., of the first industrial machine 110. In some examples, the event generation circuitry 470 can generate the event to cause the first industrial machine 110 to move towards a first one of the storage containers 114 after a determination of a location of the first one of the storage containers 114. By way of another example, the event generation circuitry 470 can generate an event that, when received by the device 202 of FIG. 2, instructs the device 202 to adjust a position (e.g., a height, an angle, a position, etc.) of the robot arm of the device 202. In some examples, the event generation circuitry 470 can generate an event to be indicative of an alert, an indication, etc., of an abnormal condition (e.g., an anomaly, an intrusion, an obstruction, etc.) associated with the outdoor environment 102, the indoor environment 104, and/or, more generally, the location determination environment 100. In some examples, the event generation circuitry 470 can store the event(s) in the datastore 492 as the multi-spectrum, multi-modal data 494.

The location engine circuitry 140 of the illustrated example includes the direction determination circuitry 480 to determine a direction of a device, an object, etc. In some examples, the direction determination circuitry 480 is instantiated by processor circuitry executing direction determination instructions and/or configured to perform operations such as those represented by one(s) of the flowcharts of FIGS. 48-63D.

In some examples, the direction determination circuitry 480 can determine a motion vector, which can include a direction, a speed, etc., of a device, such as one(s) of the first industrial machine 110, the second industrial machine 112, the storage containers 114, the video cameras 116, 118, 120, 122, the Wi-Fi devices 124, 126, 128, the 5G devices 130, 132, and/or the Bluetooth devices 134, 136. In some examples, the direction determination circuitry 480 can determine the direction, and/or, more generally, the motion vector, of the device based on the multi-spectrum, multi-modal data 494. For example, the direction determination circuitry 480 can determine the direction, and/or, more generally, the motion vector, based on TOA data, TOA measurements, TDOA data, TDOA measurements, AOA data, AOA measurements, etc., and/or any combination(s) thereof, associated with the device. In some examples, the direction determination circuitry 480 can determine a motion vector including a direction, a speed, etc., of a device, by executing the ML model(s) 496 to generate output(s) (e.g., a direction, a speed, a motion vector, etc.) based on input(s) (e.g., the multi-spectrum, multi-modal data 494). In some examples, the direction determination circuitry 480 can store the direction(s), and/or, more generally, the motion vector(s), in the datastore 492 as the multi-spectrum, multi-modal data 494.

The location engine circuitry 140 of the illustrated example includes the location determination circuitry 490 to determine a location (e.g., x-, y-, and/or z-coordinates in a geometric plane) of a device, an object, a UE, etc. In some examples, the location determination circuitry 490 is instantiated by processor circuitry executing location determination instructions and/or configured to perform operations such as those represented by one(s) of the flowcharts of FIGS. 48-63D.

In some examples, the location determination circuitry 490 can determine a location (e.g., a location and/or position vector) of a device, such as one(s) of the first industrial machine 110, the second industrial machine 112, the storage containers 114, the video cameras 116, 118, 120, 122, the Wi-Fi devices 124, 126, 128, the 5G devices 130, 132, and/or the Bluetooth devices 134, 136. In some examples, the location determination circuitry 490 can determine a location of the device based on the multi-spectrum, multi-modal data 494. For example, the location determination circuitry 490 can determine a location based on TOA data, TOA measurements, TDOA data, TDOA measurements, AOA data, AOA measurements, etc., and/or any combination(s) thereof, associated with the device. In some examples, the location determination circuitry 490 can determine a location of a device by executing the ML model(s) 496 to generate output(s) (e.g., a location, a predicted location, an imminent location, etc.) based on input(s) (e.g., the multi-spectrum, multi-modal data 494). In some examples, the location determination circuitry 490 can store the location(s) in the datastore 492 as the multi-spectrum, multi-modal data 494.

In some examples, the location determination circuitry 490 determines a location of a device, an object, a UE, etc., with respect to time, such as x-, y-, and/or z-coordinates in a geometric plane with respect to time (t). For example, the location determination circuitry 490 can add a time or temporal dimension to coordinates to output a data structure of (x-coordinate, y-coordinate, z-coordinate, timestamp). Advantageously, the location determination circuitry 490 can output ranging determinations by comparing a sequence of coordinates (e.g., x-, y-, and z-coordinates) that change across time.

The location engine circuitry 140 of the illustrated example includes the datastore 492 to record data (e.g., the multi-spectrum, multi-modal data 494, the ML model(s) 496, etc.). In some examples, the datastore 492 is instantiated by processor circuitry executing datastore instructions and/or configured to perform operations such as those represented by one(s) of the flowcharts of FIGS. 48-63D.

The datastore 492 of this example can be implemented by a volatile memory and/or a non-volatile memory (e.g., flash memory). The datastore 492 may additionally or alternatively be implemented by one or more double data rate (DDR) memories, such as DDR, DDR2, DDR3, DDR4, DDR5, mobile double data rate (mDDR), etc. The datastore 492 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 492 is illustrated as a single datastore, the datastore 492 may be implemented by any number and/or type(s) of datastores. Furthermore, the data stored in the datastore 492 may be in any data format such as, for example, binary data, comma delimited data, tab delimited data, structured query language (SQL) structures, an executable (e.g., an executable binary, an ML configuration image, etc.), etc. In some examples, the datastore 492 can implement one or more databases. As used herein, "database" refers to an organized body of related data, regardless of the manner in which the data or the organized body thereof is represented. For example, the organized body of related data can be in the form of one or more of a table, a map, a grid, a packet, a datagram, a frame, a file, an e-mail, a message, a document, a report, a list or in any other form.

In some examples, the multi-spectrum, multi-modal data 494 can include data received by the interface circuitry 410. For example, the multi-spectrum, multi-modal data 494 can be data from one(s) of the GPS satellite 106, the LEO satellite 107, the 5G cellular system 108, the first industrial machine 110, the second industrial machine 112, the storage containers 114, the video cameras 116, 118, 120, 122, the Wi-Fi devices 124, 126, 128, the 5G devices 130, 132, the Bluetooth devices 134, 136, and/or the RFID system 138 of FIG. 1. In some examples, the multi-spectrum, multi-modal data 494 can include GPS data, 4G LTE/5G/6G data, direction and/or speed data (e.g., direction and/or speed data associated with the industrial machines 110, 112), Bluetooth data, RFID data, Wi-Fi data, image and/or video data, etc., and/or any combination(s) thereof. In some examples, the multi-spectrum, multi-modal data 494 cam include device identification data, TOA data, TOA measurements, TDOA data, TDOA measurements, AOA data, AOA measurements, event data, SRS data, CIR data, SNR data, etc., and/or any combination(s) thereof. In some examples, the multi-spectrum, multi-modal data 494 can be data obtained via a terrestrial network and/or a non-terrestrial network. For example, the multi-spectrum, multi-modal data 494 can be obtained by a terrestrial network, such as a wired Ethernet network, a Wi-Fi network, a 5G wireless network, etc. In some examples, the multi-spectrum, multi-modal data 494 can be obtained by a non-terrestrial network, such as satellite network (e.g., a LOS satellite network, a BLOS satellite network, etc.).

In some examples, the location engine circuitry 140 includes means for receiving data and/or means for transmitting data. For example, the means for receiving and/or the means for transmitting may be implemented by the interface circuitry 410. In some examples, the interface circuitry 410 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the interface circuitry 410 may be instantiated by the example microprocessor 6600 of FIG. 66 executing machine-executable instructions such as those implemented by one or more blocks of one(s) of FIGS. 48-63D. In some examples, the interface circuitry 410 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the interface circuitry 410 may be instantiated by any other combination of hardware, software, and/or firmware. For example, the interface circuitry 410 may be implemented by at least a transmitter, a receiver, a transceiver, a modem, a residential gateway, a WAP, a network interface, one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for extracting data and/or means for parsing data. For example, the means for extracting and/or the means for parsing may be implemented by the parser circuitry 420. In some examples, the parser circuitry 420 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the parser circuitry 420 may be instantiated by the example microprocessor 6600 of FIG. 66 executing machine-executable instructions such as those implemented by one or more blocks of one(s) of FIGS. 48-63D. In some examples, the parser circuitry 420 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the parser circuitry 420 may be instantiated by any other combination of hardware, software, and/or firmware. For example, the parser circuitry 420 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for identifying a device and/or an object. For example, the means for identifying may be implemented by the device identification circuitry 430. In some examples, the device identification circuitry 430 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the device identification circuitry 430 may be instantiated by the example microprocessor 6600 of FIG. 66 executing machine-executable instructions such as those implemented by one or more blocks of one(s) of FIGS. 48-63D. In some examples, the device identification circuitry 430 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the device identification circuitry 430 may be instantiated by any other combination of hardware, software, and/or firmware. For example, the device identification circuitry 430 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for determining time-of-arrival (e.g., time-of-arrival data, time-of-arrival determinations, time-of-arrival outputs, etc.). For example, the means for determining time-of-arrival may be implemented by the TOA determination circuitry 440. In some examples, the TOA determination circuitry 440 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the TOA determination circuitry 440 may be instantiated by the example microprocessor 6600 of FIG. 66 executing machine-executable instructions such as those implemented by one or more blocks of one(s) of FIGS. 48-63D. In some examples, the TOA determination circuitry 440 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the TOA determination circuitry 440 may be instantiated by any other combination of hardware, software, and/or firmware. For example, the TOA determination circuitry 440 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for determining time-difference-of-arrival (e.g., time-difference-of-arrival data, time-difference-of-arrival determinations, time-difference-of-arrival outputs, etc.). For example, the means for determining time-difference-of-arrival may be implemented by the TDOA determination circuitry 450. In some examples, the TDOA determination circuitry 450 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the TDOA determination circuitry 450 may be instantiated by the example microprocessor 6600 of FIG. 66 executing machine-executable instructions such as those implemented by one or more blocks of one(s) of FIGS. 48-63D. In some examples, the TDOA determination circuitry 450 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the TDOA determination circuitry 450 may be instantiated by any other combination of hardware, software, and/or firmware. For example, the TDOA determination circuitry 450 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for determining angle-of-arrival (e.g., angle-of-arrival data, angle-of-arrival determinations, angle-of-arrival outputs, etc.). For example, the means for determining angle-of-arrival may be implemented by the AOA determination circuitry 460. In some examples, the AOA determination circuitry 460 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the AOA determination circuitry 460 may be instantiated by the example microprocessor 6600 of FIG. 66 executing machine-executable instructions such as those implemented by one or more blocks of one(s) of FIGS. 48-63D. In some examples, the AOA determination circuitry 460 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the AOA determination circuitry 460 may be instantiated by any other combination of hardware, software, and/or firmware. For example, the AOA determination circuitry 460 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for generating an event (e.g., event data, a queue event, etc.). In some examples, the means for generating an event includes and/or implements means for publishing an event and/or a location to a datastore. In some examples, the means for generating an event includes means for causing an action associated with at least one of a target device or a target object based on an event. For example, the means for generating an event, the means for publishing a location, and/or the means for causing an action may be implemented by the event generation determination circuitry 470. In some examples, the event generation determination circuitry 470 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the event generation determination circuitry 470 may be instantiated by the example microprocessor 6600 of FIG. 66 executing machine-executable instructions such as those implemented by one or more blocks of one(s) of FIGS. 48-63D. In some examples, the event generation determination circuitry 470 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the event generation determination circuitry 470 may be instantiated by any other combination of hardware, software, and/or firmware. For example, the event generation determination circuitry 470 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for determining a direction of a device and/or an object. For example, the means for determining a direction may be implemented by the direction determination circuitry 480. In some examples, the means for determining a direction includes and/or implements means for executing a machine-learning model to determine a direction. For example, the means for determining a direction and/or means for executing a machine-learning model to determine a direction may be implemented by the direction determination circuitry 480. In some examples, the direction determination circuitry 480 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the direction determination circuitry 480 may be instantiated by the example microprocessor 6600 of FIG. 66 executing machine-executable instructions such as those implemented by one or more blocks of one(s) of FIGS. 48-63D. In some examples, the direction determination circuitry 480 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the direction determination circuitry 480 may be instantiated by any other combination of hardware, software, and/or firmware. For example, the direction determination circuitry 480 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for determining a location of a device and/or an object. In some examples, the means for determining includes and/or implements means for executing a machine-learning model to determine a location. For example, the means for determining a location and/or means for executing a machine-learning model to determine a location may be implemented by the location determination circuitry 490. In some examples, the location determination circuitry 490 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the location determination circuitry 490 may be instantiated by the example microprocessor 6600 of FIG. 66 executing machine-executable instructions such as those implemented by one or more blocks of one(s) of FIGS. 48-63D. In some examples, the location determination circuitry 490 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the location determination circuitry 490 may be instantiated by any other combination of hardware, software, and/or firmware. For example, the location determination circuitry 490 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the location engine circuitry 140 includes means for storing data. For example, the means for storing data may be implemented by the datastore 492. In some examples, the datastore 492 may be instantiated by processor circuitry such as the example processor 6452 of FIG. 64, the example processor circuitry 6512 of FIG. 65, the example processor circuitry 6600 of FIG. 66, and/or the FPGA 6700 of FIG. 67. For instance, the datastore 492 may be instantiated by the example microprocessor 6600 of FIG. 66 executing machine-executable instructions such as those implemented by one or more blocks of one(s) of FIGS. 48-63D. In some examples, the datastore 492 may be instantiated by hardware logic circuitry, which may be implemented by an ASIC, XPU, or the FPGA circuitry 6700 of FIG. 67 structured to perform operations corresponding to the machine-readable instructions. Additionally or alternatively, the datastore 492 may be instantiated by any other combination of hardware, software, and/or firmware. For example, the datastore 492 may be implemented by at least memory, mass storage disc(s) or device(s), one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

While an example manner of implementing the location engine circuitry 140 of FIG. 1 is illustrated in FIG. 4, one or more of the elements, processes, and/or devices illustrated in FIG. 4 may be combined, divided, re-arranged, omitted, eliminated, and/or implemented in any other way. Further, the interface circuitry 410, the parser circuitry 420, the device identification circuitry 430, the TOA determination circuitry 440, the TDOA determination circuitry 450, the AOA determination circuitry 460, the event generation circuitry 470, the direction determination circuitry 480, the location determination circuitry 490, and/or the datastore 492, and/or, more generally, the location engine circuitry 140 of FIG. 1, may be implemented by hardware alone or by hardware in combination with software and/or firmware. Thus, for example, any of the interface circuitry 410, the parser circuitry 420, the device identification circuitry 430, the TOA determination circuitry 440, the TDOA determination circuitry 450, the AOA determination circuitry 460, the event generation circuitry 470, the direction determination circuitry 480, the location determination circuitry 490, and/or the datastore 492, and/or, more generally, the location engine circuitry 140, could be implemented by processor circuitry, analog circuit(s), digital circuit(s), logic circuit(s), programmable processor(s), programmable microcontroller(s), graphics processing unit(s) (GPU(s)), digital signal processor (s) (DSP(s)), ASIC(s), programmable logic device(s) (PLD(s)), and/or field programmable logic device(s) (FPLD(s)) such as FPGAs. Further still, the location engine circuitry 140 of FIG. 1 may include one or more elements, processes, and/or devices in addition to, or instead of, those illustrated in FIG. 4, and/or may include more than one of any or all of the illustrated elements, processes and devices.

Figure 5:
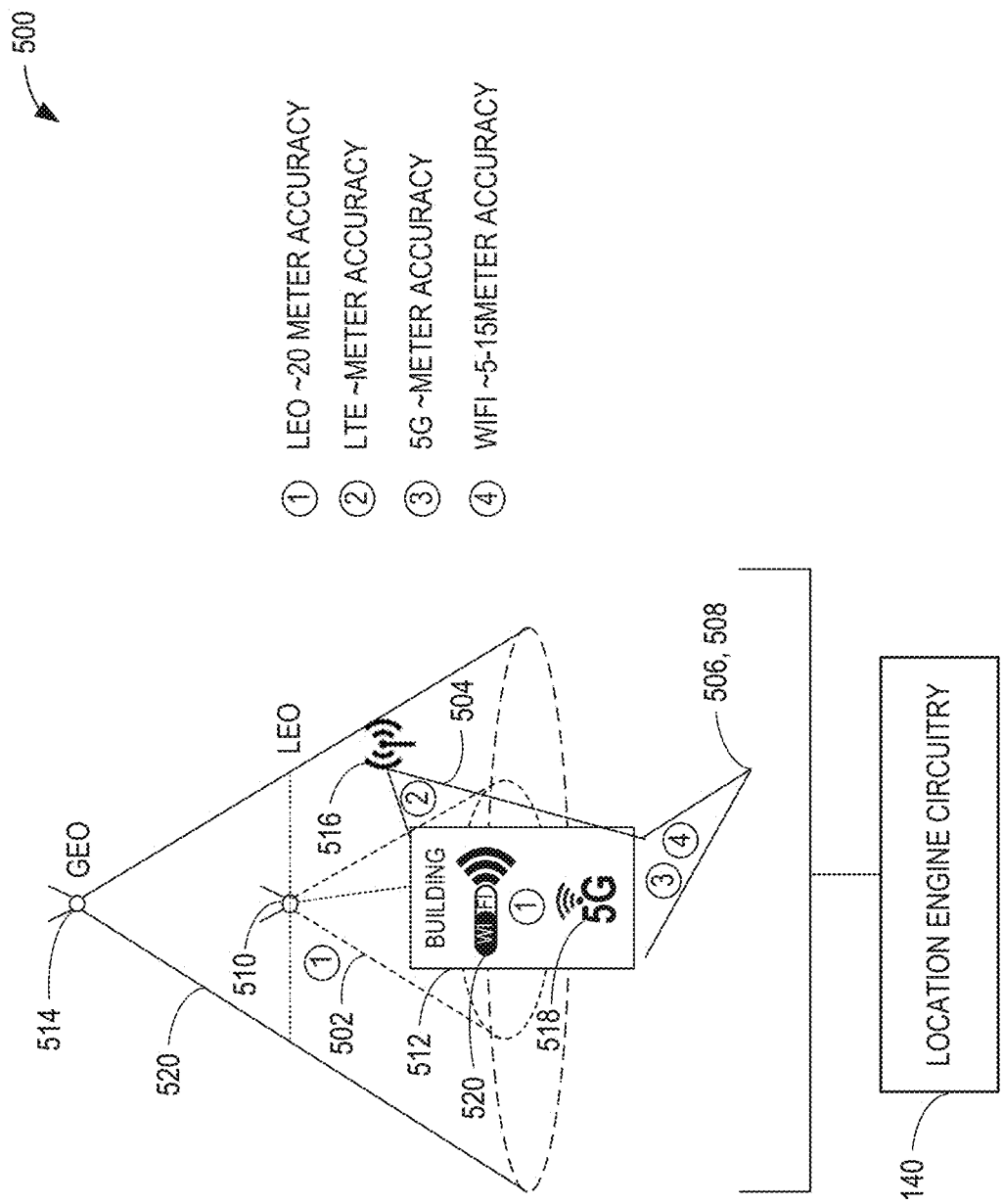
FIG. 5 is an illustration of an example location determination environment with respect to different example location determination zones.

FIG. 5 is an illustration of a first example location determination environment 500 with respect to different example location detection zones 502, 504, 506, 508. The location detection zones include a first example location detection zone 502, a second example location detection zone 504, a third example location detection zone 506, and a fourth example location detection zone 508. The first location detection zone 502 can correspond to a first location detection accuracy (e.g., a location detection accuracy of +/−20 meters (m)) associated with an example LEO satellite 510 tracking a device, an object, etc., in an example building 512. In some examples, the device, the object, etc., in the building 512 is assigned and/or scheduled to at least one of a terrestrial network or a non-terrestrial network.

In some examples, the first location detection zone 502 can be a location inclusion zone, a location exclusion zone, or a location coordination zone. For example, a location inclusion zone can allow location detection within the location inclusion zone based on multi-spectrum location detection (e.g., up to global coverage including LEOs such as the LEO satellite 510). In some examples, the location inclusion zone can be used for generation of global alerts, indications, notifications, etc. In some examples, a location exclusion zone can be used for a fixed existing blockage so the LEO satellite 510 does not have to use location detection techniques that may not penetrate and/or otherwise not work in the location exclusion zone. In some examples, a location coordination zone can be a multi-spectrum mix based on signal strength of the LEO satellite 510, an example GEO satellite 514, etc. In some examples, implementation of a location inclusion zone, location exclusion zone, and/or location coordination zone is spectrum dependent.

In some examples, the second location detection zone 504 can correspond to a second location detection accuracy (e.g., a location detection accuracy of +/−1 m) associated with a first example cellular communication system 516, such as 4G LTE. Although the first cellular communication system 516 is depicted external to the building 512, additionally or alternatively, the first cellular communication system 516 may be internal to the building 512. In some examples, the third location detection zone 506 can correspond to a third location detection accuracy (e.g., a location detection accuracy of +/−1 m) associated with a second example cellular communication system 518, such as an example 5G communication system, associated with the building 512. In some examples, the fourth location detection zone 508 can correspond to a fourth location detection accuracy (e.g., a location detection accuracy in a range of 5-15 m) associated with an example Wi-Fi communication system 520 associated with the building 512. Also depicted is a fifth example location detection zone 522 associated with the GEO satellite 514.

In some examples, the location engine circuitry 140 of FIGS. 1 and/or 4 can obtain data from at least one of the LEO satellite 510, the GEO satellite 514, the first cellular communication system 516, the second cellular communication system 518, the Wi-Fi communication system 520. In some examples, the location engine circuitry 140 can determine a location of a device, an object, etc., in the building 512 based on the data. For example, the location engine circuitry 140 can determine the location based on single-cell position, RTT, AOA, angle-of-departure (AOD), TOA, TDOA, etc., data from at least one of the first cellular communication system 516 or the second cellular communication system 518. In some examples, the location engine circuitry 140 can execute the ML model(s) 496 of FIG. 4 to generate output(s) based on the data. In some examples, the output(s) can include a position of the device, the object, etc., in the building 512 and/or an accuracy associated thereof.

Advantageously, the ML model(s) 496 can determine that data from different spectrums, modes, etc., can be used to generate a location for the device, the object, etc., with improved accuracy compared with data from the GEO satellite 514. For example, the location engine circuitry 140 can execute and/or instantiate the ML model(s) 496 to determine that data from the LEO satellite 510 can produce more accurate location data of the device, the object, etc., because the LEO satellite 510 is an L-band system, which operates in the lower part of the radio spectrum (e.g., approximately the same frequencies as mobile phones), that can broadcast signals having radiofrequencies (e.g., non-GNSS radiofrequencies with high-signal coding gain) that can penetrate deep indoor the building 512. In some examples, the LEO satellite 510 can serve as a backup data source provider to provide measurements using quadrature phase-shift key transmission up to 40 decibels (dB) relative to unobstructed reception. In some examples, location data based on data from the LEO satellite 510 can lead to less path loss, increased resiliency, and/or deeper attenuation indoors to the building 512. In some examples, the location engine circuitry 140 can execute and/or instantiate the ML model(s) 496 to determine that data from the first cellular communication system 516, the second cellular communication system 518, the Wi-Fi communication system 520, etc., and/or any combination(s) (or fusion(s)) thereof, can produce more accurate location data of the device, the object, etc., with respect to the GEO satellite 514.

Figure 6:
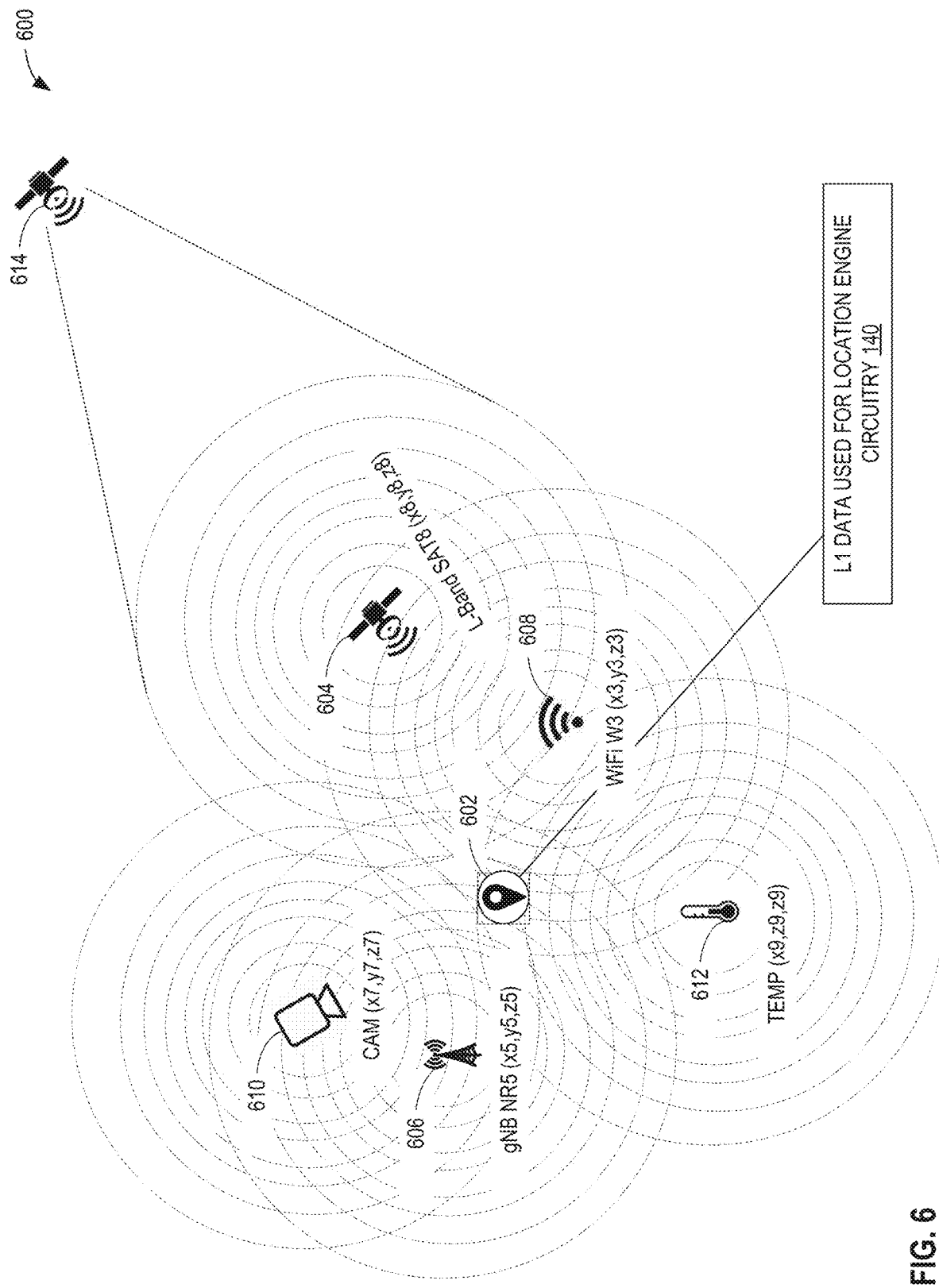
FIG. 6 is an illustration of another example location determination environment including the example location engine circuitry of FIG. 1 to determine a location of an object and/or device based on multi-spectral, multi-modal data.

FIG. 6 is an illustration of a second example location determination environment 600 in which a location of a device and/or an object, such as an example object 602, is detected based on heterogeneous data from different example sensors. In some examples, the object 602 is a passive object and/or a passive device. In some examples, the object 602 is an active object and/or an active device. In some examples, the object 602 is assigned to and/or scheduled to at least one of a terrestrial network or a non-terrestrial network.

In the illustrated example, a first example satellite 604, an example cellular communication system 606, an example Wi-Fi device 608, an example camera 610, an example IoT device 612, and a second example satellite 614 are tracking and/or otherwise determining a location of the object 602. In this example, the first satellite 604 is a LEO satellite. Alternatively, the first satellite 604 may be any other type of satellite such as a GEO satellite. In this example, the cellular communication system 606 is a 5G cellular communication system. Alternatively, the cellular communication system 606 may be any other type of cellular communication system, such as 4G LTE, 6G, etc. In this example, the IoT device 612 is a temperature sensor. Alternatively, the IoT device 612 may be any other type of sensor or connection technology enabled device. In this example, the second satellite 614 is a GEO satellite. Alternatively, the second satellite 614 may be any other type of satellite. In this example, the first satellite 604, the cellular communication system 606, the Wi-Fi device 608, the camera 610, the IoT device 612 have different locations (e.g., different x-, y-, and/or z-coordinates), and the second satellite 614 with respect to the object 602.

In the illustrated example, the location engine circuitry 140 can obtain data from the first satellite 604, the cellular communication system 606, the Wi-Fi device 608, the camera 610, the IoT device 612, and/or the second satellite 614. In some examples, the location engine circuitry 140 can receive, ingest, and/or parse the data. For example, the location engine circuitry 140 can receive L1 data, such as SRS data, from the cellular communication system 606. In some examples, the location engine circuitry 140 can determine the location of the object 602 by executing the ML model(s) 496 with the data as input(s) to the ML model(s) 496. In some examples, the location engine circuitry 140 can provide the location of the object 602 to different hardware, software, and/or firmware. For example, the location engine circuitry 140 can provide the location of the object 602 to a software service, a software application, etc., associated with the object 602.

In some examples, the second satellite 614 can issue and/or output location data, which can include epoch markers (e.g., x-, y-, and/or z-coordinates, timestamps, etc.), to device(s) within a coverage area of the second satellite 614. For example, the second satellite 614 can transmit the location data to at least one of the first satellite 604, the cellular communication system 606, the Wi-Fi device 608, the camera 610, or the IoT device 612. Advantageously, device(s) within the coverage area of the second satellite 614 can have access to the same location data and therefore can effectuate a consistent representation of time sequencing (e.g., first location data with respect to a first time (t1), second location data with respect to a second time (t2) after the first time, etc.). In some examples, LEO satellites, such as the first satellite 604, can enter and exit the coverage area of the second satellite 614 frequently, periodically, etc., and may not be an appropriate ground truth for the location data. Advantageously, at least one of the cellular communication system 606, the Wi-Fi device 608, the camera 610, or the IoT device 612 can obtain location data from the second satellite 614 to overcome coverage gaps associated with LEO satellites entering and exiting a coverage area associated with the at least one of the cellular communication system 606, the Wi-Fi device 608, the camera 610, or the IoT device 612.

Figure 7:
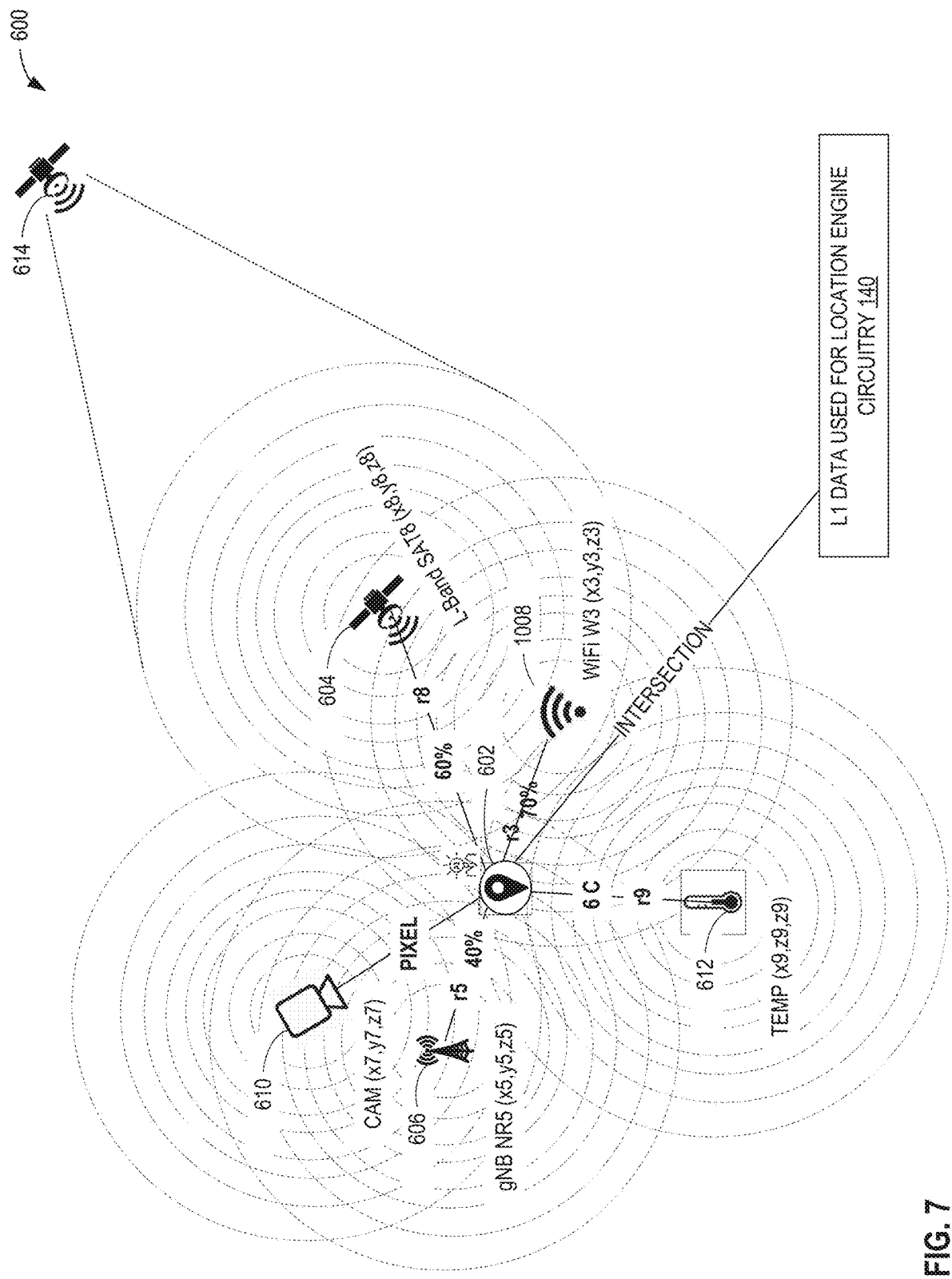
FIG. 7 is another illustration of the example location determination environment of FIG. 6.

FIG. 7 is an illustration of the second location determination environment 600 of FIG. 6 in which a location of the object 602 of FIG. 6 is detected based on multi-spectrum, multi-modal data. In the illustrated example, the location engine circuitry 140 of FIGS. 1 and/or 4 tracks and/or otherwise determines a location of the object 602 based on data from the first satellite 604, the cellular communication system 606, the Wi-Fi device 608, the camera 610, the IoT device 612, and/or the second satellite 614. For example, the location engine circuitry 140 can obtain L1 data, L2 data, signal strength measurements, sensor data, TOA data, TDOA data, AOA data, etc., from the first satellite 604, the cellular communication system 606, the Wi-Fi device 608, the camera 610, the IoT device 612, the second satellite 614, etc. In some examples, the location engine circuitry 140 can obtain pixel data from the camera 610. In some examples, the location engine circuitry 140 can obtain sensor data (e.g., temperature measurements, measured data, measurement data, measurement data inputs, etc.) from sensors, such as the IoT device 612. In the illustrated example, the first satellite 604, the cellular communication system 606, the Wi-Fi device 608, the camera 610, the IoT device 612, and/or the second satellite 614 are data sources because they are the source of data from which the location engine circuitry 140 can determine a location of the object 602. In the illustrated example, the first satellite 604, the cellular communication system 606, the Wi-Fi device 608, the camera 610, the IoT device 612, and/or the second satellite 614 are data producers because they are the producers of data from which the location engine circuitry 140 can determine a location of the object 602.

In some examples, the data from the data sources in the illustrated example can be implemented by data corresponding to L1 or a first layer of an OSI model. For example, the location engine circuitry 140 can obtain first L1 data from the first satellite 604, and the first L1 data can include a first bit stream (e.g., a binary transmission) decoded from a signal transmitted by a transmitter of the first satellite 604 and received by a receiver (e.g., an antenna) associated with and/or otherwise in communication with the location engine circuitry 140.

In some examples, the location engine circuitry 140 can obtain second L1 data from the cellular communication system 606, and the second L1 data can include a second bit stream decoded from a signal transmitted by a transmitter (e.g., a radio) of the cellular communication system 606 and received by a receiver (e.g., an antenna) associated with and/or otherwise in communication with the location engine circuitry 140. For example, the second bit stream can be representative of SRS data, CIR data, SNR data, etc.

In some examples, the location engine circuitry 140 can obtain third L1 data from the Wi-Fi device 608, and the third L1 data can include a third bit stream decoded from a signal transmitted by a transmitter of the Wi-Fi device 608 (e.g., a radio) and received by a receiver (e.g., an antenna) associated with and/or otherwise in communication with the location engine circuitry 140. For example, the third bit stream can be representative of RSSI levels.

In some examples, the location engine circuitry 140 can obtain fourth L1 data from the camera 610, and the fourth L1 data can include a fourth bit stream decoded from a signal transmitted by a wired transmitter (e.g., a wired line connection such as coax, fiber, copper, etc.) or wireless transmitter (e.g., a radio) of the camera 610 and received by a receiver (e.g., a wireline receiver, an antenna, etc.) associated with and/or otherwise in communication with the location engine circuitry 140. For example, the fourth bit stream can correspond to raw pixel or other image data generated by the camera 610.

In some examples, the location engine circuitry 140 can obtain fifth L1 data from the IoT device 612. The fifth L1 data can include a fifth bit stream decoded from a signal transmitted by a transmitter of the IoT device 612 (e.g., a radio) and received by a receiver (e.g., an antenna) associated with and/or otherwise in communication with the location engine circuitry 140. In some examples, the fifth bit stream can correspond to raw sensor data (e.g., an analog current value, an analog voltage value, temperature data, a unit of measure, etc.) generated by the IoT device 612.

In some examples, the location engine circuitry 140 can obtain other types of data associated with an OSI model such as L2 data, L3 data, etc. For example, the location engine circuitry 140 can obtain L2 data from the Wi-Fi device 608, and the L2 data may include a MAC address of the Wi-Fi device 608. In some examples, the location engine circuitry 140 can obtain L3 data from the Wi-Fi device 608, and the L3 data can include an IP address, Internet Protocol security (IPsec) data, Internet Group Management Protocol (IGMP) data, Internet Control Message Protocol (ICMP) data, etc.

In some examples, the location engine circuitry 140 can obtain L2 data from the IoT device 612. For example, the L2 data can include a MAC address of the IoT device 612. In some examples, the location engine circuitry 140 can obtain L3 data from the IoT device 612, and the L3 data can include an IP address, IPsec data, IGMP data, ICMP data, etc. Advantageously, the location engine circuitry 140 can determine the location of the object 602 based on an intersection of data (e.g., L1 data, L2 data, L3 data, etc., and/or any combination(s) thereof) from one(s) of data sources, data producers, etc., such as the first satellite 604, the cellular communication system 606, the Wi-Fi device 608, the camera 610, the IoT device 612, and/or the second satellite 614 of the illustrated example.

Figure 8:
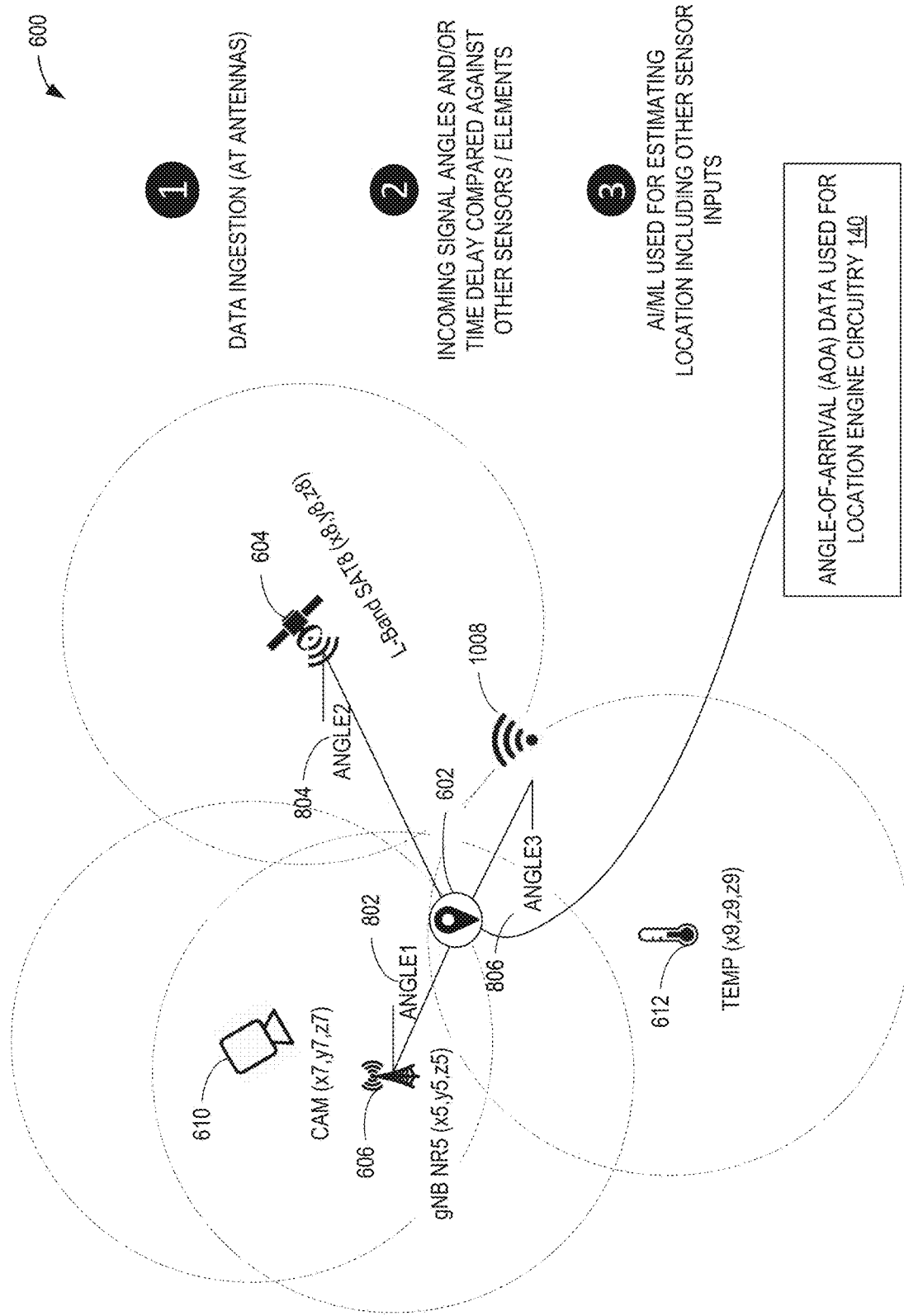
FIG. 8 is an illustration of the example location determination environment of FIG. 6 including the example location engine circuitry of FIG. 1 to determine the location of the device and/or object based on angle-of-arrival data.

FIG. 8 is an illustration of the second location determination environment 600 of FIG. 6 in which a location of the object 602 is detected based on AOA data. In the illustrated example, the location engine circuitry 140 of FIGS. 1 and/or 4 tracks and/or otherwise determines a location of the object 602 based on data from the first satellite 604, the cellular communication system 606, the Wi-Fi device 608, the camera 610, the IoT device 612, and/or the second satellite 614. For example, the location engine circuitry 140 can obtain AOA measurements from the object 602, the first satellite 604, the cellular communication system 606, the Wi-Fi device 608, the camera 610, the IoT device 612, and/or the second satellite 614.

In some examples, the object 602 is an active object. For example, the object 602 can be the first industrial machine 110 of FIG. 1, which can change direction, speed, etc. In some examples, the location engine circuitry 140 can obtain a first AOA 802 (identified by ANGLE1) from the cellular communication system 606, a second AOA 804 (identified by ANGLE2) from the first satellite 604, and/or a third AOA 806 (identified by ANGLE3) from the Wi-Fi device 608. For example, the location engine circuitry 140 can obtain incoming signal angles and time delay measurements from the cellular communication system 606, the first satellite 604, and/or the Wi-Fi device 608; execute comparison(s) of one(s) of the signal angles and time delay measurements against other one(s) of the signal angles and time delay measurements; and determine a location of the object 602 based on the comparison(s).

In some examples, the object 602 is a passive object. For example, the object 602 can be one of the storage containers 114 of FIG. 1. For example, the location engine circuitry 140 can obtain the first AOA from the cellular communication system 606, the second AOA from the first satellite 604, and/or the third AOA from the Wi-Fi device 608. For example, the location engine circuitry 140 can obtain incoming signal angles and time delay measurements from the cellular communication system 606, the first satellite 604, and/or the Wi-Fi device 608; execute comparison(s) of one(s) of the signal angles and time delay measurements against other one(s) of the signal angles and time delay measurements; and determine a location of the object based on the comparison(s). Advantageously, the location engine circuitry 140 can determine the location of the object 602 based on an intersection of AOA data from one(s) of data sources, data producers, etc., such as the object 602, the first satellite 604, the cellular communication system 606, the Wi-Fi device 608, the camera 610, the IoT device 612, and/or the second satellite 614 of the illustrated example.

Figure 9:
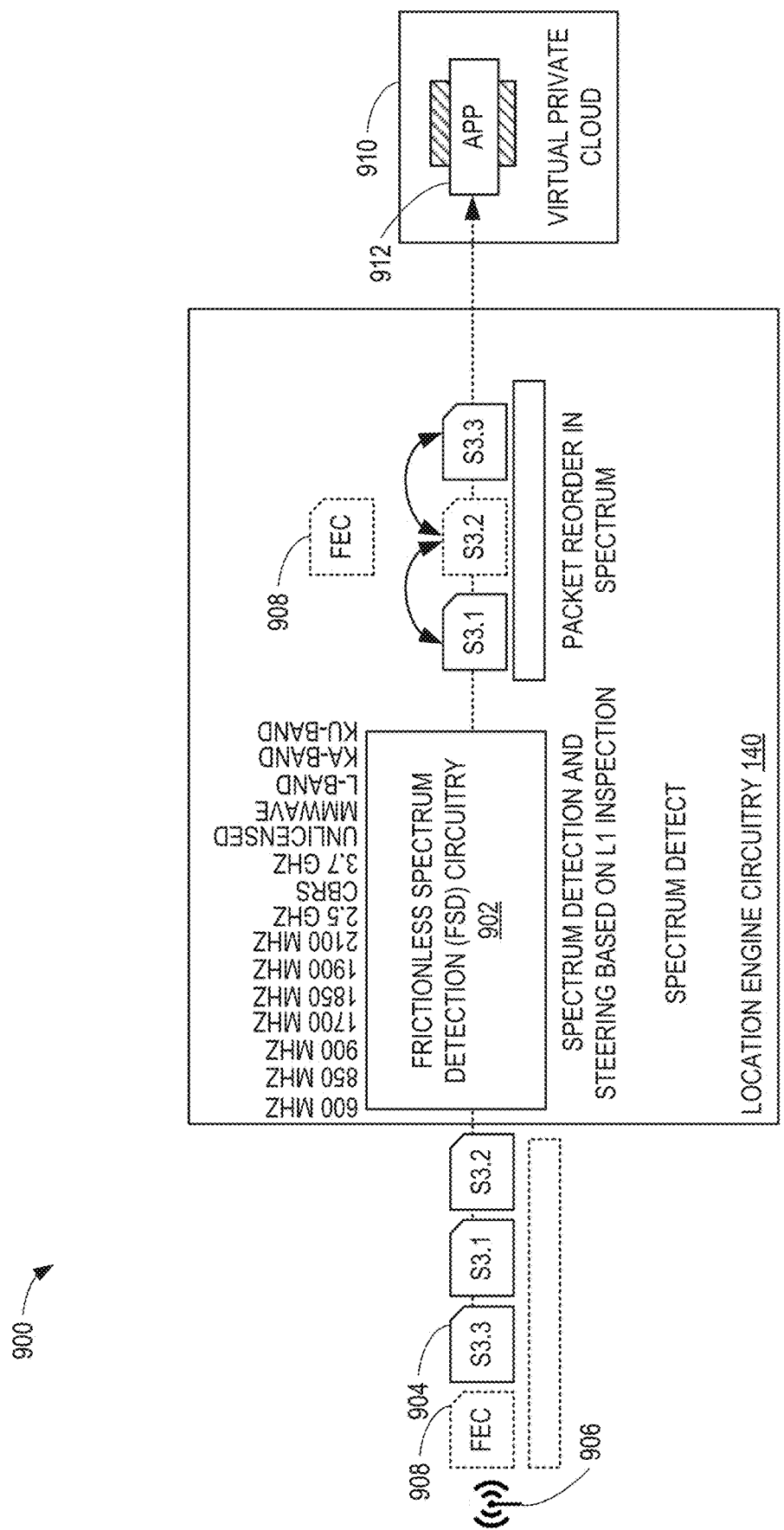
FIG. 9 is an illustration of the example location engine circuitry of FIG. 1 to determine a location of a device and/or an object based on multi-spectral data.

FIG. 9 is an illustration of a third example location determination environment 900 including an example implementation of the location engine circuitry 140 of FIGS. 1 and/or 4 to determine a location of a device and/or an object based on wireless data, such as cellular data. In some examples, the location engine circuitry 140 can implement homogeneous data processing (e.g., processing data from multiple cellular data sources).

The location engine circuitry 140 of the illustrated example includes example frictionless spectrum detection (FSD) circuitry 902 that detects a spectrum of example incoming wireless data 904 generated by an example cellular data source 906. In some examples, the incoming wireless data 904 can be implemented by data packets. In some examples, the cellular data source 906 can be implemented by a cellular handset device (e.g., a smartphone). In some examples, the FSD circuitry 902 can use data driven conditioning to order spectrum feeds and policy techniques to correct for lost packets within a specific spectrum and/or out-of-order processing of multiple spectrums. Example forward error correcting (FEC) circuitry 908 is also depicted in the illustrated example. For example, the FEC circuitry 908 can pre-process the incoming wireless data 904 and output the pre-processed wireless data to the FSD circuitry 902. After a detection of the spectrum of the incoming wireless data 904, the location engine circuitry 140 can reorder the incoming wireless data 904. After a reordering of the incoming wireless data 904, the location engine circuitry 140 can deliver and/or otherwise output the reordered wireless data to an example virtual private cloud (VPC) 910, which implements, includes, and/or otherwise hosts an example application 912.

In example operation, the location engine circuitry 140 can detect and/or steer the incoming wireless data 904 based on L1 inspection (e.g., L1 data inspection). In example operation, the location engine circuitry 140 can parse and/or otherwise extract L1 data from the incoming wireless data 904. In example operation, the location engine circuitry 140 can execute the ML model(s) 496 of FIG. 4 with the L1 data as ML input(s) to generate ML output(s), which can include a location of the cellular data source 906. In example operation, the location engine circuitry 140 can provide and/or otherwise output the location to the application 912. In example operation, the application 912 can cause one or more actions, operations, etc., to occur. For example, the application 912 can be an autonomous driving application, an autonomous robot application, etc., associated with the cellular data source 906 (e.g., the cellular data source 906 can be an autonomous vehicle, an autonomous robot, etc.). In some examples, after receiving a location of the cellular data source 906, the application 912 can determine a spectrum for which the cellular data source 906 is to use based on the location of the cellular data source 906. In some examples, after receiving a location of the cellular data source 906, the application 912 can generate a command, a direction, an instruction, etc., to cause the cellular data source 906, or device(s) associated thereof, to execute one or more actions (e.g., an autonomous driving action such as a change in speed or direction, an autonomous robot action such as a change in a robot arm position, etc.).

Figure 10:
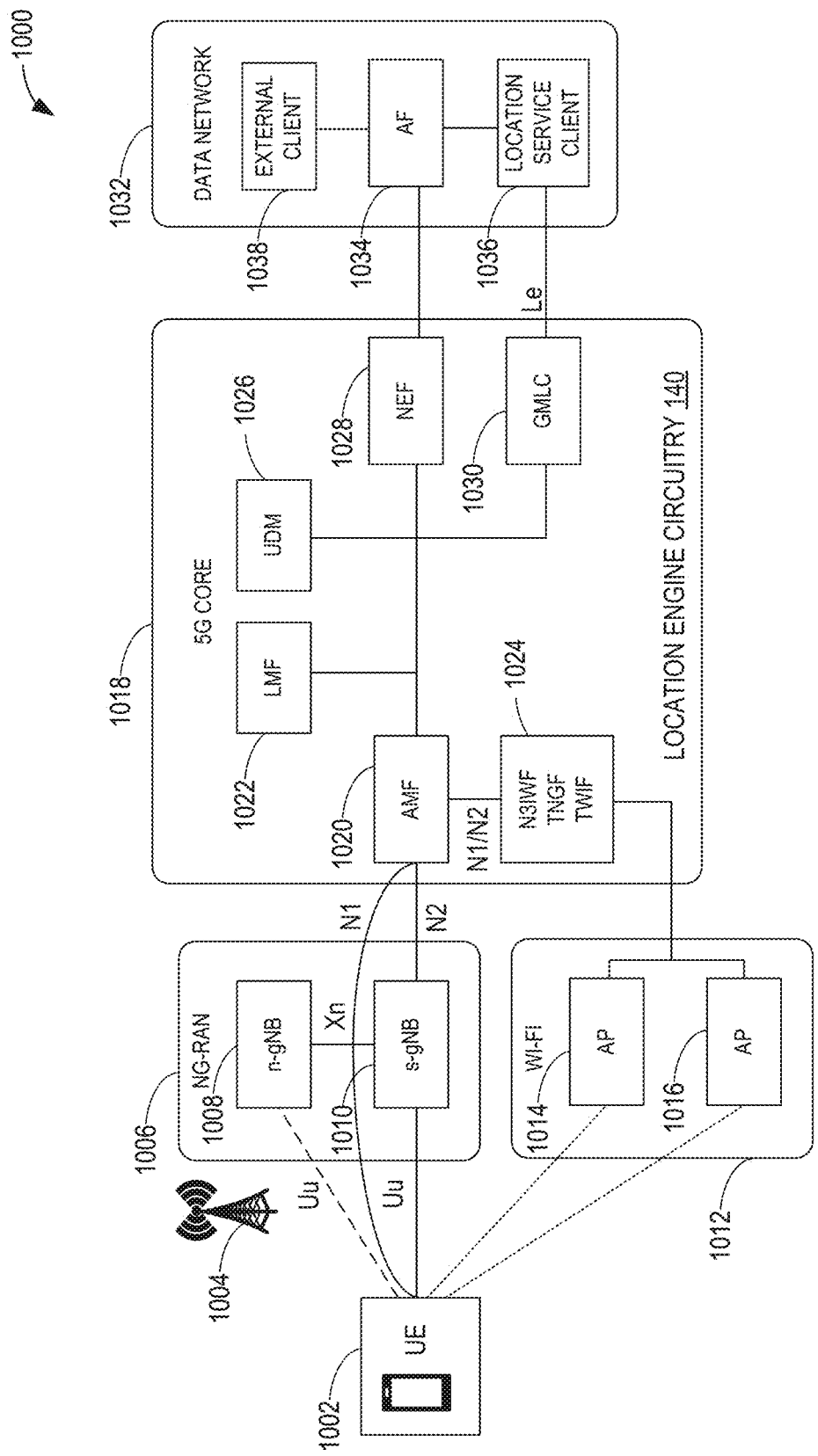
FIG. 10 is another illustration of the example location engine circuitry of FIG. 1 to determine a location of a device and/or an object based on multi-spectral data.

FIG. 10 is an illustration of a fourth example location determination environment 1000 including the example location engine circuitry 140 of FIG. 1 to determine a location of an example UE 1002 based on multi-spectral data. The fourth location determination environment 1000 includes an example RU 1004 and an example next generation radio access network (NG-RAN) 1006, which includes and/or otherwise implements an example primary next-generation 5G logical node 1008 (identified by n-gNB) and an example secondary next-generation 5G logical node 1010 (identified by s-gNB). The fourth location determination environment 1000 includes an example Wi-Fi communication system 1012, which includes a first example AP 1014 and a second example AP 1016. In some examples, the UE 1002 is assigned and/or scheduled to at least one of a terrestrial network or a non-terrestrial network.

The fourth location determination environment 1000 includes an example 5G-core 1018. The 5G-core 1018 of the illustrated example can be a core server, a 5G-core server, etc. The 5G-core 1018 of the illustrated example is implemented at least in part by the location engine circuitry 140. For example, the 5G-core 1018 can include the location engine circuitry 140. The 5G-core 1018 includes an example Access and Mobility Management Function (AMF) 1020, an example Location Management Function (LMF) 1022, and example functions 1024, which include an example Non-3GPP Inter-Working Function (N3IWF), an example Trusted Non-3GPP Gateway Function (TNGF), and an example Trusted WLAN Interworking Function (TWIF). The 5G-core 1018 includes an example Unified Data Management (UDM) function 1026, an example Network Exposure Function (NEF) 1028, and an example Gateway Mobile Location Centre (GMLC) 1030. The fourth location determination environment 1000 includes an example data network 1032, which includes an example Application Function (AF) 1034, an example location service client 1036, and an example external client 1038.

In the illustrated example, the UE 1002 is in communication with the n-gNB 1008 and the s-gNB 1010 via respective interfaces identified by Uu. In the illustrated example, the n-gNB 1008 is coupled to and/or otherwise in communication with the s-gNB 1010 via an interface identified by Xn. In the illustrated example, the UE 1002 is coupled to and/or otherwise in communication with the AMF 1020, and/or, more generally, the 5G-core 1018, via an interface identified by N1. In the illustrated example, the s-gNB 1010 is coupled to and/or otherwise in communication with the AMF 1020, and/or, more generally, the 5G-core 1018, via an interface identified by N2. In the illustrated example, the AMF 1020 is coupled to and/or otherwise in communication with the functions 1024 via an interface identified by N1/N2. In the illustrated example, the GMLC 1030 is coupled to and/or otherwise in communication with the location service client 1036 via an interface identified by Le.

In the illustrated example, the UE 1002 is coupled to and/or otherwise in communication with the first AP 1014, the second AP 1016, and/or, more generally, the Wi-Fi communication system 1012. The first AP 1014, the second AP 1016, and/or, more generally, the Wi-Fi communication system 1012, is/are coupled to the functions 1024, and/or, more generally, the 5G-core 108. The AMF 1020 is coupled to and/or otherwise in communication with one(s) of the LMF 1022, the UDM 1026, the NEF 1028, and/or the GMLC 1030. The NEF 1028, and/or, more generally, the 5G-core 1018, is coupled to and/or otherwise in communication with the AF 1034, and/or, more generally, the data network 1032. The AF 1034 is coupled to and/or otherwise in communication with the external client 1038.

In example operation, the fourth location determination environment 1000 can effectuate and/or otherwise implement location determination of the UE 1002 based on multi-spectrum data sources. For example, the UE 1002 can transmit first data, such as SRS data to the NG-RAN 1006 and/or the 5G-core 1018. For example, the first data can be representative of data of a first mode or spectrum, such as cellular. In some examples, the UE 1002 can transmit second data, such as Wi-Fi data packets, to the Wi-Fi communication system 1012. For example, the first data can be representative of data based on a second mode or spectrum, such as Wi-Fi. Advantageously, the location engine circuitry 140, and/or, more generally, the 5G-core 1018, can determine a location of the UE 1002 based on the first data and/or the second data.

In example operation, the location engine circuitry 140 can output the location of the UE 1002 to at least one of the AF 1034 or the location service client 1036. For example, the AF 1034 can output the location to the external client 1038, which can be implemented by an application, a service, etc., that can cause one or more actions, events, operations, etc., to occur based on the location. In some examples, the location engine circuitry 140 can output the location to the location service client 1036, which can be implemented by an application, a service, etc., that can cause one or more actions, events, operations, etc., to occur based on the location.

Figure 11:
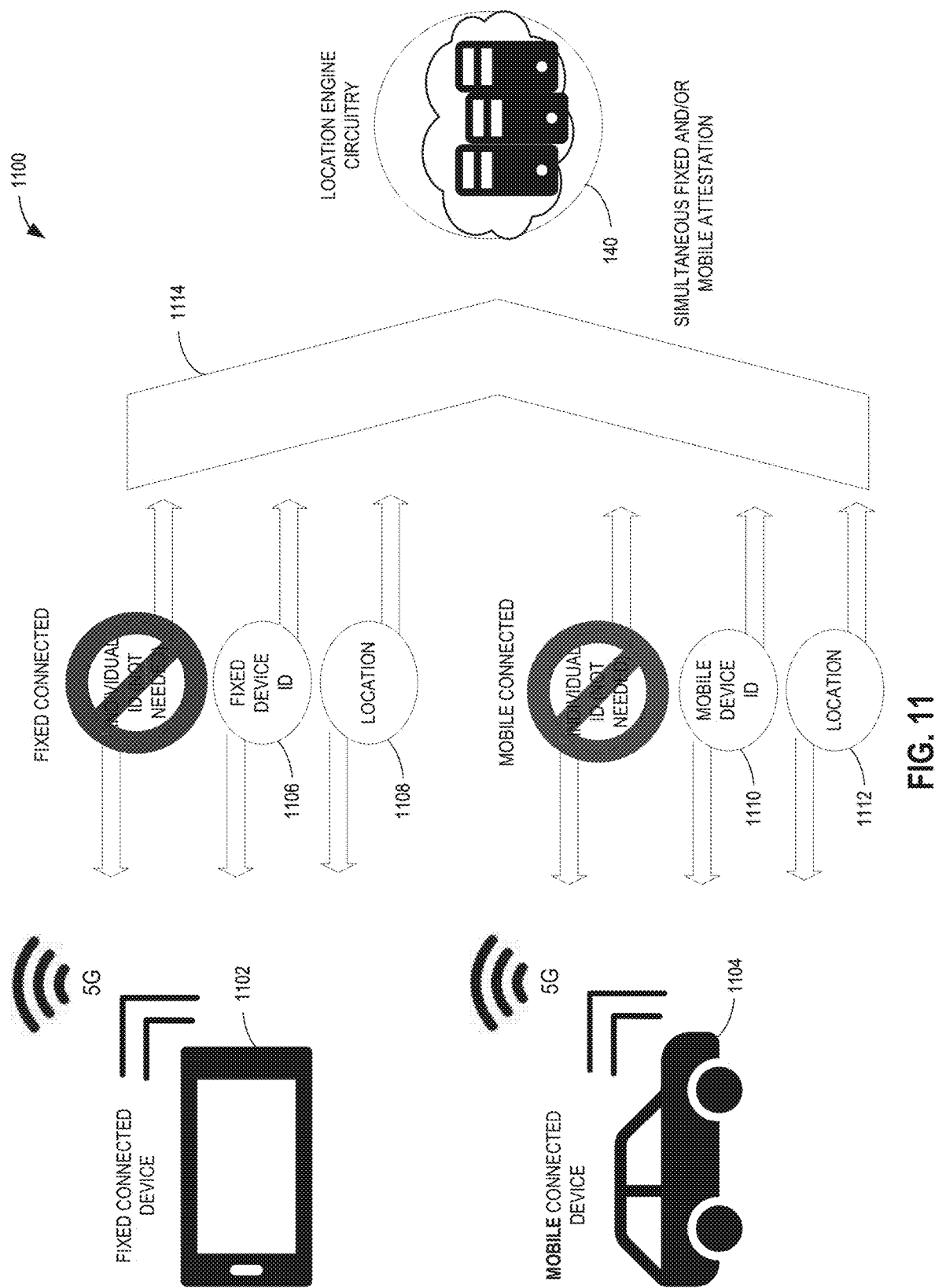
FIG. 11 is an illustration an example location determination environment including the example location engine circuitry of FIG. 1 to determine locations of devices and/or objects based on at least one of device identification data or location data.

FIG. 11 is an illustration of a fifth example location determination environment 1100 in which locations of devices and/or objects, such as example objects 1102, 1104, are determined based on at least one of example device identification data 1106, 1110 or example location data 1108, 1112. The device identification data 1106, 1110 includes a first example device identifier 1106 (identified by FIXED DEVICE ID) and a second example device identifier 1110 (identified by MOBILE DEVICE ID). Additionally or alternatively, the device identification data 1106, 1110 may include object identifiers that respectively identify the objects 1102, 1104, which can be implemented by an alphanumeric data string (e.g., a vehicle identification number (VIN), a manufacturer serial number, etc.). The location data 1108, 1112 includes a first example location 1108 and a second example location 1112. In some examples, the illustrated example of FIG. 11 implements geography or geographical (GEO) fencing based on location/positioning. In the illustrated example, the objects 1102, 1104 include a first example object 1102 and a second example object 1104. Additionally or alternatively, one(s) of the objects 1102, 1104 may be device(s).

The first object 1102 of the illustrated example is a fixed connected device that can be enabled with cellular connection technology such as 5G cellular. For example, the first object 1102 can be a device whose primary mode of operation is to operate in a fixed area (although the first object 1102 may be capable of being moved from location to location). In some examples, the first object 1102 can be a smart hub device, a toll booth, a building, an energy meter, etc., and/or any combination(s) thereof.

The second object 1104 of the illustrated example is a mobile connected device that can be enabled with cellular connection technology such as 5G cellular. For example, the second object 1104 can be a device whose primary mode of operation is to operate while in motion or prior to or after the motion is complete (although the second object 1104 may be capable of remaining in a fixed location). In some examples, the second object 1104 can be a toll pass of a vehicle, a wearable device (e.g., a fitness tracker, a smartwatch, a headset, etc.), a vehicle (e.g., an autonomous vehicle, a vehicle enabled with connection technology, etc.), a medical device (e.g., a medical body device, a medical implant device, etc.), etc., and/or any combination(s) thereof.

In example operation, the first object 1102 can transmit at least one of the first device identifier 1106 or the first location 1108 to the location engine circuitry 140 of FIGS. 1 and/or 4 via an example network 1114. The network 1114 of the illustrated example can be any type of network as disclosed herein. The first device identifier 1106 can be a manufacturer identifier, a vendor identifier, an IP address, a MAC address, etc., and/or any combination(s) thereof. The first location 1108 can include a GPS location, a location with respect to one or more cellular towers, geographical coordinates, a mailing address, etc. In the illustrated example, the location engine circuitry 140 can implement a data center (e.g., a cloud data center, a telecommunications data center, an edge data center, etc.). In example operation, the location engine circuitry 140 can execute the ML model(s) 496 of FIG. 4 with at least one of the first device identifier 1106 or the first location 1108 as ML inputs to generate ML output(s), which can include the location of the first object 1102.

In example operation, the second object 1104 can transmit at least one of the second device identifier 1110 or the second location 1112 to the location engine circuitry 140 of FIGS. 1 and/or 4 via the network 1114. The second device identifier 1110 can be a manufacturer identifier, a vendor identifier, an IP address, a MAC address, etc., and/or any combination(s) thereof. The second location 1112 can include a GPS location, a location with respect to one or more cellular towers, geographical coordinates, a mailing address, etc. In example operation, the location engine circuitry 140 can execute the ML model(s) 496 of FIG. 4 with at least one of the second device identifier 1110 or the second location 1112 as ML inputs to generate ML output(s), which can include the location of the second object 1104. Advantageously, the location engine circuitry 140 can simultaneously implement fixed and mobile attestation of respective ones of the first object 1102 and the second object 1104.

Advantageously, the location engine circuitry 140 can utilize epoch markers (e.g., x-, y-, and/or z-coordinates, timestamps, nonces or nonce data values representative of timestamps and/or coordinates, etc.) in attestation of devices to achieve scaling of attestation across many components in a mobile edge network. For example, a stream of epoch markers, such as timestamp nonces, can be broadcast and/or multicast across a large geographical area. In some examples, a LEO satellite and/or a GEO satellite can cover the large geographical area to achieve synchronization of attestation evidence freshness. Since all parties (e.g., attesters and verifiers) have access to the same stream of epoch markers, the parties can agree on how fresh (or current) the attestation is by including the epoch marker in the attested evidence. Similarly, the freshness of the attestation results produced by an attestation verifier (e.g., a silicon manufacturer, a cloud services provider, etc.) can represent the freshness of attestation results (to be consumed by relying parties—any downstream entity in use cases disclosed herein) by including an epoch marker in the attestation results.

Figure 12:
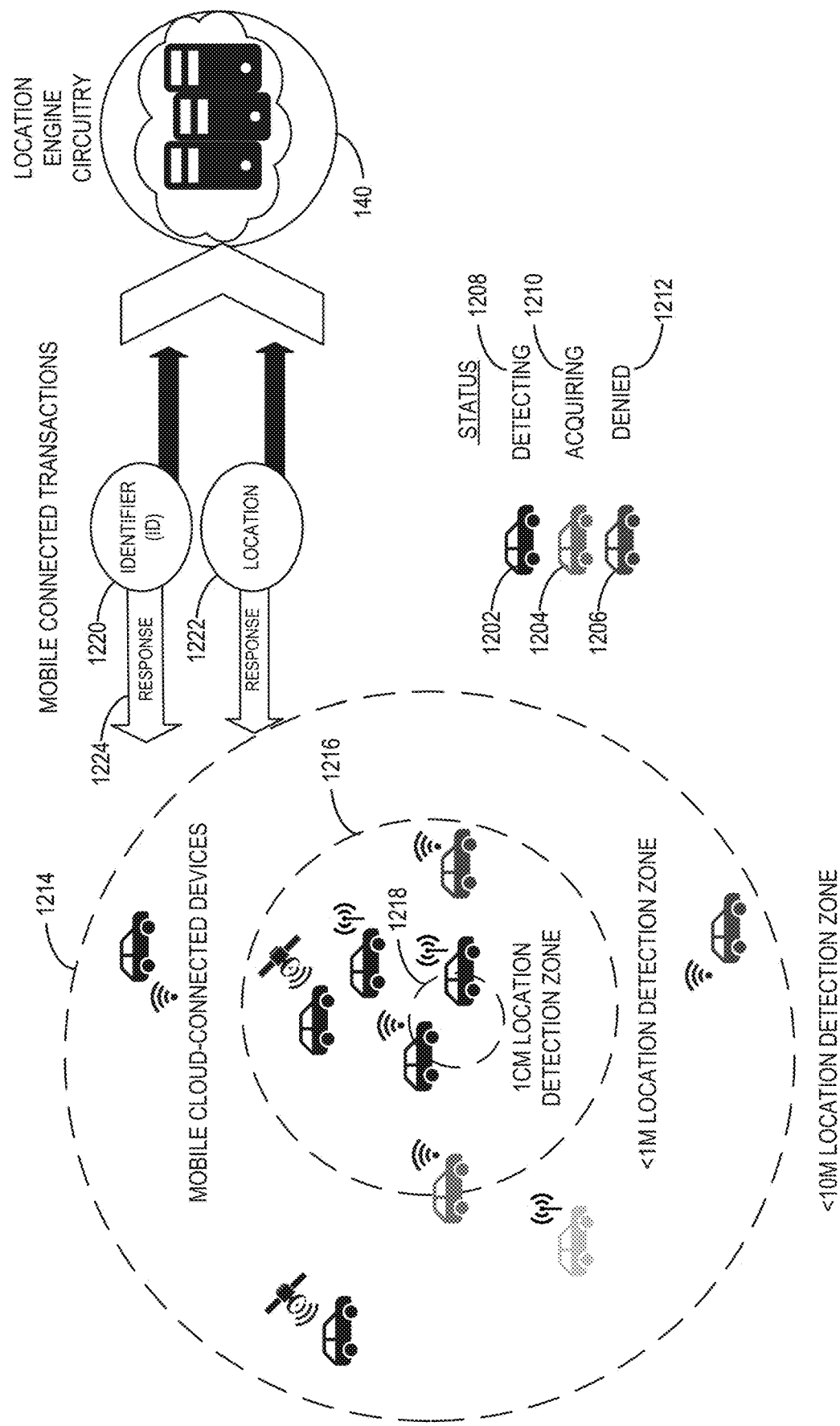
FIG. 12 is an illustration of an example location determination environment including the example location engine circuitry of FIG. 1 to determine locations of devices and/or objects based on location statuses.

FIG. 12 is an illustration of a sixth example location determination environment 1200 in which locations of devices and/or objects, such as example objects 1202, 1204, 1206, are determined by the location engine circuitry 140 of FIGS. 1 and/or 4 based on example location statuses 1208, 1210, 1212. In some examples, the illustrated example implements location/positioning based rideshare, vehicle share, rental car zones (e.g., automatic valet parking, automated parking using multi-spectrum, multi-modal sensors, vehicle inventory management, etc.), shipping container location and routing management, and the like. The objects 1202, 1204, 1206 of the illustrated example are mobile cloud-connected devices, such as vehicles or portion(s) thereof. The objects 1202, 1204, 1206 are included in one of example location detection zones 1214, 1216, 1218 including a first example location detection zone 1214, a second example location detection zone 1216, and a third example location detection zone 1218. The first location detection zone 1214 has a first accuracy detection level of less than 10 m, the second location detection zone 1216 has a second accuracy detection level of less than 1 m, and the third location detection zone 1218 has a third accuracy detection level of less than 1 centimeter (cm). In some examples, one(s) of the objects 1202, 1204, 1206 can be enabled to connect to other device(s) via different connection technologies such as satellite, Wi-Fi, and/or cellular (e.g., 4G LTE/5G/6G cellular). In some examples, the various accuracy detection levels can be representative of fine-grained or coarse-grained detection levels. For example, the first accuracy detection level and/or the second accuracy detection level can be a coarse-grained detection level. In some examples, the third accuracy detection level can be a fine-grained detection level.

In some examples, the location statuses 1208, 1210, 1212 are statuses assigned to one(s) of the objects 1202, 1204, 1206 by the location engine circuitry 140. The objects include first example objects 1202, second example objections 1204, and third example objects 1206. The location statuses 1208, 1210, 1212 include a first example location status 1208 of detecting, a second example location status 1210 of acquiring, and a third example location status 1212 of denied. In some examples, the location engine circuitry 140 can assign the first location status 1208 to an object in response to a determination that the location engine circuitry 140 has identified a location of the object and is tracking or detecting (e.g., continuously tracking or detecting) the location of the object. In some examples, the location engine circuitry 140 can assign the second location status 1210 to an object after a determination that the location engine circuitry 140 is attempting to identify and/or otherwise acquire a location of the object. In some examples, the location engine circuitry 140 can assign the third location status 1212 to an object after a determination that the location engine circuitry 140 has identified the object as being an unauthorized, unverified, and/or malicious object whose communications are not to be received and/or processed by the location engine circuitry 140 due to safety and/or security requirements or considerations.

In example operation, the location engine circuitry 140 can receive and/or otherwise obtain example identifiers 1220 and example locations 1222 from one(s) of the objects 1202, 1204, 1206 via different spectrums and modes. For example, the location engine circuitry 140 can receive one(s) of the identifiers 1220 and/or one(s) of the locations 1222 from one(s) of the objects 1202, 1204, 1206 via different spectrums such as those associated with satellite communication, cellular communication, Wi-Fi communication, etc., and/or any combination(s) thereof. In some examples, the location engine circuitry 140 can receive one(s) of the identifiers 1220 and/or one(s) of the locations 1222 from one(s) of the objects 1202, 1204, 1206 via different modes such as from at least one of satellite communication, cellular communication, or Wi-Fi communication. In example operation, the location engine circuitry 140 can transmit example responses 1224 indicative of the receipt of the identifiers 1220 to one(s) of the objects 1202, 1204, 1206 that transmitted the identifiers 1220. In some examples, the location engine circuitry 140 can execute the ML model(s) 496 of FIG. 4 with the identifiers 1220 and/or the locations 1222 as inputs to generate outputs, which can include locations of respective ones of the objects 1202, 1204, 1206.

In some examples, the sixth location determination environment 1200 can implement a geo-fence zone environment. For example, the first location detection zone 1214 can be a first geo-fence zone, the second location detection zone 1216 can be a second geo-fence zone, and the third location detection zone 1218 can be a third geo-fence zone. In some examples, location determination associated with the geo-fence zones can be enforced and/or implemented based on a timing duration or wall-clock time where the geo-fence zones can describe a current timeframe (t) and future timeframe. Or, in the case of epoch markers, the geo-fence zones can describe an interval time frame where a geo-location coordinate is true based on a period corresponding to a set of epoch markers. For example, when $10<t<=20$ in the sixth location determination environment 1200, epoch markers of the geo-fence zones can be enforced. Examples sets of ranges can define periods (e.g., $(10<t<=20)$, $(40<t<=60)$, $(80<t<=100)$, etc.).

Figure 13:
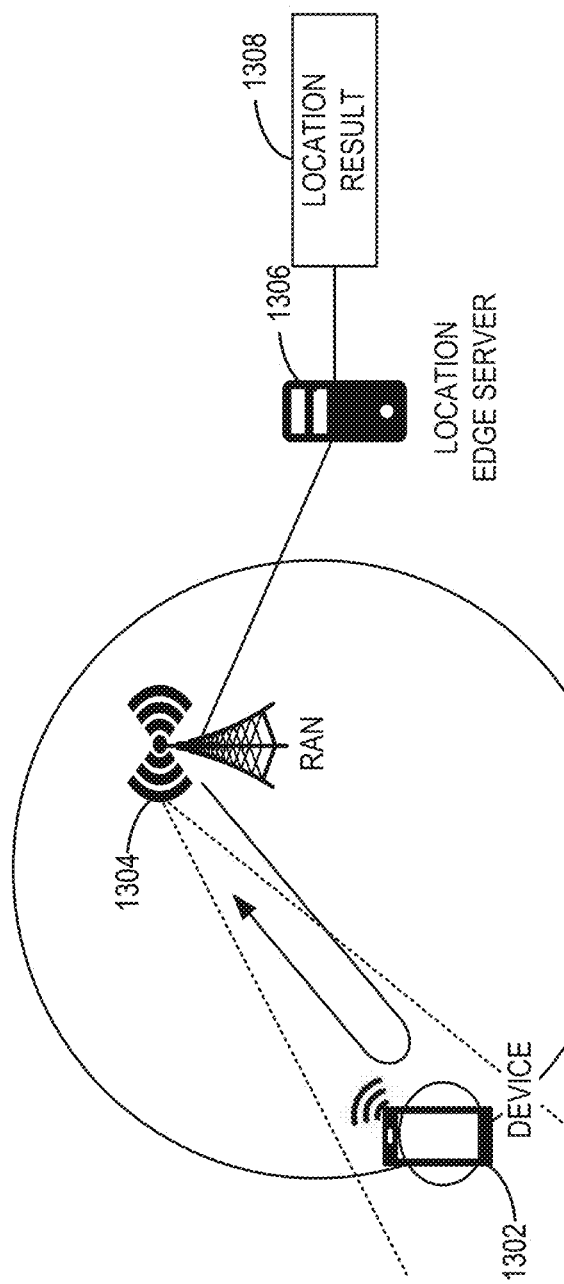
FIG. 13 is an illustration of determining a location of a device and/or an object based on time-of-arrival data.

FIG. 13 is an illustration of determining a location of an object based on TOA data. The illustrated example of FIG. 13 includes an example device 1302, an example RAN 1304, and an example location edge server 1306. The device 1302 of the illustrated example is a smartphone but may be any other type of device, such as an autonomous vehicle, an aerial vehicle (e.g., a drone, a helicopter, etc.), an industrial machine, etc. The RAN 1304 of the illustrated example is a 5G RAN but may be any other type of RAN such as 4G LTE or 6G RAN. The RAN 1304 of the illustrated example implements a gNodeB (i.e., a gNB). The location edge server 1306 of the illustrated example can be implemented by a processor platform including processor circuitry. For example, the location edge server 1306 can be a server or any other type of computing or electronic device. In some examples, the location edge server 1306 includes and/or implements the location engine circuitry 140 of FIGS. 1 and/or 4.

In some examples, the device 1302, the RAN 1304, and/or the location edge server 1306 can effectuate an uplink positioning technique, such as uplink time-of-arrival (UL-TOA). For example, the device 1302 can transmit SRS data at a specified and/or pre-defined measurement or transmission periodicity to the RAN 1304. In some examples, the RAN 1304 can determine a difference between a first timestamp at which the device 1302 transmitted the SRS data and a second timestamp at which the RAN 1304 received the SRS data. In some examples, the RAN 1304 can determine a range or distance between the device 1302 and the RAN 1304 based on the difference between the first and second timestamps. In example operation, the RAN 1304 can output the range to the location edge server 1306, which can determine a location of the device 1302 based on the range. In the illustrated example, the location of the device 1302 determined by the location edge server 1306 is identified by an example location result 1308. In some examples, the location result 1308 is a coordinate location, a Cartesian coordinate location, etc., of the device 302.

In some examples, the device 1302, the RAN 1304, and/or the location edge server 1306 can effectuate a downlink positioning technique, such as downlink time-of-arrival (DL-TOA). For example, the location edge server 1306 can instruct the device 1302 via the RAN 1304 to transmit SRS data from the device 1302 to the RAN 1304 at a specified and/or pre-defined measurement or transmission periodicity. For example, the location edge server 1306 can instruct the device 1302 to transmit SRS data to the RAN 1304 at a measurement frequency of 1 Hz (or any other measurement frequency). In some examples, the RAN 1304 can determine a RTT based on a first timestamp at which the RAN 1304 instructs the device 1302 to transmit SRS data and a second timestamp at which the RAN 1304 receives the SRS data from the device 1302. In some examples, the RAN 1304 can determine a range or distance between the device 1302 and the RAN 1304 based on the RTT. In example operation, the RAN 1304 can output the range to the location edge server 1306, which can determine a location of the device 1302 based on the range.

Figure 14:
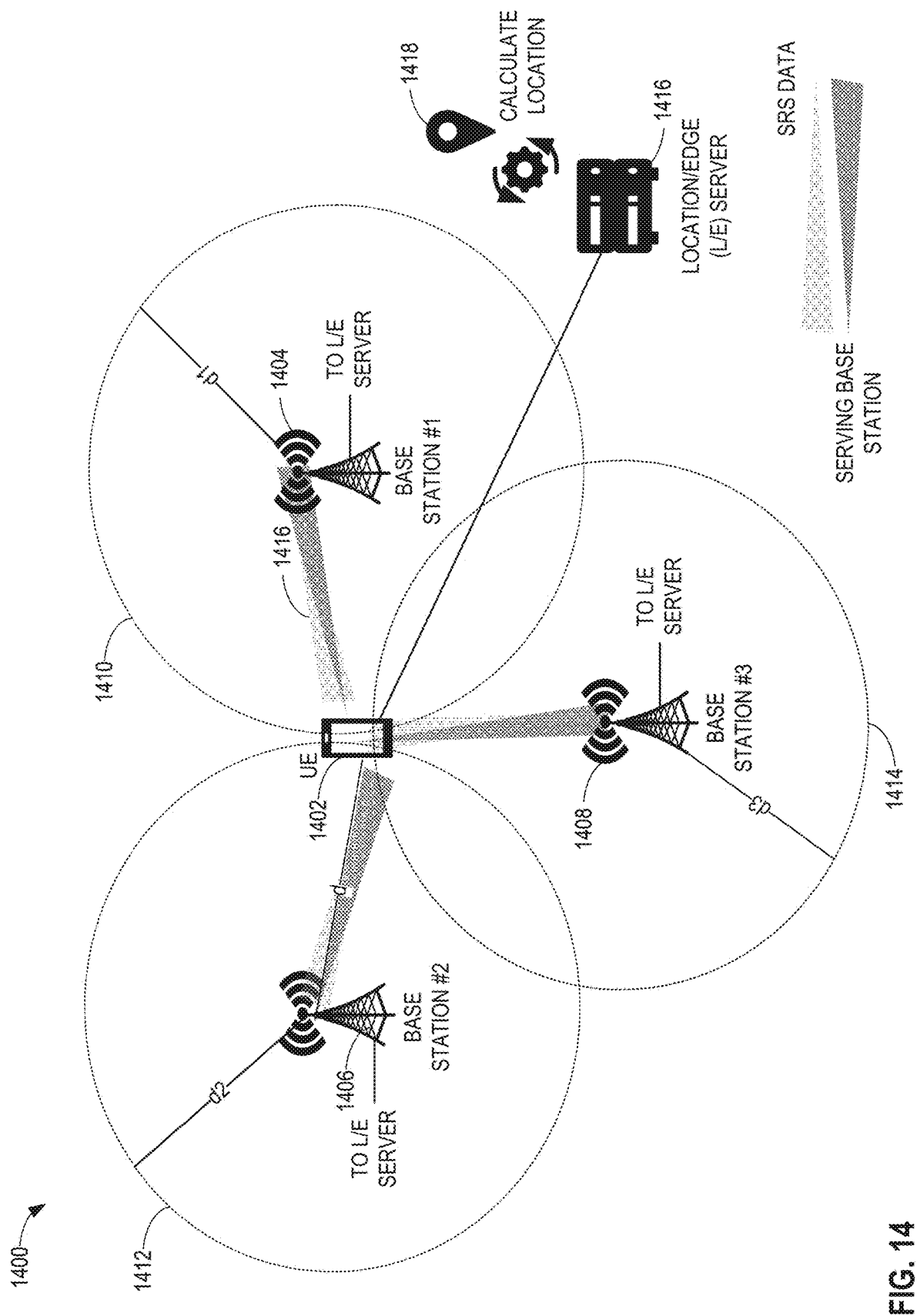
FIG. 14 is an illustration of determining a location of a device and/or an object based on time-of-arrival data and/or time-difference-of-arrival data.

FIG. 14 is an illustration of determining a location of a device and/or an object based on TOA data and/or TDOA data. In the illustrated example of FIG. 14, an example UE 1402 is in communication with at least one of a first example base station 1404 (identified by BASE STATION #1), a second example base station 1406 (identified by BASE STATION #2), or a third example base station 1408 (identified by BASE STATION #3). In the illustrated example of FIG. 14, each depicted circle 1410, 1412, 1414 can represent possible locations of the UE 1402. In the illustrated example of FIG. 14, the intersection of the depicted circles can represent the location of the UE 1402.

In some examples, such as TOA examples, the distance (d) between a serving base station and the UE 1402 is based on an exact time that a signal was sent ($t_{sent}$) from a source (e.g., the UE 1402), an exact time a signal arrives ($t_{arrival}$) at the destination (e.g., one of the base stations 1404, 1406, 1408), and the speed at which the signal travels (c=speed of light), which can be represented by the example of Equation (1) below:

$$d = c^*(t_{arrival} - t_{sent}), \quad \text{Equation (1)}$$

In some examples, time (e.g., $t_{sent}$, $t_{arrival}$, etc.) can be attested using epoch markers such that all use cases involving time as disclosed herein can be attested such that timing events herein can be subject to audit, third-party and/or trusted or validated party review, black-box reconstruction, etc.

A further consideration is that two-dimension or two-dimensional (2D) (x,y) location as a circle can lead to the example of Equation (2) below:

$$d = \sqrt{(x\_BS - x\_UE)^2 + (y\_BS - y\_UE)^2}, \quad \text{Equation (2)}$$

For example, 2D coordinates (x,y) are planar or Cartesian coordinates. In the example of Equation (2) above, x_BS and y_BS are known because x_BS is the x-coordinate position of a serving base station and y_BS is the y-coordinate position of the serving base station. x_UE and y_UE in the example of Equation (2) above refer to the x- and y-coordinates of the UE 1402.

$$d1 = \sqrt{(x\_BS1 - x\_UE)^2 + (y\_BS1 - y\_UE)^2}, \quad \text{Equation (3)}$$

For example, d1 in the example of Equation (3) above can correspond to d1 of the illustrated example, which is the radius of the circle 1410 that represents possible locations of the UE 1402. x_BS1 and y_BS1 of the example of Equation (3) above refer to the known x- and y-coordinates of the first base station 1404. x_UE and y_UE of the example of Equation (3) above refer to the x- and y-coordinates of the UE 1402. Similar equations can be generated to determine d2 and d3 of the illustrated example. In some examples, 2D location can need at least 3 reference points. In some examples, three-dimensional (3D) location can need at least 3 reference points. For example, the at least 3 reference points can be 3D coordinates, spherical coordinates, N-sphere coordinates, etc.

In some examples, the 2D circle 1410 can be illustrated around the first base station 1404, which can be repeated for a minimum of three base stations for 2D location determination, four base stations for 3D location determination, etc. The illustrated example of FIG. 14 can require a time synchronization between the UE 1402 and corresponding base stations 1404, 1406, 1408 when utilizing TOA techniques as disclosed herein. Advantageously, example TDOA techniques as disclosed herein do not require a time synchronization between the UE 1402 and corresponding base stations 1404, 1406, 1408 for location determination.

In some examples, the location of the UE 1402 can be determined based on disclosed TDOA techniques. Advantageously, TDOA techniques as disclosed herein do not require a time synchronization between the UE 1402 and the base stations 1404, 1406, 1408 because a difference in arrival times ($\Delta t$) at different reference points (e.g., two serving base stations) and a speed of transmission (c=speed of light) can yield a difference in distances ($\Delta d$) between the UE 1402 and the two reference points, which can be represented by the example of Equation (4) below:

$$\Delta d = c^*(\Delta t), \quad \text{Equation (4)}$$

Determining a location of the UE 1402 in 2D yields the example of Equation (5) below:

$$\Delta d = \sqrt{(X_{BSA}-X_{UE})^2 - (Y_{BSA}-Y_{UE})^2} - \sqrt{(X_{BSB}-X_{UE})^2 - (Y_{BSB}-Y_{UE})^2},$$ Equation (5)

In the example of Equation (5) above, Δd refers to the difference between the UE 1402 and two reference points. For example, $(X_{BSA}, Y_{BSA})$ and $(X_{BSB}, Y_{BSB})$ are the known positions of two serving base stations (base station A (BSA) and base station B (BSB)). In the example of Equation (5) above, $(X_{UE}, Y_{UE})$ are the to be determined coordinates for the UE 1402.

By way of example, to determine the difference in positions between the UE 1402 and two serving base stations, such as the first base station 1404 and the second base station 1406, the example of Equation (5) above can be adapted to yield the example of Equation (6) below:

$$\Delta d_{BS1,BS2} = \sqrt{(X_{BS2}-X_{UE})^2 - (Y_{BS2}-Y_{UE})^2} - \sqrt{(X_{BS1}-X_{UE})^2 - (Y_{BS1}-Y_{UE})^2},$$ Equation (6)

In the example of Equation (6) above, $(X_{BS1}, Y_{BS1})$ refer to the known coordinates of the first base station 1404 and $(X_{BS2}, Y_{BS2})$ refer to the known coordinates of the second base station 1406. In the example of Equation (6) above, $(X_{UE}, Y_{UE})$ refer to the desired coordinates of the UE 1402. Similar equations can be generated as depicted in the examples of Equation (7) and Equation (8) below to determine $\Delta d_{BS1,BS3}$ (e.g., a difference in distances between the UE 1402 and the first base station 1404 and the third base station 1408) and $\Delta d_{BS2,BS3}$ (e.g., a difference in distances between the UE 1402 and the second base station 1406 and the third base station 1408).

$$\Delta d_{BS1,BS3} = \sqrt{(X_{BS3}-X_{UE})^2 - (Y_{BS3}-Y_{UE})^2} - \sqrt{(X_{BS1}-X_{UE})^2 - (Y_{BS1}-Y_{UE})^2},$$ Equation (7)

$$\Delta d_{BS2,BS3} = \sqrt{(X_{BS3}-X_{UE})^2 - (Y_{BS3}-Y_{UE})^2} - \sqrt{(X_{BS2}-X_{UE})^2 - (Y_{BS2}-Y_{UE})^2},$$ Equation (8)

In example operation, the UE 1402 can send an SRS (sounding reference signal) at an unknown time to the first base station 1404 ($t_{arrival1}$) and the second base station 1406 ($t_{arrival2}$), where Δd of the first base station 1404 and the second base station 1406 is $\Delta d_{BS1,BS2}$ as represented by the example of Equation (9) below:

$$\Delta d_{BS1,BS2} = t_{arrival1} - t_{arrival2},$$ Equation (9)

For example, the location engine circuitry 140 can determine $\Delta d_{BS1,BS2}$ based on the TDOA of $t_{arrival1}$ and $t_{arrival2}$. In some examples, the location engine circuitry 140 can determine $(X_{UE}, Y_{UE})$ using the example of Equation (6) above based on determining $\Delta d_{BS1,BS2}$ (e.g., utilizing the example of Equation (9) above) and $(X_{BS1}, Y_{BS1})$ and $(X_{BS2}, Y_{BS2})$ being known.

In some examples, the UE 1402 sends an SRS (sounding reference signal) at an unknown time to the first base station 1404 ($t_{arrival1}$) and the third base station 1408 ($t_{arrival3}$), where Δd of the first base station 1404 and the third base station 1408 is $\Delta d_{BS1,BS3}$ as represented by the example of Equation (10) below:

$$\Delta d_{BS1,BS3} = t_{arrival1} - t_{arrival3},$$ Equation (10)

For example, the location engine circuitry 140 can determine $\Delta d_{BS1,BS3}$ based on the TDOA of $t_{arrival1}$ and $t_{arrival3}$. In some examples, the location engine circuitry 140 can determine $(X_{UE}, Y_{UE})$ using the example of Equation (7) above based on determining $\Delta d_{BS1,BS3}$ (e.g., utilizing the example of Equation (10) above) and $(X_{BS1}, Y_{BS1})$ and $(X_{BS3}, Y_{BS3})$ being known.

In some examples, the UE 1402 can send an SRS (sounding reference signal) at an unknown time to the second base station 1406 ($t_{arrival2}$) and the third base station 1408 ($t_{arrival3}$), where Δd of the second base station 1406 and the third base station 1408 is $\Delta d_{BS2,BS3}$ represented by the example of Equation (11) below:

$$\Delta d_{BS2,BS3} = t_{arrival2} - t_{arrival3},$$ Equation (11)

For example, the location engine circuitry 140 can determine $\Delta d_{BS2,BS3}$ based on the TDOA of $t_{arrival2}$ and $t_{arrival3}$. In some examples, the location engine circuitry 140 can determine $(X_{UE}, Y_{UE})$ using the example of Equation (8) above based on determining $\Delta d_{BS2,BS3}$ (e.g., utilizing the example of Equation (11) above) and $(X_{BS2}, Y_{BS2})$ and $(X_{BS3}, Y_{BS3})$ being known.

In some examples, the location engine circuitry 140 can generate arcs, parabolas, etc., representative of possible locations for the UE 1402. For example, the location engine circuitry 140 can generate an arc, a parabola, etc., for each of $\Delta d_{BS1,BS2}$, $\Delta d_{BS1,BS3}$, and $\Delta d_{BS2,BS3}$. In some examples, the location engine circuitry 140 can determine an intersection of the arcs, the parabolas, etc. In some examples, the location engine circuitry 140 can determine a location of the UE 1402 based on the intersection of the arcs, the parabolas, etc. In some examples, the location engine circuitry 140 can discard out-of-scope arcs, parabolas to achieve improved accuracy and/or reduced noise in the location determination of the UE 1402.

In example operation, an example location and/or edge server 1416 can determine an example location 1418 based on at least one of TOA data or TDOA data. In some examples, the location/edge server 1416 can include and/or implement the location engine circuitry 140 of FIGS. 1 and/or 4. In example operation, the location/edge server 1416 can instruct the UE 1402 (via one(s) of the base stations 1404, 1406, 1408) to transmit wireless data, such as SRS data, to one(s) of the base stations 1404, 1406, 1408 with a particular periodicity. Such a technique can be used to implement an uplink time-of-arrival (UL-TOA), an uplink time-difference-of-arrival (UL-TDOA), and/or an uplink angle-of-arrival (UL-AOA) technique. Advantageously, in UL-TOA, UL-TDOA, and/or UL-AOA techniques, the UE 1402 may not need additional hardware, software, and/or firmware to transmit the requested SRS data to the base stations 1404, 1406, 1408. In example operation, the UE 1402 can transmit SRS data to at least one of the first base station 1404, the second base station 1406, or the third base station 1408. The location/edge server 1416 can obtain the SRS data from the at least one of the first base station 1404, the second base station 1406, or the third base station 1408. In some examples, the location/edge server 1416 can determine angle(s), such as AOA data, at which one(s) of the SRSs is/are received at the antenna of the base stations 1404, 1406, 1408. In example operation, the location/edge server 1416 can utilize one(s) of the examples of Equations (1)-(6) above to determine the location 1418 based on at least one of the TOA data, the TDOA data, and/or AOA data.

In some examples, the UE 1402, the base stations 1404, 1406, 1408, and/or the location edge server 1416 can effectuate a downlink positioning technique, such as Observed Time Difference of Arrival (OTDOA) that is based on measuring the difference in the arrival times of downlink radio signals, from multiple base stations. For example, each of the base stations 1404, 1406, 1408 can transmit reference signals (e.g., SRSs) and the UE 1402 can compare the arrival times of the reference signals. The UE 1402 can report the difference in the timing to the location/edge server 1416 via one(s) of the base stations 1404, 1406, 1408. The location/edge server 1416 can combine the timing differences with the knowledge of the positions of the base stations 1404, 1406, 1408, to calculate the position of the UE 1402.

In some examples, the location/edge server 1416, which can include and/or implement the location engine circuitry 140, can determine an AOA of SRS data associated with the UE 1402. In some examples, the location/edge server 1416 can determine a first AOA associated with SRS data from the UE 1402 at a first antenna of the first base station 1404; determine a second AOA associated with the SRS data at a second antenna of the first base station 1404; and determine the location of the target object based on the first AOA and the second AOA. In some examples, the location/edge server 1416 can determine a first AOA associated with SRS data from the UE 1402 at a first antenna of the first base station 1404; determine a second AOA associated with the SRS data at a second antenna of the second base station 1406; and determine the location of the target object based on the first AOA and the second AOA.

Figure 15A:
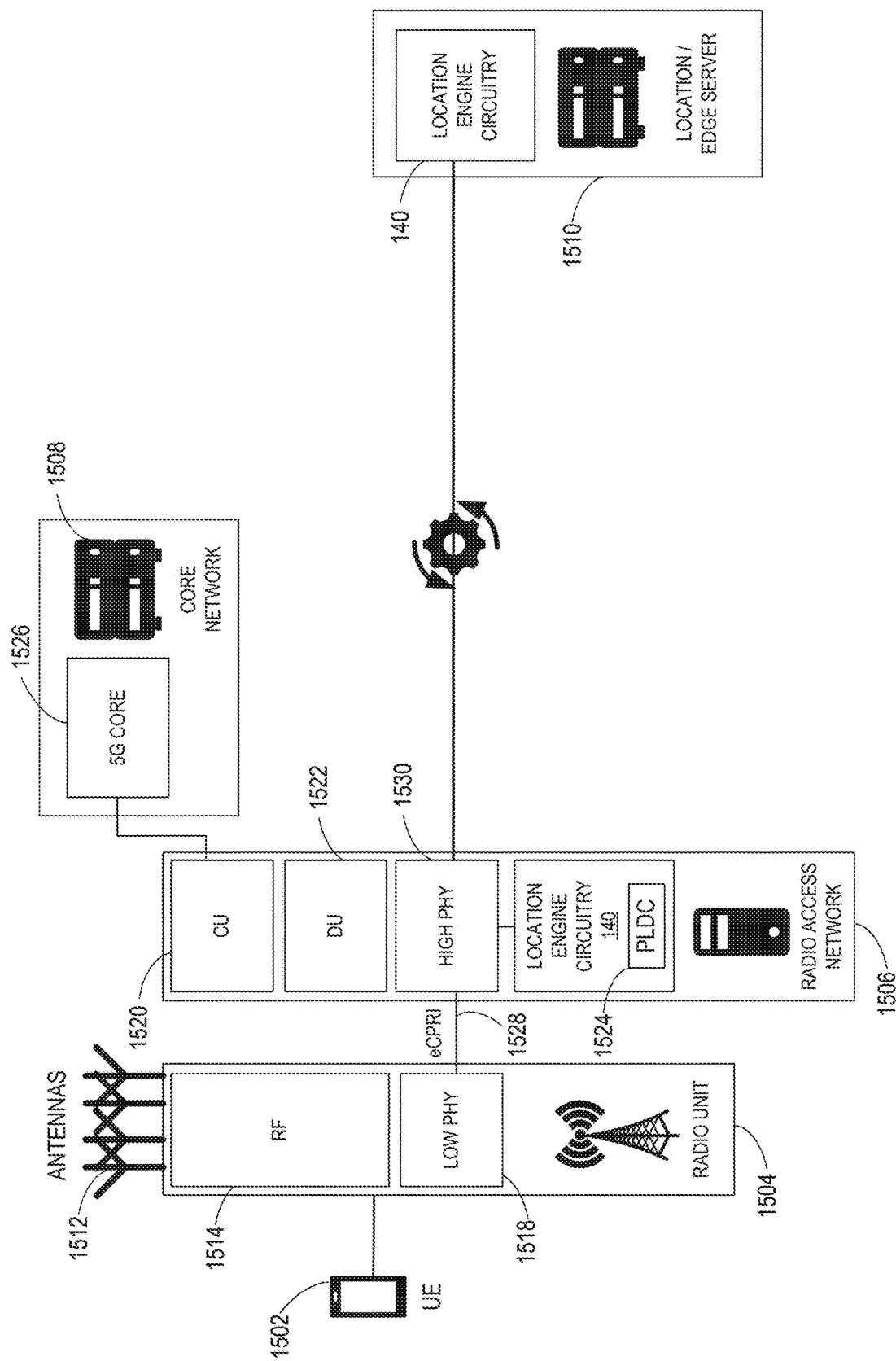
FIG. 15A is an illustration of determining a location of a device and/or an object on-premises and/or off-premises.

FIG. 15A is an illustration of determining a location of a device and/or an object on-premises and/or off-premises. The illustrated example of FIG. 15A includes an example UE 1502, an example RU 1504, an example RAN 1506, an example core network (CN) 1508, and an example location and/or edge server 1510. The UE 1502 of the illustrated example is a smartphone but may be any other type of wireless-enabled device. The RU 1504 of the illustrated example includes example antennas 1512, an example radiofrequency (RF) interface 1514, and an example low-PHY 1518 (e.g., portions of the physical layer of the OSI model located in the RU 1504). In some examples, the RF interface 1514 can be implemented by a low-noise amplifier (LNA) and/or a power amplifier (PA). The RAN 1506 of the illustrated example includes an example centralized unit (CU) 1520, an example distributed unit (DU) 1522, the location engine circuitry 140 (e.g., an instance of the location engine circuitry 140), and an example programmable location data collector (PLDC) 1524. In the illustrated example, the location engine circuitry 140 includes and/or implements the PLDC 1524. Alternatively, the PLDC 1524 may be separate from the location engine circuitry 140. The CN 1508 of the illustrated example includes an example 5G core 1526. The location/edge server 1510 of the illustrated example includes the location engine circuitry 140 of FIGS. 1 and/or 4.

In example operation, the RF interface 1514 can receive wireless data from the UE 1502, such as SRS data, via the antennas 1512. The low-PHY 1518 can receive the SRS data from the RF interface 1514. The high-PHY 1530 (e.g., portions of the physical layer of the OSI model located with the DU 1522) can obtain the SRS data from the low-PHY 1518 via an example Enhanced Common Public Radio Interface (eCPRI) interface 1528. The PLDC 1524, and/or, more generally, the location engine circuitry 140, can obtain the SRS data from the high-PHY 1530.

The PLDC 1524 of the illustrated example can be implemented by hardware, software, and/or firmware to access data (e.g., network data or network data inputs, cellular data or cell/cellular input data, Wi-Fi data or Wi-Fi input data, etc.) asynchronously or synchronously based on a policy, a service level agreement (SLA), etc. For example, the PLDC 1524 can be instantiated on hardware (e.g., an FPGA configured to implement the PLDC 1524), software (e.g., an application, a VM, a container, etc., that, when executed and/or instantiated, implements the PLDC 1524), and/or firmware. In some examples, the PLDC 1524 can be hardware (e.g., circuitry), such as register-transfer level or register-transfer logic (RTL) circuitry, a structured ASIC, etc., and/or any combination(s) thereof. For example, the PLDC 1524 can be embedded into processor circuitry, such as a CPU. In the illustrated example, the PLDC 1524 is included in and/or implemented by an example high-PHY 1530. Additionally or alternatively, the PLDC 1524 may be separate from the high-PHY 1530.

In some examples, the PLDC 1524 is executed and/or instantiated as a service, a software task, etc., to obtain SRS data; extract portion(s) of the SRS data; and output the portion(s) of the SRS data to the location engine circuitry 140, and/or, more generally, the location/edge server 1510. In some examples, the location engine circuitry 140 configures the PLDC 1524 to obtain the SRS data at a specified periodicity based on the policy, the SLA, etc. For example, the policy, the SLA, etc., can define and/or include timing requirements associated with transmitting SRS data, receiving SRS data, and/or determining a location based on the SRS data. In some examples, the location engine circuitry 140 configures the PLDC 1524 to obtain the SRS data at high frequency to ensure that the SRS data is stored prior to being overwritten by subsequently received SRS data. For example, SRS data obtained from a UE can be ephemeral, such as existing in a non-transitory computer- and/or machine-readable medium until new SRS data is received from the UE. Advantageously, the PLDC 1524 can obtain SRS data in accordance with policies, SLAs, etc., representative of time critical applications, such as increased safety or security applications.

In some examples, the location engine circuitry 140 determines to determine a location of the UE 1502 on the RAN 1506. For example, the PLDC 1524 can obtain the SRS data and the location engine circuitry 140 can determine a location of the UE 1502 based on the SRS data. In some examples, the location engine circuitry 140 determines to offload a determination of a location of the UE 1502 from the RAN 1506. For example, the PLDC 1524 can obtain the SRS data from the high-PHY 1530. In some examples, the location engine circuitry 140 can cause the SRS data to be transmitted from the PLDC 1524, the location engine circuitry 140, and/or, more generally, the RAN 1506, to the location engine circuitry 140 of the location/edge server 1510 via a network. In some examples, the location engine circuitry 140 of the location/edge server 1510 can determine a location of the UE 1502 based on the SRS data. In some examples, the location engine circuitry 140 of the location/edge server 1510 can output the location of the UE 1502 to an application, a service, etc., to be displayed on a GUI, to cause operation(s) to be carried out in connection with the UE 1502, etc., and/or any combination(s) thereof.

Figure 15B:
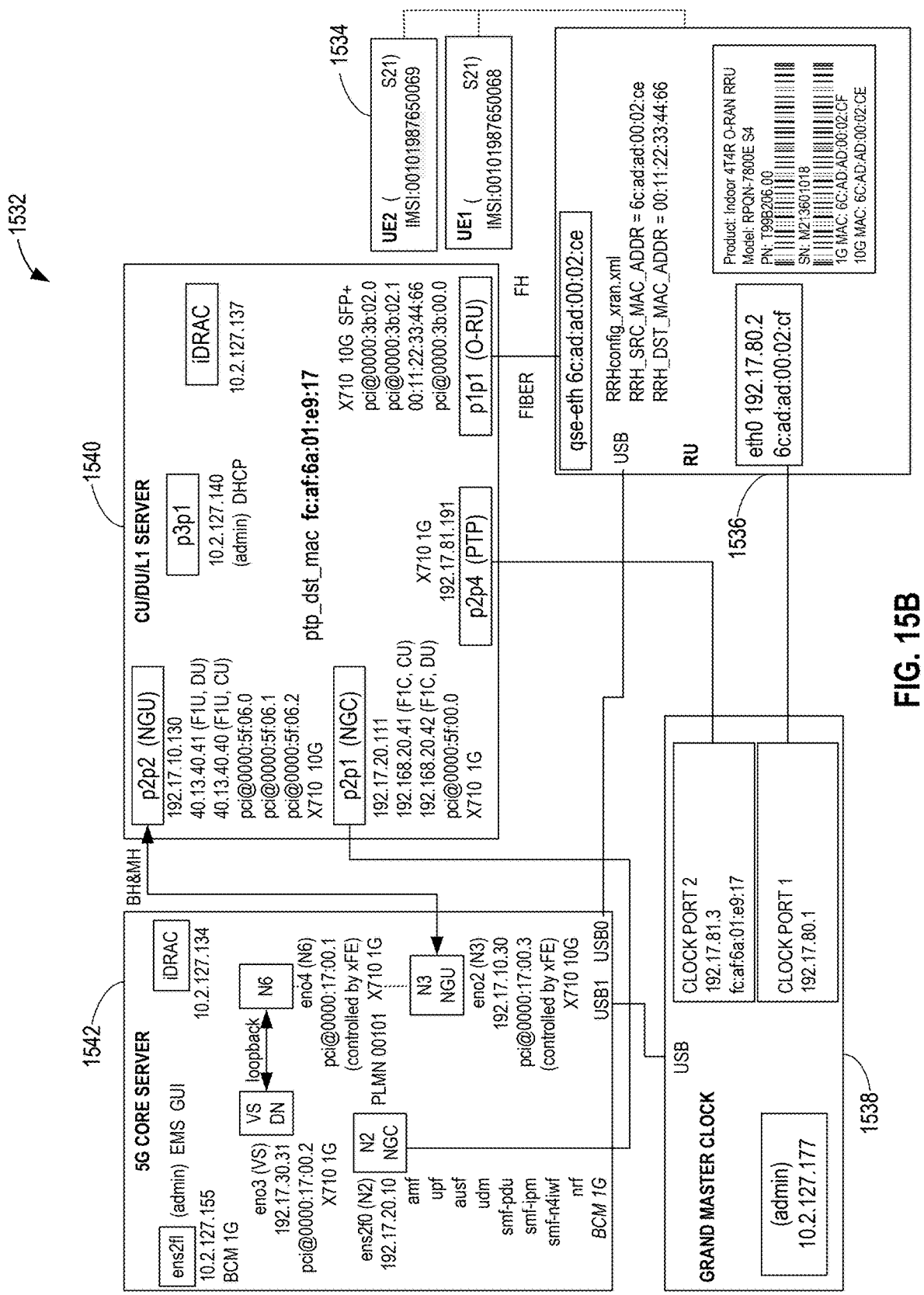
FIG. 15B is an example implementation of an example cellular network architecture.

FIG. 15B is an example implementation of an example cellular network architecture 1532. In some examples, the cellular network architecture 1532 can implement a 5G private network, which can be triggered (e.g., automatically triggered) to determine a location of example UE 1534 based on a detection of SRS data received by an example RU 1536 for a particular UE. As described further herein, location determination can be automatically triggered after a UE (e.g., the UE 1534) and/or a cell (e.g., a cell of a public land mobile network (PLMN)) has been configured to transmit one or more SRSs (sounding reference signals). In some examples disclosed herein, automatic triggered location determination may refer to location determination performed in accordance with a scheduled SRS data transmission (e.g., for a location service, other RAN operations (e.g., channel estimation (CE), beam forming, etc.), etc.). In examples where location determination is performed for a cell (e.g., a cell of a PLMN), location(s) can be determined for each UE in the cell. Additionally or alternatively, as described further herein, location determination can be triggered on-demand (e.g., based on a request by an application) or on a predefined basis (e.g., as part of a CE task, a beamforming task, etc.). Further depicted in the cellular network architecture 1532 is an example clock 1538, an example CU/DU/L1 server 1540, and an example 5G core server 1542. In the example of FIG. 15B, the UE 1534 may correspond to the UE 1502 of FIG. 15A. Additionally, in the example of FIG. 15B, the RU 1536 may correspond to the RU 1504 of FIG. 15A. In the example of FIG. 15B, the CU/DU/L1 server 1540 may correspond to the RAN 1506 of FIG. 15A. In the example of FIG. 15B, the 5G core server 1542 may correspond to the 5G core 1526 of FIG. 15A.

In the illustrated example of FIG. 15B, the RU 1536 is communicatively coupled to the UE 1534. For example, the RU 1536 and the UE 1534 can transmit and/or receive data from one another via a cellular connection (e.g., a 4G LTE cellular connection, a 5G cellular connection, a 6G cellular connection (which may include LEO satellite network connection points), etc.). The RU 1536 is coupled to the CU/DU/L1 server 1540 via a fiber connection. Additionally or alternatively, the RU 1536 may be coupled to the CU/DU/L1 server 1540 via any other wired and/or wireless connection. The RU 1536 is coupled to the 5G core server 1542 via a USB connection. Additionally or alternatively, the RU 1536 may be coupled to the 5G core server 1542 via any other wired and/or wireless connection. The clock 1538 is coupled to the RU 1536 and the CU/DU/L1 server 1540. For example, the clock 1538 can implement Precision Time Protocol (PTP) to synchronize the clock(s) of the RU 1536 and the CU/DU/L1 server 1540 with the clock 1538. In some examples, the clock 1538 can implement one or more atomic clocks such as an atomic clock included in one or more LEO satellite and/or one or more GEO satellites. In additional or alternative examples, the clock 1538 can implement one or more deep space atomic clocks. The clock 1538 of the illustrated example is coupled to the 5G core server 1542 via a USB connection. Additionally or alternatively, the clock 1538 may be coupled to the 5G core server 1542 via any other wired and/or wireless connection. Further couplings (e.g., physical couplings, communication couplings, etc.) between one(s) of the RU 1536, the clock 1538, the CU/DU/L1 server 1540, and/or the 5G core server 1542 is/are depicted in the illustrated example of FIG. 15B.

FIG. 15C depicts a table 1544 of example parameters 1546 to implement examples disclosed herein. The parameters 1546 of the illustrated example include example phases, service areas (e.g., cellular service areas, wireless service areas, etc.), position accuracies (e.g., UE position accuracies), UE speeds, availabilities, latency and/or runtimes, numbers of UEs per RU, numbers of compute cores, and numbers of RUs and corresponding antennas.

In some examples, determining a location of a device and/or an object on-premises and/or off-premises can be carried out by meeting the parameters 1546 of the illustrated example. By way of example, phase 2 can correspond to determining a location of UE in an indoor environment (e.g., an office building, an apartment building, a hospital, etc.). Phase 2 can correspond to determining a location of UE within a 0.75 meter (m) horizontal (e.g., x-axis in a Cartesian coordinate system) radius. Phase 2 can correspond to determining a location of UE traveling and/or moving up to a speed of 20 kilometers per hour (km/hr). Phase 2 can correspond to having an availability of the location of the UE in the horizontal and vertical (e.g., y-axis in a Cartesian coordinate system) for 95% of a specified time period. Phase 2 can correspond to determining a location of a UE with a latency of less than 100 milliseconds (ms) per a 12-hour time period. Phase 2 can correspond to a configuration of two or more UEs per RU. Phase 2 can correspond to allocating less than one compute core (e.g., one or more slices or portions of a compute core) of multi-core processor circuitry to implement a measurement engine (ME). Phase 2 can correspond to allocating less than two compute cores of multi-core processor circuitry to implement a location engine (LE). Phase 2 can correspond to a configuration of one RU with four antennas. Any other parameters to determine a location of a device and/or an object on-premises and/or off-premises are contemplated.

Figure 15D:
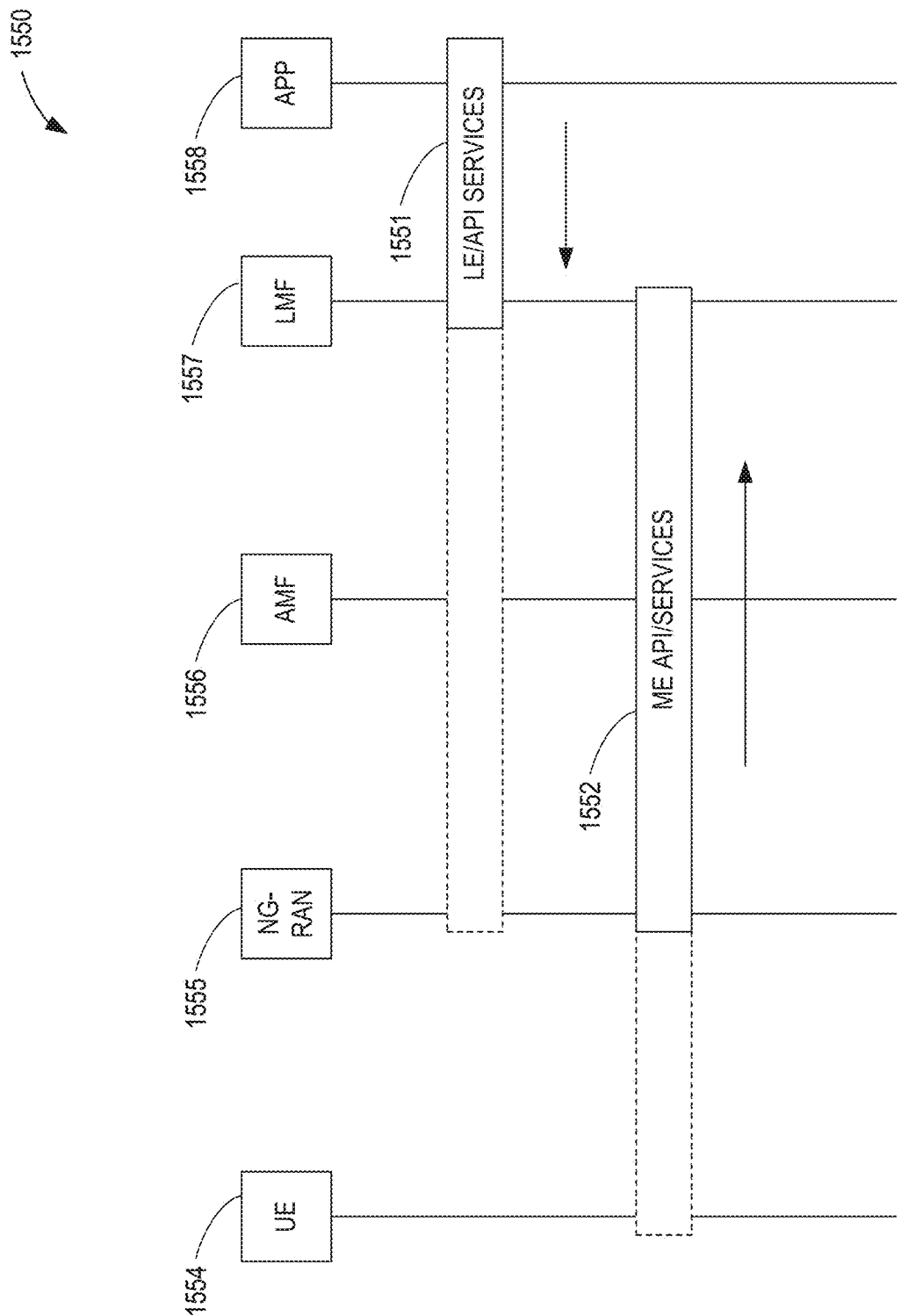
FIG. 15D is an example workflow to implement an example location engine and an example measurement engine.

FIG. 15D is an example workflow 1550 to implement an example location engine (LE) 1551 and an example measurement engine (ME) 1552. The workflow 1550 of the illustrated example includes an example UE 1554, an example NG-RAN 1556, an example AMF 1558, an example LMF 1557, and an example application 1558 (identified by APP). The example application 1558 may be an asset tracking application (e.g., an application to track a location of industrial equipment, storage containers, etc.), a movement tracking application (e.g., an application to track movement of industrial equipment), a supply chain application (e.g., an application to order and/or ship goods when goods associated with a storage container leave an indoor environment), a distance tracking application (e.g., an application to monitor travel distances associated with industrial equipment), a people or person proximity application (e.g., an application to determine a distance between a human operator and industrial equipment for safety and/or operational purposes), an autonomous control application (e.g., an application to effectuate self-driving or self-control tasks of industrial equipment, etc.), etc., and/or any combination(s) thereof.

In the illustrated example of FIG. 15D, the workflow 1550 begins when the application 1558 invokes the LE 1551 to determine a location of the UE 1554. The LE 1551 of the illustrated example is implemented at least in part by an API (e.g., a REST API) and/or one or more services (e.g., software and/or firmware-based services). For example, the LE 1551 may correspond to the 5G core 1526 of FIG. 15A implementing an instance of the location engine circuitry 140. In the example of FIG. 15D, the application 1558 can request an API associated with the LE 1551 for the location of the UE 1554. In the illustrated example, the request can be provided to the LMF 1557 which, in turn, can pass the request to at least one of the AMF 1556 or the NG-RAN 1555. In the example of FIG. 15D, the AMF 1556 and/or the LMF 1557 may correspond to the 5G core 1526 of FIG. 15A. Additionally, the NG-RAN 1555 of FIG. 15D may correspond to the RAN 1506 of FIG. 15A.

In the illustrated example of FIG. 15D, after a receipt of the request at the NG-RAN 1555, the NG-RAN 1555 can output SRS data received from the UE 1554 to the LMF 1557 via the AMF 1556. In some examples, the ME 1552 can be implemented at least in part by an API (e.g., a REST API) and/or one or more services. In the example of FIG. 15D, the ME 1552 may correspond to the RAN 1506 and/or the PLDC 1524 of FIG. 15A. In the example of FIG. 15D, in response to receiving SRS data at the NG-RAN 1555, the NG-RAN 1555 can invoke an API associated with the ME 1552 to carry out determination of location measurements. For example, the NG-RAN 1555 can provide SRS data from the UE 1554 to the API. In some examples, the API can facilitate the determination of location measurements that can be used to determine a location of the UE 1554. In some examples, the NG-RAN 1555 can output the SRS data, the location measurements, and/or the location to at least one of the AMF 1556 or the LMF 1557. In some examples, the LMF 1557 can output the location of the UE 1554 to the application 1558.

Figure 15E:
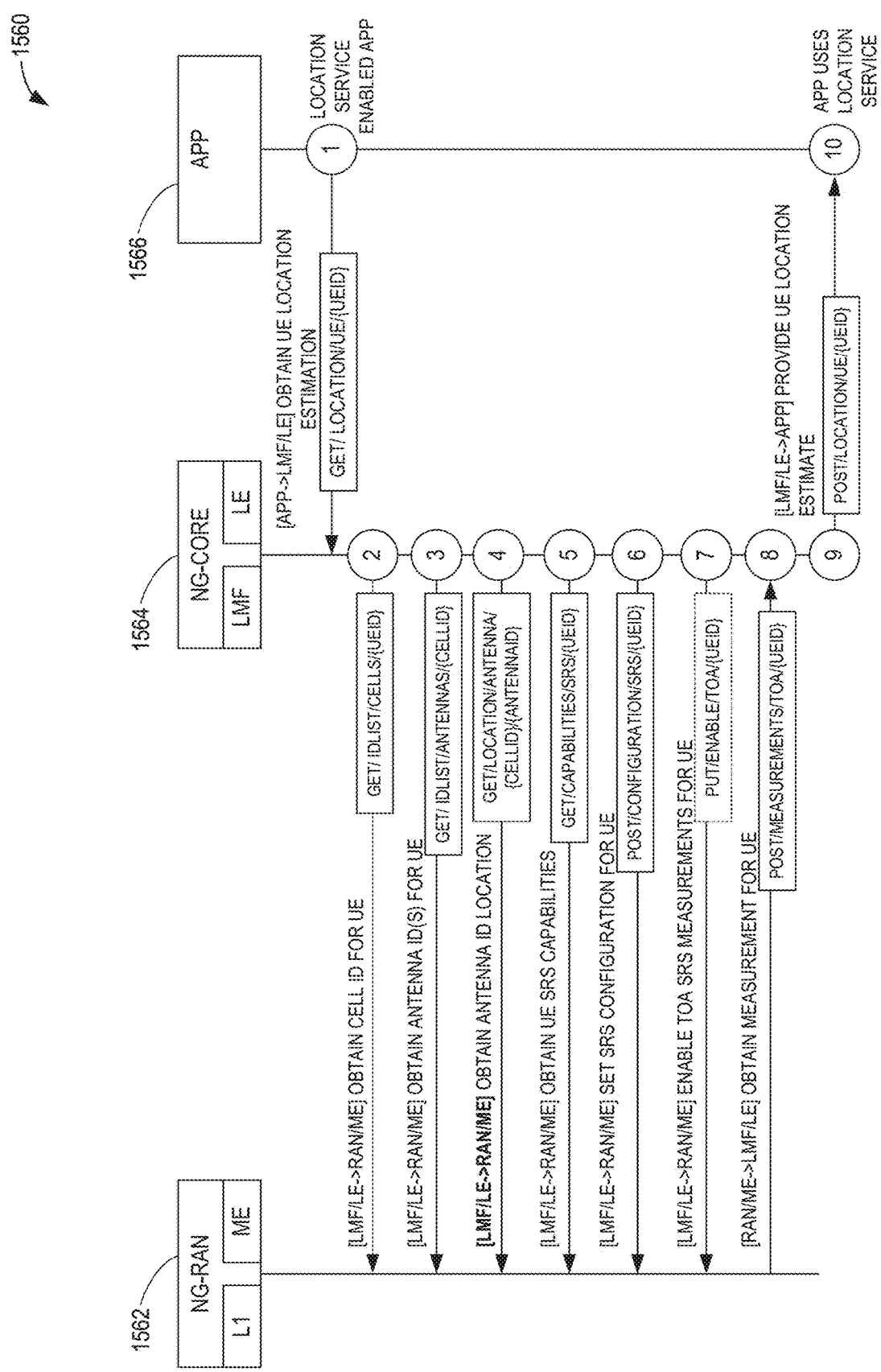
FIG. 15E is an example workflow to implement the cellular network architecture of FIG. 15B.

FIG. 15E is an example workflow 1560 to implement a cellular network architecture. For example, the workflow 1560 can be executed, instantiated, and/or performed to implement the cellular network architecture 1532 of FIG. 15B. The workflow 1560 includes an example NG-RAN 1562, an example NG-Core 1564 (e.g., a core server, an NG-Core server, etc.), and an example application 1566. In the illustrated example, the application 1566 can be a location service enabled application. For example, the application 1566 may be an asset tracking application (e.g., an application to track a location of industrial equipment, storage containers, etc.), a movement tracking application (e.g., an application to track movement of industrial equipment), a supply chain application (e.g., an application to order and/or ship goods when goods associated with a storage container leave an indoor environment), a distance tracking application (e.g., an application to monitor travel distances associated with industrial equipment), a people or person proximity application (e.g., an application to determine a distance between a human operator and industrial equipment for safety and/or operational purposes), an autonomous control application (e.g., an application to effectuate self-driving or self-control tasks of industrial equipment, etc.), etc., and/or any combination(s) thereof. In the example of FIG. 15E, the NG-RAN 1562 includes an example L1 interface and an example measurement engine (ME). In the example of FIG. 15E, the NG-RAN 1562 may correspond to the RAN 1506 of FIG. 15A, the L1 interface may correspond to the high-PHY 1530 of FIG. 15A, and the ME may correspond to the PLDC 1524 of FIG. 15A. In some examples, the L1 interface can be implemented based on a vRAN protocol (e.g., FLEXRAN™ protocol provided by Intel® Corporation). For example, the L1 interface can be implemented by FLEXRAN™ Reference Architecture for Wireless Access provided by Intel® Corporation of Santa Clara, California In some examples, FLEXRAN™ Reference Architecture for Wireless Access may correspond to PHY L1. The NG-Core 1564 of the example of FIG. 15E includes an example LMF and an example location engine (LE). In the example of FIG. 15E, the NG-Core 1564 may correspond to the 5G core 1526 of FIG. 15A. Additionally, in the example of FIG. 15E, the LMF may correspond to an LMF implemented by the 5G core 1526 of FIG. 15A such as the LMF 1557 of FIG. 15D. The example LE included in the NG-Core 1564 may correspond to an instance of the location engine circuitry 140.

In the illustrated example of FIG. 15E, in example operation, the application 1566 can generate a GET request for a location of a UE associated with the NG-RAN 1562 (e.g., a UE with a specified UE identifier). The example request from the application 1566 may include a frequency with which the application 1566 would like to measure the location of the UE (e.g., an SRS configuration), a desired dimension for the location (e.g., a 2D location, a 3D location, etc.) requested by the application 1566, and/or a required dimension for the location (e.g., a 2D location, a 3D location, etc.) requested by the application 1566. In the example of FIG. 15E, the UE may be in communication with one or more RUs associated with the NG-RAN 1562. In example operation, based on the GET request of the application 1566, the NG-Core 1564 can generate a GET request to obtain an identifier (e.g., a cellular identifier, a cell ID, etc.) for the UE. In example operation, the NG-Core 1564 additionally generates a GET request (or message) to obtain identifier(s) of antenna(s) associated with the UE. For example, the NG-Core 1564 causes transmission of a GET request to the NG-RAN 1562 to obtain one or more identifiers of one or more antennas (of the one or more RUs) to which the UE has access.

Depending on the number of antennas to which the UE has access, the dimension at which the NG-Core 1564 can estimate the location of the UE may be limited. For example, the NG-Core 1564 may require at least three SRS measurements (e.g., TOA measurements) for the NG-Core 1564 to estimate a 2D location of the UE. Additionally, for example, the NG-Core 1564 may require at least four SRS measurements (e.g., TOA measurements) for the NG-Core 1564 to estimate a 3D location of the UE. Furthermore, each SRS measurement (e.g., TOA measurement) for the UE may be unique to UE/antenna pair. As such, if the application 1566 requires at least a 3D location of the UE, but the UE only has access to three antennas, then the NG-Core 1564 may not be able to estimate the location of the UE at the dimension required by the application 1566. In such examples, the NG-Core 1564 may continue to generate GET requests (or messages) to obtain identifier(s) of antenna(s) associated with the UE until a sufficient number of antennas are available to determine the location of the UE at the dimension required by the application 1566. Additionally or alternatively, the NG-Core 1564 may generate a message to the application 1566 indicating that the location of the UE cannot be estimated at the dimension required by the application 1566. In example operation, the NG-Core 1564 generates a GET request to obtain a location of the antenna(s) associated with the UE. In the example of FIG. 15E, the GET request for antenna location can cause the NG-RAN 1562 to determine one or more Cartesian coordinate locations of the one or more antennas corresponding to the one or more identifiers by executing and/or instantiating an LMF. For example, the NG-RAN 1562 executes and/or instantiates a PLDC (e.g., the PLDC 1524 of FIG. 15A) to determine the one or more Cartesian coordinate locations of the one or more antennas.

In the illustrated example of FIG. 15E, in example operation, the NG-Core 1564 can generate a GET request to obtain SRS capabilities of the UE. Example SRS capabilities of a UE depend on the capability of the UE to provide SRS data. For example, a smart phone may have more SRS capabilities as compared to a wired and/or wireless infant monitor due to the sophistication of technology included in and/or the physical properties (e.g., battery capacity) of the smart phone as compared to the infant monitor. Example SRS capabilities include a frequency at which a UE can provide location data (e.g., 10 location samples per second, 1 location sample per second, 1 location sample per 10 minutes, etc.). In example operation, the NG-Core 1564 can generate a POST message to set an SRS configuration at the NG-RAN 1562 for the UE. For example, the NG-Core 1564 generates a POST message to set an SRS configuration for the UE based on opt-in preference associated with the UE, the SRS capabilities of the UE, current and/or historical SRS configurations for the UE, and/or an SRS configuration included in the request from the application 1566. Based on the POST message generated by the NG-Core 1564, the NG-RAN 1562 sets an SRS configuration (e.g., a period for computing and/or otherwise estimating a location sample of the UE based on SRS data collected from the UE).

In the illustrated example of FIG. 15E, in example operation, the NG-Core 1564 can generate a PUT message to enable one or more TOA SRS measurements (and/or one or more TDOA measurements) for the UE. For example, the PUT message can be implemented by a boolean value (e.g., true, false, 0, 1, etc.) to instruct the NG-RAN 1562 to determine and/or calculate one or more TOA measurements (and/or one or more TDOA measurements) based on SRS data from the UE. Additionally, for example, the PUT message generated by the NG-Core 1564 can instruct the NG-RAN 1562 to adjust the frequency with which the UE transmits an SRS (sounding reference signal) to the one or more RUs associated with the NG-RAN 1562. For example, when first configuring the frequency with which the UE transmits an SRS (sounding reference signal) to the one or more RUs associated with the NG-RAN 1562, the NG-RAN 1562 can enable the UE to transmit one or more SRSs (sounding reference signals) at the frequency indicated in the SRS configuration for the UE (e.g., as set by the NG-Core 1564). In this manner, by generating the PUT message, the NG-Core 1564 can be considered to enable the UE to transmit one or more SRSs (sounding reference signals) to enable SRS-based location measurement.

In example operation, the NG-RAN 1562 generates a POST message to provide one or more TOA measurements (and/or one or more TDOA measurements) to the NG-Core 1564. As such, the NG-RAN 1562 computes one or more TOA measurements (and/or one or more TDOA measurements) for the UE and communicates the one or more TOA measurements (and/or one or more TDOA measurements) to the NG-Core 1564 as the one or more TOA measurements (and/or one or more TDOA measurements) become available (e.g., in real time). In example operation, the NG-Core 1564 generates an example POST message to provide a UE location estimate and/or determination of the UE location to the application 1566. For example, the NG-Core 1564 computes the location estimate for the UE based on the one or more TOA measurements (and/or one or more TDOA measurements) provided in the POST message(s) generated by the NG-RAN 1562 and provides the location estimate to the application 1566 via a POST message. For example, when a set of TOA measurements and/or TDOA measurements (e.g., a set of TOA measurements and/or TDOA measurements sufficient to estimate the location of the UE at the dimension required and/or desired by the application 1566) have been provided by the NG-RAN 1562, the NG-Core 1564 computes the location estimate for the UE and provides the location estimate to the application 1566 via a POST message. In some examples, if the NG-Core 1564 previously provided the location estimate for the UE at the dimension required, but not desired, by the application 1566 and the NG-Core 1564 is later capable of computing the location estimate for the UE at the dimension desired by the application 1566, then the NG-Core 1564 computes the location estimate for the UE at the dimension desired by the application 1566 and provides the location estimate to the application 1566 via a POST message. In example operation, the application 1566 can utilize the location estimate of the UE as an input to the application 1566 to generate an output, which can be an action, an operation, and/or other data of interest.

FIG. 15F depicts example implementations of cellular data messages 1570 to implement a cellular network architecture as disclosed herein. The cellular data messages 1570 of FIG. 15F can correspond to the cellular data messages of FIG. 15E. Any other implementations of cellular data messages are contemplated.

Figure 16:
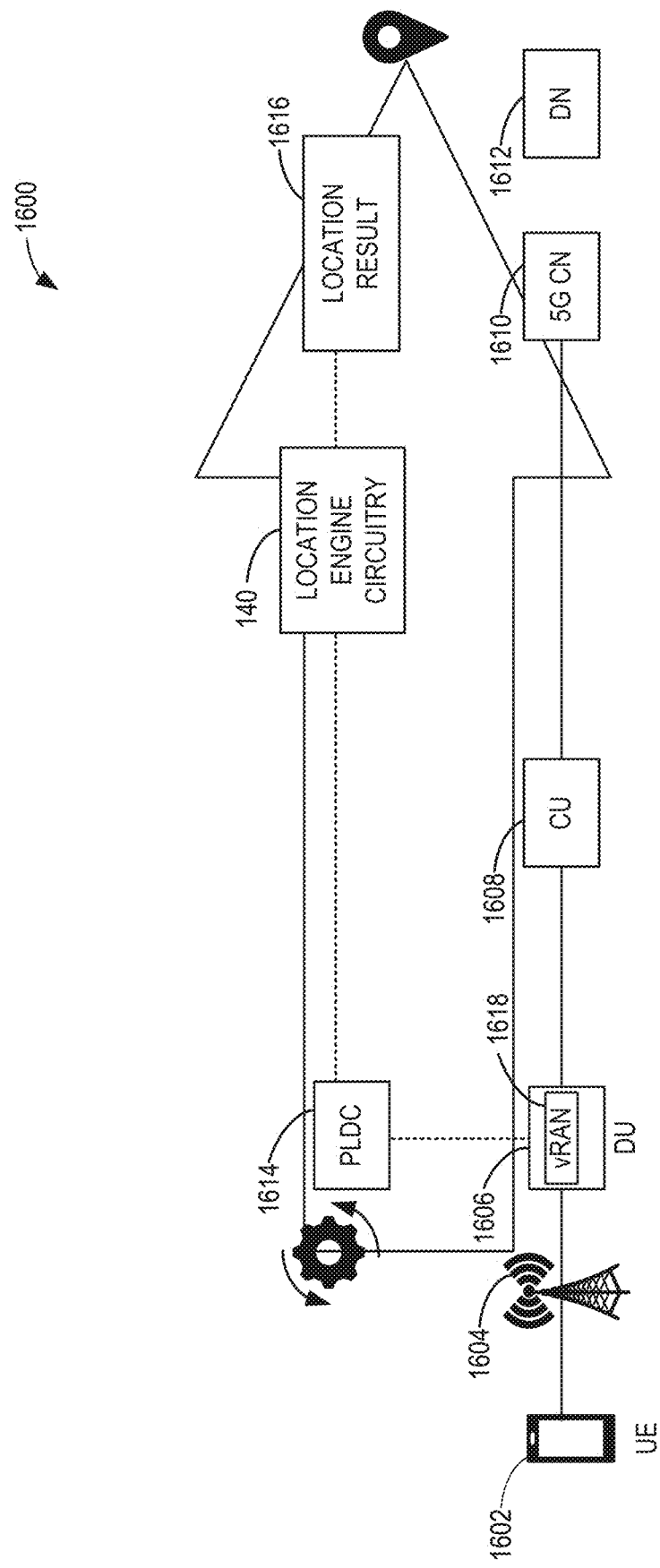
FIG. 16 is an example workflow of determining a network-based location of a device and/or an object.

FIG. 16 is an example workflow 1600 of determining a network-based location of a device and/or an object. The workflow 1600 includes an example UE 1602, an example RU 1604, an example DU 1606, an example CU 1608, an example 5G CN 1610, an example data network (DN) 1612, an example PLDC 1614, the location engine circuitry 140 of FIGS. 1 and/or 4, and an example location result 1616. In some examples, the PLDC 1614 of the illustrated example can correspond to the PLDC 1524 of FIG. 15A. Additionally or alternatively, the location engine circuitry 140 may be included in the RU 1604, the DU 1606, an xAPP, an LMF, or the cloud.

In example operation, the 5G CN 1610 can connect and/or otherwise establish a connection with the CU 1608. For example, the 5G CN 1610 can register an international mobile subscriber identity (IMSI) of the UE 1602 with the CU 1608. In some examples, the 5G CN 1610 can establish a packet data network (PDN) session with the CU 1608. In some examples, an IMSI is a number that uniquely identifies a user of a cellular network.

In example operation, the UE 1602 can transmit cellular data, such as SRS data or any other type of wireless data, to the RU 1604. The RU 1604 can output the SRS data to the DU 1606, which can execute and/or instantiate an example virtual radio access network (vRAN) 1618. For example, the DU 1606 can instruct an L1 interface of the RU 1604 and/or the DU 1606 to receive the SRS data from the UE 1602. In example operation, the vRAN 1618, and/or, more generally, the DU 1606, can receive the SRS data, which can include IQ samples or symbols (e.g., quadrature samples or symbols).

In example operation, the vRAN 1618, and/or, more generally, the DU 1606, can output the IQ samples to at least one of the CU 1608 or the PLDC 1614. For example, the vRAN 1618 can output the IQ samples to the CU 1608, which can output the IQ samples to the 5G CN 1610 and the DN 1612. In example operation, the vRAN 1618 can output the IQ samples to the PLDC 1614, which can format the IQ samples based on a data format associated with the location engine circuitry 140. In example operation, the location engine circuitry 140 can calculate the location result 1616 based on disclosed technique(s), such as an AOA, TOA, and/or TDOA technique. In example operation, a logical entity (e.g., an application, a service, etc.) can consume the location result 1616 to effectuate one or more actions, operations, tasks, workloads, etc. Advantageously, the workflow 1600 of FIG. 16 can be executed and/or instantiated by processor circuitry to effectuate direct, simultaneous L1 SRS access without impact to communication traffic. For example, the vRAN 1618, and/or, more generally, the DU 1606, can output the SRS data to the CU 1608 and the PLDC 1614 substantially simultaneously to effectuate substantially parallel processing of the SRS data.

Figure 17:
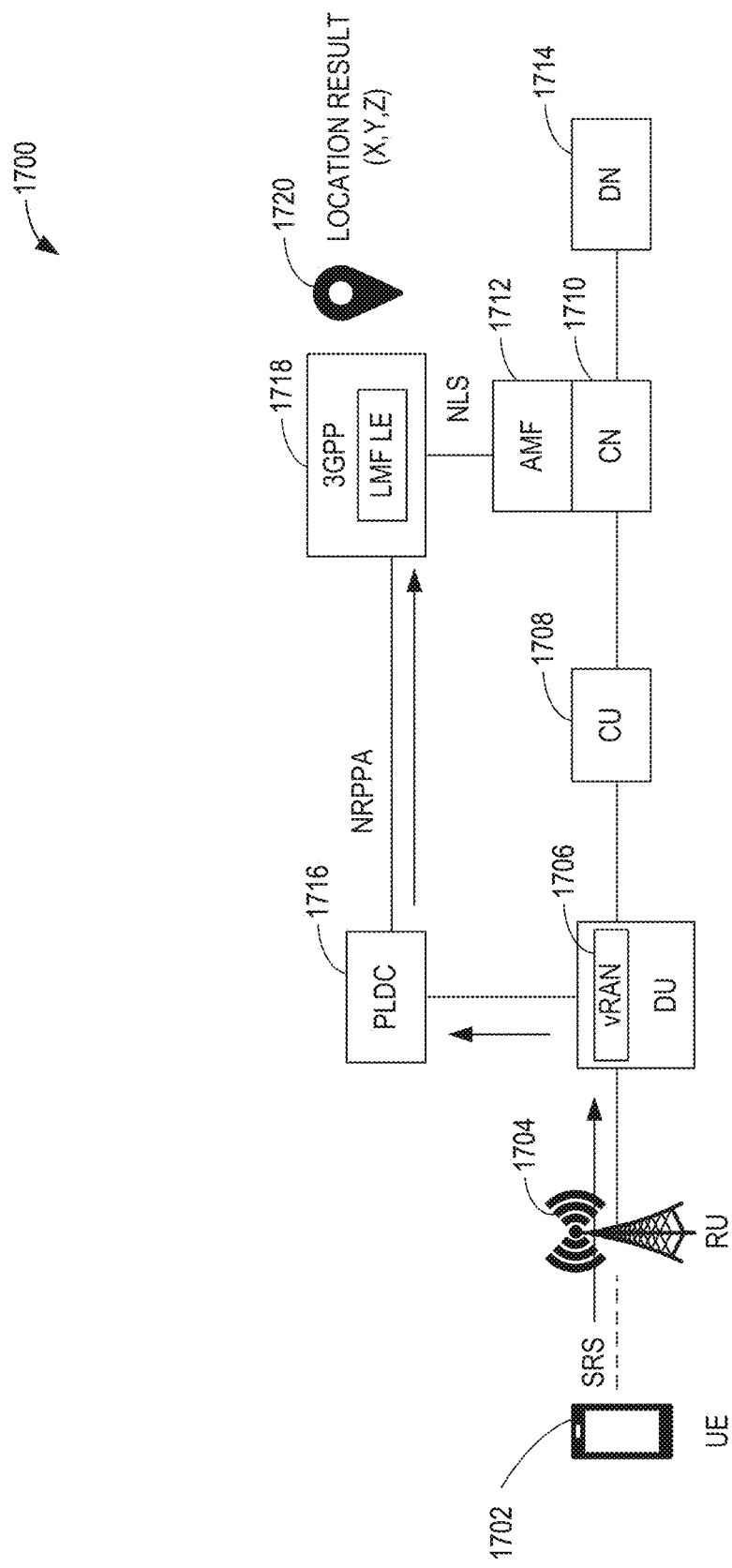
FIG. 17 is an illustration of a first example location determination architecture based on the 3rd Generation Partnership Project (3GPP) standard.

FIG. 17 is an illustration of a first example location determination architecture 1700 based on the 3rd Generation Partnership Project (3GPP) standard. The first location determination architecture 1700 includes an example UE 1702, an example RU 1704, an example DU 1706, an example CU 1708, an example CN 1710, an example AMF 1712, an example DN 1714, an PLDC 1716, and an example location management function location engine (LMF LE) 1718. The LMF LE 1718 of the illustrated example can be based on the 3GPP standard. In some examples, the LMF LE 1718 can include and/or be implemented by the location engine circuitry 140 of FIGS. 1 and/or 4.

In example operation, the UE 1702 transmits cellular data, such as SRS data, to the DU 1706 via the RU 1704. In this example, the DU 1706 implements a vRAN. The DU 1706 can provide the SRS data to the CU 1708, which, in turn, can provide the SRS data to the CN 1710. The CN 1710 can provide the SRS data to the AMF 1712 and/or the DN 1714. In some examples, the LMF LE 1718 can configure the DU 1706 to obtain data from the UE 1702 at a programmable and/or configurable rate. In some examples, the LMF LE 1718 can configure the DU 1706 to obtain a type and/or quantity of data from the UE 1702.

In example operation, the PLDC 1716 can provide data to the LMF LE 1718 based on the NR Positioning Protocol A (NRPPa). In example operation, the LMF LE 1718 can output an example location result 1720 based on the data from the PLDC 1716. For example, the location result 1720 can be coordinates (e.g., x-, y-, and/or z-coordinates) of the UE 1702 based on the SRS data.

Figure 18:
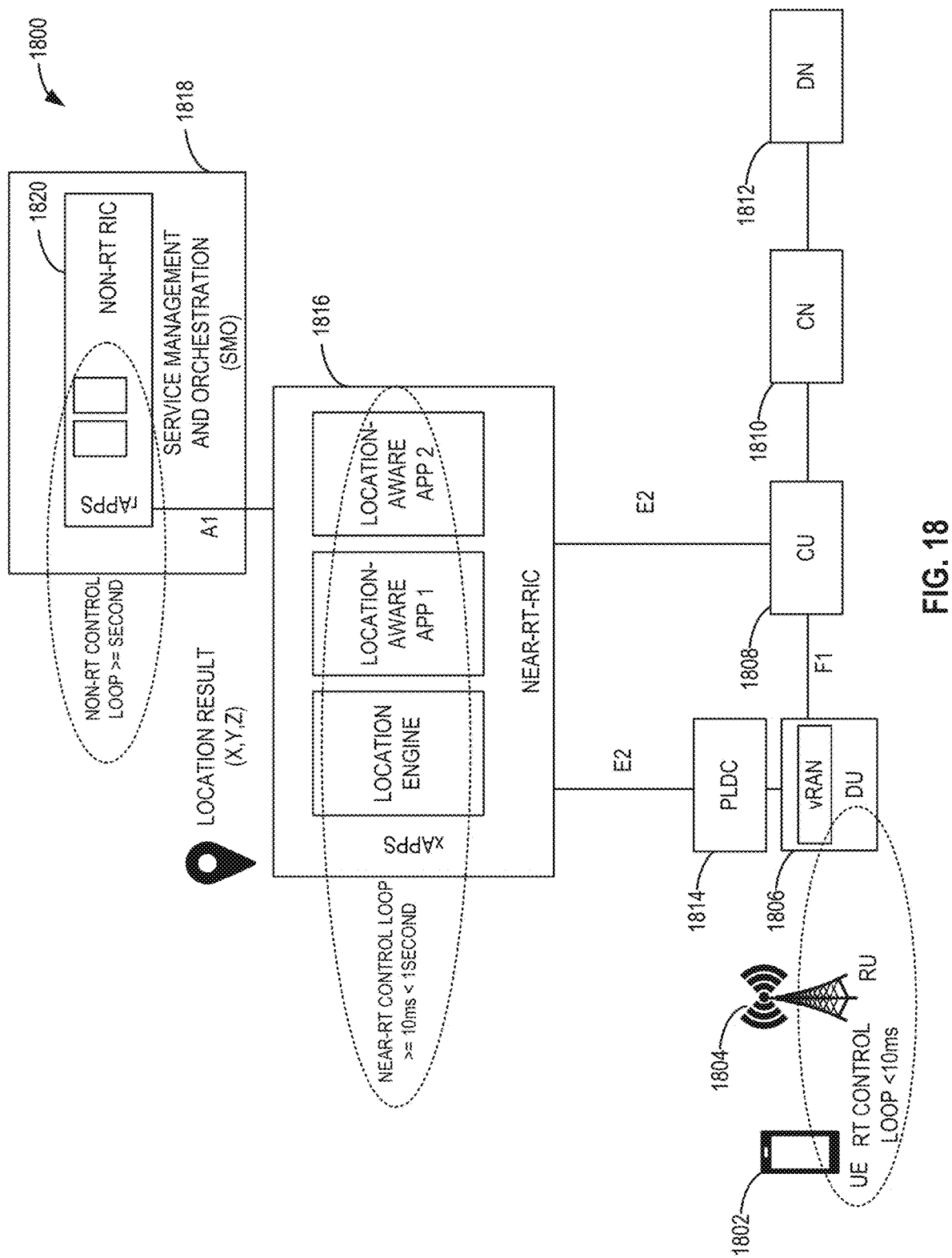
FIG. 18 is an illustration of a second example location determination architecture based on the Open Radio Access Network (O-RAN) standard.

FIG. 18 is an illustration of a second example location determination architecture 1800 based on the Open Radio Access Network (O-RAN) standard. The second location determination architecture 1800 includes an example UE 1802, an example RU 1804, an example DU 1806, an example CU 1808, an example CN 1810, an example DN 1812, an example PLDC 1814, an example near real time radio access network intelligent controller (near-RT-RIC) 1816, and an example service management and orchestration (SMO) service 1818, which includes an example non-real time radio access network intelligent controller (non-RT RIC) 1820. The near-RT-RIC 1816 of the illustrated example includes and/or otherwise implements xAPPs, such as a location engine xAPP, a first location-aware xAPP (identified by Location-Aware App1), and a second location-aware xAPP (identified by Location-Aware App2). The SMO service 1818 of the illustrated example includes and/or otherwise implements one or more rAPPs such as the non-RT RIC 1820.

In some examples, the near-RT-RIC 1816 can reside within a telecommunications (telco) edge cloud or regional cloud and is responsible for intelligent edge control of RAN nodes and resources. In some examples, the near-RT-RIC 1816 can control RAN elements and their resources with optimization actions that may typically take 10 ms to one second to complete. In some examples, the near-RT-RIC 1816 can receive policy guidance from the non-RT RIC 1820 and can provide policy feedback to the non-RT RIC 1820 through specialized applications referred to as xAPPs.

The non-RT RIC 1820 of the illustrated example is part of the SMO framework 1818. In some examples, the non-RT RIC 1818 can be centrally deployed in a service provider network to enable non-real time (e.g., greater than 1 second) control of RAN elements and their resources through specialized applications called rAPPs, such as a location determination rAPP. In some examples, the non-RT RIC 1818 communicates with xAPPs running on the near-RT RIC 1816 to provide policy-based guidance for edge control of RAN elements and their resources.

In example operation, the UE 1802 can provide cellular data, such as SRS data, to the RU 1804. The RU 1804 can provide the cellular data to the DU 1806, which can implement a vRAN. The PLDC 1814 can obtain the cellular data at a particular or specified frequency, rate, etc., and provide the cellular data to the near-RT-RIC 1816. The near-RT-RIC 1816 can determine a location of the UE 1802 based on the cellular data. The near-RT-RIC 1816 can provide the location to one(s) of the other xAPPs and/or one(s) of the one or more rAPPs of the SMO service 1818.

Figure 19:
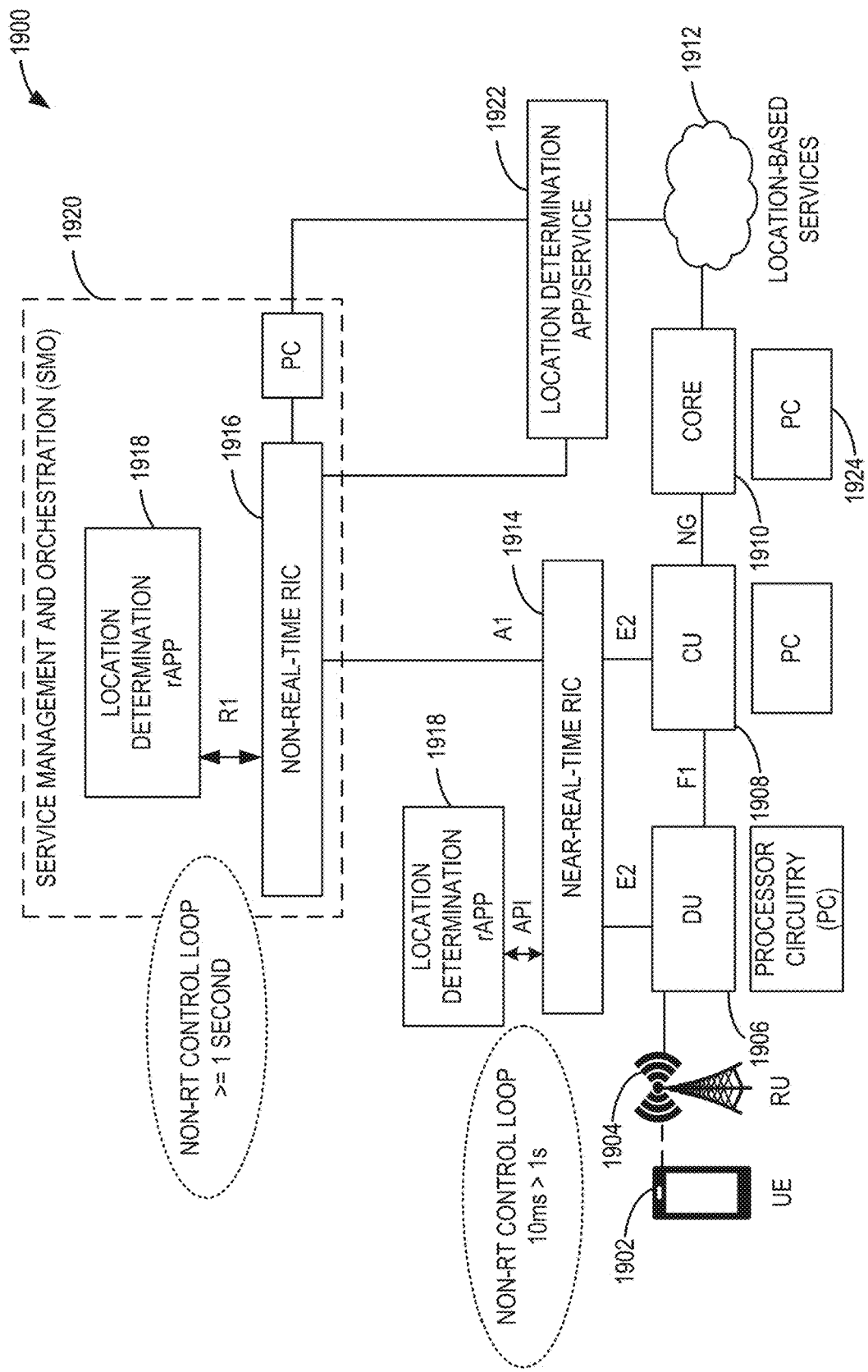
FIG. 19 is an illustration of a third example location determination architecture based on the O-RAN standard.

FIG. 19 is an illustration of a third example location determination architecture 1900 based on the O-RAN standard. In some examples, the third location determination architecture 1900 can be utilized for location detection at the Edge and/or a cloud data center. The third location determination architecture 1900 includes an example UE 1902, an example RU 1904, an example DU 1906, an example CU 1908, an example core server 1910 (identified by CORE), an example cloud data center 1912, an example near-real-time RIC 1914, an example non-real-time RIC 1916, and an example location determination rAPP 1918. In some examples, at least one of the RU 1904 or the DU 1906 can include and/or implement the location engine circuitry 140 of FIGS. 1 and/or 4.

In some examples, the near-real-time RIC 1914 can reside within a telco edge cloud or regional cloud and is responsible for intelligent edge control of RAN nodes and resources. In some examples, the near-real-time RIC 1914 can control RAN elements and their resources with optimization actions that may typically take 10 ms to one second to complete. In some examples, the near-real-time RIC 1914 can receive policy guidance from the non-real-time RIC 1916 and can provide policy feedback to the non-real-time RIC 1916 through specialized applications referred to as xAPPs.

The non-real-time RIC 1916 of the illustrated example is part of the SMO framework 1920. In some examples, the non-real-time RIC 1916 can be centrally deployed in a service provider network to enable non-real time (e.g., greater than 1 second) control of RAN elements and their resources through specialized applications called rAPPs, such as the location determination rAPP 1918. In some examples, the non-real-time RIC 1916 can communicate with xAPPs running on the near-real-time RIC 1914 to provide policy-based guidance for edge control of RAN elements and their resources.

In the illustrated example, the core server 1910 and/or the cloud data center 1912 can execute an example location determination application and/or service 1922 to identify a location, a position, etc., of the UE 1902. For example, the UE 1902 can provide location data to the RU 1904. The RU 1904 can provide the location data to the DU 1906, which can in turn provide the location data (or portion(s) thereof), to the near-real-time RIC 1934 and/or the CU 1908. The CU 1908 can provide the location data (or portion(s) thereof) to the core server 1910. The core server 1910 can instantiate and/or execute the location determination application/service 1922 to determine a location of the UE 1902 based on the location data (or portion(s) thereof). In some examples, the core server 1910 can execute the location determination application/service 1922 locally with example processor circuitry 1924 of the core server 1910. In some examples, the core server 1910 can provide the location data (or portion(s) thereof) to the cloud data center 1912. For example, the cloud data center 1912 can instantiate and/or execute the location determination application/service 1922 to determine the position of the UE 1902. In response to determining the position of the UE 1902, the cloud data center 1912 can output and/or otherwise provide the position of the UE 1902 to the core server 1910 and/or to a different application (e.g., to display and/or otherwise present the position to a user).

Figure 20:
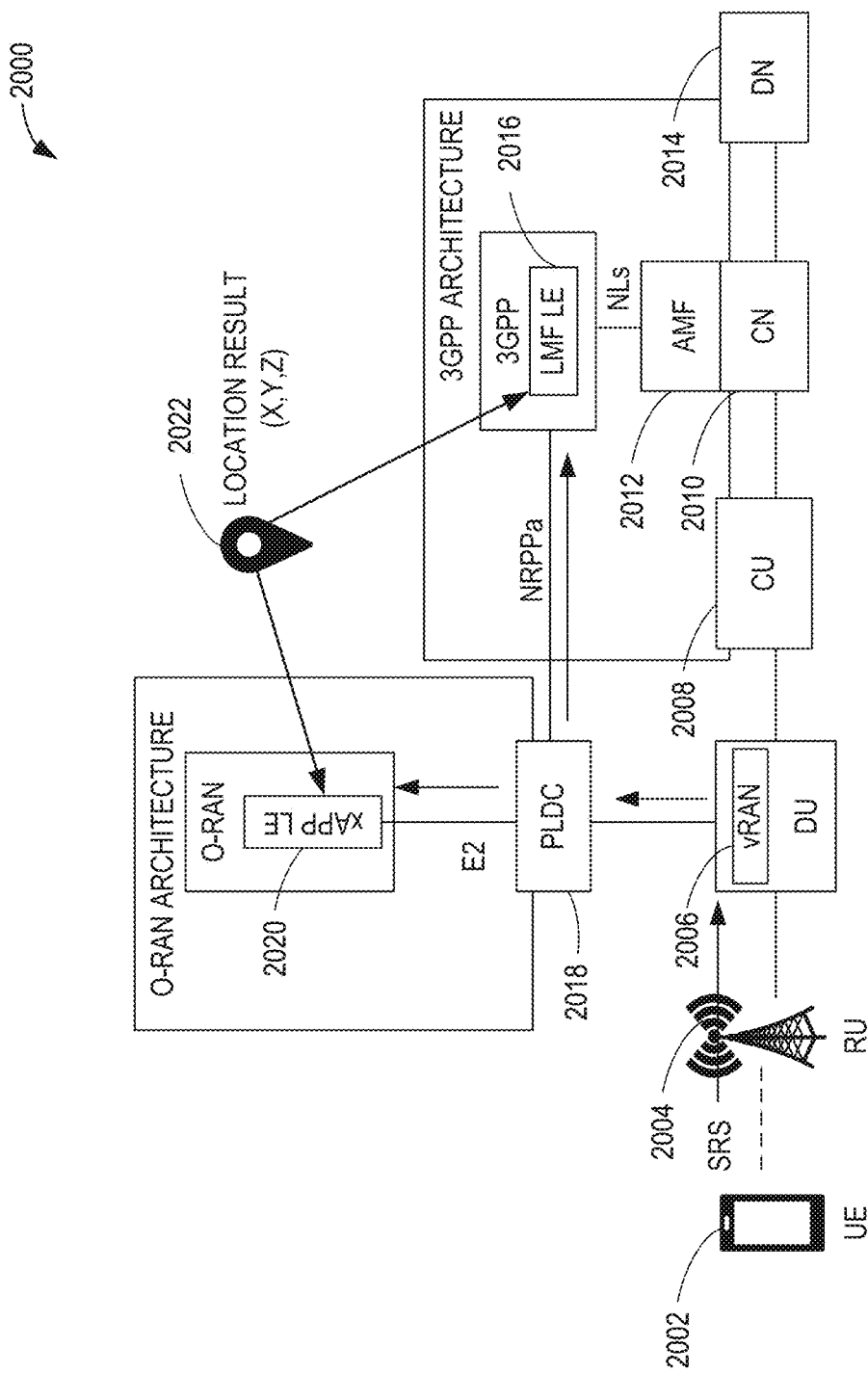
FIG. 20 is an illustration of a fourth example location determination architecture based on the 3GPP standard and/or the O-RAN standard.

FIG. 20 is an illustration of a fourth example location determination architecture 2000 based on the 3GPP standard and/or the O-RAN standard. The fourth location determination architecture 2000 includes an example UE 2002, an example RU 2004, an example DU 2006, an example CU 2008, an example CN 2010, an example AMF 2012, an example DN 2014, an example LMF LE 2016, an example PLDC 2018, an example xAPP LE 2020, and an example location result 2022. The DU 2006 of the illustrated example includes and/or implements a VRAN. In some examples, at least one of the RU 2004, the DU 2006, the LMF LE 2016, or the xAPP LE 2020 can include and/or implement the location engine circuitry 140 of FIGS. 1 and/or 4. The LMF LE 2016 of the illustrated example is based on the 3GPP standard. The xAPP LE 2020 of the illustrated example is based on the O-RAN architecture.

In example operation, the UE 2002 transmits cellular data, such as SRS data, to the DU 2006 via the RU 2004. In some examples, the DU 2006 can provide the SRS data for utilization in a 3GPP architecture. For example, the DU 2006 can output the SRS data to the CU 2008, which, in turn, can provide the SRS data to the CN 2010. The CN 2010 can provide the SRS data to the AMF 2012 and/or the DN 2014. The AMF 2012 can output the SRS data to the LMF LE 2016 via an NLs protocol, transport link, or interface. In some examples, the LMF LE 2016 can generate the location result 2022 based on the SRS data. For example, the location result 2022 can be coordinates (e.g., x-, y-, and/or z-coordinates, such as x-, y-, and/or z-Cartesian coordinates) of the UE 2002 based on the SRS data. In example operation, a logical entity (e.g., an application, a service, etc.) can consume the location result 2022 to effectuate one or more actions, operations, tasks, workloads, etc. In some examples, the LMF LE 2016 can configure the DU 2006 (e.g., via at least one of the AMF 2012 or the PLDC 2018) to obtain data from the UE 2002 at a programmable and/or configurable rate. In some examples, the LMF LE 2016 can configure the DU 2006 to obtain a type and/or quantity of data from the UE 2002.

In some examples, the DU 2006 can provide the SRS data for utilization in a O-RAN architecture. For example, the DU 2006 can output the SRS data to the PLDC 2018. The PLDC 2018 can output the SRS data to the LMF LE 2016 via the NRPPa protocol, transport link, or interface. The PLDC 2018 can output the SRS data to the xAPP LE 2020 via an E2 protocol, transport link, or interface. In some examples, the xAPP LE 2020 can generate the location result 2022 based on the SRS data. In some examples, the xAPP LE 2020 can configure the DU 2006 (e.g., via the PLDC 2018) to obtain data from the UE 2002 at a programmable and/or configurable rate. In some examples, the xAPP LE 2020 can configure the DU 2006 to obtain a type and/or quantity of data from the UE 2002.

Advantageously, the fourth location determination architecture 2000 can be executed, instantiated, and/or implemented by processor circuitry to effectuate direct, simultaneous L1 SRS access without impact to communication traffic based on a 3GPP architecture and/or an O-RAN architecture. For example, the vRAN, and/or, more generally, the DU 2006, can output the SRS data to the CU 2008 and the PLDC 2018 substantially simultaneously to effectuate substantially parallel processing of the SRS data by multiple architectures.

Figure 21:
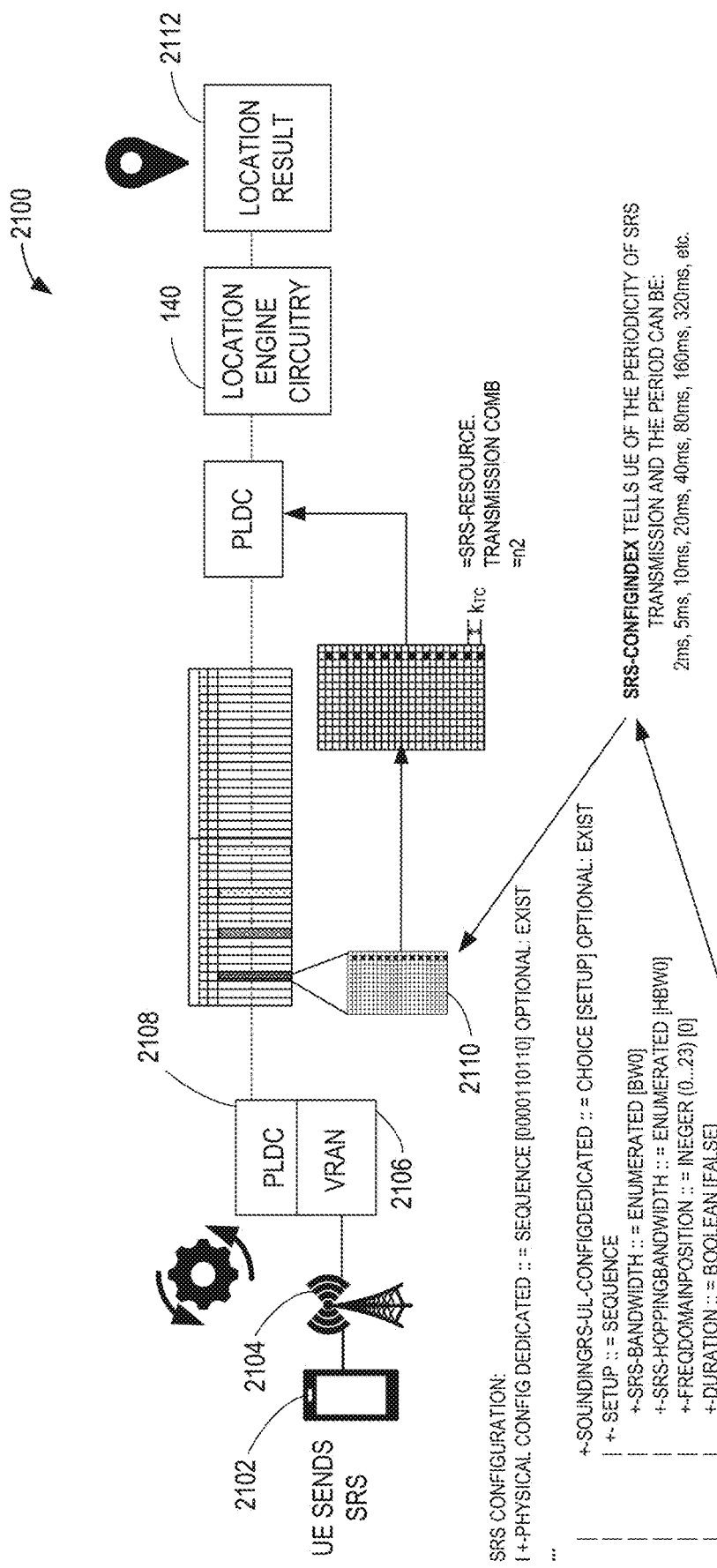
FIG. 21 is an example workflow to determine a location of a device and/or an object based on cellular data.

FIG. 21 is an example workflow 2100 to determine a location of a device and/or an object based on cellular data. For example, the workflow 2100 can be executed and/or instantiated by processor circuitry to implement 5G positioning. The workflow 2100 includes an example UE 2102, an example RU 2104, an example vRAN 2106, an example PLDC 2108, an example transmission comb 2110, the location engine circuitry 140 of FIGS. 1 and/or 4, and an example location result 2112. In example operation, the RU 2104 enables the UE 2102 to transmit SRS data to the RU 2104. In example operation, the RU 2104 instructs the UE 2102 to allocate SRS positioning resources into a flexible slot within a new radio (NR) subframe within an NR frame. For example, when a physical uplink control channel (PUCCH) or physical uplink shared channel (PUSCH) is not scheduled, SRS can be used to test the reception quality for uplink channel-dependent scheduling and are transmitted in the last symbol of the subframe. The allocation to subcarriers can be determined by the SRS bandwidth configuration. SRSs can be multiplexed by time (periodic transmissions), frequency, cyclic shifts, and transmission comb. As used herein, "scheduling" refers to the process of allocating resources for transmitting data. In some examples, a UE can transmit non-scheduled wireless data, such as to a base station, by transmitting wireless data when data becomes available at the UE for transmission to the base station. For example, the UE can transmit non-scheduled wireless data by transmitting wireless data to the base station without initiating a handshake with the bases station.

In example operation, the UE 2102 transmits positioning SRS data for a specific antenna of the RU 2104 for a specific periodicity. In example operation, the RU 2104 receives the positioning SRS transmission on a set of symbols (e.g., a set of 1, 2, or 4 orthogonal frequency-division multiplexing (OFDM) symbols). In example operation, the RU 2104 transmits the positioning SRS data to the vRAN 2106 and the PLDC 2108. In some examples, the vRAN 2006 and/or the PLDC 2018 can be implemented by the same hardware (e.g., a DU) or different hardware. In some examples, the PLDC 2108 can output the SRS data to the location engine circuitry 140 to cause the determination of the location result 2112, which corresponds to a position, a location, etc., of the UE 2102.

In some examples, the SRS data from the UE 2102 can include data representative of reference signal power, timing differences, angles, etc., that can be used for multiple techniques to generate the location result 2112. In some examples, the RU 2104, the PLDC 2108, etc., can determine RTT measurements based on the SRS data to determine a distance between the UE 2102 and the RU 2104 using a known location of the RU 2104. In some examples, the RU 2104, the PLDC 2108, etc., can determine a TOA, a TDOA, an AOA, etc., based on the SRS data. In some examples, the location engine circuitry 140 can determine a TOA, a TDOA, an AOA, etc., based on the SRS data.

Figure 22:
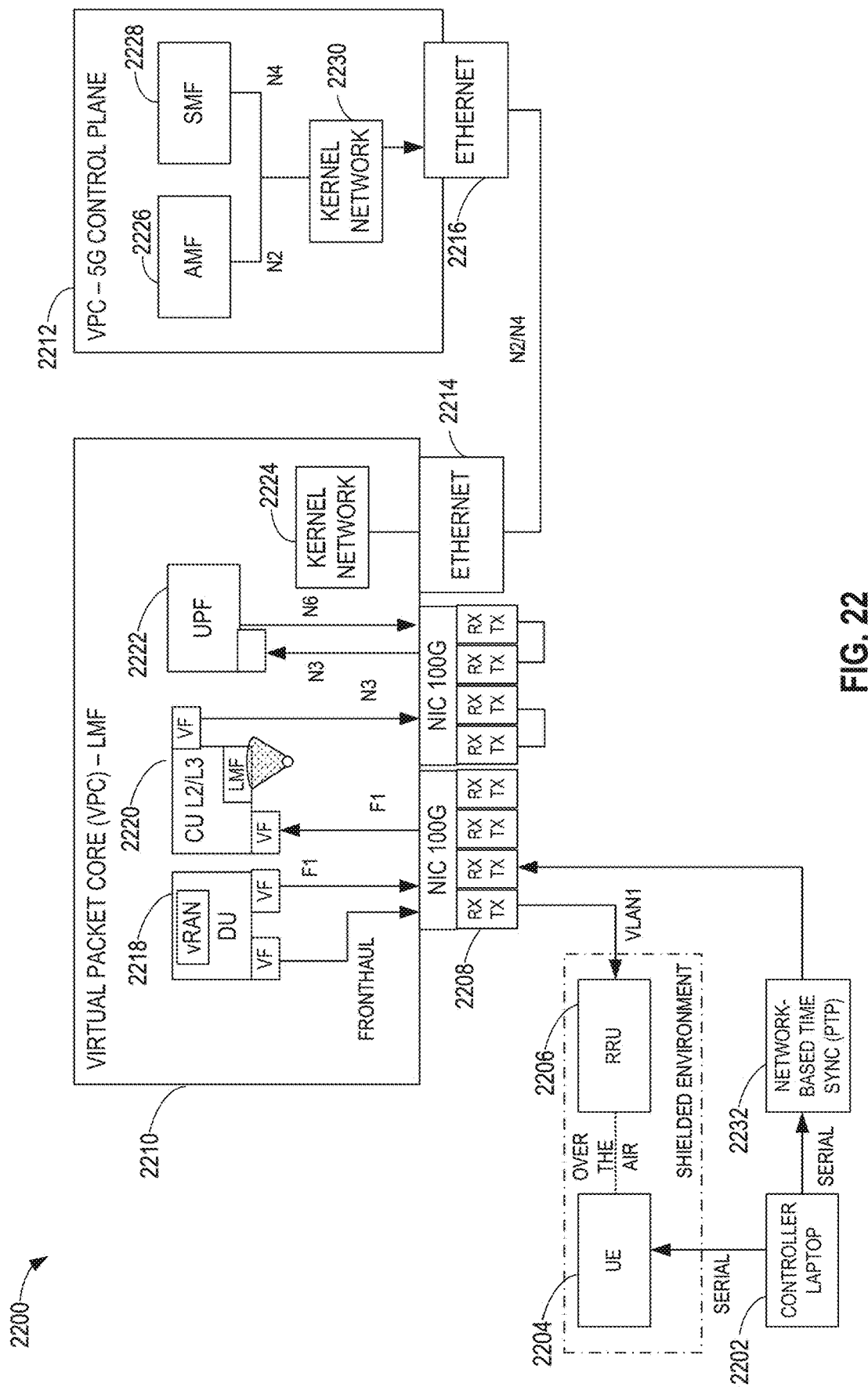
FIG. 22 is an illustration of a fifth example location determination architecture.

FIG. 22 is an illustration of a fifth example location determination architecture 2200. The fifth location determination architecture 2200 includes an example controller laptop 2202, an example UE 2204, an example RRU 2206, example interface circuitry 2208 (e.g., network interface circuitry (NIC)) a first example virtual packet core (VPC) 2210, a second example VPC 2212, a first example Ethernet interface 2214, and a second example Ethernet interface 2216. The first VPC 2210 can implement an LMF. In some examples, the LMF can be on-premises (on-prem) or at the Edge. The first VPC 2210 includes an example DU 2218, which implements a vRAN. The first VPC 2210 includes and/or implements an example CU 2220, an example User Plane Function (UPF) 2222, and a first example kernel network 2224. The second VPC 2212 can implement a 5G control plane. The second VPC 2212 includes an example AMF 2226, an example Session Management Function (SMF) 2228, and a second example kernel network 2230.

In the illustrated example, the controller laptop 2202 can perform an example network-based time synchronization 2232 based on PTP. The controller laptop 2202 can configure the UE 2204 to transmit SRS data to the RRU 2206 via a serial interface or any other type of wired or wireless interface. In example operation, the UE 2204 can transmit wireless data, such as SRS data, to the RRU 2206 in a shielded environment (e.g., an electromagnetically shielded environment) (or a non-shielded environment). The RRU 2206 can output the SRS data to the interface circuitry 2208 via a virtual local area network connection (identified by VLAN1). The interface circuitry 2208 can output the SRS data to the DU 2218 and/or the CU 2220 via fronthaul and/or F1 protocols, transport links, or interfaces.

In some examples, the DU 2218 can include and/or implement the location engine circuitry 140 of FIGS. 1 and/or 4. For example, the DU 2218 can determine a location of the UE 2204 based on the SRS data. In some examples, the CU 2220 can include and/or implement the location engine circuitry 140 of FIGS. 1 and/or 4. For example, the CU 2220 can execute and/or instantiate the location engine circuitry 140 to implement an LMF that can determine the location of the UE 22204 based on non-3GPP spectrum types, modes, etc., such as Wi-Fi, Bluetooth, etc., and/or any combination(s) thereof.

In some examples, the DU 2218 can output the location of the UE 2204 to the UPF 2222 and/or the second VPC 2212 via the first kernel network 2224, the first Ethernet interface 2214, the second Ethernet interface 2216, and/or the second kernel network 2230. For example, the DU 2218 can cause the location of the UE 2204 to be provided to at least one of the AMF 2226 or the SMF 2228 of the second VPC 2212.

Figure 23:
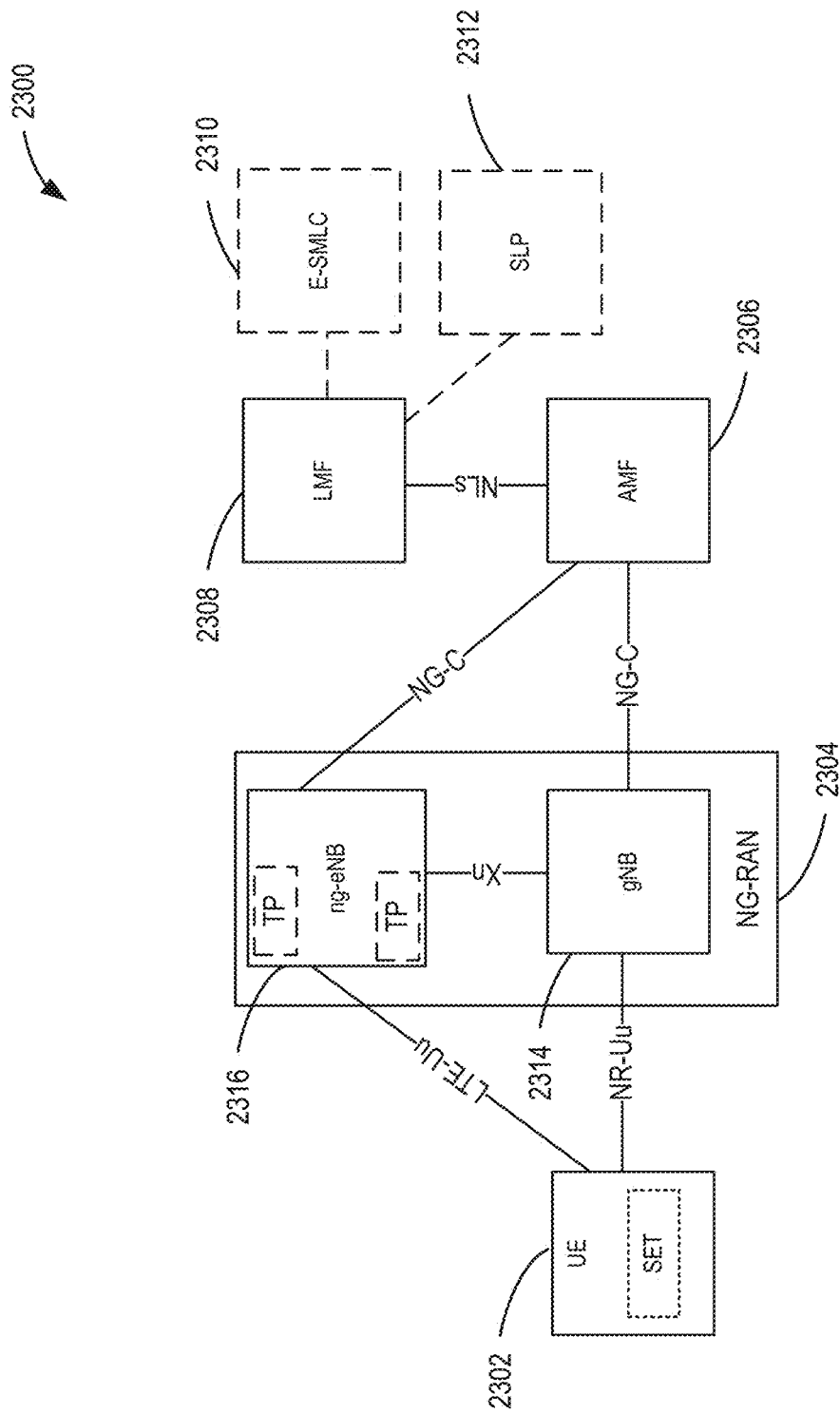
FIG. 23 is an illustration of a sixth example location determination architecture.

FIG. 23 is an illustration of a sixth example location determination architecture 2300. The sixth location determination architecture 2300 includes an example UE 2302, an example NG-RAN 2304, an example AMF 2306, an example LMF 2308, an example Evolved Serving Mobile Location Center (E-SMLC) 2310, and an example Secure User Plane Location Platform (SLP) 2312. The NG-RAN 2304 includes and/or implements an example gNB 2314 and an example ng-eNB 2316. For example, the UE 2302 can transmit cellular data, such as SRS data, to the gNB 2314 via an NR-Uu protocol, transport link, or interface. In some examples, the UE 2302 can transmit cellular data, such as SRS data, to the ng-eNB 2316 via an LTE-Uu protocol, transport link, or interface. The gNB 2314 and the ng-eNB 2316 are communicatively coupled to each other via an Xn protocol, transport link, or interface. The gNB 2314 and the ng-eNB 2316 are in communication with the AMF 2306 via an NG-C protocol, transport link, or interface. The ng-eNB 2316 includes and/or implements transmission points (TPs). The AMF 2306 is communicatively coupled to the LMF 2308 via an NLs protocol, transport link, or interface. The LMF 2308 is in communication with at least one of the E-SMLC 2310 or the SLP 2312.

In some examples, the gNB 2314, the ng-eNB 2316, and/or, more generally, the NG-RAN 2304, can include and/or implement the location engine circuitry 140 of FIGS. 1 and/or 4. For example, the gNB 2314, the ng-eNB 2316, and/or, more generally, the NG-RAN 2304, can execute and/or instantiate the location engine circuitry 140 to determine a location of the UE 2302 based on SRS data obtained from the UE 2302.

In some examples, the LMF 2308 can include and/or implement the location engine circuitry 140 of FIGS. 1 and/or 4. For example, the LMF 2308 can obtain the SRS data from the NG-RAN 2304 via the AMF 2306. In some examples, the LMF 2308 can execute and/or instantiate the location engine circuitry 140 to determine the location of the UE 2302 based on the SRS data obtained from the UE 2302. In some examples, the LMF 2308 can configure the UE 2302 to send SRS data using the LTE-Uu and/or NR-Uu protocol, transport link, or interface. For example, the LMF 2308 can transmit configuration data (identified as SET) to the UE 2302 via the NG-RAN 2304 and the AMF 2306. In some examples, the UE 2302 can transmit the SRS data to the NG-RAN 2304 based on the configuration data, which can specify a type of SRS data, a rate at which to transmit the SRS data, etc., and/or any combination(s) thereof.

Figure 24:
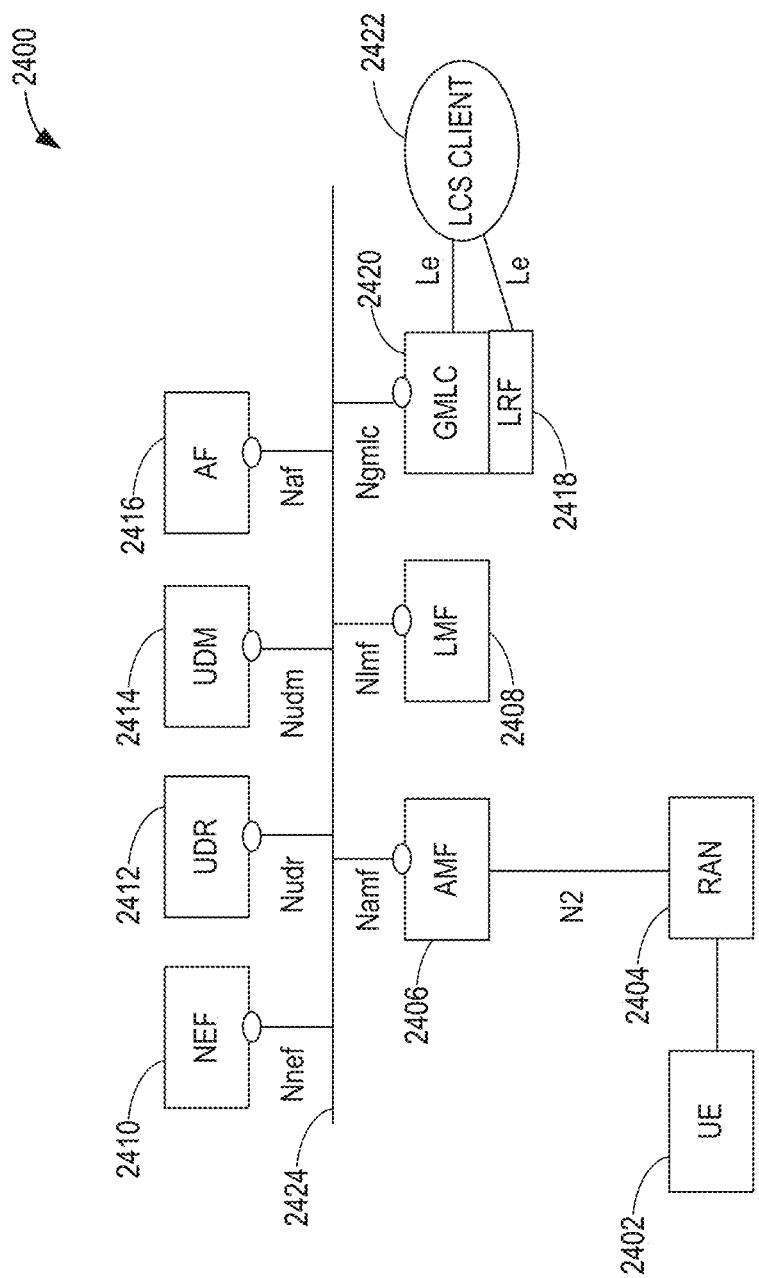
FIG. 24 is an illustration of a seventh example location determination architecture.

FIG. 24 is an illustration of a seventh example location determination architecture 2400. The seventh location determination architecture 2400 includes an example UE 2402, an example RAN 2404, an example AMF 2406, an example LMF 2408, an example NEF 2410, an example Unified Data Repository (UDR) 2412, an example UDM 2414, an example AF 2416, an example Location Retrieval Function (LRF) 2418, an example GMLC 2420, an example Location Service (LCS) client 2422. The RAN 2404 is in communication with the AMF 2406 via an N2 protocol, transport link, or interface. The AMF 2406 is in communication with an example bus 2424 via an Namf protocol, transport link, or interface. In some examples, the bus 2424 can be a logical representation of a communication or data bus. In some examples, the bus 2424 can be a computing and/or electrical bus. The LMF 2408 is in communication with the bus 2424 via an Nlmf protocol, transport link, or interface. The NEF 2410 is in communication with the bus 2424 via an Nnef protocol, transport link, or interface. The UDR 2412 is in communication with the bus 2424 via an Nudr protocol, transport link, or interface. The UDM 2414 is in communication with the bus 2424 via an Nudm protocol, transport link, or interface. The AF 2416 is in communication with the bus 2424 via an Naf protocol, transport link, or interface. The GMLC 2420 is in communication with the bus 2424 via an Ngmlc protocol, transport link, or interface. The GMLC 2420 and the LRF 2418 are in communication with the LCS client 2422 via an Le protocol, transport link, or interface.

In some examples, a GMLC, such as the GMLC 2420 of FIG. 24, is the gateway for LCS clients, such as the LCS client 2422. For example, the GMLC can perform authorization, validate privacy settings, and/or forward location request(s) to UEs served by the AMF 2406. In some examples, an LRF, such as the LRF 2418, can provide or validate position information for UEs and LCS clients in sessions associated with time-critical or sensitive constraints, such as emergency or high-urgency applications.

In some examples, the RAN 2404 can include and/or implement the location engine circuitry 140 of FIGS. 1 and/or 4. For example, the RAN 2404 can obtain SRS data from the UE 2402 and determine a location of the UE 2402 based on the SRS data. In some examples, the RAN 2404 can cause the location of the UE 2402 to be provided to the LCS client 2422 via at least one of the AMF 2406, the LMF 2408, the NEF 2410, the UDR 2412, the UDM 2414, the AF 2416, the LRF 2418, or the GMLC 2420. For example, the LCS client 2422 can be an application, a service, etc., that can consume and/or otherwise utilize the location of the UE 2402 to cause one or more actions, operations, tasks, workloads, etc., to be completed.

Figure 25:
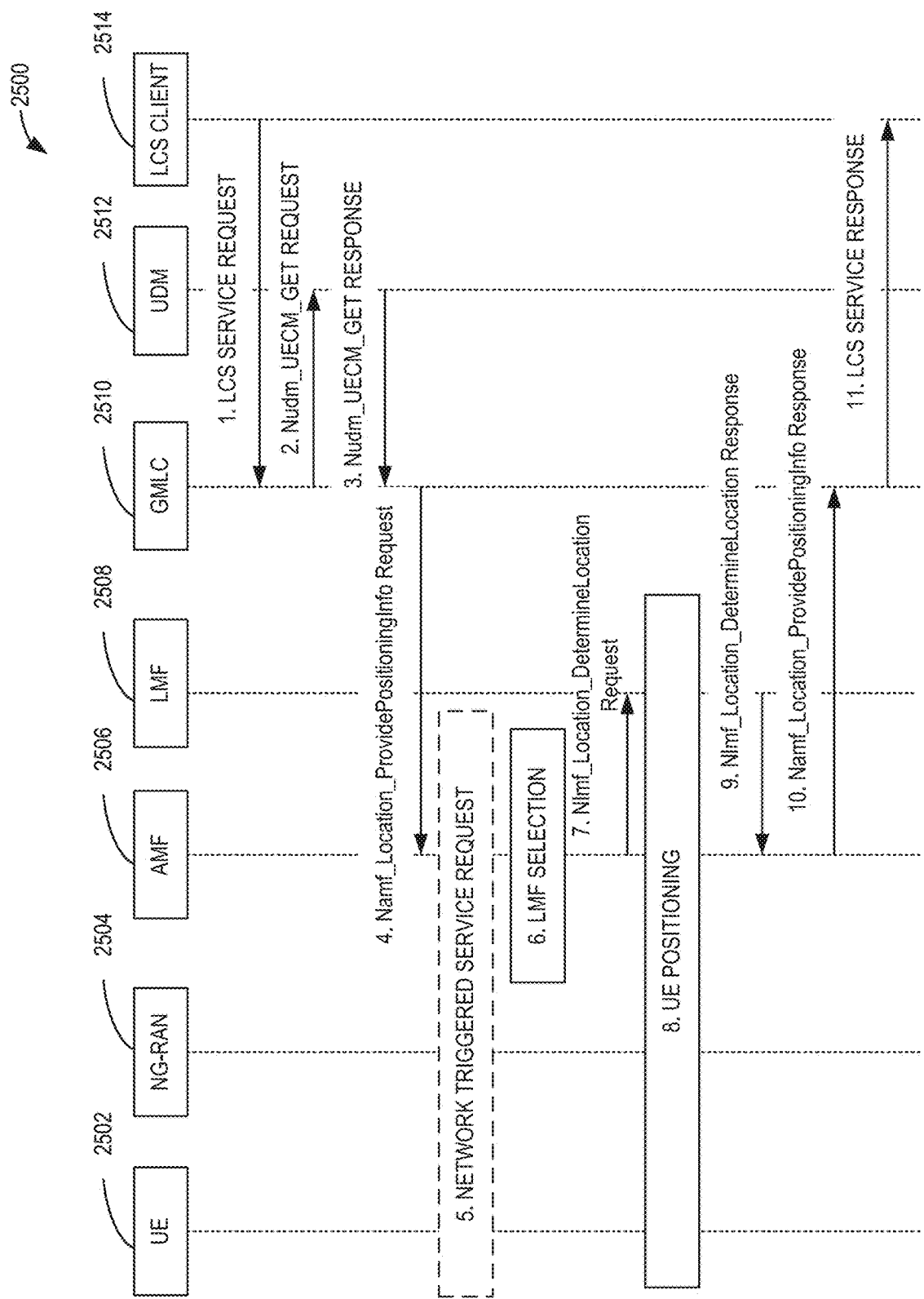
FIG. 25 is an example workflow to implement an example location determination architecture.

FIG. 25 is an example workflow 2500 to implement an example location determination architecture as disclosed herein, such as the seventh location determination architecture 2400 of FIG. 24. The workflow 2500 of FIG. 25 includes an example UE 2502, an example NG-RAN 2504, an example AMF 2506, an example LMF 2508, an example GMLC 2510, an example UDM 2512, and an example LCS client 2514.

The workflow 2500 of the illustrated example begins when the LCS client 2514 generates an LCS service request, such as a request for a location of the UE 2502. The LCS client 2514 issues the LCS service request to the GMLC 2510. The GMLC 2510 generates a UE Context Management (UECM) request, such as an Nudm_UECM_Get Request, to the UDM 2512. The UDM 2512 issues an Nudm_UECM_Get Response to the GMLC 2510. The GMLC 2510 issues an Namf_Location_ProvidePositioningInfoRequest to the AMF 2506. The AMF 2506 invokes a network triggered service request in connection with at least one of the UE 2502, the NG-RAN 2504, the AMF 2506, or the LMF 2508. The AMF 2506 identifies the UE 2502 for location determination via an LMF selection. The AMF 2506 generates an Nlmf_Location_DetermineLocation Request to the LMF 2508 in connection with the UE 2502, which causes a UE positioning workflow to occur. For example, the LMF 2508 can instruct the UE 2502 via the NG-RAN 2504 and/or the AMF 2506 to send SRS data to the NG-RAN 2504. The NG-RAN 2504 can include and/or implement the location engine circuitry 140 of FIGS. 1 and/or 4 to determine the location of the UE 2502 based on the SRS data. The NG-RAN 2504 can output the location of the UE 2502 to the AMF 2506 via the LMF 2508 using an Nlmf_Location_DetermineLocation Response. The AMF 2506 can output the location of the UE 2502 to the GMLC 2510 via an Namf_Location_ProvidePositioningInfo Response. The GMLC 2510 can output the location of the UE 2502 to the LCS client 2514 via an LCS Service Response.

Figure 26:
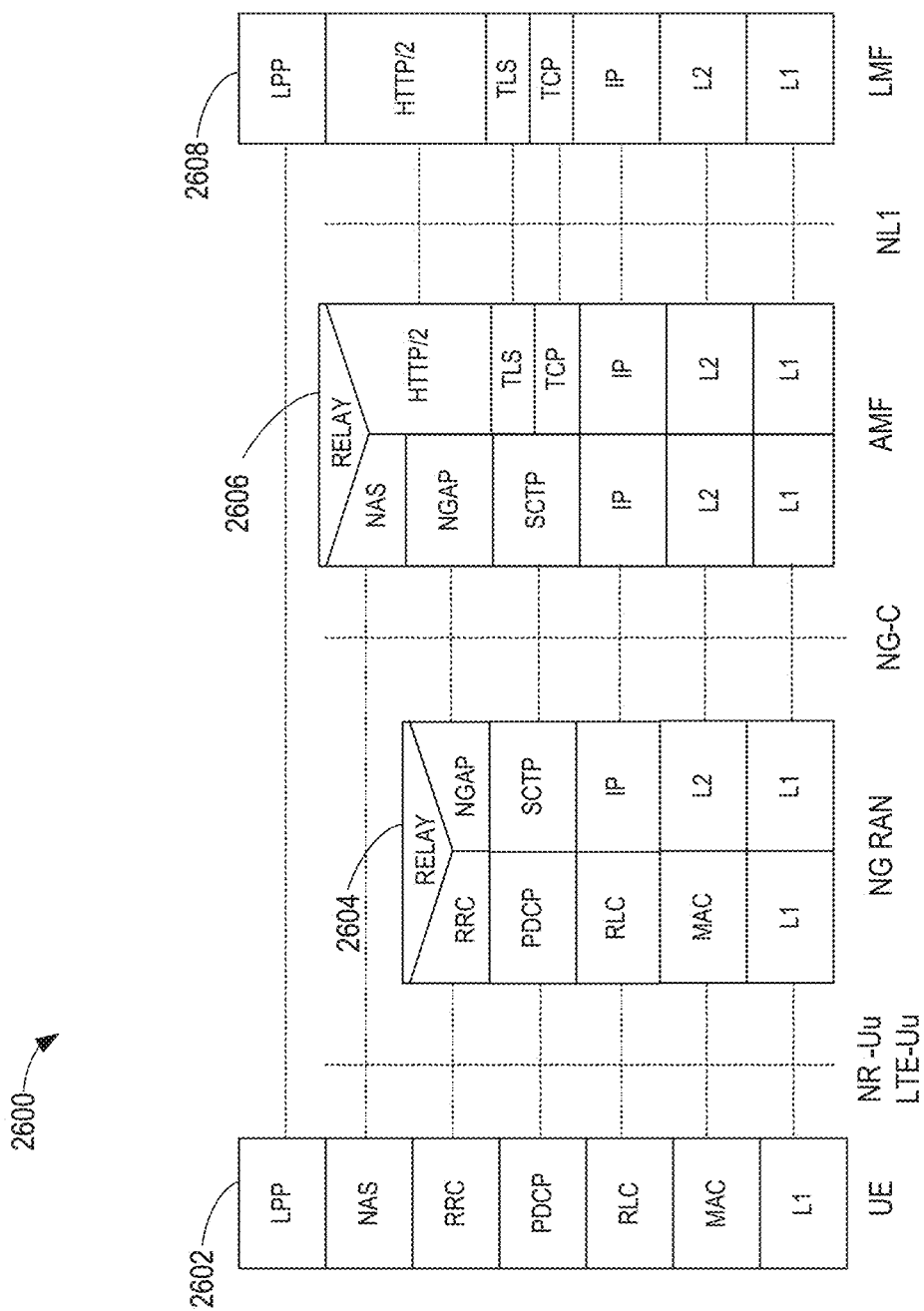
FIG. 26 is an illustration of an example communication framework to implement example location determination architectures disclosed herein.

FIG. 26 is an illustration of an example communication framework 2600 to implement example location determination architectures disclosed herein. The communication framework 2600 includes a first example protocol layer 2602, a second example protocol layer 2604, a third example protocol layer 2606, and a fourth example protocol layer 2608. The first protocol layer 2602 is implemented by a UE, such as any UE disclosed herein (e.g., the UE 2002 of FIG. 20). The second protocol layer 2604 is implemented by an NG RAN, such as any RAN disclosed herein (e.g., the RAN 1506 of FIG. 15A, a RAN implemented by the DU 2006 of FIG. 20, etc.). The third protocol layer 2606 is implemented by an AMF, such as any AMF disclosed herein (e.g., the AMF 2012 of FIG. 20). The fourth protocol layer 2608 is implemented by an LMF, such as any LMF disclosed herein (e.g., the LMF LE 2016 of FIG. 20).

In example operation, a UE can communicate with an NG RAN via at least one of an NR-Uu or LTE-Uu protocol, transport link, or interface. In example operation, an NG RAN can communicate with an AMF via an NG-C protocol, transport link, or interface. In example operation, an AMF can communicate with an LMF via an NL1 protocol, transport link, or interface. In example operation, a UE can be in communication with an LMF via an LPP protocol, transport link, or interface.

Figure 27:
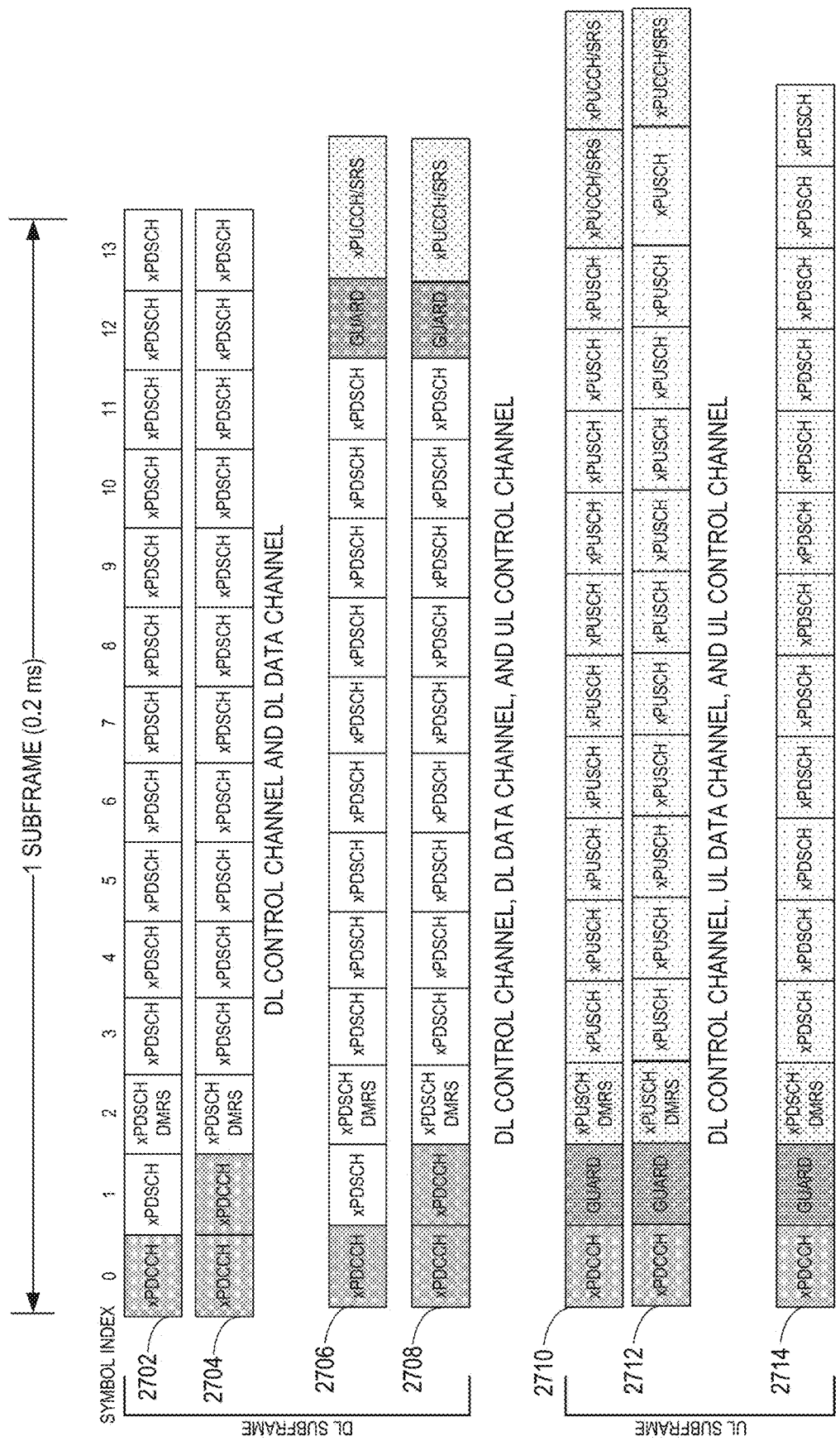
FIG. 27 depicts an example implementation of communication subframes.

FIG. 27 depicts an example implementation of communication subframes 2702, 2704, 2706, 2708, 2710, 2712, 2714. The communication subframes 2702, 2704, 2706, 2708, 2710, 2712, 2714 are 0.2 ms subframes. Alternatively, one(s) of the communication subframes 2702, 2704, 2706, 2708, 2710, 2712, 2714 may have any other duration. The communication subframes 2702, 2704, 2706, 2708, 2710, 2712, 2714 include example downlink (DL) subframes 2702, 2704, 2706, 2708 and example uplink (UL) subframes 2710, 2712, 2714. The DL subframes 2702, 2704, 2706, 2708 include a first example DL subframe 2702, a second example DL subframe 2704, a third example DL subframe 2706, and a fourth example DL subframe 2708.

The first DL subframe 2702 of the illustrated example includes a physical downlink control channel (PDCCH) (identified by xPDCCH), a plurality of physical downlink shared channels (PDSCHs) (identified by xPDSCH), and a PDSCH demodulation reference signal (DMRS). The second DL subframe 2704 includes two PDCCHs, a PDSCH DMRS, and a plurality of PDSCHs. The third DL subframe 2706 includes a PDCCH, a PDSCH DMRS, a plurality of PDSCHs, a guard channel (identified by GUARD), and a PUCCH. In some examples, an SRS (sounding reference signal) is transmitted in the PUCCH slot of the third DL subframe 2706 and/or the fourth DL subframe 2708 when the PUCCH is not scheduled.

The UL subframes 2710, 2712, 2714 include a first example UL subframe 2710, a second example UL subframe 2712, and a third example UL subframe 2714. The first UL subframe 2710 includes a PDCCH, a GUARD, a PUSCH DMRS, and a plurality of PUSCHs. In some examples, an SRS (sounding reference signal) is transmitted in the PUCCH slot of the first UL subframe 2710 when the PUCCH is not scheduled. The second UL subframe 2712 includes a PDCCH, a GUARD, a PUSCH DMRS, and a plurality of PUSCHs. In some examples, an SRS (sounding reference signal) is transmitted in the PUCCH slot of the second UL subframe 2712 when the PUCCH is not scheduled. The third UL subframe 2714 includes a PDCCH, a GUARD, a PUSCH DMRS, and a plurality of PUSCHs.

In the illustrated example, PDCCHs implement DL control channels. In the illustrated example, PDSCH DMRS and/or PDSCH implement DL data channels. In the illustrated example, PUCCH and/or SRS implement UL control channels. In the illustrated example, PUSCH DMRS and/or PUSCH implement UL data channels.

In some examples, the SRS is a reference signal for a base station (e.g., a gNB, an eNB, etc.) to determine channel quality of an uplink path for subsection frequency region(s). For example, if configured, a UE can transmit the SRS in the last symbol slot in the uplink frame structure (e.g., the last symbol slot in the third DL subframe 2706, the fourth DL subframe 2708, the first UL subframe 2710, the second UL subframe 2712, etc.). In some examples, a PDSCH can include the DMRS for demodulating the plurality of PDSCHs. In some examples, without the PDSCHs, a base station may not detect an SRS.

In some examples, a PUSCH can include the DMRS for demodulating the plurality of PUSCHs. In some examples, without the PUSCHs, a base station may not detect an SRS. In some examples, a PUSCH can carry Uplink Control Information (UCI) information including acknowledgment (ACK) or no acknowledgment (NACK) for the received PDSCH data, channel quality indicator (CQI) data, rank indicator (RI) data (e.g., a number of possible transmission layers for the DL transmission under specific channel conditions, a maximum number of uncorrelated paths that can be used for the DL transmission, etc.), and/or precoding matrix indicator (PMI) data. In some examples, CQI data can be 4-bit values that indicate the highest modulation and code rate for a received transport block that meets a block error rate target (e.g., a block error rate target of at most 5%, 10%, 15%, etc., which can be estimated by a UE).

Figure 28:
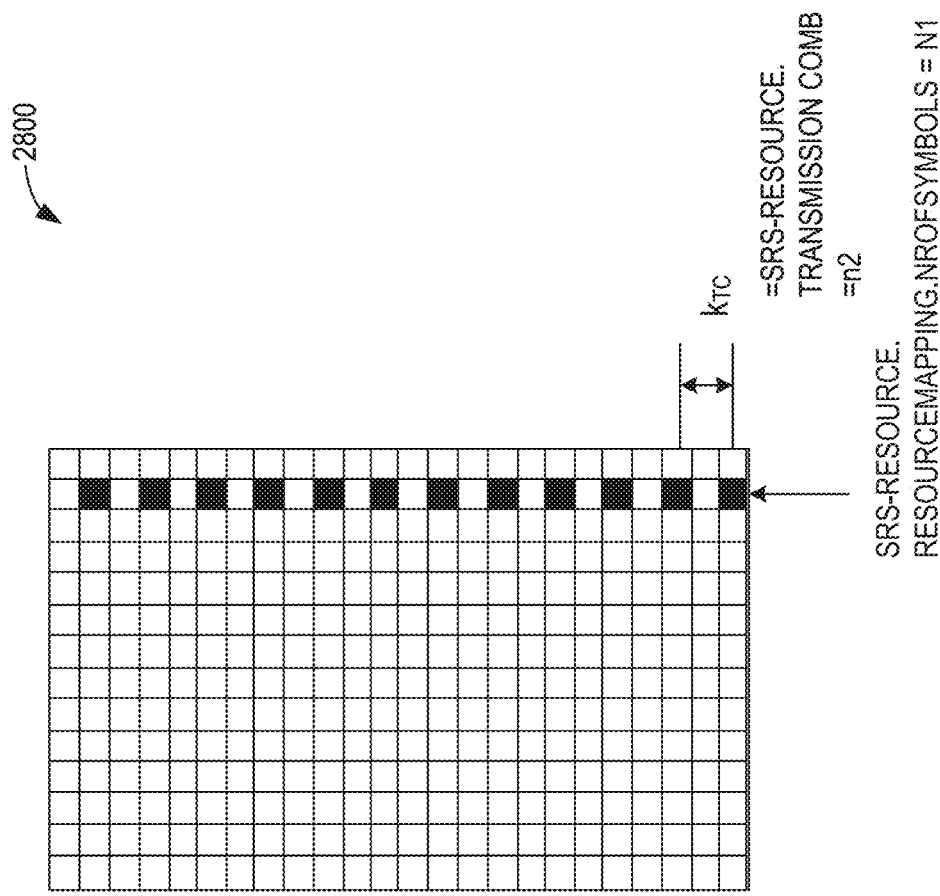
FIG. 28 is an illustration of an example multiple input, multiple output (MIMO) antenna.

FIG. 28 is an illustration of an example multiple input, multiple output (MIMO) antenna 2800. In some examples, the illustrated example implements a 3GPP resource grid. In some examples, the MIMO antenna 2800 can be communicatively coupled to an RU as disclosed herein. The MIMO antenna 2800 of the illustrated example is implemented as an array of antennas. The MIMO antenna 2800 can implement a transmission comb technique in which SRS data is transmitted in every alternate (e.g., every even or every odd) subcarrier in an assigned SRS bandwidth. For example, the RU can execute a transmission comb function (e.g., transmssionComb), which takes values 0 or 1 to inform whether to transmit SRS data in every even or odd subcarrier in the assigned SRS bandwidth. Advantageously, the RU can enable a base station (e.g., an eNB, a gNB, etc.) to multiplex two UEs with the same cyclicShift, frequency, and time resources but different transmissionComb (e.g., 0 or 1). For example, an RU as disclosed herein can utilize the MIMO antenna 2800 to effectuate a transmission comb technique to multiplex multiple UEs to achieve scale in obtaining location data associated with the multiple UEs.

Figure 29:
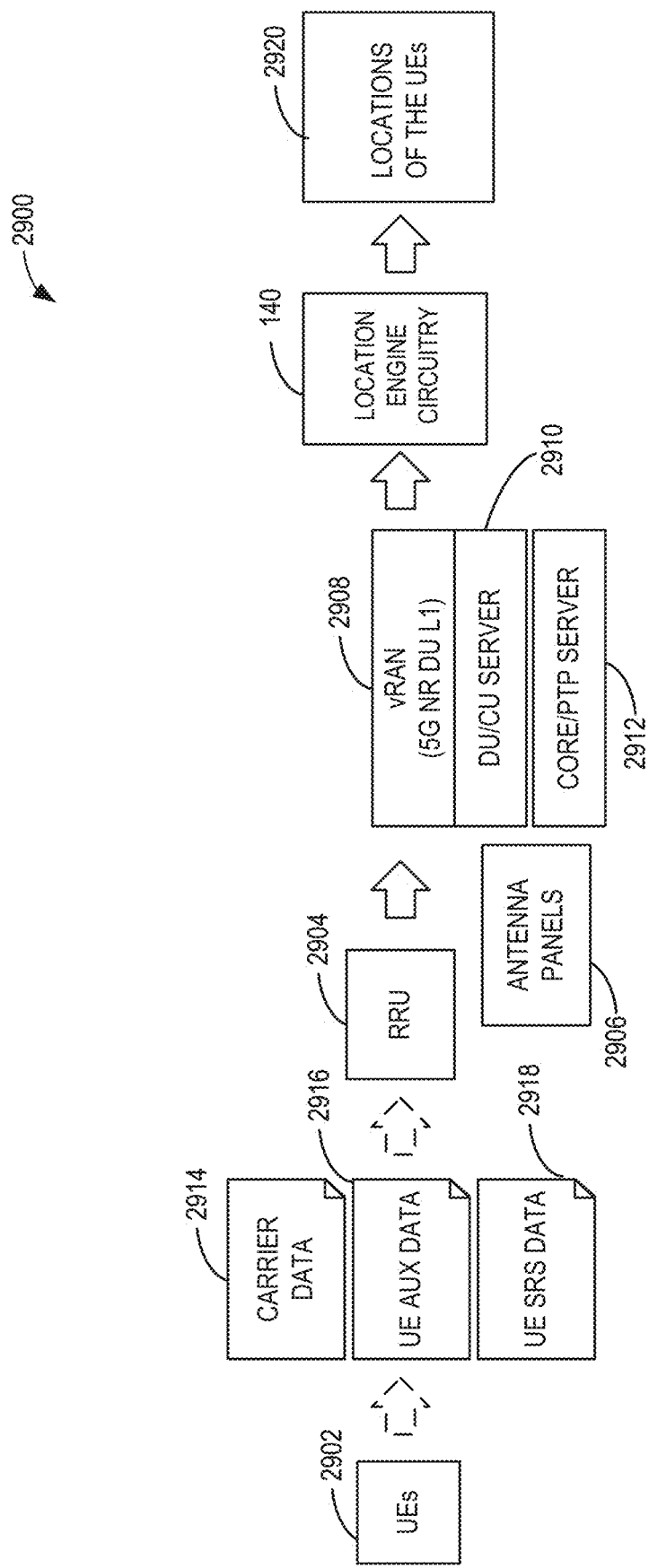
FIG. 29 is a block diagram of a first example workflow to determine a location of a device and/or an object in a terrestrial environment.

FIG. 29 is a block diagram of a first example workflow 2900 to determine a location of a device and/or an object in a terrestrial environment. The first workflow 2900 includes UES 2902, an example RRU 2904, example antenna panels 2906, example servers 2908, 2910, 2912, and the location engine circuitry 140 of FIGS. 1 and/or 4. In some examples, the UEs 2902 can be cellular connection enabled devices, such as handset devices (e.g., smartphones), tablets, IoT devices, vehicles, etc. In this example, the RRU 2904 can include and/or otherwise be associated with the antenna panels 2906. The servers 2908, 2910, 2912 include one or more first example servers 2908, one or more second example servers 2910, and one or more third example servers 2912. The one or more first servers 2908 are 5G NR DU L2 servers, which can implement a 5G NR DU L2 interface, such as an interface based on a vRAN protocol (e.g., FLEXRAN™ protocol provided by Intel® Corporation). The one or more second servers 2910 are DU and/or CU servers, which can implement 5G NR DU L1. The one or more third servers 2912 are core servers, which can implement PTP (e.g., core and/or PTP servers).

RUs, RRUs, RANs, vRANs, DUs, CUs, and/or core servers as disclosed herein can be implemented by FLEXRAN™ Reference Architecture for Wireless Access provided by Intel® Corporation of Santa Clara, California In some examples, FLEXRAN™ can be implemented by an off-the-shelf general-purpose Xeon® series processor with Intel Architecture server system and/or a virtualized platform including components of processors, input/output (I/O) circuitry, and/or accelerators (e.g., artificial intelligence and/or machine-learning accelerators, ASICs, FPGAs, GPUs, etc.) provided by Intel® Corporation. Additionally or alternatively, FLEXRAN™ can be implemented by a specialized and/or customized server system and/or a virtualized platform including components of processors, input/output (I/O) circuitry, and/or accelerators (e.g., artificial intelligence and/or machine-learning accelerators, ASICs, FPGAs, GPUs, etc.) provided by Intel® Corporation and/or any other manufacturer. Advantageously, in some examples, FLEXRAN™ Reference Architecture can enable increased levels of flexibility with the programmable on-board features, memory, and I/O. Advantageously, in some examples, deployments based on the FLEXRAN™ Reference Architecture can scale from small to large capacities with the same set of components running different applications or functions, ranging from the RAN to core network and data center including edge computing and media, enabling economies of scale.

Advantageously, in some examples disclosed herein, architectures, deployments, and/or systems based on the 3rd Generation Partnership Project (3GPP) standard and/or the Open RAN standard can be implemented by hardware, software, and/or firmware associated with FLEXRAN™. For example, a 3GPP system as disclosed herein can include a server including processor circuitry that can execute and/or instantiate machine-readable instructions to implement FLEXRAN™.

In some examples, hardware platforms, such as the IoT device 6450 of FIG. 64, the processor platform 6500 of FIG. 65, etc., can include hardware accelerator(s), hardware accelerator or acceleration circuitry, etc., that can utilize FLEXRAN™ functionality with improved efficiency compared to non-accelerated deployments. For example, FLEXRAN™ can include functions implemented by different types of Instruction Set Architectures (ISAs) as described below. In some examples, the functions can include Fast-Fourier Transform (FFT), Inverse-Fast-Fourier Transform (IFFT), etc., algorithms, calculations, computations, determinations, etc., which can be implemented by hardware executing and/or instantiating corresponding machine-readable instructions. For example, the IoT device 6450 of FIG. 64, the processor platform 6500 of FIG. 65, etc., can include one or more hardware accelerators that can execute and/or instantiate FFT, IFFT, etc., machine-readable instructions to receive cellular data, calculate and/or determine measurements based on the cellular data, and/or output the measurements with increased efficiency, increased bandwidth, increased throughput, and/or reduced latency. In some examples, the IoT device 6450 of FIG. 64, the processor platform 6500 of FIG. 66, etc., can include processor circuitry that can offload compute workloads, such as FFT, IFFT, etc., workloads, to the one or more hardware accelerators to process the compute workloads based on the FLEXRAN™ functions.

In some examples, one(s) of the servers 2908, 2910, 2912 can execute and/or instantiate machine-readable instructions that improve an efficiency or performance of computing or compute workload tasks. For example, one(s) of the one or more first servers 2908, the one or more second servers 2910, and/or the one or more third servers 2912 can execute a first set of instructions (e.g., machine-readable instructions, 256-bit Streaming Single Instruction, Multiple Data (SIMD) Extensions (SSE) instructions, etc.), a second set of instructions (e.g., Advanced Vector Extensions (AVX) 512-bit instructions also referred to as AVX-512 instructions), a third set of instructions (e.g., an Instruction Set Architecture (ISA) tailored to and/or otherwise developed to improve and/or otherwise optimize 5G processing tasks, which may also be referred to herein as 5G-ISA instructions or AVX512-FP16 instructions as provided by Intel® Corporation). In some examples, one(s) of the servers 2908, 2910, 2912 can include circuitry customized, configured, and/or otherwise optimized to execute computing or compute workload tasks. For example, the one(s) of the servers 2908, 2910, 2912 can include circuitry such as ASICs, FPGAs, etc., and/or any combination(s) thereof.

In example operation, the RRU 2904 can obtain example wireless data 2914, 2916, 2918 from the UEs 2902 via the antenna panels 2906. For example, the RRU 2904 can obtain example carrier data 2914, example auxiliary data 2916, and example SRS data 2918. The RRU 2904 can transmit, deliver, and/or otherwise provide the wireless data 2914, 2916, 2918 to one(s) of the servers 2908, 2910, 2912. The location engine circuitry 140 can obtain the wireless data 2914, 2916, 2918 from the one(s) of the servers 2908, 2910, 2912. The location engine circuitry 140 can determine example locations 2920 of respective ones of the UEs 2902 based on the wireless data 2914, 2916, 2918. For example, the location engine circuitry 140 can execute and/or instantiate the ML model(s) 496 of FIG. 4 using the wireless data 2914, 2916, 2918, or portion(s) thereof, as ML input(s) to generate ML output(s), which can include, be representative of, and/or otherwise correspond to the locations 2920.

Figure 30:
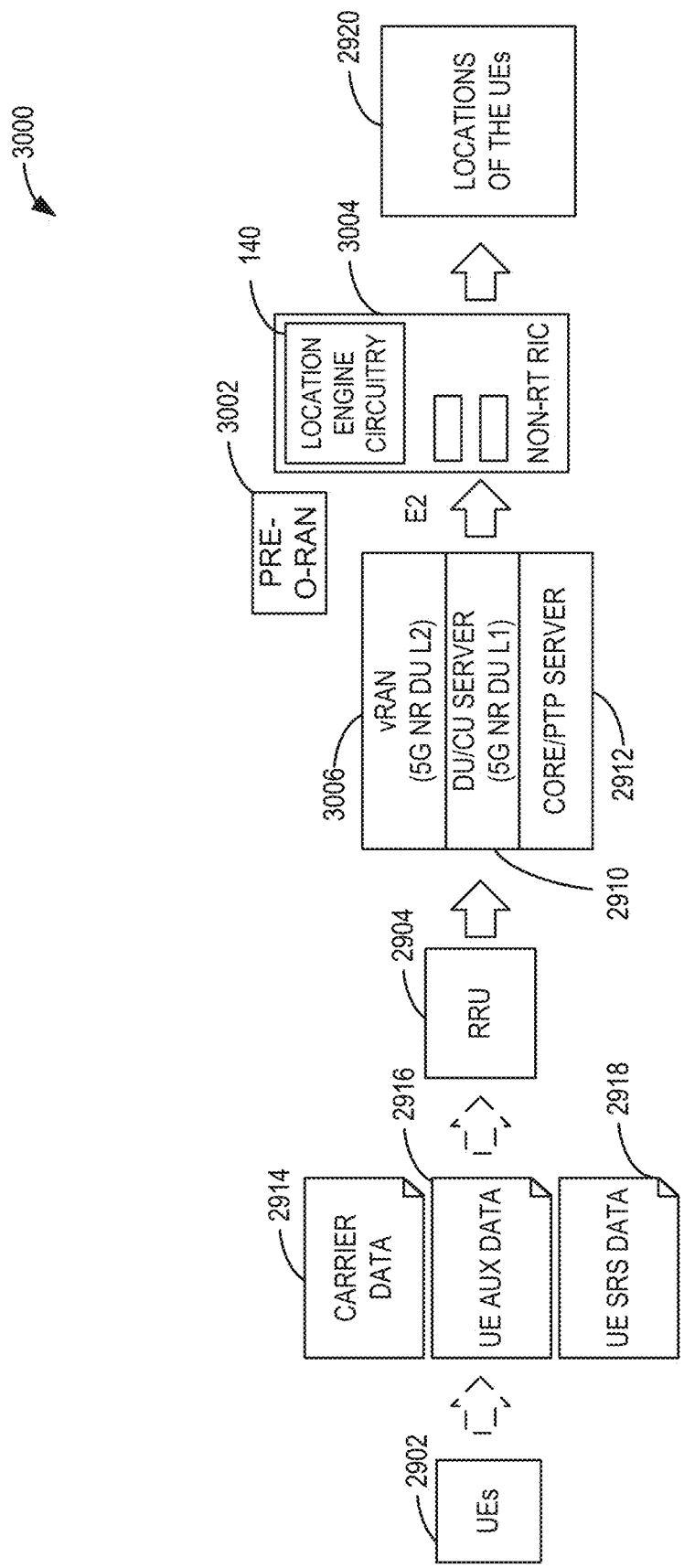
FIG. 30 is a block diagram of a second example workflow to determine a location of a device and/or an object in a terrestrial environment.

FIG. 30 is a block diagram of a second example workflow 3000 to determine a location of a device and/or an object in a terrestrial environment. The second workflow 3000 includes the UE 2902, the RRU 2904, the one or more second servers 2910, the one or more third servers 2912, the wireless data 2914, 2916, 2918, and the locations 2920 of FIG. 29. The second workflow 3000 includes the location engine circuitry 140 of FIGS. 1 and/or 4. The second workflow 3000 includes an example pre-O-RAN 3002, an example non-real-time RIC (non-RT RIC) 3004, and one or more example fourth servers 3006. In this example, the one or more fourth servers 3006 are 5G NR DU L2 servers, which can implement a vRAN protocol (e.g., FLEXRAN™ protocol provided by Intel® Corporation). In this example, the non-RT RIC 3004 includes the location engine circuitry 140.

In example operation, the RRU 2904 can obtain the wireless data 2914, 2916, 2918 from the UEs 2902. The RRU 2904 can transmit, deliver, and/or otherwise provide the wireless data 2914, 2916, 2918 to one(s) of the servers 2910, 2912, 3006. The location engine circuitry 140 of the non-RT RIC 3004 can obtain the wireless data 2914, 2916, 2918 from the one(s) of the servers 2910, 2912, 3006. The location engine circuitry 140 can determine the locations 2920 of respective ones of the UEs 2902 based on the wireless data 2914, 2916, 2918. For example, the location engine circuitry 140 can execute and/or instantiate the ML model(s) 496 of FIG. 4 using the wireless data 2914, 2916, 2918, or portion(s) thereof, as ML input(s) to generate ML output(s), which can include the locations 2920.

Figure 31A:
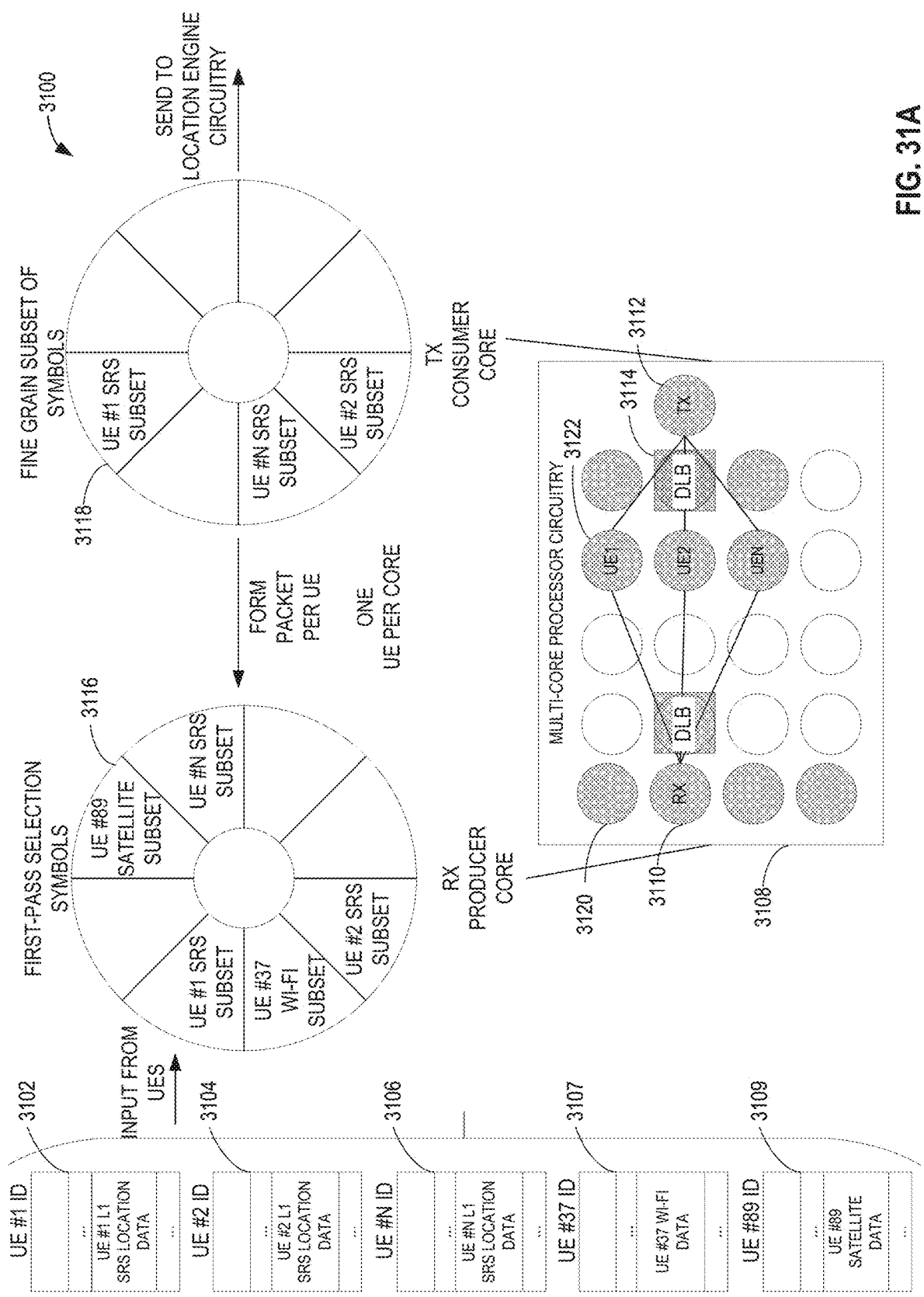
FIG. 31A is a block diagram of a third example workflow to determine a location of a device and/or an object in a terrestrial environment using dynamic load balancers.

FIG. 31A is a block diagram of a third example workflow 3100 to determine a location of a device and/or an object in a terrestrial environment. The third workflow 3100 includes example UE data 3102, 3104, 3106, 3107, 3109 and example multi-core processor circuitry 3108. The UE data 3102, 3104, 3106, 3107, 3109 includes first example UE data 3102 generated by a first UE having a first UE identifier (identified by UE #1 ID), second example UE data 3104 generated by a second UE having a second UE identifier (identified by UE #2 ID), third example UE data 3106 generated by a third UE having a third UE identifier (identified by UE #N ID), fourth example UE data 3107 generated by a fourth UE having a fourth UE identifier (identified by UE #37 ID), and fifth example UE data 3109 generated by a fifth UE having a fifth UE identifier (identified by UE #89 ID). For example, the first through third UE data 3102, 3104, 3106 can include L1 SRS location data, the fourth UE data 3107 can include Wi-Fi data, and the fifth UE data 3109 can include satellite data (e.g., GEO/GNSS data, LEO satellite data, etc.). Advantageously, the UE data 3102, 3104, 3106, 3107, 3109 can implement multi-spectrum, multi-modal data as disclosed herein (e.g., the multi-spectrum, multi-modal data 494 of FIG. 4). Additionally or alternatively, there may be fewer or more types and/or instances of UE data than depicted in the illustrated example.

In some examples, the multi-core processor circuitry 3108 can be implemented by a CPU, a DSP, a GPU, an FPGA, an Infrastructure Processing Unit (IPU), network interface circuitry (NIC) (e.g., a smart NIC), an XPU, etc., or any other type of processor circuitry. The multi-core processor circuitry 3108 includes a plurality of example cores 3110, 3112 including an example receive (RX) core 3110 and an example transmitter (TX) core 3112. The multi-core processor circuitry 3108 includes example dynamic load balancer (DLB) circuitry 3114. In some examples, the DLB circuitry 3114 can be implemented by a Dynamic Load Balancer provided by INTEL® Corporation of Santa Clara, California.

In some examples, the DLB circuitry 3114 can dynamically balance workload(s) across one(s) of one or more second example cores 3122. In some examples, one or more instances of the DLB circuitry 3114 can be included in respective ones of the cores 3110, 3112. For example, a core of the multi-core processor circuitry 3108 can include one or more instances of the DLB circuitry 3114 in an uncore region associated with the core. In some examples, the RX core 3110 can implement a first example ring buffer 3116. In some examples, the TX core 3112 can implement a second example ring buffer 3118.

In example operation, one or more first example cores 3120 including the RX core 3110 can receive the UE data 3102, 3104, 3106, 3107, 3109 from UEs. In some examples, the UE data 3102, 3104, 3106, 3107, 3109 can be cleartext, ciphertext, etc. In some examples, the UE data 3102, 3104, 3106, 3107, 3109 can be transmitted in 512 byte packets. Alternatively, the UE data 3102, 3104, 3106, 3107, 3109 may be transmitted in any other byte sized packets and/or data forma. The one or more first cores 3120 can extract data of interest (e.g., extract subset(s) or portion(s) of the data) from the UE data 3102, 3104, 3106, 3107, 3109, such as the L1 SRS location data, Wi-Fi bit stream data, satellite bit stream data, etc. In some examples, the one or more first cores 3120 can store the extracted data in the first ring buffer 3116. For example, the one or more first cores 3120 can extract L1 SRS location data from the first UE data 3102 and insert the extracted L1 SRS location data into the first ring buffer 3116. In some examples, the one or more first cores 3120 can extract Wi-Fi data (e.g., a bit stream, an IP address, a MAC address, etc.) from the fourth UE data 3107 and insert the extracted Wi-Fi data into the first ring buffer 3116. Advantageously, the RX core 3110 can extract subset(s) of incoming data based on a spectrum and/or a type of UE of the UE data 3102, 3104, 3106, 3107, 3109.

In example operation, the one or more first cores 3120 can generate queue events corresponding to respective ones of the UE data 3102, 3104, 3106, 3107, 3109. For example, the one or more first cores 3120 can generate a first queue event including the first UE identifier, a second queue event including the second UE identifier, and a third queue event including the third UE identifier. In some examples, the queue events can be implemented by an array of data. Alternatively, the queue events may be implemented by any other data structure. In some examples, the queue events can include data pointers that reference respective locations in memory at which the UE data 3102, 3104, 3106, 3107, 3109 is stored. For example, the first queue event can include a first data pointer that corresponds to a memory address, a range of memory addresses, etc., at which the first UE data 3102, or portion(s) thereof, are stored. The one or more first cores 3120 can enqueue the first through third queue events into the DLB circuitry 3114. For example, the one or more first cores 3120 can enqueue the first through third queue events into hardware-managed queues (e.g., portion(s) of memory). In some examples, the DLB circuitry 3114 can select one of the identifiers to process based on a priority value, which may be included in the queue events.

In example operation, the DLB circuitry 3114 can dequeue the first through third queue events to one or more of the second cores 3122 (cores identified by UE1, UE2, UEN), which can implement worker cores. The one or more second cores 3122 can execute computational task(s), operation(s), etc., on the UE data 3102, 3104, 3106, 3107, 3109 associated with the respective dequeued queue events. For example, the one or more second cores 3122 can execute a cryptographic, encryption, etc., task (e.g., an IPsec task) on the UE data 3102, 3104, 3106, 3107, 3109. In response to completing the task(s), the one or more second cores 3122 can enqueue the queue events back to the DLB circuitry 3114. For example, the DLB circuitry 3114 can reorder and/or otherwise re-assemble the UE data 3102, 3104, 3106, 3107, 3109 (e.g., data packets that include and/or otherwise implement the UE data 3102, 3104, 3106, 3107, 3109). In example operation, the DLB circuitry 3114 can dequeue the queue events to the TX core 3112, which can cause the TX core 3112 to transmit the reordered and/or reassembled data packets (e.g., encrypted data packets) to different hardware, software, and/or firmware. In some examples, the TX core 3112 can provide the data packets to the second ring buffer 3118. In some examples, the data included in the second ring buffer 3118 can include less data than data originally inserted in the first ring buffer 3116. For example, UE #1 SRS data in the first ring buffer 3116 can include a first quantity of L1 SRS location data (e.g., a first number of parameters, a first number of bits, etc.) and UE #1 SRS subset in the second ring buffer 3118 can include a second quantity of L1 SRS location data less than the first quantity.

In some examples, the TX core 3112 can transmit the data packets from the second ring buffer 3118 to the location engine circuitry 140 of FIGS. 1 and/or 4. For example, the location engine circuitry 140 can execute the ML model(s) 496 of FIG. 4 utilizing the data packets as ML input(s) to generate ML output(s), which can include locations of the UEs that generated the UE data 3102, 3104, 3106, 3107, 3109. In some examples, the TX core 3112 can provide the data packets from the second ring buffer 3118 to the first ring buffer 3116. For example, the data packets can be provided from the first ring buffer 3116 to the UEs that generated the UE data 3102, 3104, 3106, 3107, 3109.

Figure 31B:
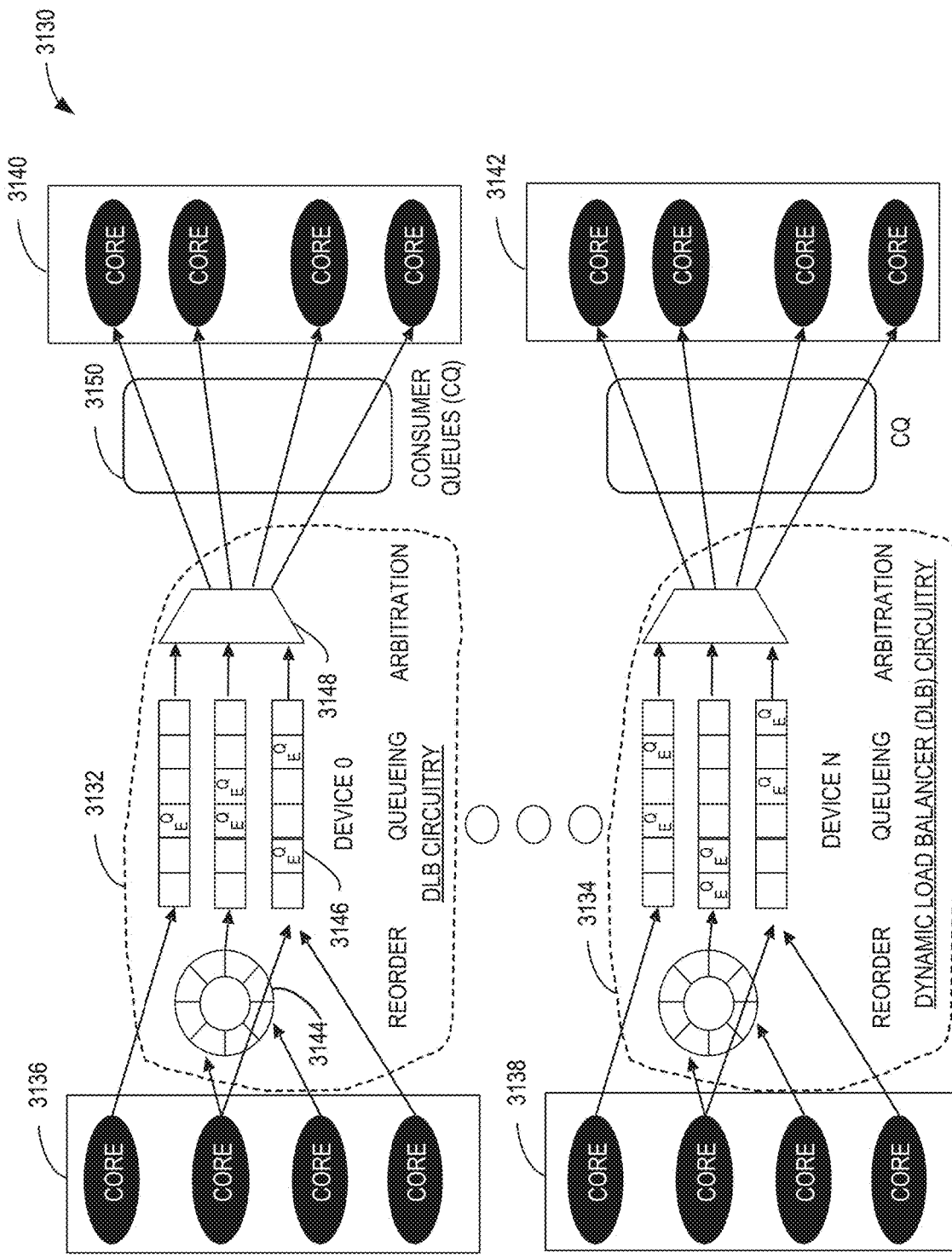
FIG. 31B is an example workflow to enqueue and/or dequeue data using the dynamic load balancers of FIG. 31A.

FIG. 31B is an example workflow 3130 to enqueue and/or dequeue data using the dynamic load balancers of FIG. 31A. The workflow 3130 of the illustrated example of FIG. 31B includes first example DLB circuitry 3132 and second example DLB circuitry 3134. In some examples, the first DLB circuitry 3132 and/or the second DLB circuitry 3134 can implement the DLB circuitry 3114 of FIG. 31. In some examples, the first DLB circuitry 3132 and/or the second DLB circuitry 3134 can implement the parser circuitry 420 of FIG. 4, or portion(s) thereof. In some examples, the first DLB circuitry 3132 and/or the second DLB circuitry 3134 can implement the first ring buffer 3116 and/or the second ring buffer 3118 of FIG. 31A.

The workflow 3130 of the illustrated example includes first example producer cores 3136 and second example producer cores 3138 that are in communication with a respective one of the DLB circuitry 3132, 3134. For example, the first producer cores 3136 and/or the second producer cores 3138 can be cores of multi-core processor circuitry as disclosed herein, such as the one or more first cores 3120 and/or the RX core 3110 of the multi-core processor circuitry 3108 of FIG. 31A. In this example, first example consumer cores 3140 and second example consumer cores 3142 are in communication with a respective one of the DLB circuitry 3132, 3134. For example, the first consumer cores 3140 and/or the second consumer cores 3142 can be cores of multi-core processor circuitry as disclosed herein, such as the one or more second cores 3122 of the multi-core processor circuitry 3108 of FIG. 31A.

In some examples, fewer or more than instances of the DLB circuitry 3132, 3134 and/or fewer or more than the producer cores 3136, 3138 and/or consumer cores 3140, 3142 depicted in the illustrated example may be used. In this example, there is no cross-device arbitration (e.g., DEVICE 0 does not arbitrate for DEVICE N), however, in other examples, there may be cross-device arbitration.

In some examples, the DLB circuitry 3132, 3134 correspond to a hardware-managed system of queues (e.g., hardware-implemented queues, hardware-implemented data queues, etc.) and arbiters (e.g., hardware-implemented arbiters) that link the producer cores 3136, 3138 and the consumer cores 3140, 3142. In some examples, one or both of the DLB circuitry 3132, 3134 can be a PCI or PCI-E device in processor circuitry. For example, one or both of the DLB circuitry 3132, 3134 can be an accelerator (e.g., a hardware accelerator) included either in processor circuitry or in communication with the processor circuitry.

The DLB circuitry 3132, 3134 of the illustrated example includes example reorder logic circuitry 3144, example queueing logic circuitry 3146, and example arbitration logic circuitry 3148. In this example, the reorder logic circuitry 3144, the queuing logic circuitry 3146, and/or the arbitration logic circuitry 3148 can be implemented with hardware. In some examples, the reorder logic circuitry 3144, the queuing logic circuitry 3146, and/or the arbitration logic circuitry 3148 can be implemented by hardware, software, firmware and/or any combination of hardware, software and/or firmware. In some examples, the reorder logic circuitry 3144, the queueing logic circuitry 3146, and/or the arbitration logic circuitry 3148 can implement the first ring buffer 3116 of FIG. 31A. In some examples, the reorder logic circuitry 3144, the queueing logic circuitry 3146, and/or the arbitration logic circuitry 3148 can implement the second ring buffer 3118 of FIG. 31A.

In example operation, the reorder logic circuitry 3144 can obtain data from one or more of the producer cores 3136, 3138 and facilitate reordering operations. For example, the reorder logic circuitry 3144 can inspect a data pointer from one of the producer cores 3136, 3138. In some examples, the data pointer can be associated with wireless data, or portion(s) thereof. For example, the data pointer can reference a UE identifier, such as UE #1 of FIG. 31A, and/or, more generally, wireless data associated with the UE identifier. In some examples, the reorder logic circuitry 3144 can determine that the data pointer is associated with a known data sequence. In some examples, the producer cores 3136, 3138 can enqueue the data pointer with the queueing logic circuitry 3146 because the data pointer is not associated with a known data flow and may not be needed to be reordered and/or otherwise processed by the reorder logic circuitry 3144.

In some examples, the reorder logic circuitry 3144 stores the data pointer and other data pointers associated with data packets in the known data flow in a buffer (e.g., a ring buffer, a first-in first-out (FIFO) buffer, etc.) until a portion of or an entirety of the data pointers in connection with the known data flow are obtained and/or otherwise identified. The reorder logic circuitry 3144 can transmit the data pointers to one or more of the queues maintained by the queueing logic circuitry 3146 to maintain an order of the known data sequence. For example, the queues can store the data pointers as queue elements (QEs).

The queueing logic circuitry 3146 of the illustrated example implements a plurality of queues (e.g., hardware-implemented queues, hardware-implemented data queues, etc.) or buffers (e.g., hardware-implemented buffers, hardware-implemented data buffers, etc.) to store data pointers or other information. In some examples, the queueing logic circuitry 3146 transmits data pointers in response to filling an entirety of the queue(s). In some examples, the queueing logic circuitry 3146 transmits data pointers from one or more of the queues to the arbitration logic circuitry 3148 on an asynchronous or synchronous basis.

In some examples, the arbitration logic circuitry 3148 can be configured and/or instantiated to perform an arbitration by selecting a given one of the consumer cores 3140, 3142. For example, the arbitration logic circuitry 3148 can implement one or more arbiters, sets of arbitration logic circuitry (e.g., first arbitration logic circuitry, second arbitration logic circuitry, etc.), etc., where each of the one or more arbiters, each of the sets of arbitration logic circuitry, etc., can correspond to a respective one of the consumer cores 3140, 3142. In some examples, the arbitration logic circuitry 3148 is based on consumer readiness (e.g., a consumer core having space available for an execution or completion of a task), task availability, etc. In example operation, the arbitration logic circuitry 3148 transmits and/or otherwise facilitates a passage of data pointers from the queueing logic circuitry 3146 to example consumer queues 3150.

In example operation, the consumer cores 3140, 3142 are in communication with the consumer queues 3150 to obtain data pointers for subsequent processing. In some examples, a length (e.g., a data length) of one or more of the consumer queues 3150 are programmable and/or otherwise configurable. In some examples, the DLB circuitry 3132, 3134 generate an interrupt (e.g., a hardware interrupt) to one(s) of the consumer cores 3140, 3142 in response to a status, a change in status, etc., of the consumer queues 3150. Responsive to the interrupt, the one(s) of the consumer cores 3140, 3142 can retrieve the data pointer(s) from the consumer queues 3150.

The DLB circuitry 3132, 3134 of the illustrated example can check a status (e.g., full, not full, not empty, etc.) of the consumer queues 3150. In some examples, the DLB circuitry 3132, 3134 can track fullness of the consumer queues 3150 by observing enqueues on an associated producer port (e.g., a hardware port) of the DLB circuitry 3132, 3134. For example, in response to each enqueueing, the DLB circuitry 3132, 3134 can determine that a corresponding one of the consumer cores 3140, 3142 has completed work on a QE and, thus, a location of the QE is now available in the queues maintained by the queuing logic circuitry 3146. For example, a format of the QE can include a bit (e.g., a data bit) that is indicative whether a consumer queue token, which can represent a location of the QE in the consumer queues 3150, is being returned. In some examples, new enqueues that are not completions of prior dequeues do not return consumer queue tokens because there is no associated entry in the consumer queues 3150.

Figure 31C:
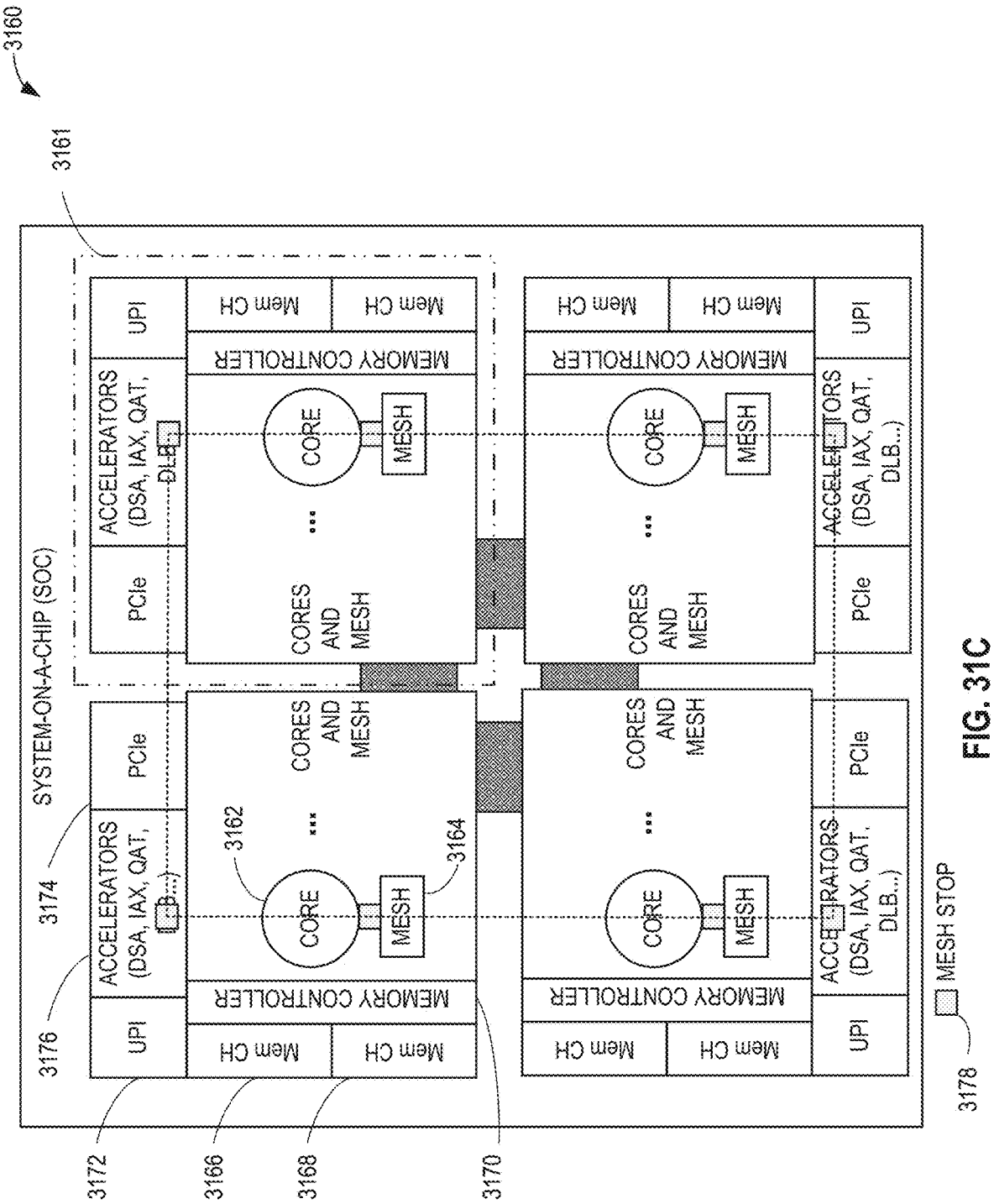
FIG. 31C depicts an example implementation of the dynamic load balancers of FIG. 31A and/or FIG. 31B.

FIG. 31C depicts an example implementation of the DLB circuitry 3114 of FIG. 31A and/or the DLB circuitry 3132, 3134 of FIG. 31B. The illustrated example of FIG. 31C depicts a first example system-on-a-chip (SoC) 3160. For example, the first SoC 3160 can be processor circuitry implemented by a semiconductor package including a plurality of example semiconductor tiles (or dies) 3161. In some examples, the first SoC 3160 can implement the DLB circuitry 3114 of FIG. 31A, the first DLB circuitry 3132 of FIG. 31B, and/or the second DLB circuitry 3134 of FIG. 31B. The first SoC 3160 includes a plurality of example cores 3162, example mesh circuitry (e.g., mesh fabric circuitry) 3164, example memory channels 3166, 3168, example memory controllers 3170, Ultra Path Interconnects (UPIs) 3172, example PCIe interconnects 3174, example accelerators 3176, and example mesh stops 3178.

The accelerators 3176 of the illustrated example can be implemented by one or more Data Streaming Accelerators (DSAs) (e.g., one or more DSAs provided by Intel®), one or more Analytics Accelerators (e.g., one or more Intel Analytics Accelerators (IAX) provided by Intel®), one or more QuickAssist Technology (QAT) accelerators (e.g., one or more QAT accelerators provided by Intel®), and/or one or more instances of DLB circuitry as disclosed herein, etc. In some examples, the accelerators 3176 can be implemented by the DLB circuitry 3114 of FIG. 31A, the first DLB circuitry 3132 of FIG. 31B, and/or the second DLB circuitry 3134 of FIG. 31B. For example, the DLB circuitry of the accelerators 3176 can implement uncore accelerators because the DLB circuitry is in an uncore region of the first SoC 3160. Advantageously, in some examples, the cores 3162 can offload scheduling tasks to the DLB circuitry of the accelerators 3176 to increase the availability of the cores 3162 for other high-value added application workload processing, such as AI/ML application workload processing.

Figure 31D:
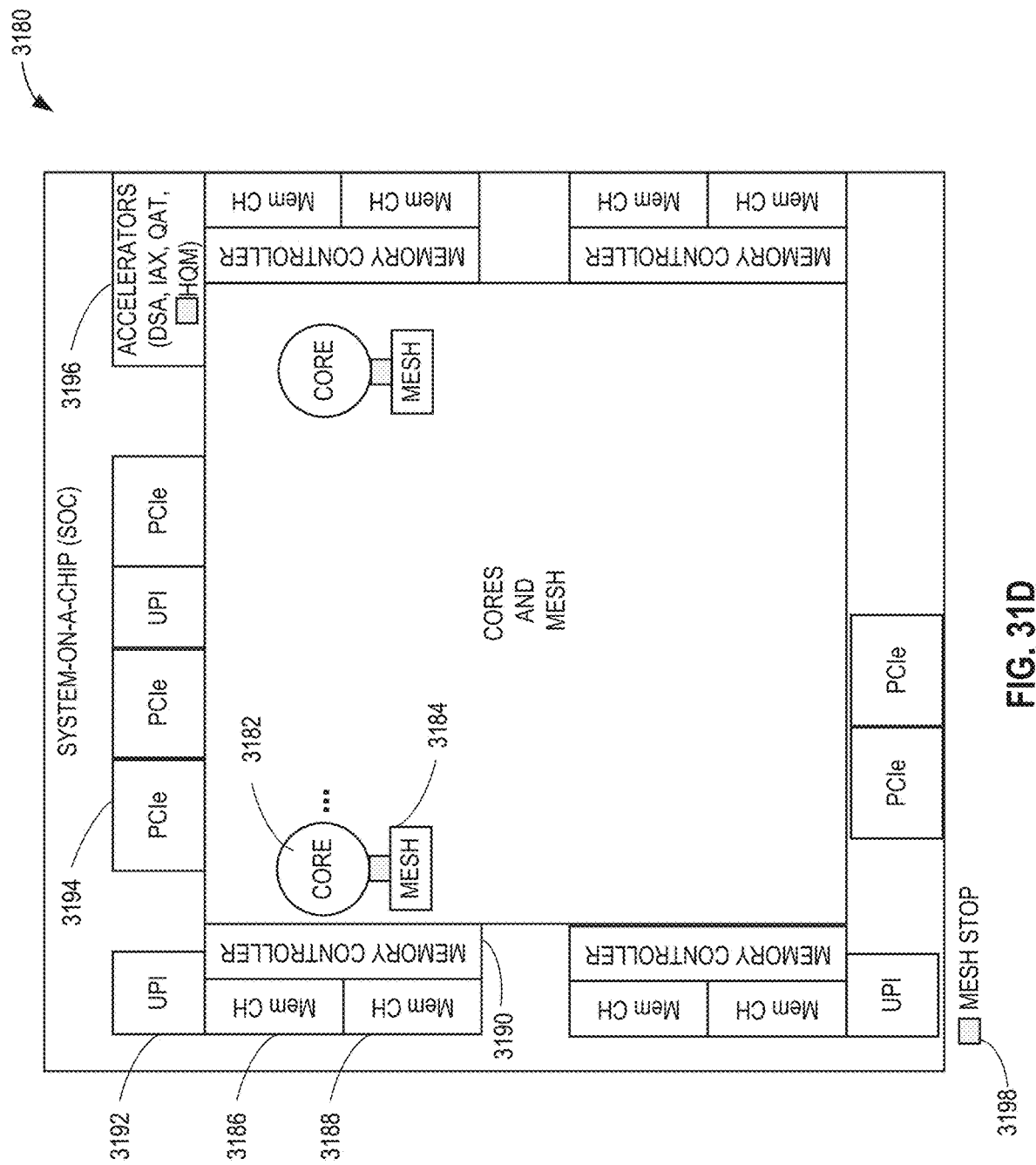
FIG. 31D depicts an example implementation of the dynamic load balancers of FIG. 31A and/or FIG. 31B.

FIG. 31D depicts another example implementation of the DLB circuitry 3114 of FIG. 31A and/or the DLB circuitry 3132, 3134 of FIG. 31B. The illustrated example of FIG. 31D depicts a second example SoC 3180. For example, the second SoC 3180 can be processor circuitry implemented by a semiconductor package, which may be implemented as a single semiconductor tile or die. Alternatively, the second SoC 3180 may be implemented by more than one tile or die. In some examples, the second SoC 3180 can implement the DLB circuitry 3114 of FIG. 31A, the first DLB circuitry 3132 of FIG. 31B, and/or the second DLB circuitry 3134 of FIG. 31B. The second SoC 3180 includes a plurality of example cores 3182, example mesh circuitry (e.g., mesh fabric circuitry) 3184, example memory channels 3186, 3188, example memory controllers 3190, example UPIs 3192, example PCIe interconnects 3194, example accelerators 3196, and example mesh stops 3198.

The accelerators 3196 of the illustrated example can be implemented by one or more DSAs (e.g., one or more DSAs provided by Intel®), one or more Analytics Accelerators (e.g., one or more IAX provided by Intel®), one or more QAT accelerators (e.g., one or more QAT accelerators provided by Intel®), and/or one or more instances of DLB circuitry as disclosed herein. The cores 3182 of the illustrated example share the same one(s) of the accelerators 3196 while one or more of the cores 3162 of FIG. 31C access their own respective accelerators 3176.

In some examples, the accelerators 3196 can be implemented by the DLB circuitry 3114 of FIG. 31A, the first DLB circuitry 3132 of FIG. 31B, and/or the second DLB circuitry 3134 of FIG. 31B. The DLB circuitry of the accelerators 3196 can implement uncore accelerators because the DLB circuitry is in an uncore region of the second SoC 3180. Advantageously, in some examples, the cores 3182, can offload scheduling tasks to the DLB circuitry of the accelerators 3196 to increase the availability of the cores 3182 for other high-value added application workload processing, such as AI/ML application workload processing.

Figure 32:
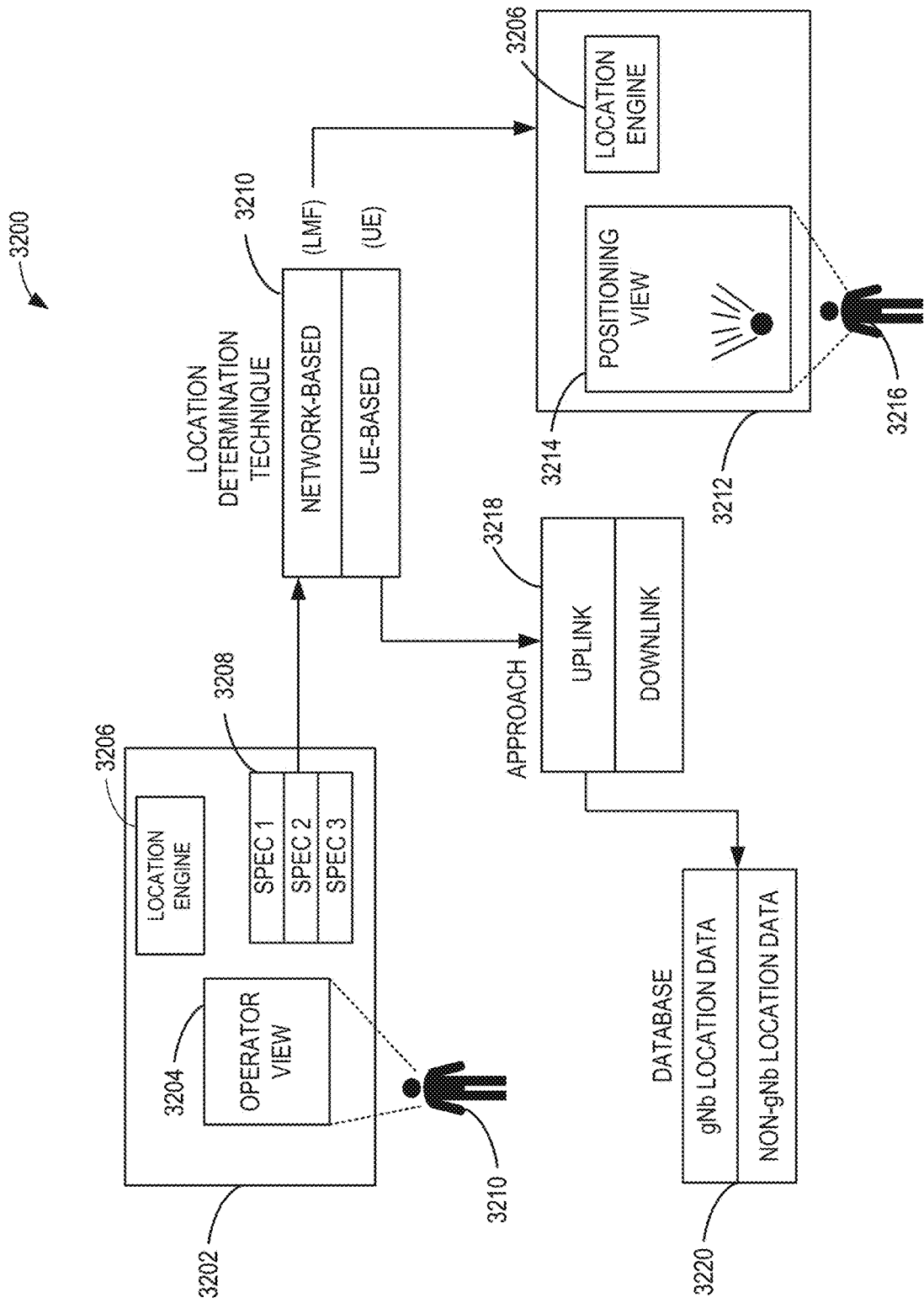
FIG. 32 is an illustration of an example location determination system that may be network based or user-equipment based.

FIG. 32 is an illustration of an example location determination system 3200 that may be network based or user-equipment based. The location determination system 3200 includes a first example application 3202, which includes an example operator view 3204, example location engine 3206, and example specification options 3208 (identified by SPEC 1, SPEC 2, SPEC 3). In some examples, the operator view 3204 can be implemented by a graphical user interface (GUI), which can be accessed by and/or presented to an example user 3210. In some examples, the location engine 3206 can be implemented using the location engine circuitry 140 of FIGS. 1 and/or 4. For example, the location engine 3206 can be hardware, software, and/or firmware. For example, the location engine 3206 can be processor circuitry that executes and/or instantiates machine-readable instructions to launch and/or otherwise execute the application 3202. In some examples, the location engine 3206 is software and/or firmware. In some examples, the specification options 3208 may include a plurality of specification standards, such as the 3GPP standard, the O-RAN standard, etc. In example operation, the user 3210 can select one of the specification options 3208 to which the location engine 3206 can determine and/or identify a location of an object.

In response to a selection of one of the specification options 3208, a location determination technique 3210 is selected. For example, in response to selecting the 3GPP standard from the specification options 3208, the location engine 3206 can be configured and/or transitioned into a mode of operation to use a network-based location determination technique (e.g., a technique based on an LMF). In some examples, in response to selecting an O-RAN standard from the specification options 3208, the location engine 3206 can be configured and/or switched into a mode of operation to use a UE-based location determination technique (e.g., a technique based on UE(s)).

In example operation, the location engine 3206 of the first application 3202 can push the selection to a second example application 3212, which includes the location engine 3206 and an example positioning view 3214. The positioning view 3214 can be implemented by a GUI, which can be accessed by and/or presented to another example user 3216 (or the same user 3210). In some examples, the location engine 3206 can generate the positioning view 3214 based on and/or associated with the location of one or more UEs. For example, the location engine 3206 of the second application 3212 can be configured based on the selection of the one of the specification options 3208.

In example operation, the location engine 3206 of the first application 3202 can push the selection to example telco hardware 3218, which can include one or more RUs, one or more CUs, one or more DUs, one or more core servers, etc., and/or any combination(s) thereof. After configuration of the telco hardware 3218 based on the selection of the one of the specification options 3208, the telco hardware 3218 can query location data from an example database 3220. For example, the telco hardware 3218 can query location data (e.g., gNb location data, non-gNb location data, etc.) that corresponds to the selection of the one of the specification options 3208.

Figure 33:
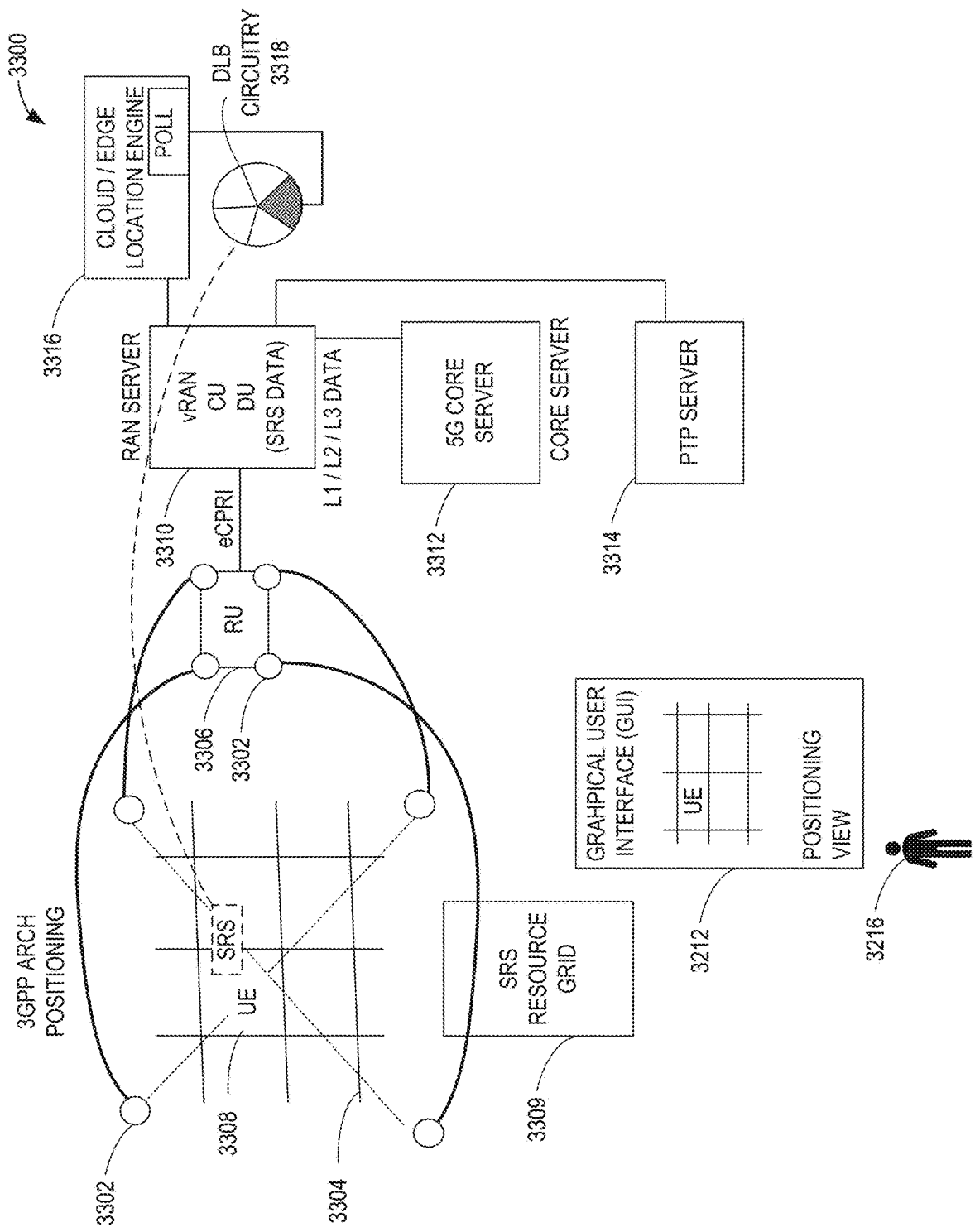
FIG. 33 is an illustration of another example location determination system that may be executed at the Edge and/or an example cloud data center.

FIG. 33 is an illustration of another example location determination system 3300 that may be executed at the Edge and/or an example cloud data center. For example, the location determination system 3300 of FIG. 33 can implement the example location determination system 3200 of FIG. 32, or portion(s) thereof. In the illustrated example, the positioning view 3214 and the user 3216 of FIG. 32 are depicted.

In the illustrated example, example antennas 3302 of an example MIMO antenna (e.g., a MIMO antenna array, a Massive MIMO Antenna (mMIMO), etc.) 3304 of an example RU 3306 receive location data associated with an example UE 3308. For example, the RU 3306 can generate an example SRS resource grid 3309, in accordance to scheduling request(s) from gNB, based on the location data.

The RU 3306 can provide the data necessary for location calculations, or portion(s) thereof, to at least one of an example RAN server 3310, which can be implemented by at least one of a vRAN, a CU, or a DU. The RAN server 3310 can provide a portion of the data used for location calculations, which can include SRS data, to at least one of the location engine 3206 of FIG. 32, an example 5G core server 3312, an example PTP server 3314, or an example data center 3316, which can be implemented by a cloud data center or an edge data center. In some examples, the data center 3316 can implement a cloud and/or edge-based location engine, which can correspond to the location engine circuitry 140 of FIGS. 1 and/or 4. In some examples, the PTP server 3314 can carry out, execute, and/or otherwise effectuate the PTP, which is a protocol that can be used to synchronize clocks throughout a network (e.g., a telco network, a cellular network, etc.). In some examples, the PTP server 3314 can achieve clock accuracy in the sub-microsecond range.

The RAN server 3310 can be communicatively coupled to the RU 3306 via an eCPRI, which is an interface that can be utilized to split up the baseband functions to reduce data traffic strain on a communication channel. For example, the RAN server 3310 can receive location data from the RU 3306 via an eCPRI interface. The RAN server 3310 can extract SRS data (e.g., SRS data specific to a particular UE) from the location data by using example DLB circuitry 3318 to reduce a number of memory copies (e.g., copy memory block instructions (memcpy) in a programming language such as C language). In some examples, the RAN server 3310 can extract SRS data from the location data using the DLB circuitry 3318 to increase and/or improve efficiency and throughput while decreasing and/or reducing latency in connection with processing the location data. In some examples, the DLB circuitry 3318 corresponds to the DLB circuitry 3114 of FIG. 31A. In some examples, the location engine 3206 of FIG. 32 can be implemented using the DLB circuitry 3318 and/or other associated hardware, software, and/or firmware. In some examples, the DLB circuitry 3318 can enqueue pointers to location data associated with the UE 3308 to the data center 3316 to cause the data center 3316 to retrieve the location data at a memory location referenced by the pointer. The data center 3316 can determine a location of the UE 3308 based on the location data. The data center 3316 can provide an indication of the completion of the location determination to the DLB circuitry 3318. The DLB circuitry 3318 can dequeue the pointer in response to receiving the indication. In the illustrated example, after the location determination of the UE 3308, the RAN server 3310 can provide and/or otherwise output the location determination to the positioning view 3214, which can implement a GUI that depicts the location of the UE 3308.

Figure 34:
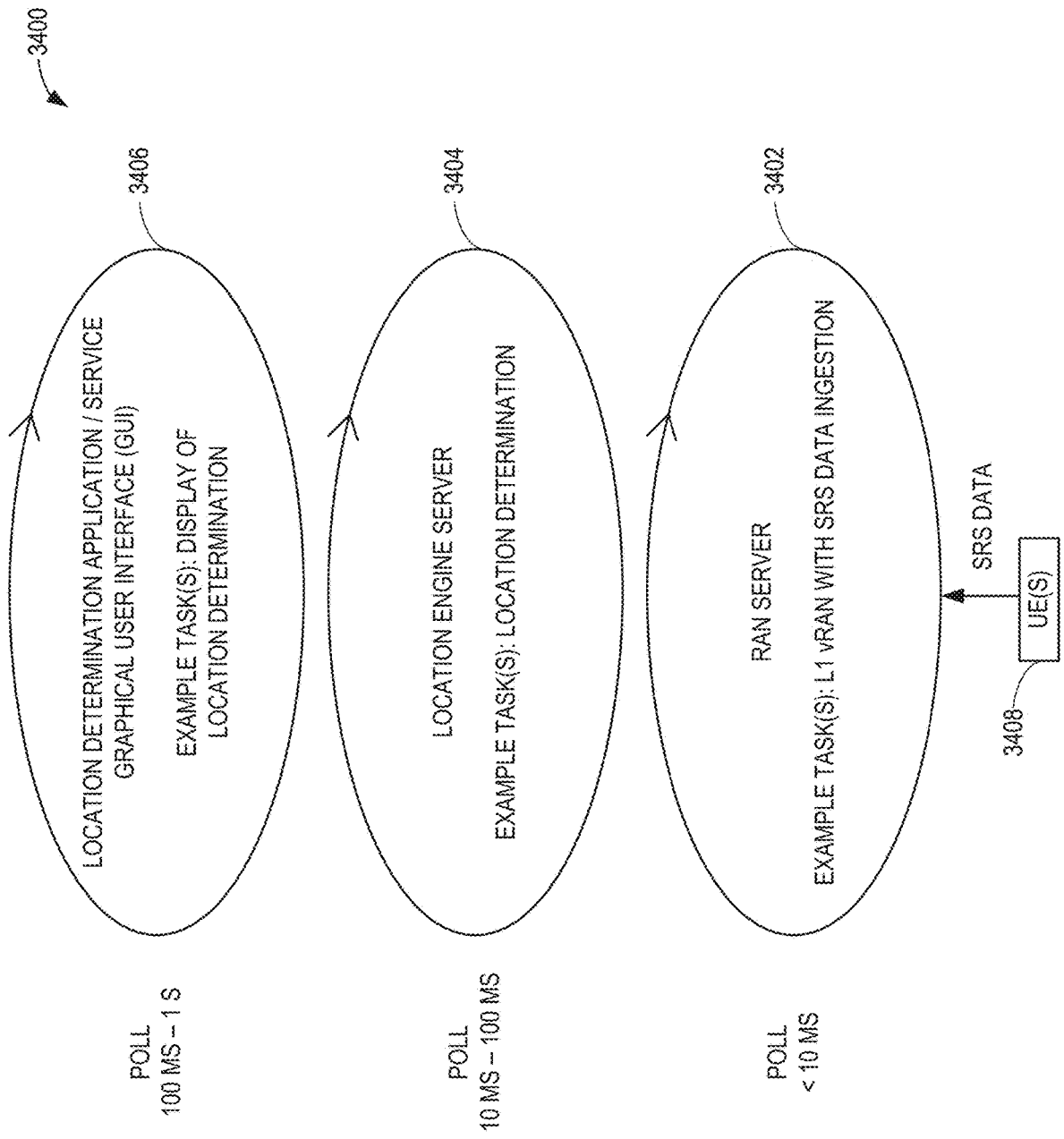
FIG. 34 is an illustration of an example location determination model.

FIG. 34 is an illustration of an example location determination model 3400. The location determination model 3400 includes a first example model layer 3402, a second example model layer 3404, and a third example model layer 3406. In some examples, the first model layer 3402 can be implemented using an example RAN server as disclosed herein. For example, the RAN server can be a VRAN that implements FLEXRAN™ protocol provided by Intel® Corporation. The RAN server can perform example task(s) such as data ingestion of L1 SRS data from example UE(s) 3408.

In some examples, the second model layer 3404 can be implemented using a location engine server. For example, the second model layer 3404 can be implemented using the location engine circuitry 140 of FIGS. 1 and/or 4 or any other location engine as disclosed herein. In some examples, the third model layer 3406 can be implemented using an application and/or service for location determination. For example, the third model layer 3406 can be implemented using an application/service that executes and/or instantiates a GUI. In some examples, the GUI can receive configuration information (e.g., from a user) to configure the location engine server. In some examples, the GUI can receive data that the RAN server is to provide to the location engine server. In some examples, the GUI can display a location determination associated with an object (e.g., the UE(s) 3408), which can include a location or position of the object.

In the illustrated example, the first model layer 3402 can poll and/or otherwise receive data at a first rate (e.g., a rate in a range of 0-9 ms, less than 10 ms, etc.). In the illustrated example, the second model layer 3404 can poll and/or otherwise receive data at a second rate (e.g., a rate in a range of 10-100 ms). In the illustrated example, the third model layer 3406 can poll and/or otherwise receive data at a third rate (e.g., a rate in a range of 100 ms to 1 second). In the illustrated example, the first rate, the second rate, and the third rate are different from each other. Alternatively, one(s) of the first rate, the second rate, and/or the third rate may be the same.

Figure 35:
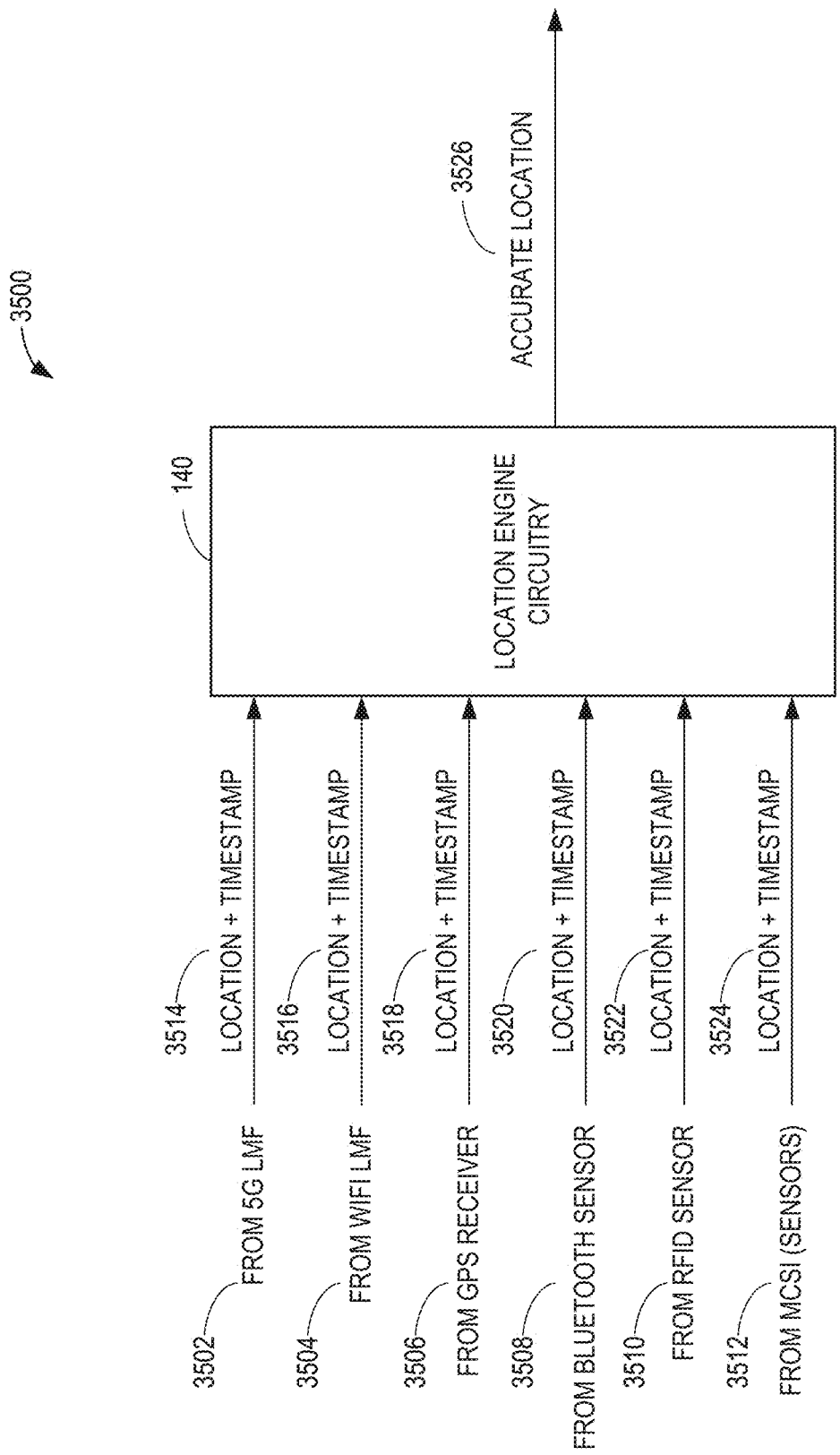
FIG. 35 is a block diagram of another example implementation of the location engine circuitry of FIGS. 1 and/or 4.

FIG. 35 is a block diagram of an example system 3500 including an example implementation of the location engine circuitry 140 of FIGS. 1 and/or 4. The system 3500 includes example data sources (e.g., data producers, UEs, connection technology enabled devices, etc.) 3502, 3504, 3506, 3508, 3510, 3512 including a first example data source 3502, a second example data source 3504, a third example data source 3506, a fourth example data source 3508, a fifth example data source 3510, and a sixth example data source 3512.

The first data source 3502 is a 5G LMF that generates first example data 3514 including location and timestamp data associated with an object being tracked by (or in communication with) the 5G LMF. The second data source 3504 is a Wi-Fi LMF that generates second example data 3516 including location and timestamp data associated with the object being tracked by the Wi-Fi LMF. The third data source 3506 is a GPS receiver that generates third example data 3518 including location and timestamp data associated with the object being tracked by the GPS receiver. The fourth data source 3508 is a Bluetooth sensor (or beacon) that generates fourth example data 3520 including location and timestamp data associated with the object being tracked by the Bluetooth sensor (or beacon). The fifth data source 3510 is an RFID sensor (or beacon) that generates fifth example data 3522 including location and timestamp data associated with the object being tracked by RFID sensor (or beacon). The sixth data source 3512 is a multichannel serial interface (MCSI) device (e.g., a camera) that generates sixth example data 3524 including location and timestamp data associated with the object being tracked by MC SI device.

In the illustrated example, the location engine circuitry 140 can implement a Kalman filter adapted to apply weights based on time and state information associated with one(s) of the data 3514, 3516, 3518, 3520, 3522, 3524, or portion(s) thereof. Alternatively, the location engine circuitry 140 may utilize any other type of model that applies weights based on at least one of time or state information. For example, the location engine circuitry 140 can use a Gauss-Newton filter, a Kalman-Bucy filter, a Schmidt extended filter, a hidden Markov model, Bayesian estimation, fixed-interval smoothers (e.g., Rauch-Tung-Striebel smoothers, Bryson-Frazier smoothers, etc.), etc.

In example operation, the location engine circuitry 140 can generate an example location 3526 of the object being tracked and/or otherwise monitored by one(s) of the data sources 3502, 3504, 3506, 3508, 3510, 3512. For example, the location engine circuitry 140 can assign an initial set of weights (e.g., values in a range of 0-1 or any other range such as 0.5-1.0) to respective ones of the data sources 3502, 3504, 3506, 3508, 3510, 3512. In some examples, the location engine circuitry 140 can execute and/or instantiate the Kalman filter and adjust one(s) of the weights over time based on time and state information. For example, after a determination that the first data source 3502 has not transmitted data over a time period, the location engine circuitry 140 can utilize the Kalman filter to reduce a weight of the first data source 3502 and/or increase one(s) of the other weights. In some examples, after a determination that the sixth data source 3512 has identified an object of interest, the location engine circuitry 140 can execute and/or instantiate the Kalman filter to increase a weight of the sixth data source 3512 and/or reduce one(s) of the weights. In some examples, in response to a determination that the fifth data source 3510 has pinged the location engine circuitry 140 that an object has triggered an RFID system, the location engine circuitry 140 can execute and/or instantiate the Kalman filter to increase a first weight of the fifth data source 3510 and a second weight of the fourth data source 3508 because the fourth data source 3508 may be associated and/or otherwise correlated with the fifth data source 3510 (e.g., the fourth data source 3508 may be in close proximity to the fifth data source 3510). Additionally or alternatively, the location engine circuitry 140 can execute and/or instantiate the ML model(s) 496 of FIG. 4 using one(s) of the data 3514, 3516, 3518, 3520, 3522, 3524 as ML input(s) to generate ML output(s), which can include the location 3526 of the object.

In some examples, the location engine circuitry 140 can determine the location 3526 based on a policy (e.g., a data driven location policy, a location determination policy, an SLA, etc.). For example, the location engine circuitry 140 can determine that a UE is associated with a policy that includes at least one of location accuracy error (e.g., a tolerance of +/−1 cm location accuracy error in which the UE is to be located, a tolerance of +/−1 m location accuracy error in which the UE is to be located, a tolerance of +/−1% location accuracy error in which the UE is to be located, a tolerance of +/−5% location accuracy error in which the UE is to be located, etc.), a 2D location dimension configuration, a 3D location dimension configuration, or a wall clock response. For example, the location engine circuitry 140 can determine that the policy specifies that a location of a UE is to be determined based on 2D location determination as described above in connection with at least FIG. 14. In some examples, the location engine circuitry 140 can determine that the policy specifies that a location of a UE is to be determined based on 3D location determination as described above in connection with at least FIG. 14. In some examples, the location engine circuitry 140 can determine that the policy specifies a wall clock response, which can correspond to an actual amount of time consumed or taken to perform an activity, an operation, a task, etc. For example, the location engine circuitry 140 can determine that the policy defines a wall clock response associated with a time duration of which the location engine circuitry 140 is to begin and complete a location determination of a UE.

Figure 36:
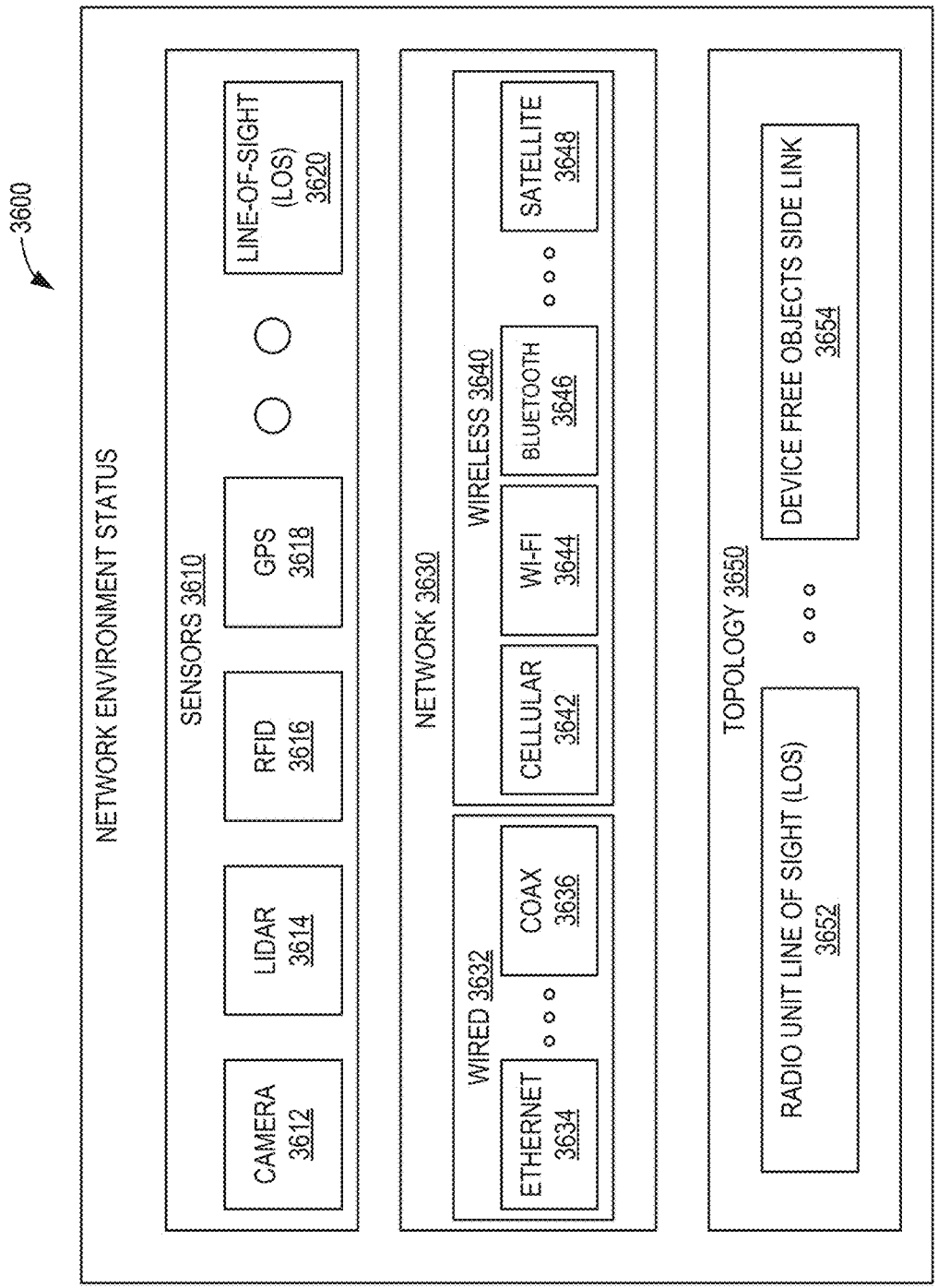
FIG. 36 is a block diagram of an example implementation of network environment status that may be used the example location engine circuitry of FIGS. 1 and/or 4 to determine a location of a device and/or an object.

FIG. 36 is a block diagram of an example implementation of network environment status 3600 that may be used the example location engine circuitry 140 of FIGS. 1 and/or 4 to determine a location of an object. In some examples, the network environment status 3600 can implement a network topology status. In some examples, the location engine circuitry 140 of FIGS. 1 and/or 4, can generate a decision tree (e.g., an AI/ML decision tree, a location determination data source decision tree, etc.) based on the network environment status 3600. For example, the location engine circuitry 140 can generate the decision tree to identify available data sources, producers, etc., of a network environment from which the location engine circuitry 140 can utilize data to determine a location of an object. In some examples, the data sources, producers, etc., may be associated with a network environment of which the object is a part of, such as the network 142, and/or, more generally, the location determination environment 100 of FIG. 1.

In the illustrated example, the network environment status 3600 includes example sensors 3610, an example network 3630, and an example topology 3650. The sensors 3610 can may be representative of and/or otherwise correspond to data from data sources, data producers, etc., such as sensors as disclosed herein. For example, the sensors 3610 can include a camera 3612, a LIDAR system 3614 (or portion(s) thereof), an RFID system 3616 (or portion(s) thereof), a GPS system 3618 (or portion(s) thereof), a LOS system 3620, or portion(s) thereof, etc., and/or any combination(s) thereof. In some examples, the network environment status 3600 can include network connectivity associated with one(s) of the sensors 3610. For example, the LOS system 3620 can include sensor(s) such as radio detection and ranging (RADAR) sensor(s), X-Ray sensor(s), sound navigation and ranging (SONAR) sensor(s), and the like.

The network 3630 of the illustrated example can be representative of and/or otherwise correspond to data from a wired network 3632 or a wireless network 3640. For example, the network 3630 can include data that may be generated through the execution of the wired network 3632 or the wireless network 3640. The wired network 3632 can include an Ethernet network 3634, a coaxial (coax) network 3636, etc., and/or any combination(s) thereof. For example, the network 3630 can be representative of data that may be obtained from the transmission of a data packet using Ethernet protocol, such as an IP source or destination address, an IP source or destination port, Ethernet packet header data, etc. The wireless network 3640 can include a cellular network 3642, a Wi-Fi network 3644, a Bluetooth network 3646, a satellite network 3648 (e.g., one or more GEOs, one or more LEOs, etc., and/or any combination(s) thereof), etc., and/or any combination(s) thereof. For example, the network 1940 may be representative of data that may be obtained from the transmission of a data packet using Wi-Fi, which may include power of a Wi-Fi antenna, a direction of the Wi-Fi antenna, etc. In some examples, the network environment status 3600 can include data representative of network connectivity associated with the wired network 3632, the wireless network 3640, and/or, more generally, the network 3630.

The topology 3650 of the illustrated example can be representative of and/or otherwise correspond to data from a radio unit LOS topology 3652, a device free objects side link topology 3654, etc., and/or any combination(s) thereof. For example, the topology 3650 can be representative of data that can be obtained from a type and/or configuration of a topology of a network, which can include whether one or more devices (e.g., RU(s), CU(s), DU(s), core server(s), PTP server(s), etc.) are powered and/or enabled to receive/transmit data. In some examples, the network environment status 3600 can include network connectivity associated with the radio unit LOS topology 3652, the device free objects side link topology 3654, and/or, more generally, the topology 3650. The illustrated example of FIG. 36 is not exhaustive and any further number and/or types of the sensors 3610, the network 3630, and/or the topology 3650 are contemplated to effectuate the examples described herein.

Figure 37:
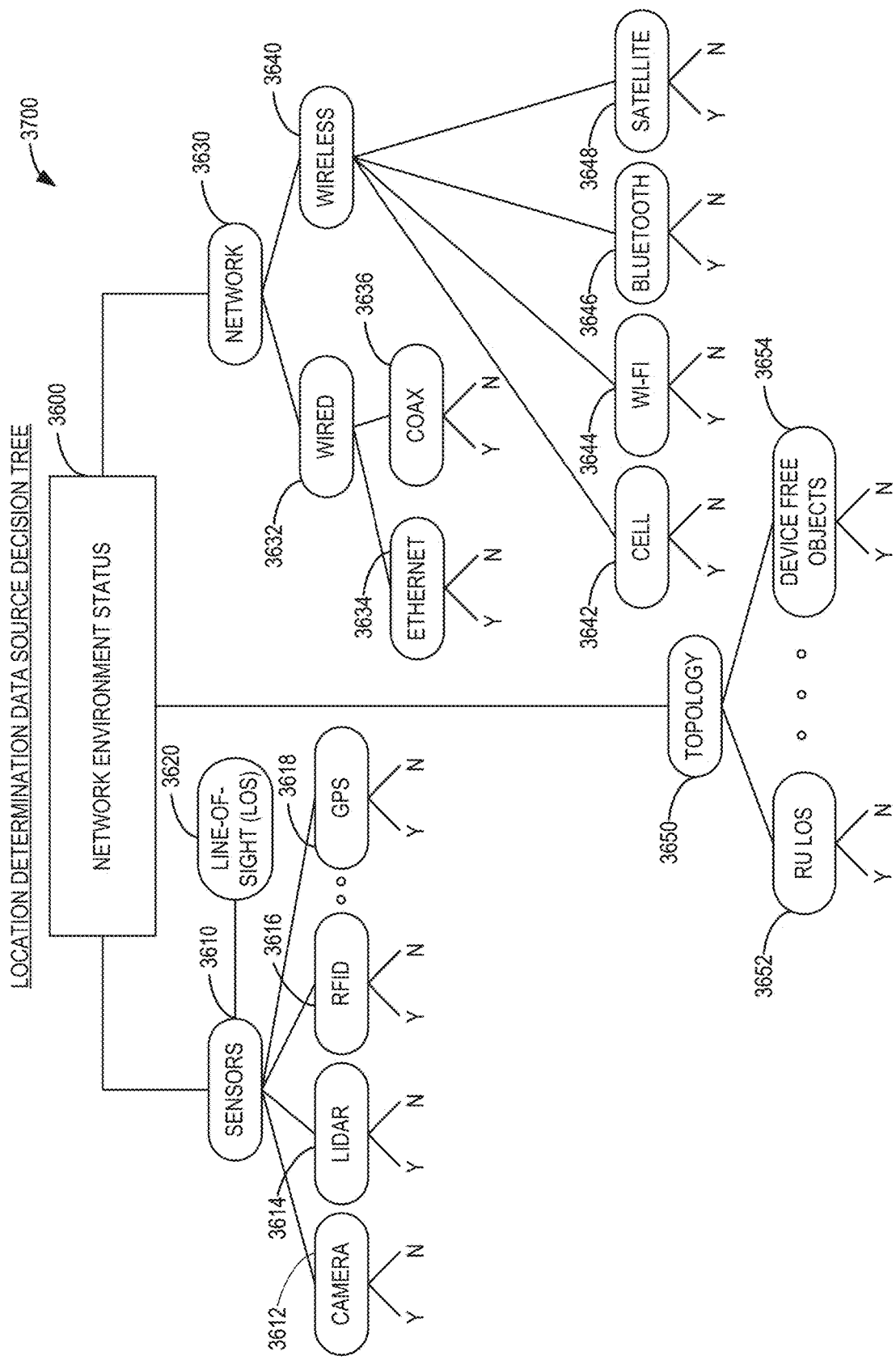
FIG. 37 is an example implementation of a location determination data source decision tree that may be used the example location engine circuitry of FIGS. 1 and/or 4 to determine a location of a device and/or an object.

FIG. 37 is an example implementation of a location determination data source decision tree 3700 that can be used by the example location engine circuitry 140 of FIGS. 1 and/or 4 to determine a location of a device and/or an object. In some examples, a location engine, such as the location engine circuitry 140 of FIGS. 1 and/or 4, can execute, carry out, perform, and/or otherwise implement the location determination data source decision tree 3700. For example, the location engine circuitry 140 can execute and/or instantiate an application and/or service to implement the network environment status 3600 of FIG. 36. For example, the location engine circuitry 140 can invoke the network environment status 3600 to retrieve data associated with the sensors 3610, the network 3630, and/or the topology 3650 of FIG. 36. In some examples, the location engine circuitry 140 can retrieve network connectivity data associated with the sensors 3610, the network 3630, and/or the topology 3650.

In example operation, the location engine circuitry 140 can determine whether at least one of the camera 3612, the LIDAR system 3614, the RFID system 3616, the GPS system 3618, or the LOS system 3620 of FIG. 36 is/are available to provide data to the location engine circuitry 140. For example, the location engine circuitry 140 can determine whether the camera 3612 is powered and/or otherwise enabled in a network environment to which the location engine circuitry 140 has access. In some examples, the location engine circuitry 140 can determine that the camera 3612 is powered on and/or otherwise available to provide data (e.g., identified with a yes 'Y' in the illustrated example) or not available (e.g., identified with a no 'N' in the illustrated example). For example, the location engine circuitry 140 can determine that the camera 3612 is available based on a determination that the camera 3612 has network connectivity to a network. In some examples, the location engine circuitry 140 can determine that the camera 3612 is not available based on a determination that the camera 3612 does not have network connectivity to a network and/or otherwise is not connected to the network.

In example operation, the location engine circuitry 140 can identify one(s) of the data sources as available or not available. For example, the location engine circuitry 140 can identify which nodes are live, powered, enabled, online, etc., at substantially simultaneously at a time when a request for location determination of an object is requested to improve an accuracy of the location determination. In example operation, the location engine circuitry 140 can prune and/or otherwise remove one(s) of the data sources that is/are not available from utilization for location determination. In response to pruning the one(s) of the data sources that is/are not available to provide data for location determination, the location engine circuitry 140 can obtain location data from the available one(s) (or non-pruned one(s)) of the data sources.

Figure 38:
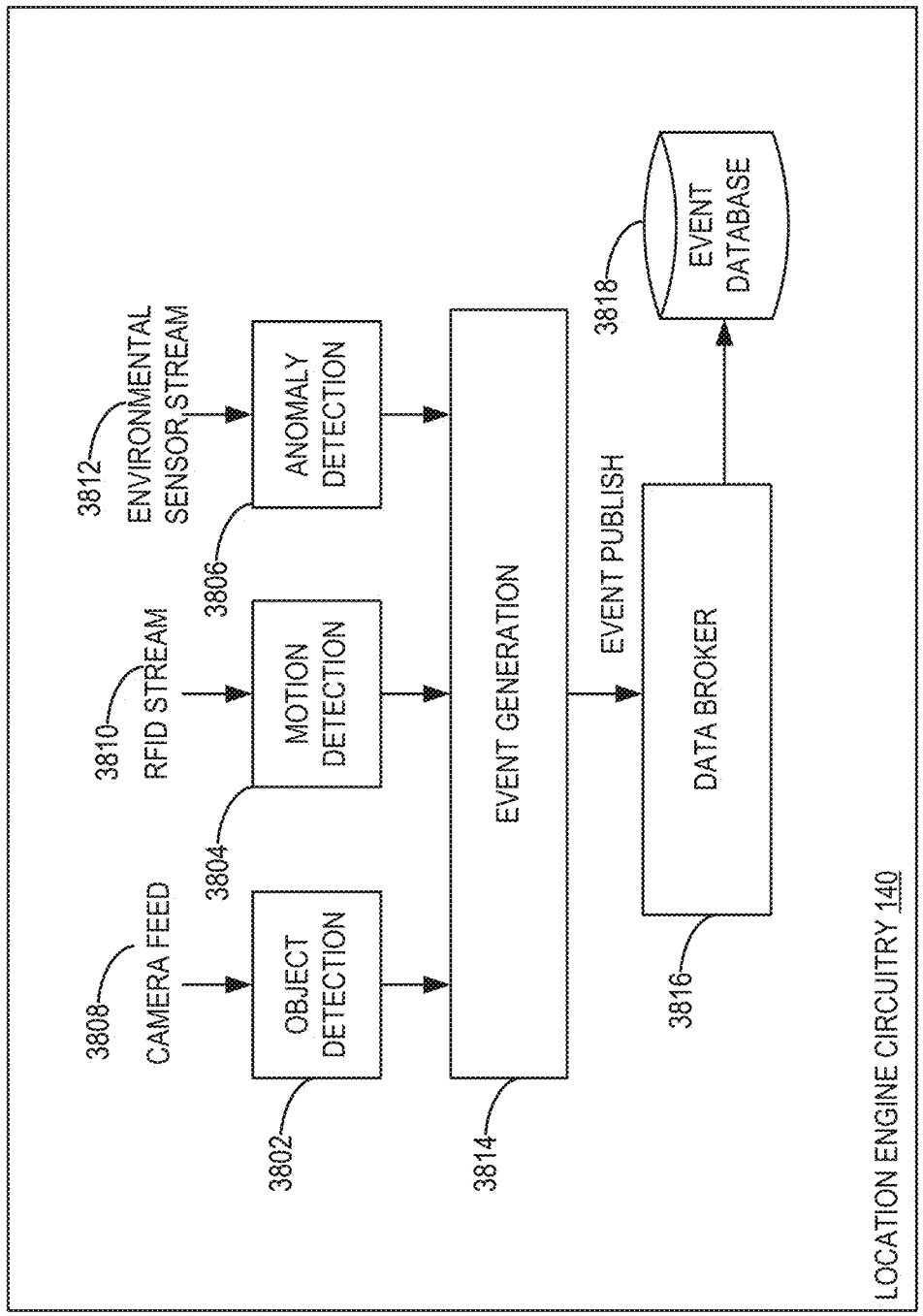
FIG. 38 is a block diagram of another example implementation of the location engine circuitry of FIGS. 1 and/or 4 to execute at least one of object detection, motion detection, or anomaly detection.

FIG. 38 is a block diagram of another example implementation of the location engine circuitry 140 of FIGS. 1 and/or 4 to execute at least one of object detection, motion detection, or anomaly detection. In the illustrated example, the location engine circuitry 140 executes and/or instantiates at least one of object detection 3802 (e.g., generate outputs from object detectors, object detection circuitry, etc.), motion detection 3804 (e.g., generate outputs from motion detectors, motion detection circuitry, etc.), or anomaly detection 3806 (e.g., generate outputs from anomaly detectors, anomaly detection circuitry, etc.) of object(s) in an environment. In some examples, the illustrated example of FIG. 38 can implement passive object data collection in which an infrastructure provides data associated with the object(s).

In the illustrated example, the location engine circuitry 140 can obtain an example camera feed 3808, an example RFID stream 3810, and an example environmental sensor stream 3812. In some examples, the location engine circuitry 140 implements the object detection 3802 with object detection circuitry, the motion detection 3804 with motion detection circuitry, and/or the anomaly detection 3806 with anomaly detection circuitry. For example, the location engine circuitry 140 can detect an object based on the camera feed 3808. In some examples, the location engine circuitry 140 can detect motion of the object based on the RFID stream 3810. In some examples, the location engine circuitry 140 can detect an anomaly condition associated with the object based on the environmental sensor stream 3812, which can include one or more environmental sensors (e.g., moisture, pressure, temperature, etc., sensors).

In the illustrated example, the location engine circuitry 140 can execute and/or instantiate example event generation 3814 with event generation circuitry. For example, the location engine circuitry 140 can generate and/or publish an event indicative of output(s) of at least one of the object detection 3802, the motion detection 3804, or the anomaly detection 3806. For example, discrete sensors like IP cameras, RFID readers, light sensors, temperature sensors, humidity sensors, accelerometers, etc., can feed their data into the event generation 3814, which can include logic specific to the type of sensor generating the data.

In some examples, the events can include and/or otherwise be representative of location and/or direction data or information. In some examples, the events can include only raw sensor data. In some examples, the events can include a detection of a forklift moving right to left by a camera having an identifier of 34. In some examples, the events can include a detection that an RFID tag associated with a forklift having an identifier (e.g., an object identifier) of ABC has moved from Zone X to Zone Y. In some examples, the events can include a determination that a temperature in a hallway having an identifier of 12 has increased by 5 degrees Fahrenheit. In some examples, the events can include a detection that the lights in a room with an identifier of C4 has gone out. In some examples, the event can include a detection of the forklift based on machine-vision techniques of identifying the forklift based on image data (e.g., an image, a picture, a collection of pixels, a point cloud, an infrared representation, etc.) associated with the forklift.

In some examples, the event can include a first indication that the object has been detected, a second indication that the object is in motion (or has moved from a first location to a second location), and/or a third indication that an anomaly condition is present. In some examples, the event can include direction information, location information, etc., associated with the object. In some examples, the events can include sensor data (e.g., raw sensor data). In some examples, the event(s) can include a direction and/or a location of an object in an environment.

In example operation, the location engine circuitry 140 can publish the event to an example data broker 3816, which can be implemented by data broker circuitry. The data broker 3816 can store the events in an example event database 3818, which can be accessed by device(s), application(s), etc. In some examples, the event database 3818 can be implemented by memory and/or one or more mass storage devices. In some examples, the location engine circuitry 140 can implement at least one of the object detection 3802, the motion detection 3804, the anomaly detection 3806, the event generation 3814, or the data broker 3816 by executing and/or instantiating an AI/ML model as disclosed herein, such as the ML model(s) 496 of FIG. 4.

Figure 39:
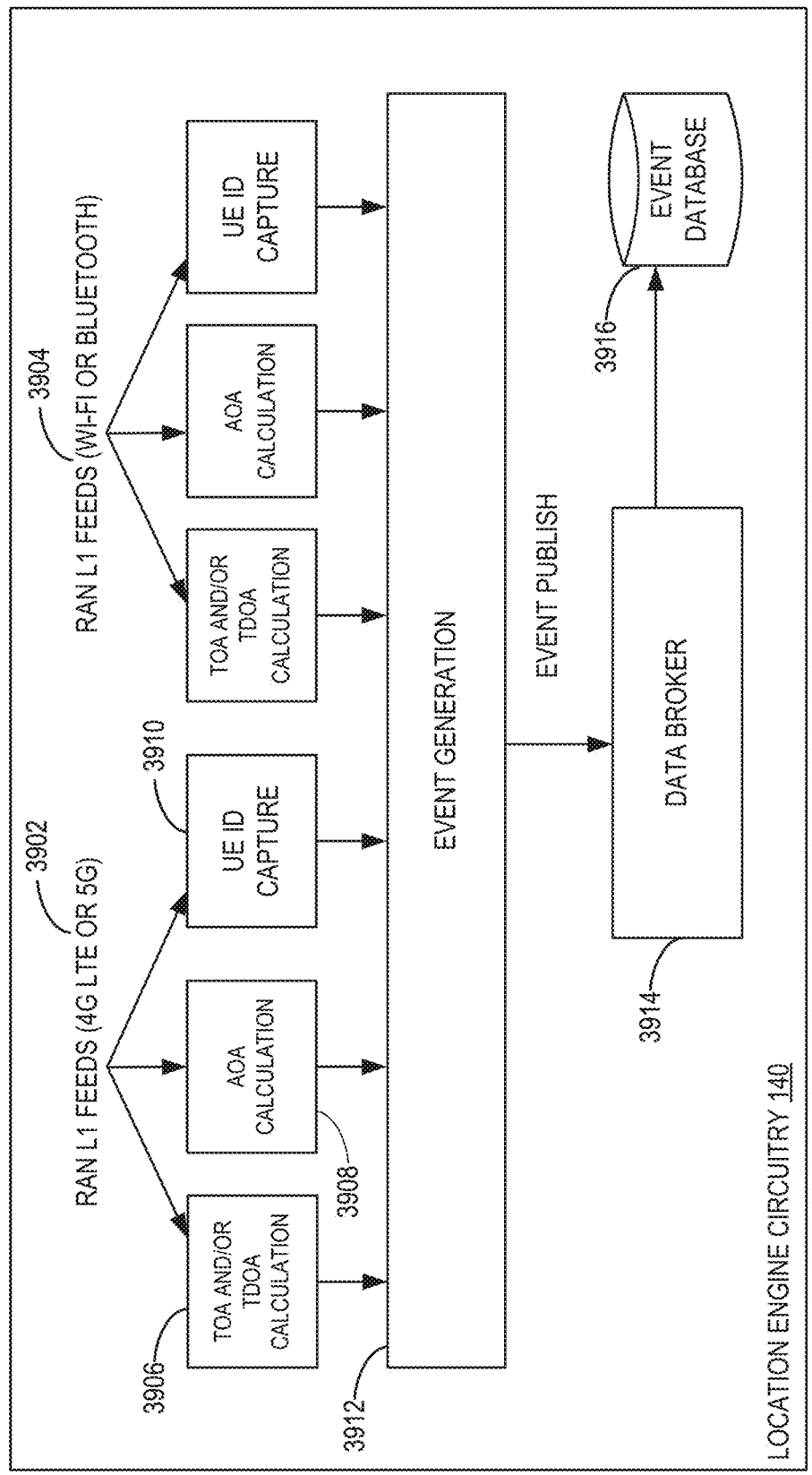
FIG. 39 is a block diagram of another example implementation of the location engine circuitry of FIGS. 1 and/or 4 to determine a location of a device and/or an object based on at least one of time-of-arrival data, time-difference-of-arrival data, angle-of-arrival data, or device identification data in terrestrial settings.

FIG. 39 is a block diagram of another example implementation of the location engine circuitry 140 of FIGS. 1 and/or 4 to determine a location of a device and/or an object based on at least one of TOA data, TDOA data, AOA data, or device identification data in terrestrial settings. In some examples, the location engine circuitry 140 identifies a location of object(s) in an environment based on at least one of TOA data, TDOA data, AOA data, or device identification data in terrestrial settings. In some examples, the illustrated example of FIG. 39 can implement passive object data collection in which an infrastructure provides data associated with the object(s).

In the illustrated example, the location engine circuitry 140 obtains first example RAN L1 feeds 3902 and second example RAN L1 feeds 3904. In this example, the first RAN L1 feeds 3902 can be implemented by 4G LTE or 5G (or 6G in other examples). In this example, the second RAN L1 feeds 3904 can be implemented by Wi-Fi or Bluetooth (or RFID or GNSS in other examples). In example operation, the location engine circuitry 140 can execute and/or instantiate an example TOA and/or TDOA calculation 3906, an example AOA calculation 3908, and an example UE identifier (ID) capture operation 3910 on the first RAN L1 feeds 3902 and/or the second RAN L1 feeds 3904.

In example operation, the location engine circuitry 140 can execute and/or instantiate example event generation operations 3912 based on at least one of the TOA and/or TDOA calculation 3906, the AOA calculation 3908, or the UE ID capture 3910. For example, the event generation operations 3912 can generate an event based on a TOA measurement, a TDOA measurement, an AOA measurement, and/or a UE ID (e.g., a UE ID captured and/or otherwise extracted from the first RAN L1 feeds 3902 and/or the second RAN L1 feeds 3904). The event generation operations 3912 can cause event(s) to be published to an example data broker 3914. The data broker 3914 can store the event(s) in an example event database 3916. In some examples, the event database 3916 can be implemented by memory and/or one or more mass storage devices. In some examples, the event(s) can include a direction and/or a location of an object in an environment. In some examples, the location engine circuitry 140 can implement at least one of the event generation 3912 or the data broker 3914 by executing an AI/ML model, such as the ML model(s) 496 of FIG. 4.

In some examples, RAN based sensor data such as UE TOA data, UE TDOA data, UE AOA data, and UE scan report data can be fed into the event generation operations 3912. For example, the event generation operations 3912 can generate an event that includes a UE with an identifier of 123, an indication that the UE is 12.5 meters away from basestation-2, and an indication that the UE is at an angle of 37 degrees with respect to basestation-2. In some examples, the event generation operations 3912 can generate an event that includes a UE with an identifier of 456, an indication that the UE is 34.2 meters away from basestation-1, and an indication that the UE is at an angle of 172 degrees with respect to basestation-1. In some examples, the event generation operations 3912 can generate an event that identifies a Wi-Fi device with a media access control (MAC) address of 3F and/or an identifier of 37, the Wi-Fi device is 10.5 meters away from a Wi-Fi AP, and that the Wi-Fi device is positioned at an angle of 17 degrees with respect to the Wi-Fi AP.

Figure 40:
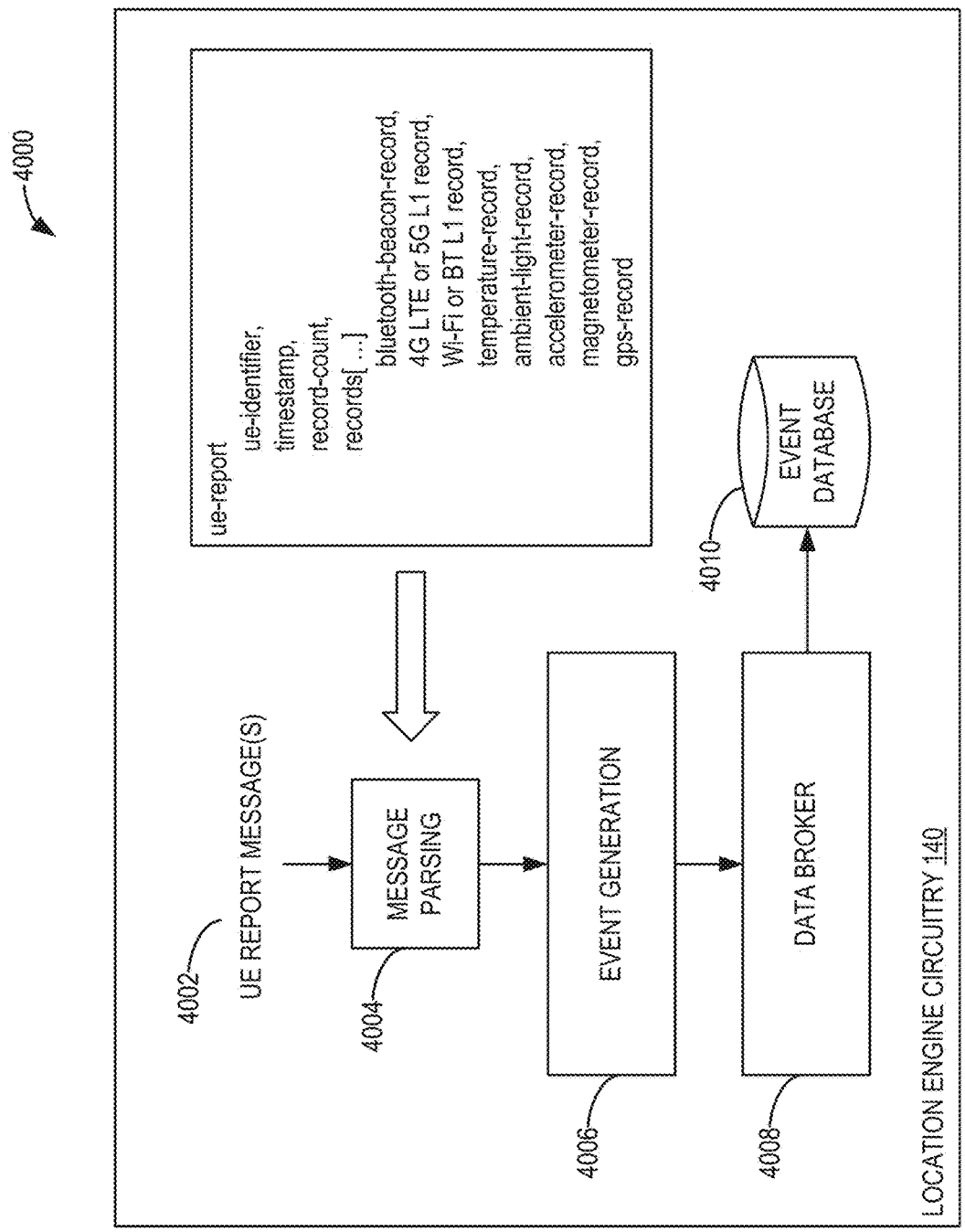
FIG. 40 is a block diagram of another example implementation of the location engine circuitry of FIGS. 1 and/or 4 to parse example messages from user equipment to generate example events.

FIG. 40 is a block diagram of another example implementation of the location engine circuitry 140 of FIGS. 1 and/or 4 to parse example messages 4002 from UE(s) to generate example events. In some examples, the illustrated example of FIG. 40 can implement active object data collection in which an object, such as a UE, can provide data associated with the object.

In example operation, the location engine circuitry 140 can execute and/or instantiate example message parsing 4004 on the messages 4003. For example, the location engine circuitry 140 can parse the messages 4002 to extract data of interest from the messages 4002. In some examples, the messages 4002 can include UE identifiers (identified by ue-identifier), timestamps (identified by timestamp), record counts (identified by record-count), and/or records (identified by records[ . . . ]). In this example, the records can include multi-spectrum, multi-modal records, such as Bluetooth, 4G LTE, 5G L1, Wi-Fi or Bluetooth L1, sensor records (e.g., temperature, ambient light, accelerometer, magnetometer, etc., records), GPS records, etc. For example, the records can be implemented by the multi-spectrum, multi-modal data 494 of FIG. 4.

In example operation, the location engine circuitry 140 can generate and/or otherwise output event(s) based on the parsed messages by executing and/or instantiating example event generation 4006. In example operation, the location engine circuitry 140 can provide the event(s) to an example data broker 4008. In example operation, the data broker 4008 can push, transmit, and/or output the event(s) to an example event database 4010, which can be accessed by device(s), application(s), etc. In some examples, the event database 4010 can be implemented by memory and/or one or more mass storage devices. In some examples, the event(s) can include a first event that identifies a UE with an identifier of 123, an indication that the UE is 2.9 meters away from a Bluetooth beacon with an identifier of 7, and an indication that the UE is positioned at an angle of 33 degrees with respect to the Bluetooth beacon. In some examples, the event(s) can include a second event that is representative of a detection of a UE with an identifier of 456 that is able to see a Wi-Fi network with an SSID of "Network-1" at an RSSI of −63 decibel milliwatts (dBm).

Figure 41:
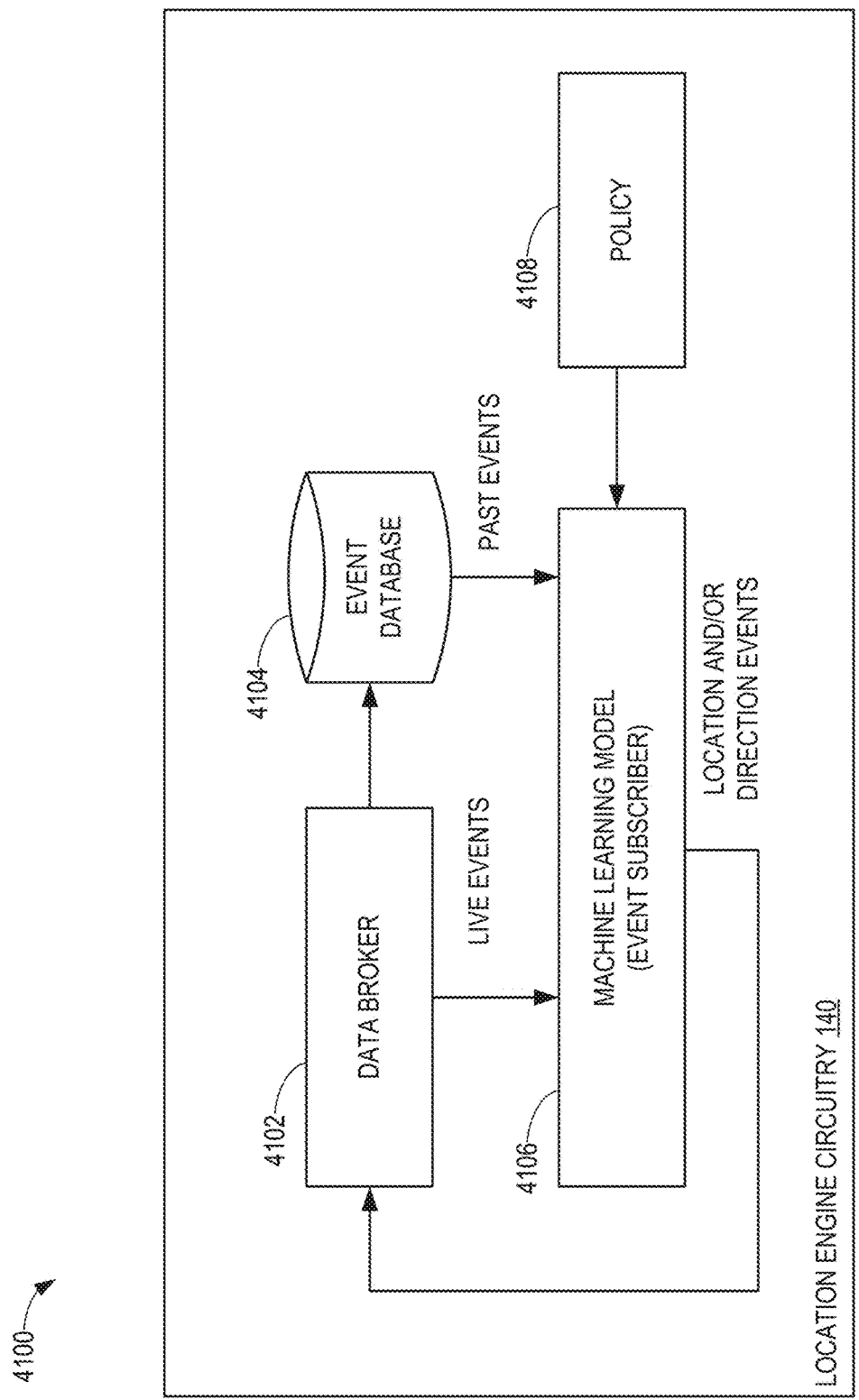
FIG. 41 is a block diagram of another example implementation of the location engine circuitry of FIGS. 1 and/or 4 to generate example location and direction events based on at least one of live events or past events associated with objects in an environment.

FIG. 41 is a block diagram of another example implementation of the location engine circuitry 140 of FIGS. 1 and/or 4 to generate example location and direction events based on at least one of live events or past events associated with devices and/or objects in an environment. In example operation, an example data broker 4102 pushes events to an example event database 4104 and an example ML model 4106. In some examples, the location engine circuitry 140 can execute and/or instantiate the ML model 4106 to implement a location and/or direction AI/ML engine. In some examples, the ML model 4106 can be implemented by the ML model(s) 496 of FIG. 4.

In example operation, the ML model 4106 can obtain past events from the event database 4104 as ML input(s). In example operation, the ML model 4106 can generate location and/or direction events based on the live events, the past events, and an example policy 4108. In some examples, the policy 4108 can be representative of one or more requirements, specifications, etc., that can adjust operation of the ML model 4106. In some examples, the policy 4108 can be an SLA. In some examples, the location events can include a location of an object and/or an action to be executed in connection with the object. In some examples, the direction events can include a direction in which the object may be moving and/or an action to be executed in connection with the object. In some examples, the policy 4108 can include at least one of location accuracy error (e.g., a tolerance of +/−1 cm location accuracy error, a tolerance of +/−1 m location accuracy error, a tolerance of +/−1% location accuracy error, a tolerance of +/−5% location accuracy error, etc.), a 2D location dimension configuration, a 3D location dimension configuration, or a wall clock response.

In some examples, the policy 4108 can define prioritizations of data to be utilized for location determination of a target device and/or target object. For example, the policy 4108 can define that the processing of scheduled data associated with the target device/object is to be prioritized over unscheduled data. In some examples, the policy 4108 can define that the processing of unscheduled data associated with the target device/object is to be prioritized over scheduled data. For example, the policy 4108 can define that unscheduled data associated with the object 602 is to be processed with a higher priority than scheduled data associated with the object 602. In some examples, the policy 4108 can define that prioritized data is to be processed with DLB circuitry as disclosed herein to achieve decreased processing latency, increased data bandwidth, and/or increased data throughput.

In some examples, the ML model 4106 can subscribe to various "topics" and publish events based on certain "policies." For example, the ML model 4106 can publish an event that can include a determination that a forklift with an identifier of ABC is at location x/y/z (e.g., a location with x-, y-, and z-coordinates) with a velocity vector of v. In some examples, the ML model 4106 can publish an event that includes a detection of a UE with an identifier of 123 being at location x/y/z with a velocity vector of v. In some examples, the ML model 4106 can publish an event that identifies a Wi-Fi device with a MAC address of 2F at location x/y/z with a velocity vector of v. For example, the ML model 4106 can output events to the data broker 4102 on a unique "topic" as well as stored in the event database 4104.

Figure 42:
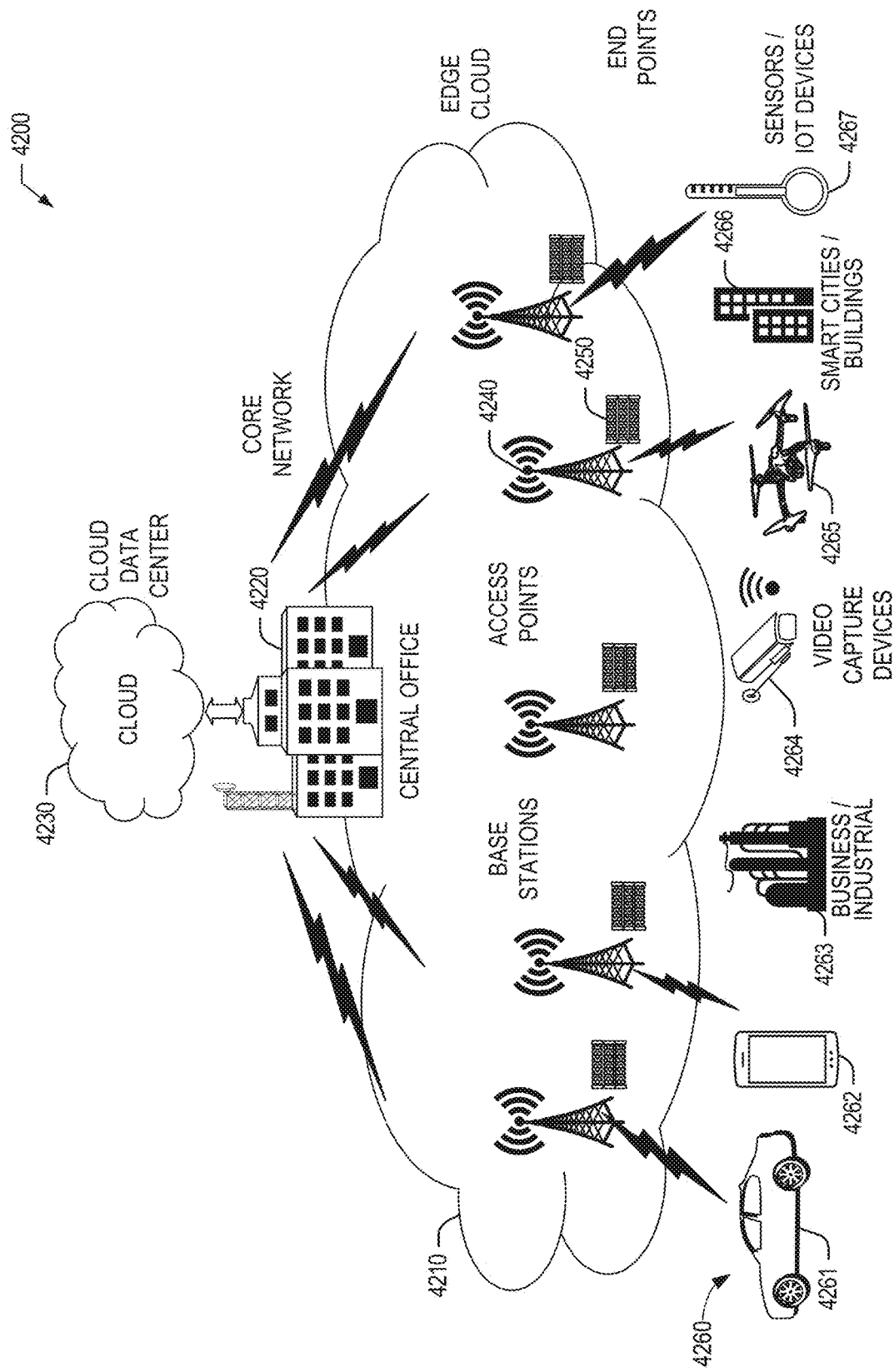
FIG. 42 illustrates an overview of an example edge cloud configuration for edge computing that may implement the examples disclosed herein.

FIG. 42 is a block diagram 4200 showing an overview of a configuration for edge computing, which includes a layer of processing referred to in many of the following examples as an "edge cloud". As shown, the edge cloud 4210 is co-located at an edge location, such as an access point or base station 4240, a local processing hub 4250, or a central office 4220, and thus may include multiple entities, devices, and equipment instances. The edge cloud 4210 is located much closer to the endpoint (consumer and producer) data sources 4260 (e.g., autonomous vehicles 4261, user equipment 4262, business and industrial equipment 4263, video capture devices 4264, drones 4265, smart cities and building devices 4266, sensors and IoT devices 4267, etc.) than the cloud data center 4230. Compute, memory, and storage resources that are offered at the edges in the edge cloud 4210 are critical to providing ultra-low latency response times for services and functions used by the endpoint data sources 4260 as well as reduce network backhaul traffic from the edge cloud 4210 toward cloud data center 4230 thus improving energy consumption and overall network usages among other benefits.

In some examples, the central office 4220, the cloud data center 4230, and/or portion(s) thereof, may implement one or more location engines that locate and/or otherwise identify positions of devices of the endpoint (consumer and producer) data sources 4260 (e.g., autonomous vehicles 4261, user equipment 4262, business and industrial equipment 4263, video capture devices 4264, drones 4265, smart cities and building devices 4266, sensors and IoT devices 4267, etc.). In some such examples, the central office 4220, the cloud data center 4230, and/or portion(s) thereof, may implement one or more location engines to execute location detection operations with improved accuracy.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 42, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 4210, which provide coordination from client and distributed computing devices.

Figure 43:
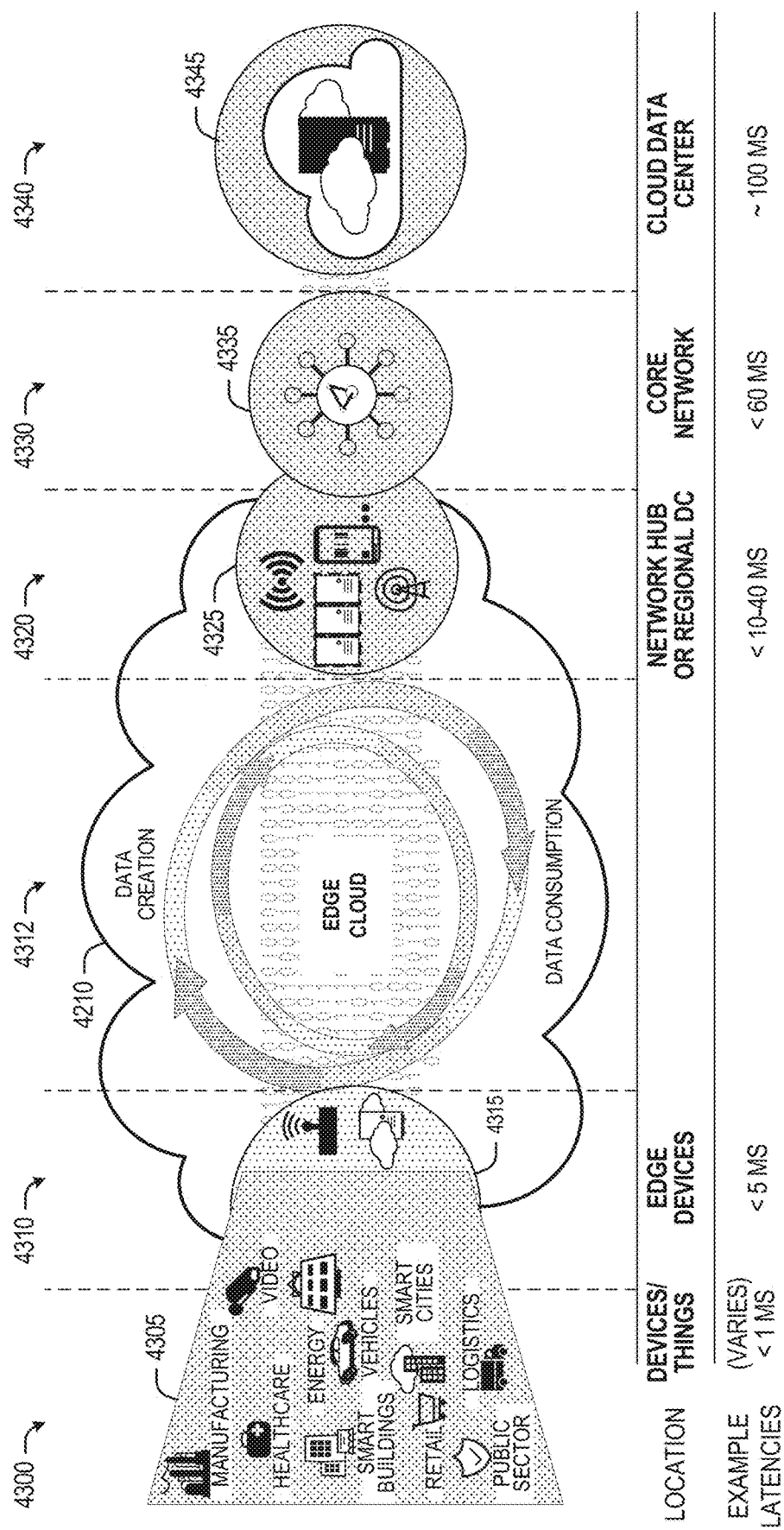
FIG. 43 illustrates operational layers among example endpoints, an example edge cloud, and example cloud computing environments that may implement the examples disclosed herein.

FIG. 43 illustrates operational layers among endpoints, an edge cloud, and cloud computing environments. Specifically, FIG. 43 depicts examples of computational use cases 4305, utilizing the edge cloud 4210 of FIG. 42 among multiple illustrative layers of network computing. The layers begin at an endpoint (devices and things) layer 4300, which accesses the edge cloud 4210 to conduct data creation, analysis, and data consumption activities. The edge cloud 4210 may span multiple network layers, such as an edge devices layer 4310 having gateways, on-premise servers, or network equipment (nodes 4315) located in physically proximate edge systems; a network access layer 4320, encompassing base stations, radio processing units, network hubs, regional data centers (DC), or local network equipment (equipment 4325); and any equipment, devices, or nodes located therebetween (in layer 4312, not illustrated in detail). The network communications within the edge cloud 4210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 4300, under 5 ms at the edge devices layer 4310, to even between 10 to 40 ms when communicating with nodes at the network access layer 4320. Beyond the edge cloud 4210 are core network 4330 and cloud data center 4332 layers, each with increasing latency (e.g., between 40-60 ms at the core network layer 4330, to 100 or more ms at the cloud data center layer 4340). As a result, operations at a core network data center 4335 or a cloud data center 4345, with latencies of at least 60 to 100 ms or more, will not be able to accomplish many time-critical functions of the use cases 4305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 4335 or a cloud data center 4345, a central office or content data network may be considered as being located within a "near edge" layer ("near" to the cloud, having high latency values when communicating with the devices and endpoints of the use cases 4305), whereas an access point, base station, on-premise server, or network gateway may be considered as located within a "far edge" layer ("far" from the cloud, having low latency values when communicating with the devices and endpoints of the use cases 4305). It will be understood that other categorizations of a particular network layer as constituting a "close", "local", "near", "middle", or "far" edge may be based on latency, distance, number of network hops, or other measurable characteristics, as measured from a source in any of the network layers 4300-4340.

The various use cases 4305 may access resources under usage pressure from incoming streams, due to multiple services utilizing the edge cloud. For example, location detection of devices associated with such incoming streams of the various use cases 4305 is desired and may be achieved with example location engines as disclosed herein. To achieve results with low latency, the services executed within the edge cloud 4210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 4210 may provide the ability to serve and respond to multiple applications of the use cases 4305 (e.g., object tracking, location detection, video surveillance, connected cars, etc.) in real-time or near real-time, and meet ultra-low latency requirements for these multiple applications. These advantages enable a whole new class of applications (VNFs), Function-as-a-Service (FaaS), Edge-as-a-Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 4210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 4210 (network layers 4310-4330), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 4210.

As such, the edge cloud 4210 is formed from network components and functional features operated by and within edge gateway nodes, edge aggregation nodes, or other edge compute nodes among network layers 4310-4330. The edge cloud 4210 thus may be embodied as any type of network that provides edge computing and/or storage resources which are proximately located to RAN capable endpoint devices (e.g., mobile computing devices, IoT devices, smart devices, etc.), which are discussed herein. In other words, the edge cloud 4210 may be envisioned as an "edge" which connects the endpoint devices and traditional network access points that serve as an ingress point into service provider core networks, including mobile carrier networks (e.g., GSM networks, LTE networks, 4G/5G/6G networks, etc.), while also providing storage and/or compute capabilities. Other types and forms of network access (e.g., Wi-Fi, long-range wireless, wired networks including optical networks) may also be utilized in place of or in combination with such 44GPP carrier networks.

The network components of the edge cloud 4210 may be servers, multi-tenant servers, appliance computing devices, and/or any other type of computing devices. For example, the edge cloud 4210 may include an appliance computing device that is a self-contained electronic device including a housing, a chassis, a case or a shell. In some examples, the edge cloud 4210 may include an appliance to be operated in harsh environmental conditions (e.g., extreme heat or cold ambient temperatures, strong wind conditions, wet or frozen environments, and the like). In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 64, 65, 66, and/or 67 illustrate example hardware for implementing an appliance computing device. The edge cloud 4210 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 44:
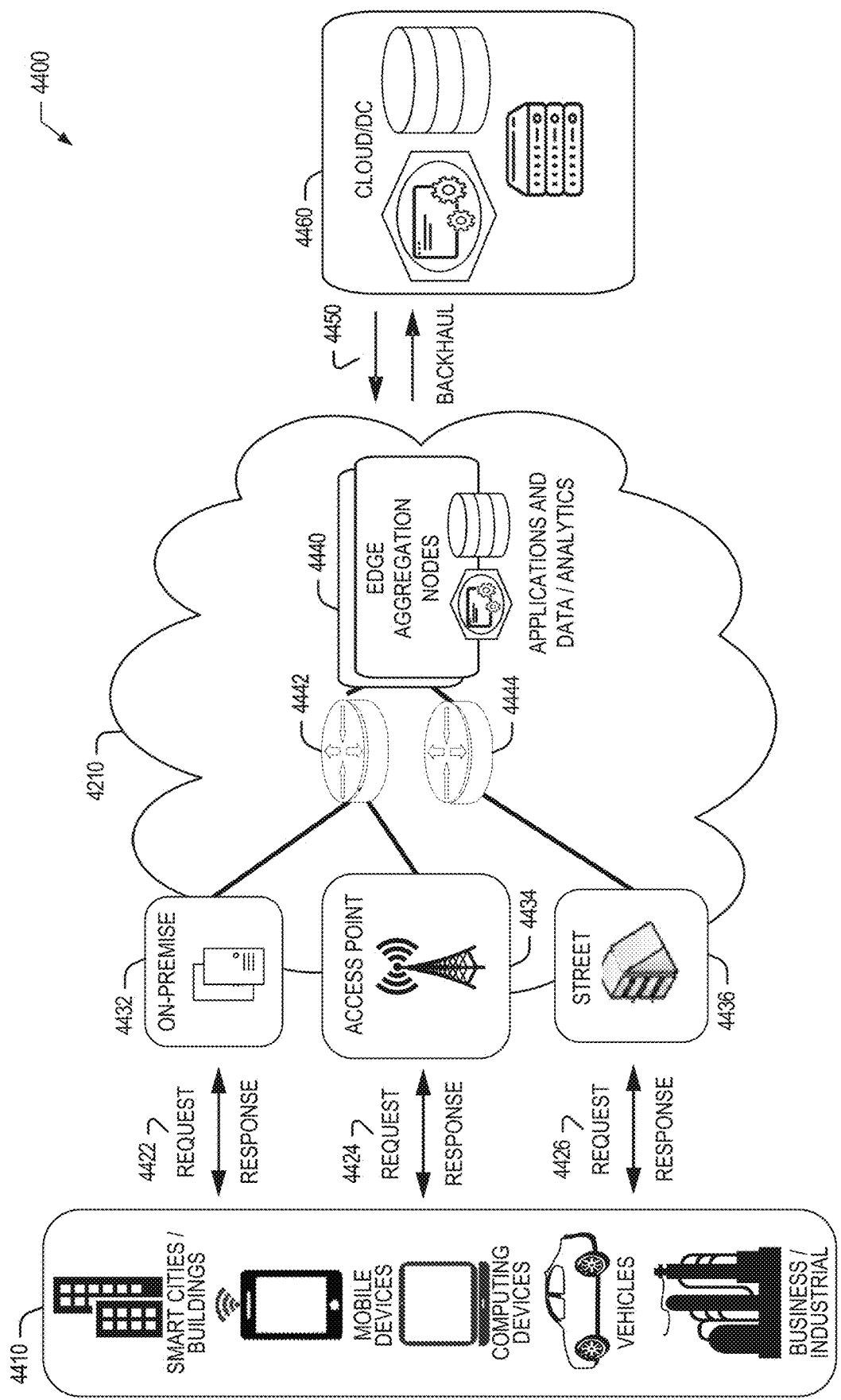
FIG. 44 illustrates an example approach for networking and services in an edge computing system that may implement the examples disclosed herein.

In FIG. 44, various client endpoints 4410 (in the form of mobile devices, computers, autonomous vehicles, business computing equipment, industrial processing equipment) exchange requests and responses that are specific to the type of endpoint network aggregation. For instance, client endpoints 4410 may obtain network access via a wired broadband network, by exchanging requests and responses 4422 through an on-premise network system 4432. Some client endpoints 4410, such as mobile computing devices, may obtain network access via a wireless broadband network, by exchanging requests and responses 4424 through an access point (e.g., cellular network tower) 4434. Some client endpoints 4410, such as autonomous vehicles may obtain network access for requests and responses 4426 via a wireless vehicular network through a street-located network system 4436. However, regardless of the type of network access, the TSP may deploy aggregation points 4442, 4444 within the edge cloud 4210 of FIG. 42 to aggregate traffic and requests. Thus, within the edge cloud 4210, the TSP may deploy various compute and storage resources, such as at edge aggregation nodes 4440, to provide requested content. The edge aggregation nodes 4440 and other systems of the edge cloud 4210 are connected to a cloud or data center (DC) 4460, which uses a backhaul network 4450 to fulfill higher-latency requests from a cloud/data center for websites, applications, database servers, etc. Additional or consolidated instances of the edge aggregation nodes 4440 and the aggregation points 4442, 4444, including those deployed on a single server framework, may also be present within the edge cloud 4210 or other areas of the TSP infrastructure. Advantageously, example location engines (e.g., the location engine circuitry 140 of FIGS. 1 and/or 4) as disclosed herein may detect and/or otherwise determine locations of the client endpoints 4410 with improved performance and accuracy and reduced latency.

Figure 45:
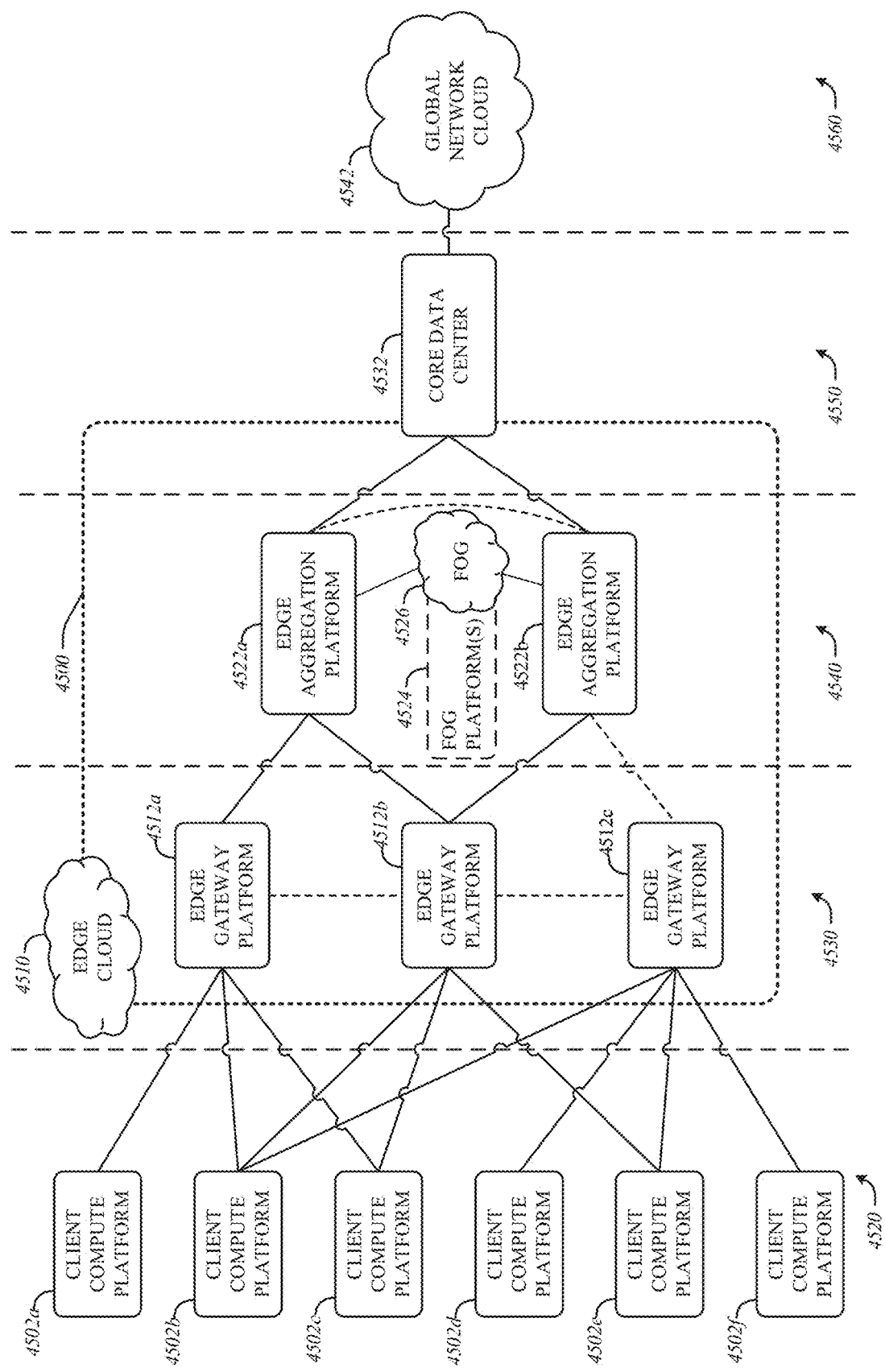
FIG. 45 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 45 depicts an example edge computing system 4500 for providing edge services and applications to multi-stakeholder entities, as distributed among one or more client compute platforms 4502, one or more edge gateway platforms 4512, one or more edge aggregation platforms 4522, one or more core data centers 4532, and a global network cloud 4542, as distributed across layers of the edge computing system 4500. The implementation of the edge computing system 4500 may be provided at or on behalf of a telecommunication service provider ("telco", or "TSP"), internet-of-things service provider, cloud service provider (CSP), enterprise entity, or any other number of entities. Various implementations and configurations of the edge computing system 4500 may be provided dynamically, such as when orchestrated to meet service objectives.

Individual platforms or devices of the edge computing system 4500 are located at a particular layer corresponding to layers 4520, 4530, 4540, 4550, and 4560. For example, the client compute platforms 4502a, 4502b, 4502c, 4502d, 4502e, 4502f are located at an endpoint layer 4520, while the edge gateway platforms 4512a, 4512b, 4512c are located at an edge devices layer 4530 (local level) of the edge computing system 4500. Additionally, the edge aggregation platforms 4522a, 4522b (and/or fog platform(s) 4524, if arranged or operated with or among a fog networking configuration 4526) are located at a network access layer 4540 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 4532 is located at a core network layer 4550 (a regional or geographically central level), while the global network cloud 4542 is located at a cloud data center layer 4560 (a national or world-wide layer). The use of "core" is provided as a term for a centralized network location—deeper in the network—which is accessible by multiple edge platforms or components; however, a "core" does not necessarily designate the "center" or the deepest location of the network. Accordingly, the core data center 4532 may be located within, at, or near the edge cloud 4510. Although an illustrative number of client compute platforms 4502*a*, 4502*b*, 4502*c*, 4502*d*, 4502*e*, 4502*f*; edge gateway platforms 4512*a*, 4512*b*, 4512*c*; edge aggregation platforms 4522*a*, 4522*b*; edge core data centers 4532; and global network clouds 4542 are shown in FIG. 45, it should be appreciated that the edge computing system 4500 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 4512*a*, 4512*b*, 4512*c* can be configured as an edge of edges such that the edge gateway platforms 4512*a*, 4512*b*, 4512*c* communicate via peer to peer connections. In some examples, the edge aggregation platforms 4522*a*, 4522*b* and/or the fog platform(s) 4524 can be configured as an edge of edges such that the edge aggregation platforms 4522*a*, 4522*b* and/or the fog platform(s) communicate via peer to peer connections. Additionally, as shown in FIG. 45, the number of components of respective layers 4520, 4530, 4540, 4550, and 4560 generally increases at each lower level (e.g., when moving closer to endpoints (e.g., client compute platforms 4502*a*, 4502*b*, 4502*c*, 4502*d*, 4502*e*, 4502*f*)). As such, one edge gateway platforms 4512*a*, 4512*b*, 4512*c* may service multiple ones of the client compute platforms 4502*a*, 4502*b*, 4502*c*, 4502*d*, 4502*e*, 4502*f*, and one edge aggregation platform (e.g., one of the edge aggregation platforms 4522*a*, 4522*b*) may service multiple ones of the edge gateway platforms 4512*a*, 4512*b*, 4512*c*.

Consistent with the examples provided herein, a client compute platform (e.g., one of the client compute platforms 4502*a*, 4502*b*, 4502*c*, 4502*d*, 4502*e*, 4502*f*) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 4500 does not necessarily mean that such platform, node, and/or device operates in a client or slave role; rather, any of the platforms, nodes, and/or devices in the edge computing system 4500 refer to individual entities, platforms, nodes, devices, and/or subsystems which include discrete and/or connected hardware and/or software configurations to facilitate and/or use the edge cloud 4510. Advantageously, example location engines (e.g., the location engine circuitry 140 of FIGS. 1 and/or 4) as disclosed herein may detect and/or otherwise determine locations of the client compute platforms 4502*a*, 4502*b*, 4502*c*, 4502*d*, 4502*e*, 4502*f* with improved performance and accuracy as well as with reduced latency.

As such, the edge cloud 4510 is formed from network components and functional features operated by and within the edge gateway platforms 4512*a*, 4512*b*, 4512*c* and the edge aggregation platforms 4522*a*, 4522*b* of layers 4530, 4540, respectively. The edge cloud 4510 may be implemented as any type of network that provides edge computing and/or storage resources which are proximately located to RAN capable endpoint devices (e.g., mobile computing devices, IoT devices, smart devices, etc.), which are shown in FIG. 45 as the client compute platforms 4502*a*, 4502*b*, 4502*c*, 4502*d*, 4502*e*, 4502*f* In other words, the edge cloud 4510 may be envisioned as an "edge" which connects the endpoint devices and traditional network access points that serves as an ingress point into service provider core networks, including mobile carrier networks (e.g., GSM networks, LTE networks, 4G/5G/6G networks, etc.), while also providing storage and/or compute capabilities. Other types and forms of network access (e.g., Wi-Fi, long-range wireless, wired networks including optical networks) may also be utilized in place of or in combination with such 44GPP carrier networks.

In some examples, the edge cloud 4510 may form a portion of, or otherwise provide, an ingress point into or across a fog networking configuration 4526 (e.g., a network of fog platform(s) 4524, not shown in detail), which may be implemented as a system-level horizontal and distributed architecture that distributes resources and services to perform a specific function. For instance, a coordinated and distributed network of fog platform(s) 4524 may perform computing, storage, control, or networking aspects in the context of an IoT system arrangement. Other networked, aggregated, and distributed functions may exist in the edge cloud 4510 between the core data center 4532 and the client endpoints (e.g., client compute platforms 4502*a*, 4502*b*, 4502*c*, 4502*d*, 4502*e*, 4502*f*). Some of these are discussed in the following sections in the context of network functions or service virtualization, including the use of virtual edges and virtual services which are orchestrated for multiple tenants.

As discussed in more detail below, the edge gateway platforms 4512*a*, 4512*b*, 4512*c* and the edge aggregation platforms 4522*a*, 4522*b* cooperate to provide various edge services and security to the client compute platforms 4502a, 4502b, 4502c, 4502d, 4502e, 4502f. Furthermore, because a client compute platforms (e.g., one of the client compute platforms 4502a, 4502b, 4502c, 4502d, 4502e, 4502f) may be stationary or mobile, a respective edge gateway platform 4512a, 4512b, 4512c may cooperate with other edge gateway platforms to propagate presently provided edge services, relevant service data, and security as the corresponding client compute platforms 4502a, 4502b, 4502c, 4502d, 4502e, 4502f moves about a region. To do so, the edge gateway platforms 4512a, 4512b, 4512c and/or edge aggregation platforms 4522a, 4522b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 4500 includes meta-orchestration functionality. For example, edge platforms at the far-edge (e.g., edge platforms closer to edge users, the edge devices layer 4530, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 4540, the core network layer 4550, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 4510. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 4510, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of an SLA. For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 420 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 46:
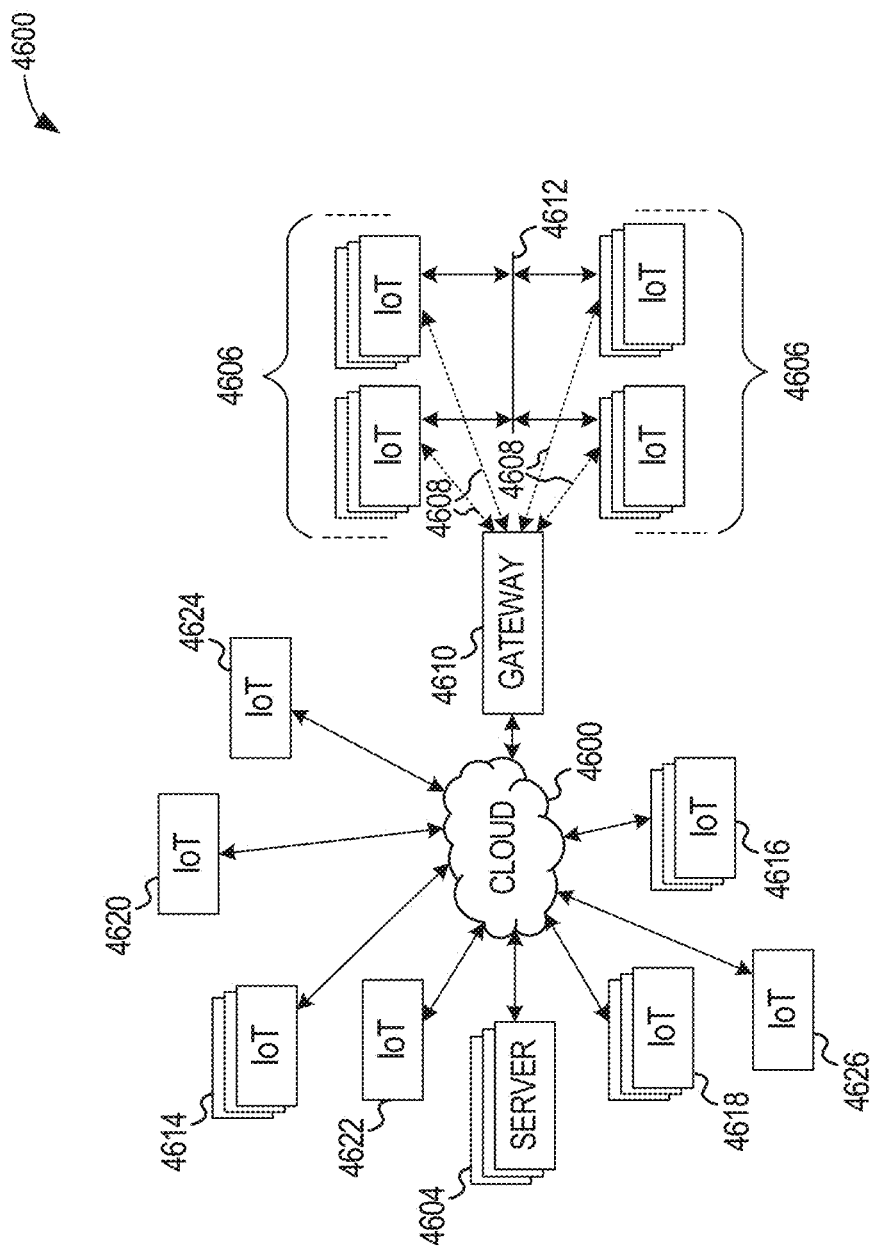
FIG. 46 illustrates a drawing of a cloud computing network, or cloud, in communication with a number of Internet of Things (IoT) devices, according to an example.

FIG. 46 illustrates a drawing of a cloud computing network, or cloud 4600, in communication with a number of IoT devices. The cloud 4600 may represent the Internet, or may be a local area network (LAN), or a wide area network (WAN), such as a proprietary network for a company. The IoT devices may include any number of different types of devices, grouped in various combinations. For example, a traffic control group 4606 may include IoT devices along streets in a city. These IoT devices may include stoplights, traffic flow monitors, cameras, weather sensors, and the like. The traffic control group 4606, or other subgroups, may be in communication with the cloud 4600 through wired or wireless links 4608, such as LPWA links, and the like. Further, a wired or wireless sub-network 4612 may allow the IoT devices to communicate with each other, such as through a local area network, a wireless local area network, and the like. The IoT devices may use another device, such as a gateway 4610 or 4628 to communicate with remote locations such as the cloud 4600; the IoT devices may also use one or more servers 4630 to facilitate communication with the cloud 4600 or with the gateway 4610. For example, the one or more servers 4630 may operate as an intermediate network node to support a local Edge cloud or fog implementation among a local area network. Further, the gateway 4628 that is depicted may operate in a cloud-to-gateway-to-many Edge devices configuration, such as with the various IoT devices 4614, 4620, 4624 being constrained or dynamic to an assignment and use of resources in the cloud 4600.

Other example groups of IoT devices may include remote weather stations 4614, local information terminals 4616, alarm systems 4618, automated teller machines 4620, alarm panels 4622, or moving vehicles, such as emergency vehicles 4624 or other vehicles 4626, among many others. Each of these IoT devices may be in communication with other IoT devices, with servers 4604, with another IoT fog device or system (not shown, but depicted in FIG. F2), or a combination therein. The groups of IoT devices may be deployed in various residential, commercial, and industrial settings (including in both private or public environments). Advantageously, example location engines (e.g., the location engine circuitry 140 of FIGS. 1 and/or 4) as disclosed herein may achieve location detection of one(s) of the IoT devices of the traffic control group 4606, one(s) of the IoT devices 4614, 4616, 4618, 4620, 4622, 4624, 4626, etc., and/or any combination(s) thereof with improved performance, improved accuracy, and/or reduced latency.

As may be seen from FIG. 46, a large number of IoT devices may be communicating through the cloud 4600. This may allow different IoT devices to request or provide information to other devices autonomously. For example, a group of IoT devices (e.g., the traffic control group 4606) may request a current weather forecast from a group of remote weather stations 4614, which may provide the forecast without human intervention. Further, an emergency vehicle 4624 may be alerted by an automated teller machine 4620 that a burglary is in progress. As the emergency vehicle 4624 proceeds towards the automated teller machine 4620, it may access the traffic control group 4606 to request clearance to the location, for example, by lights turning red to block cross traffic at an intersection in sufficient time for the emergency vehicle 4624 to have unimpeded access to the intersection.

Clusters of IoT devices, such as the remote weather stations 4614 or the traffic control group 4606, may be equipped to communicate with other IoT devices as well as with the cloud 4600. This may allow the IoT devices to form an ad-hoc network between the devices, allowing them to function as a single device, which may be termed a fog device or system (e.g., as described above with reference to FIG. 45).

Figure 47:
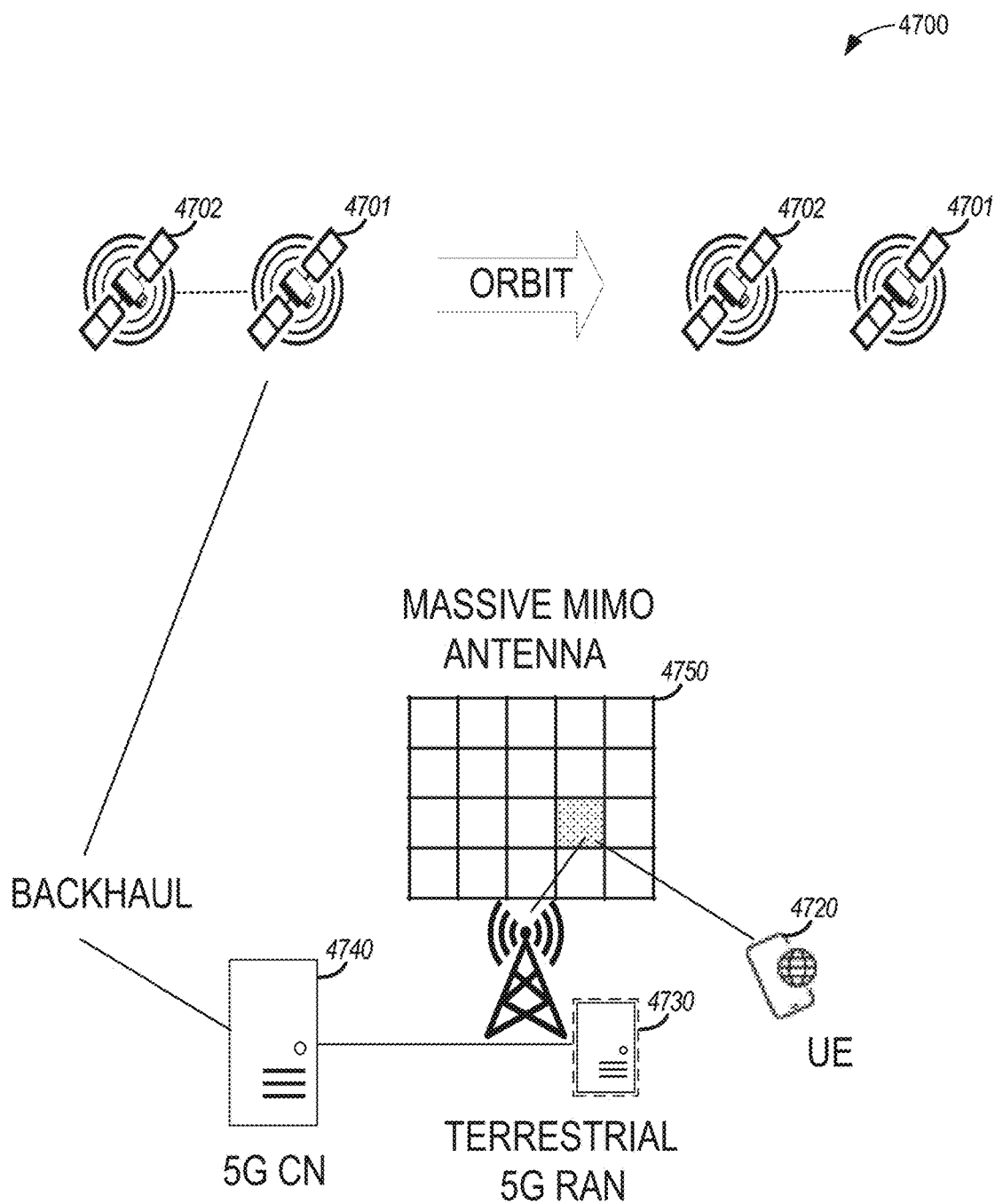
FIG. 47 illustrates network connectivity in non-terrestrial (satellite) and terrestrial (mobile cellular network) settings, according to an example.

FIG. 47 illustrates network connectivity in non-terrestrial (satellite) and terrestrial (mobile cellular network) settings, according to an example. As shown, a satellite constellation (e.g., a Low Earth Orbit constellation) may include multiple satellites 4701, 4702, which are connected to each other and to one or more terrestrial networks. Specifically, the satellite constellation is connected to a backhaul network, which is in turn connected to a 5G core network 4740. The 5G core network is used to support 5G communication operations at the satellite network and at a terrestrial 5G RAN 4730.

FIG. 47 also depicts the use of the terrestrial 5G RAN 4730, to provide radio connectivity to a UE 4720 via a MIMO antenna 4750. It will be understood that a variety of network communication components and units are not depicted in FIG. 47 for purposes of simplicity. With these basic entities in mind, the following techniques describe ways in which terrestrial and satellite networks can be extended for various Edge computing scenarios. Alternatively, the illustrated example of FIG. 47 may be applicable to other cellular technologies (e.g., 6G and the like).

Flowcharts representative of example machine-readable instructions, which may be executed to configure processor circuitry to implement the location engine circuitry 140 of FIGS. 1 and/or 4 are shown in FIGS. 48, 49, 50, 51, 52, 53, 54, 55, 56, 57, 58, 59, 60, 61, 62, and/or 63. The machine-readable instructions may be one or more executable programs or portion(s) of an executable program for execution by processor circuitry, such as the processor circuitry 6452 shown in the example IoT device 6450 discussed below in connection with FIG. 64, the processor circuitry 6512 shown in the example processor platform 6500 discussed below in connection with FIG. 65, and/or the example processor circuitry discussed below in connection with FIGS. 66 and/or 67. The program may be embodied in software stored on one or more non-transitory computer-readable storage media such as a CD, a floppy disk, an HDD, an SSD, a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a RAN gateway that may facilitate communication between a server and an endpoint client hardware device). Similarly, the non-transitory computer-readable storage media may include one or more mediums located in one or more hardware devices. Further, although the example program is described with reference to the flowcharts illustrated in FIGS. 48, 49, 50, 51, 52, 53, 54, 55, 56, 57, 58, 59, 60, 61, 62, and/or 63, many other methods of implementing the example location engine circuitry 140 of FIGS. 1 and/or 4 may alternatively be used. For example, the order of execution of the blocks may be changed, and/or some of the blocks described may be changed, eliminated, or combined. Additionally and/or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine-executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine-executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 48, 49, 50, 51, 52, 53, 54, 55, 56, 57, 58, 59, 60, 61, 62, and/or 63 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer-readable medium, non-transitory computer-readable storage medium, non-transitory machine-readable medium, and non-transitory machine-readable storage medium are expressly defined to include any type of computer-readable storage device and/or storage disk and to exclude propagating signals and to exclude transmission media. As used herein, the terms "computer-readable storage device" and "machine-readable storage device" are defined to include any physical (mechanical and/or electrical) structure to store information, but to exclude propagating signals and to exclude transmission media. Examples of computer-readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer-readable instructions, machine-readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 48:
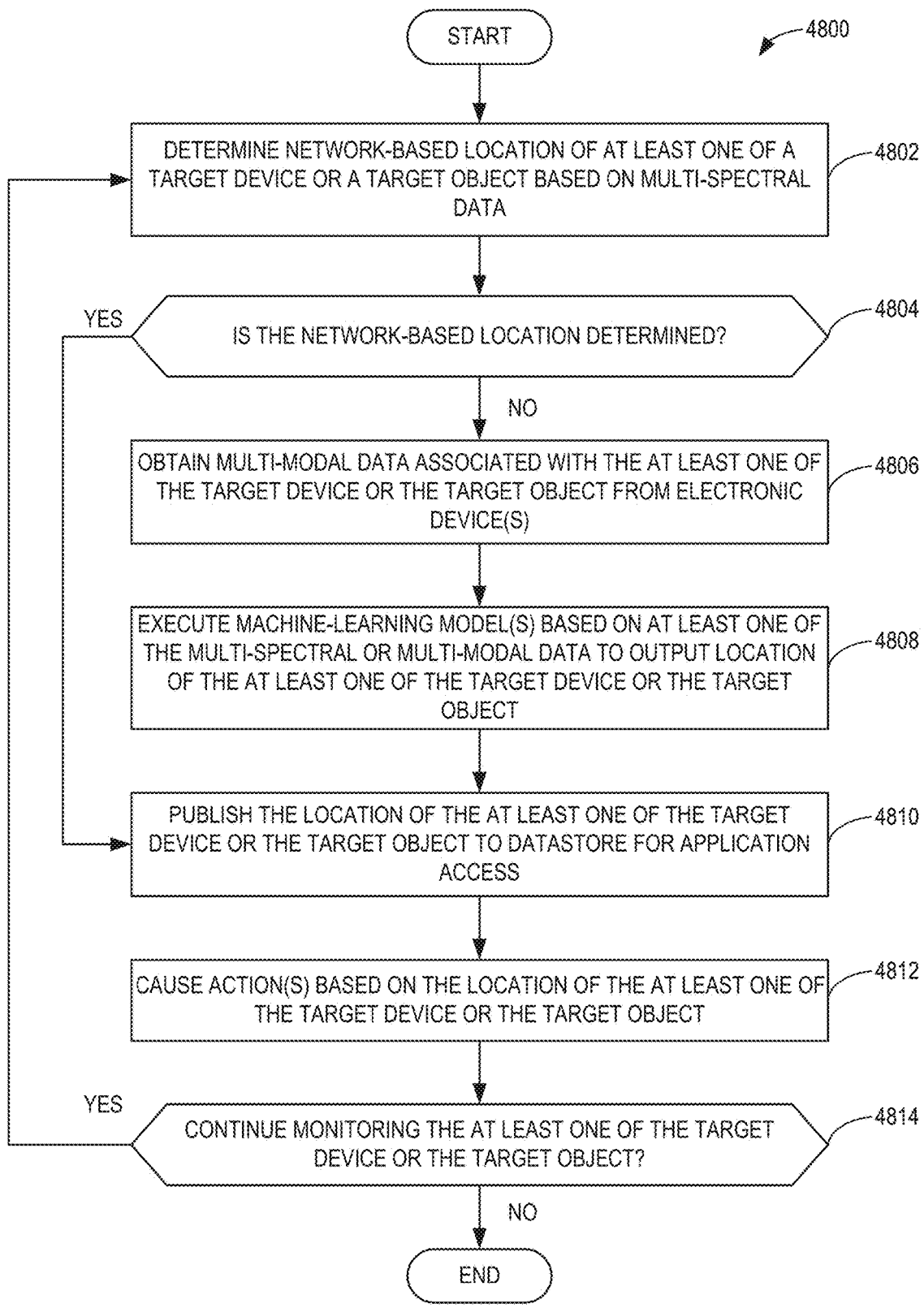
FIG. 48 is a flowchart representative of example machine-readable instructions and/or example operations that may be executed and/or instantiated by example processor circuitry to implement the example location engine circuitry of FIGS. 1 and/or 4 to determine a location of a target device and/or a target object based on at least one of multi-spectral or multi-modal data.

FIG. 48 is a flowchart representative of example machine-readable instructions and/or example operations 4800 that may be executed and/or instantiated by processor circuitry to implement the example location engine circuitry 140 of FIGS. 1 and/or 4 to determine a location of a target device and/or a target object based on at least one of multi-spectral or multi-modal data. The example machine-readable instructions and/or the example operations 4800 of FIG. 48 begin at block 4802, at which the location engine circuitry 140 determines a network-based location of at least one of a target device or a target object based on multi-spectral data.

For example, the location determination circuitry 490 (FIG. 4) can determine a location of the first industrial machine 110 of FIG. 1 based on network data, such as SRS data. In some examples, the location determination circuitry 490 can determine TOA data, TDOA data, AOA data, etc., based on the SRS data. In some examples, the location determination circuitry 490 can determine the location of the first industrial machine 110 based on at least one of the TOA data, the TDOA data, or the AOA data. In some examples, at least one of the SRS data, the TOA data, the TDOA data, or the AOA data can be stored in the datastore 492 (FIG. 4) as the multi-spectrum, multi-modal data 494 (FIG. 4).

At block 4804, the location engine circuitry 140 determines whether the network-based location is determined. For example, the location determination circuitry 490 can determine that the first industrial machine 110 has particular geographical coordinates in the outdoor environment 102 based on the network data. In some examples, the location determination circuitry 490 can determine that a location of the first industrial machine 110 cannot be determined based on the network data. For example, the location determination circuitry 490 can determine that SRS data is not received in connection with the first industrial machine 110. For example, the first industrial machine 110 can be powered off and unable to transmit SRS data, the first industrial machine 110 can have a poor or inadequate cellular connection to a servicing base station, etc.

If, at block 4804, the location engine circuitry 140 determines that the network-based location is determined, control proceeds to block 4810. Otherwise, control proceeds to block 4806. At block 4806, the location engine circuitry 140 obtains multi-modal data associated with the at least one of the target device or the target object from electronic device (s). For example, the interface circuitry 410 (FIG. 4) can obtain Wi-Fi data from the first Wi-Fi device 128, Bluetooth data from the first Bluetooth device 134, RFID data from the RFID system 138, etc., and/or any combination(s) thereof. In some examples, the Wi-Fi data, the Bluetooth data, the RFID data, etc., can be stored in the datastore 492 as the multi-spectrum, multi-modal data 494.

At block 4808, the location engine circuitry 140 executes machine-learning model(s) based on at least one of the multi-spectral or multi-modal data to output location of the at least one of the target device or the target object. For example, the location determination circuitry 490 can execute and/or instantiate the ML model(s) 496 with the SRS data and/or one(s) of the Wi-Fi data, Bluetooth data, RFID data, etc., as ML input(s) to generate ML output(s), which can be representative of a location of the first industrial machine 110.

At block 4810, the location engine circuitry 140 publishes the location of the at least one of the target device or the target object to datastore for application access. For example, the event generation circuitry 470 (FIG. 4) can publish and/or otherwise output the location of the first industrial machine 110 to an application, a service, a GUI, etc., as disclosed herein.

At block 4812, the location engine circuitry 140 causes action(s) based on the location of the at least one of the target device or the target object. For example, the event generation circuitry 470 can generate an instruction to the first industrial machine 110 to move from the location to a different location to carry out an action, an operation, a task, a workload, etc.

At block 4814, the location engine circuitry 140 determines whether to continue monitoring the at least one of the target device or the target object. For example, the location determination circuitry 490 can determine whether the first industrial machine 110 is associated with a measurement periodicity associated with an SLA. In some examples, the location determination circuitry 490 can determine that the first industrial machine 110 is associated with an SLA that specifies that a location of the first industrial machine 110 is to be determined at a periodicity of 1 time per second (or a measurement frequency of 1 Hz).

If, at block 4814, the location engine circuitry 140 determines to continue monitoring the at least one of the target device or the target object, control returns to block 4802. Otherwise, the example machine-readable instructions and/or the example operations 4800 of FIG. 48 conclude.

Figure 49:
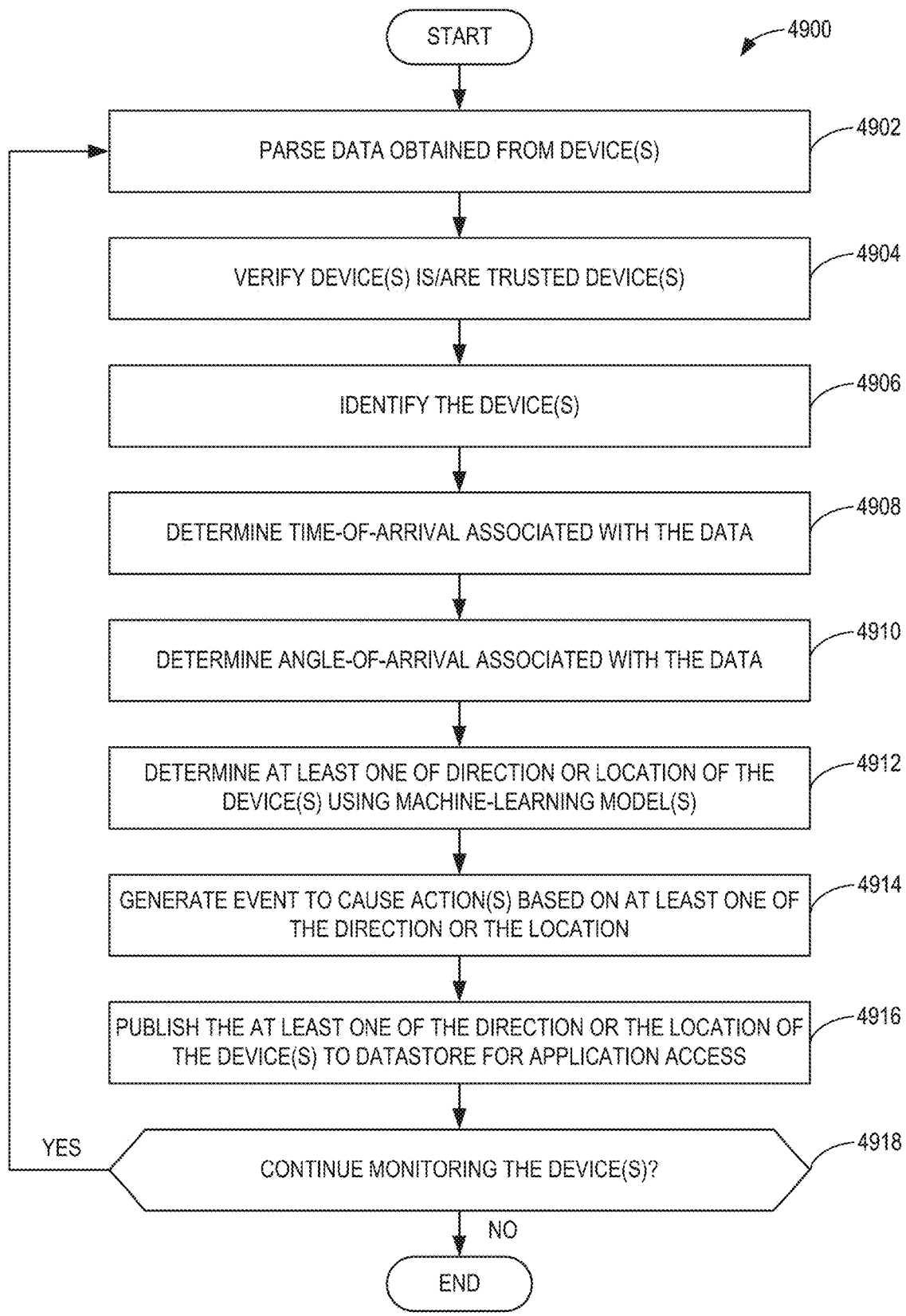
FIG. 49 is a flowchart representative of example machine-readable instructions and/or example operations that may be executed and/or instantiated by example processor circuitry to implement the example location engine circuitry of FIGS. 1 and/or 4 to determine at least one of a direction or a location of a device and/or an object.

FIG. 49 is a flowchart representative of example machine-readable instructions and/or example operations 4900 that may be executed and/or instantiated by processor circuitry to implement the location engine circuitry 140 of FIGS. 1 and/or 4 to determine at least one of a direction or a location of a device and/or an object. The example machine-readable instructions and/or the example operations 4900 of FIG. 49 begin at block 4902, at which the location engine circuitry 140 parses data obtained from device(s). For example, the interface circuitry 410 (FIG. 4) can receive data, messages, etc., from UEs or other devices. In some examples, the parser circuitry 420 (FIG. 4) can parse the data, the messages, etc., to extract data of interest.

At block 4904, the location engine circuitry 140 verifies device(s) is/are trusted device(s). For example, the device identification circuitry 430 (FIG. 4) can verify whether data received by the interface circuitry 410 originated from a trusted, authenticated, or verified data source.

At block 4906, the location engine circuitry 140 identifies the device(s). For example, the device identification circuitry 430 can identify one(s) of the device(s) based on an identifier (e.g., a UE identifier, a manufacturer identifier, a vendor identifier, a MAC address, etc.) included in the data obtained from the device(s).

At block 4908, the location engine circuitry 140 determines a time-of-arrival associated with the data. For example, the TOA determination circuitry 440 (FIG. 4) can calculate TOA measurements based on SRS data obtained from the device(s). In some examples, the TDOA determination circuitry 450 (FIG. 4) can determine TDOA measurements based on the TOA measurements.

At block 4910, the location engine circuitry 140 determines an angle-of-arrival associated with the data. For example, the AOA determination circuitry 460 (FIG. 4) can calculate AOA measurements based on SRS data obtained from the device(s).

At block 4912, the location engine circuitry 140 determines at least one of direction or location of the device(s) using machine-learning model(s). For example, the direction determination circuitry 480 (FIG. 4) can execute and/or instantiate the ML model(s) 496 (FIG. 4) using the TOA measurements, the TDOA measurements, the AOA measurements, etc., as ML input(s) to generate ML output(s), which can include a direction of the object(s). In some examples, the location determination circuitry 490 (FIG. 4) can execute and/or instantiate the ML model(s) 496 using the TOA measurements, the TDOA measurements, the AOA measurements, etc., as ML input(s) to generate ML output(s), which can include a location of the object(s).

At block 4914, the location engine circuitry 140 generates an event to cause action(s) based on at least one of the direction or the location. For example, the event generation circuitry 470 (FIG. 4) can generate an event to cause one or more actions to occur in connection with the UE based on at least one of the direction or the location of the UE.

At block 4916, the location engine circuitry 140 publishes at least one of the direction or the location of the device(s) to a datastore for application access. For example, the event generation circuitry 470 can output the event to the datastore 492 (FIG. 4). In some examples, the event generation circuitry 470 can instruct the interface circuitry 410 (FIG. 4) to publish the event to a different datastore from which an application can access the event.

At block 4918, the location engine circuitry 140 determines whether to continue monitoring the device(s). For example, the location determination circuitry 490 can determine whether to continue detecting a direction and/or location of the device(s) based on a measurement periodicity defined by SLA(s) associated with the device(s). If, at block 4918, the location engine circuitry 140 determines to continue monitoring the device(s), control returns to block 4902 to parse data obtained from the device(s). Otherwise, the example machine-readable instructions and/or the example operations 4900 of FIG. 49 conclude.

Figure 50:
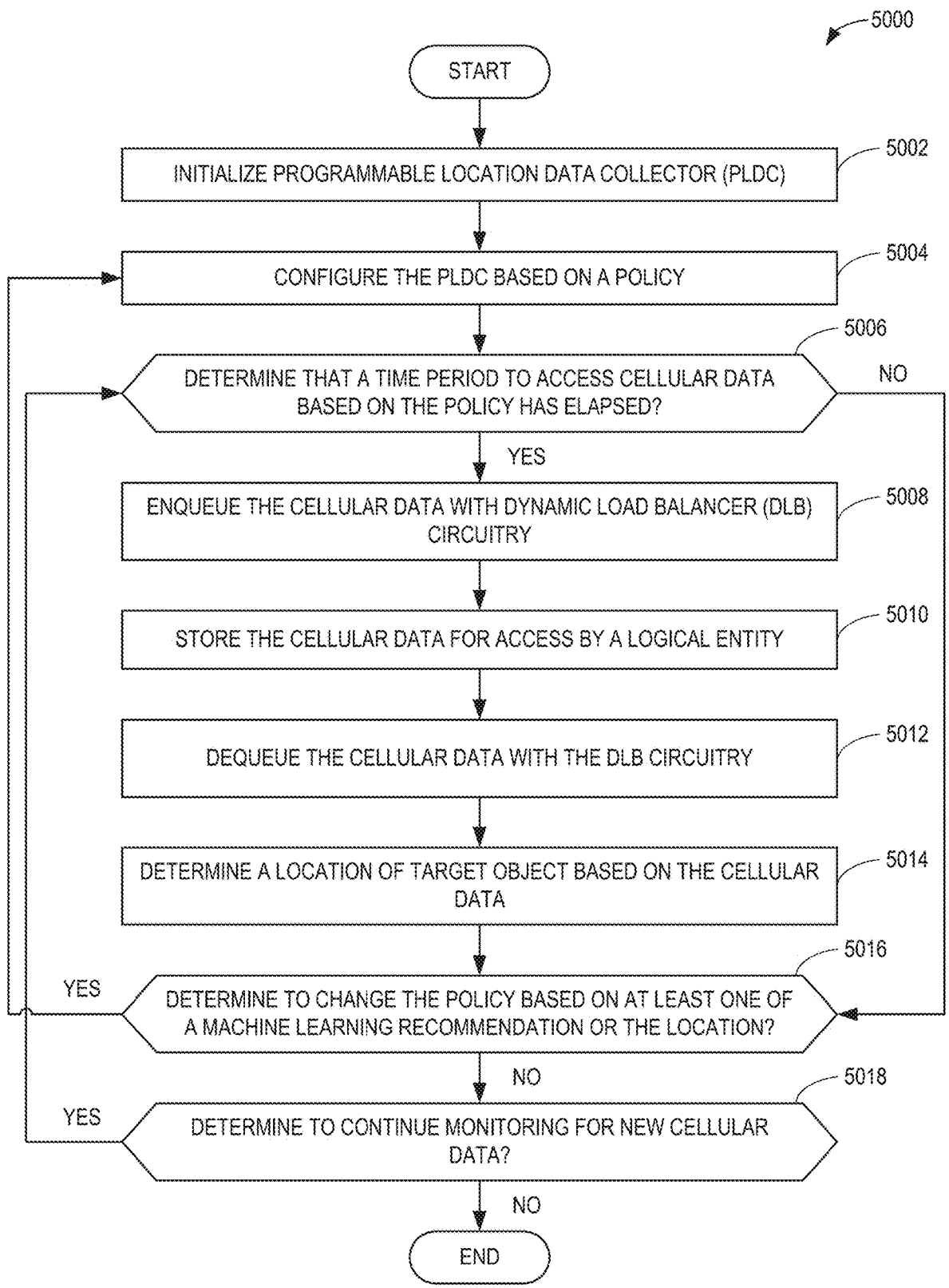
FIG. 50 is a flowchart representative of example machine-readable instructions and/or example operations that may be executed and/or instantiated by example processor circuitry to implement the example location engine circuitry of FIGS. 1 and/or 4 to determine a measurement periodicity and/or a measurement frequency based on a location of a device and/or an object.

FIG. 50 is a flowchart representative of example machine-readable instructions and/or example operations 500 that may be executed and/or instantiated by processor circuitry to implement the example location engine circuitry 140 of FIGS. 1 and/or 4 to determine a measurement periodicity and/or a measurement frequency based on a location of a device and/or an object. The example machine-readable instructions and/or the example operations 5000 of FIG. 50 begin at block 5002, at which the location engine circuitry 140 initializes a programmable location data collector (PLDC). For example, the interface circuitry 410 (FIG. 4) can initialize the PLDC 1524 of FIG. 15A.

At block 5004, the location engine circuitry 140 configures the PLDC based on a policy. For example, the parser circuitry 420 (FIG. 4) can configure the PLDC 1524 based on an SLA, which can define and/or specify that the UE 1502 is to transmit wireless data, such as SRS data, to the RU 1504 of FIG. 15A at a measurement frequency of 2 Hz. In some examples, the UE 1502 can be the device 302 of FIG. 3, which can be located at a top floor of the office building depicted in the illustrated example of FIG. 3.

At block 5006, the location engine circuitry 140 determines whether a time period to access cellular data based on the policy has elapsed. For example, the interface circuitry 410 can determine that 30 seconds have passed and the PLDC 1524 is to obtain SRS data from the UE 1502. If, at block 5006, the location engine circuitry 140 determines that a time period to access cellular data based on the policy has not elapsed, control proceeds to block 5016. Otherwise, control proceeds to block 5008.

At block 5008, the location engine circuitry 140 enqueues the cellular data with dynamic load balancer (DLB) circuitry. For example, the parser circuitry 420 (FIG. 4) can enqueue a data pointer that references the SRS data from the RX core 3110 of FIG. 31A to the DLB circuitry 3114 of FIG. 31A.

At block 5010, the location engine circuitry 140 stores the cellular data for access by a logical entity. For example, the parser circuitry 420 can store the SRS data referenced by the data pointer in memory, one or more mass storage devices, etc., that is/are accessible by application(s), service(s), firmware, etc., and/or any combination(s) thereof. In some examples, the location determination circuitry 490 (FIG. 4) can retrieve the SRS data from the memory, the one or more mass storage devices, etc. In some examples, the location determination circuitry 490 can perform one or more computational tasks, such as TOA calculations, TDOA calculations, AOA calculations, etc., and/or any combination(s) thereof, on the SRS data. In some examples, the location determination circuitry 490 can store the output(s) from the TOA calculations, TDOA calculations, AOA calculations, etc., in the memory, the one or more mass storage devices, etc.

At block 5012, the location engine circuitry 140 dequeues the cellular data with the DLB circuitry. For example, the parser circuitry 420 can dequeue the data pointer that references and/or otherwise corresponds to the SRS data, the output(s), etc., from the DLB circuitry 3114 to the TX core 3112. In some examples, the TX core 3112 can retrieve and/or otherwise obtain the SRS data, the output(s), etc., from the memory, the one or more mass storage devices, etc., referenced by the data pointer. In some examples, the TX core 3112 can output and/or transmit the SRS data, the output(s), etc., to a logical entity, such as processor circuitry, interface circuitry, an application (e.g., a location determination application, a positioning view of a GUI, etc.), a service (e.g., a location determination service, a positioning view of a GUI, etc.), etc.

At block 5014, the location engine circuitry 140 determines a location of target object based on the cellular data. For example, the location determination circuitry 490 can determine a location of the UE 1502 to be the top floor of the building of FIG. 3 based on the SRS data, the output(s), etc.

At block 5016, the location engine circuitry 140 determines whether to change the policy based on at least one of a machine learning recommendation or the location. For example, the location determination circuitry 490 can execute and/or instantiate the ML model(s) 496 with the SRS data, the output(s), etc., as ML input(s) to generate ML output(s), which can include data representative of a recommendation to change a measurement frequency associated with the UE 1502. For example, the ML output(s) can be data that is representative of a prediction or expectation that the UE 1502 is to move from the top floor of the building of FIG. 3 to a lower floor of the building of FIG. 3, which can be associated with a different measurement frequency. In some examples, the location determination circuitry 490 can determine that the UE 1502 is associated with a first measurement frequency of 1 Hz and, based on the determination of the location of the UE 1502 to be on the top floor of the building, can determine that the top floor of the building is associated with a second measurement frequency of 5 Hz. In some examples, the location determination circuitry 490 can determine to change an SLA, a measurement frequency, etc., of the UE 1502 based on at least one of the recommendation from output(s) of the ML model(s) 496 or the determined location of the UE 1502.

If, at block 5016, the location engine circuitry 140 determines to change the policy based on at least one of a machine learning recommendation or the location, control returns to block 5004, to configure the PLDC based on the change to the policy. Otherwise, control proceeds to block 5018.

At block 5018, the location engine circuitry 140 determines whether to continue monitoring for new cellular data. For example, the interface circuitry 410 can determine to continue monitoring an antenna or other receiving hardware, software, and/or firmware for new SRS data associated with the UE 1502. If, at block 5018, the interface circuitry 410 determines to continue monitoring for new cellular data, control returns to block 5006. Otherwise, the example machine-readable instructions and/or the example operations 5000 of FIG. 50 conclude.

Figure 51:
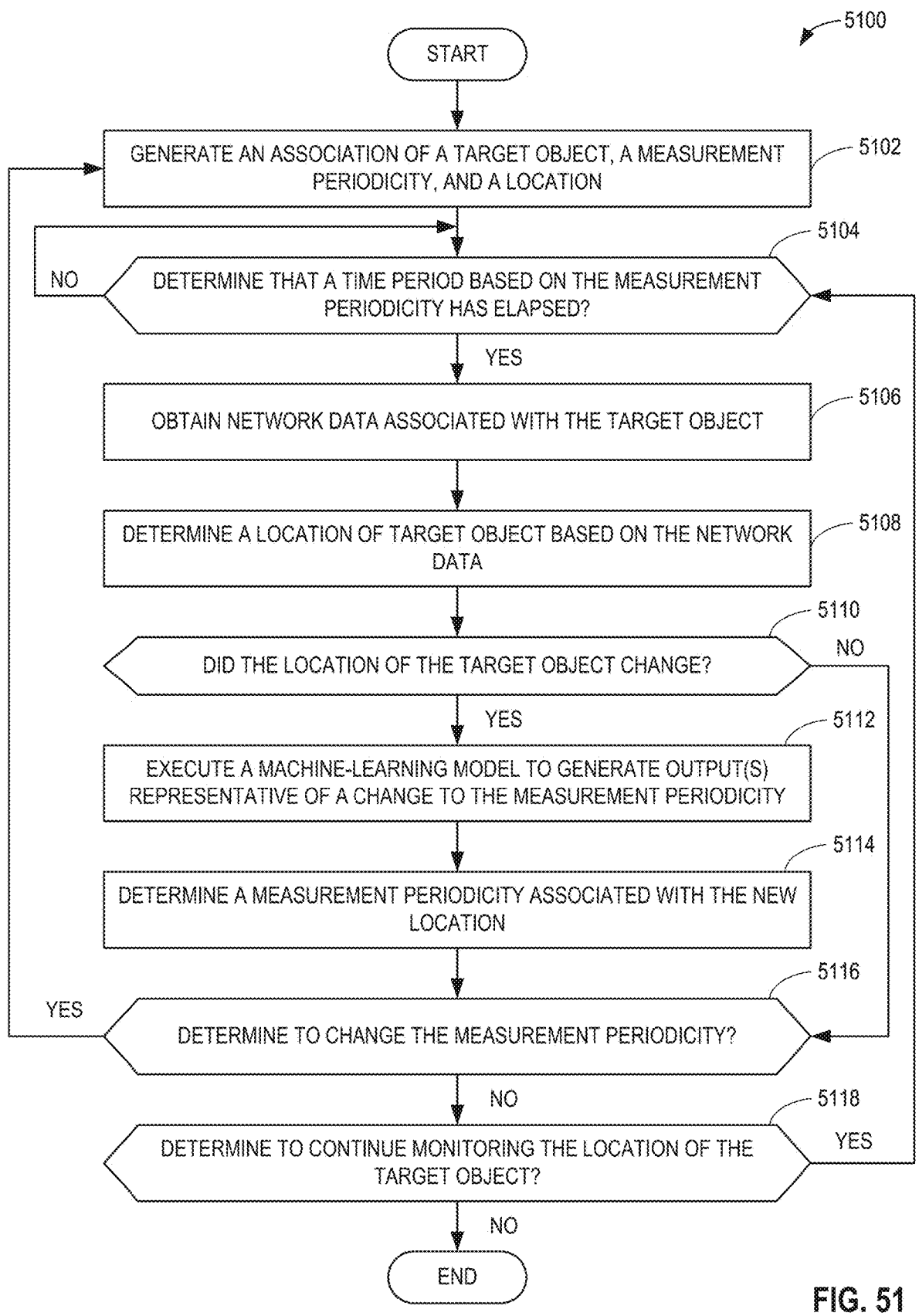
FIG. 51 is another flowchart representative of example machine-readable instructions and/or example operations that may be executed and/or instantiated by example processor circuitry to implement the example location engine circuitry of FIGS. 1 and/or 4 to determine a measurement periodicity based on a location of a device and/or an object.

FIG. 51 is another flowchart representative of example machine-readable instructions and/or example operations 5100 that may be executed and/or instantiated by processor circuitry to implement the example location engine circuitry 140 of FIGS. 1 and/or 4 to determine a measurement periodicity based on a location of a device and/or an object. The example machine-readable instructions and/or example operations 5100 of FIG. 51 begin at block 5102, at which the location engine circuitry 140 generates an association of a target object, a measurement periodicity, and a location. For example, the device identification circuitry 430 (FIG. 4) can generate an association of the second industrial machine 112, a measurement periodicity of 3 times per second (i.e., a measurement frequency of 3 Hz), and a location to be the indoor environment 104 of FIG. 1.

At block 5104, the location engine circuitry 140 determines whether a time period based on the measurement periodicity has elapsed. For example, the interface circuitry 410 (FIG. 4) can determine that at least 20 seconds have passed since the previous location determination associated with the second industrial machine 112 and, thus, the time period specified by the measurement periodicity has elapsed.

If, at block 5104, the location engine circuitry 140 determines that a time period based on the measurement periodicity has not elapsed, control waits at block 5104. Otherwise, control proceeds to block 5106.

At block 5106, the location engine circuitry 140 obtains network data associated with the target object. For example, the interface circuitry 410 can obtain network data (e.g., cellular network data), such as SRS data, from the second industrial machine 112. For example, the second industrial machine 112 can include a 5G cellular transceiver that periodically (e.g., periodically based on an SLA) transmits SRS data to a 5G base station. In some examples, the interface circuitry 410 can obtain the SRS data from the second industrial machine 112 and/or the 5G base station.

At block 5108, the location engine circuitry 140 determines a location of target object based on the network data. For example, the location determination circuitry 490 (FIG. 4) can calculate TOA measurements based on the SRS data, which can include TOA data. In some examples, the location determination circuitry 490 can determine a location of the second industrial machine 112 based on TOA techniques as disclosed herein.

At block 5110, the location engine circuitry 140 determines whether the location of the target object changed. For example, the location determination circuitry 490 can determine that the second industrial machine 112 moved from a first location in the indoor environment 104 to a second location in the indoor environment 104. In some examples, the direction determination circuitry 480 (FIG. 4) can determine that the second industrial machine 112 changed directions in the indoor environment 104.

If, at block 5110, the location engine circuitry 140 determines that the location of the target object did not change, control proceeds to block 5116. Otherwise, control proceeds to block 5112.

At block 5112, the location engine circuitry 140 executes a machine-learning model to generate output(s) representative of a change to the measurement periodicity. For example, the location determination circuitry 490 can execute and/or instantiate the ML model(s) 496 (FIG. 4) with the SRS data, the TOA data, the TOA measurements, etc., as ML input(s) to generate ML output(s), which can include data representative of a change to the measurement periodicity based on the change of the second industrial machine 112 from the first location to the second location in the indoor environment 104.

At block 5114, the location engine circuitry 140 determines a measurement periodicity associated with the new location. For example, the device identification circuitry 430 (FIG. 4) can determine that the second location of the second industrial machine 112 is associated with a measurement periodicity of 5 times per second (i.e., 5 Hz). For example, the device identification circuitry 430 can map the second location to an SLA in the datastore 492 (FIG. 4), which can define the second location to have the measurement periodicity of 5 times per second.

At block 5116, the location engine circuitry 140 determines whether to change the measurement periodicity. For example, the device identification circuitry 430 can determine to change the measurement periodicity associated with the second industrial machine 112 based on at least one of a change in direction or location of the second industrial machine 112. If, at block 5116, the location engine circuitry 140 determines to change the measurement periodicity, control returns to block 5102 to change (i) the association of the second industrial machine 112, the measurement periodicity of 3 times per second, and the first location to (ii) an association of the second industrial machine 112, the measurement periodicity of 5 times per second, and the second location. In some examples, the device identification circuitry 430 can store the new association in the datastore 492 as the multi-spectrum, multi-modal data 494 (FIG. 4).

If, at block 5116, the location engine circuitry 140 determines not to change the measurement periodicity, control proceeds to block 5118. At block 5118, the location engine circuitry 140 determines whether to continue monitoring the location of the target object. For example, the location determination circuitry 490 can determine to continue monitoring the location of the second industrial machine 112 based on the measurement periodicity associated with the second industrial machine 112.

If, at block 5118, the location engine circuitry 140 determines to continue monitoring the location of the target object, control returns to block 5104. Otherwise, the example machine-readable instructions and/or the example operations 5100 of FIG. 51 conclude.

Figure 52:
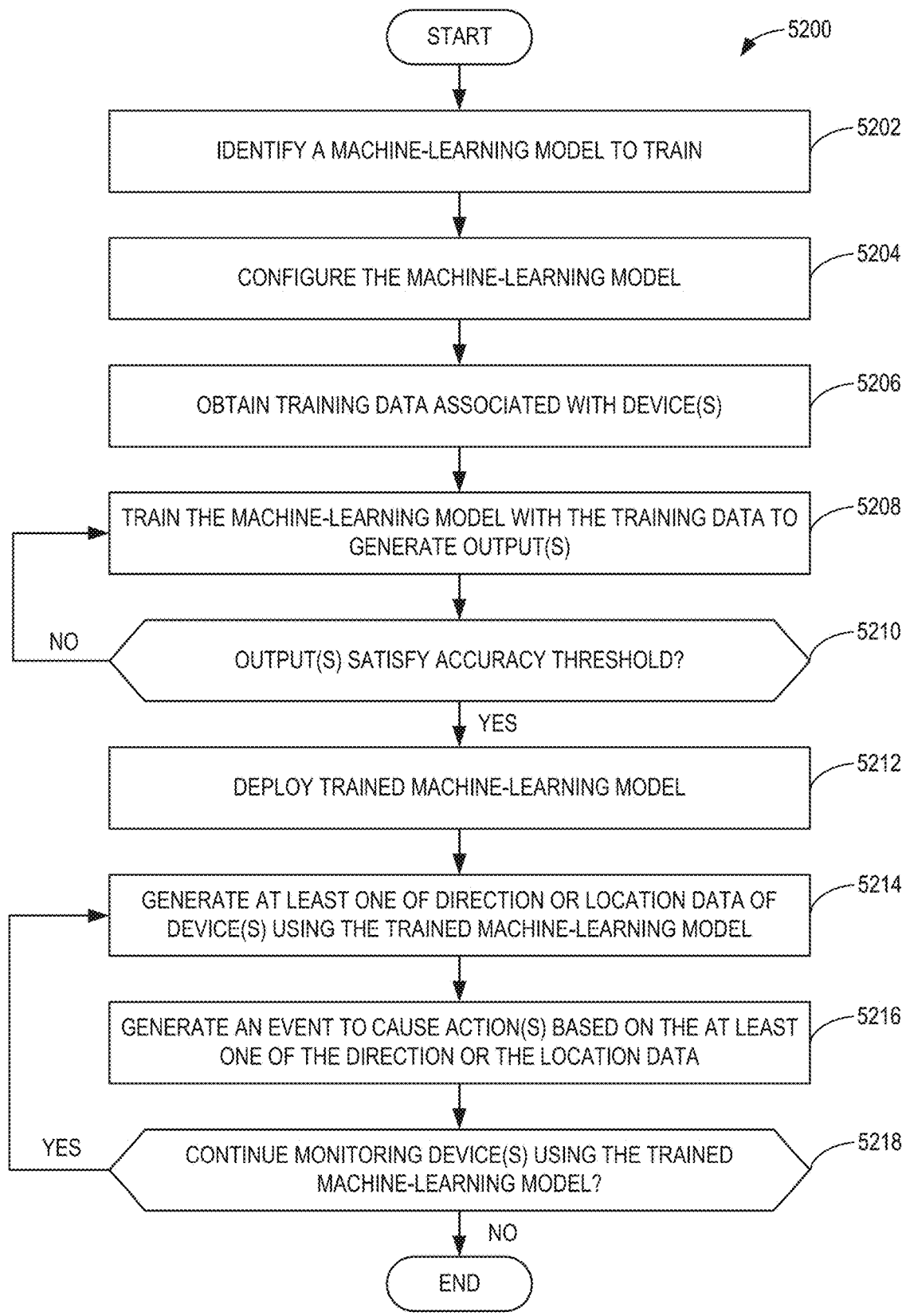
FIG. 52 is a flowchart representative of example machine-readable instructions and/or example operations that may be executed and/or instantiated by example processor circuitry to implement the example location engine circuitry of FIGS. 1 and/or 4 to determine at least one of a direction or a location of a device and/or an object based on output(s) from a machine-learning model.

FIG. 52 is a flowchart representative of example machine-readable instructions and/or example operations 5200 that may be executed and/or instantiated by processor circuitry to implement the location engine circuitry 140 of FIGS. 1 and/or 4 to determine at least one of a direction or a location of a device and/or an object based on output(s) from a machine-learning model. The example machine-readable instructions and/or the example operations 5200 of FIG. 52 begin at block 5202, at which the location engine circuitry 140 identifies a machine-learning model to train. For example, the direction determination circuitry 480 (FIG. 4) and/or the location determination circuitry 490 (FIG. 4) can select one of the ML model(s) 496 of FIG. 4 to train.

At block 5204, the location engine circuitry 140 configures the machine-learning model. For example, the direction determination circuitry 480 and/or the location determination circuitry 490 can configure the one of the ML model(s) 496 based on parameter(s) (e.g., hyperparameter(s)), a policy such as an SLA, an executable (e.g., a configuration image)), etc.

At block 5206, the location engine circuitry 140 obtains training data associated with device(s). For example, the direction determination circuitry 480 and/or the location determination circuitry 490 can obtain events (e.g., live events, past events, records, etc.), different types of data (e.g., 4G LTE records, 5G records, 6G records, Wi-Fi records, Bluetooth records, sensor records, GPS records, etc.), location data (e.g., cartesian coordinates, elevation data, etc.), direction data (e.g., motion vector data), etc.

At block 5208, the location engine circuitry 140 trains the machine-learning model with the training data to generate output(s). For example, the direction determination circuitry 480 and/or the location determination circuitry 490 can train the one of the ML model(s) 496 with the events, the different types of data, etc., and/or any combination(s) thereof, to generate training output(s), which can be used to identify an accuracy of the one of the ML model(s) 496.

At block 5210, the location engine circuitry 140 determines whether the output(s) satisfy an accuracy threshold. For example, the direction determination circuitry 480 and/or the location determination circuitry 490 can determine whether the training output(s) satisfy an accuracy threshold. In some examples, the direction determination circuitry 480 and/or the location determination circuitry 490 can determine whether a difference between a training output and an expected or labeled output satisfies an accuracy threshold.

If, at block 5210, the location engine circuitry 140 determines that the output(s) do(es) not satisfy the accuracy threshold, control returns to block 5208 to train (e.g., continue train) the machine-learning model with the training data to generate output(s). If, at block 5210, the location engine circuitry 140 determines that the output(s) satisfy the accuracy threshold, then, at block 5212, the location engine circuitry 140 deploys a trained machine-learning model. For example, the direction determination circuitry 480 and/or the location determination circuitry 490 can store the trained one of the ML model(s) 496 in the datastore 492 as one of the ML model(s) 496.

At block 5214, the location engine circuitry 140 generates at least one of direction or location data of device(s) using the trained machine-learning model. For example, the direction determination circuitry 480 and/or the location determination circuitry 490 can execute and/or instantiate the trained one of the ML model(s) 496 using the multi-spectrum, multi-modal data 494 as ML input(s) to generate ML output(s), which can include at least one of a direction or a location of a device.

At block 5216, the location engine circuitry 140 generates an event to cause action(s) based on the at least one of the direction or the location data. For example, the event generation circuitry 470 (FIG. 4) can generate an event to invoke and/or cause one or more actions to occur in connection with the device based on at least one of the direction or the location of the device.

At block 5218, the location engine circuitry 140 determines whether to continue monitoring device(s) using the trained machine-learning model. If, at block 5218, the location engine circuitry 140 determines to continue monitoring device(s) using the trained machine-learning model, control returns to block 5214 to generate at least one of direction or location data of device(s) using the trained machine-learning model. Otherwise, the example machine-readable instructions and/or the example operations 5200 of FIG. 52 conclude.

Figure 53:
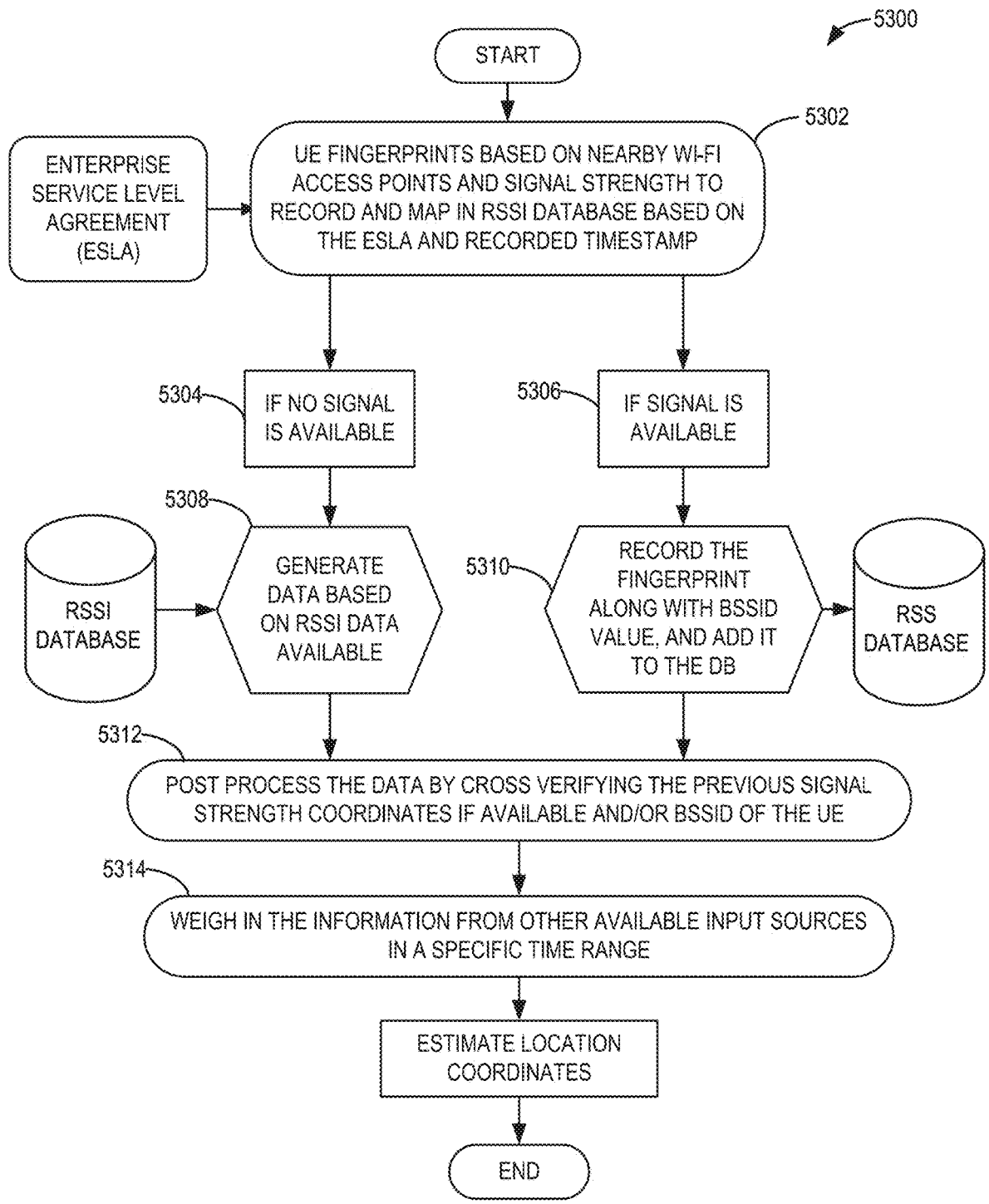
FIG. 53 is a flowchart representative of example machine-readable instructions and/or example operations that may be executed and/or instantiated by example processor circuitry to implement the example location engine circuitry of FIGS. 1 and/or 4 to determine a location of a device and/or an object based on at least one of Wireless Fidelity (Wi-Fi) or Bluetooth communication data.

FIG. 53 is a flowchart representative of example machine-readable instructions and/or example operations 5300 that may be executed and/or instantiated by processor circuitry to implement the example location engine circuitry 140 of FIGS. 1 and/or 4 to determine a location of a device and/or an object based on at least one of Wireless Fidelity (Wi-Fi) or Bluetooth communication data. The example machine-readable instructions and/or the example operations 5300 of FIG. 53 begins by the location engine circuitry 140 identifying UE fingerprints based on nearby Wi-Fi APs and signal strength to record and map in an RSSI database based on an enterprise service level agreement (ESLA), and recording timestamp(s) (identified by block 5302). In some examples, the ESLA can include and/or implement a policy, which can include accuracy value(s), input source(s) (e.g., selection(s) of data producers or data sources), a number of hardware resources to utilize (e.g., a number of cores, processor circuitry cores, etc.), a quantity of safety memory to utilize, a bandwidth to utilize, etc., and/or any combination(s) thereof.

If the location engine circuitry 140 determines that there is no signal (e.g., Wi-Fi signal) available (identified by block 5304), then the location engine circuitry 140 generates data based on available RSSI data from an RSSI database (identified by block 5308). If the location engine circuitry 140 determines that there is a signal (e.g., a Wi-Fi signal) available (identified by block 5306), the location engine circuitry 140 records a fingerprint based on the signal, and adds the fingerprint and a basic service set identifier (BSSID) value in a received signal strength (RSS) database (identified by block 5310). For example, the RSS database can include data indicating reception signal strength (e.g., a real signal strength) of signals. In some examples, the RSS database can include values of signal strength received by a receiver. In some examples, a BSSID can implement the MAC address of a radio interface that the location engine circuitry 140 is connected to receive the signal.

In some examples, the RSS database and/or the RSSI database can include homogeneous and/or heterogeneous data. For example, the RSS database can include homogeneous RSS data, which can include RSS values from multiple Wi-Fi APs. In some examples, the RSS database can include homogeneous RSS data, which can include RSS values from multiple Bluetooth beacons, multiple satellites, etc. In some examples, the RSS database can include heterogeneous RSS data, which can include first RSS values from one or more Wi-Fi APs, one or more satellites, and/or one more IoT devices.

In some examples, the RSSI database can include homogeneous RSSI data, which can include RSSI values from multiple Wi-Fi APs. In some examples, the RSSI database can include homogeneous RSSI data, which can include RSSI values from multiple Bluetooth beacons, multiple satellites, etc. In some examples, the RSSI database can include heterogeneous RSSI data, which can include first RSSI values from one or more Wi-Fi APs, second RSSI values from one or more satellites, third RSSI values from one more IoT devices, etc.

In response to at least one of generating the data or recording the fingerprint and BSSID value, the location engine circuitry 140 post processes the data by cross verifying the previous signal strength coordinates if available and a BSSID of the UE (identified by block 5312). In some examples, the location engine circuitry 140 can weigh in the information from other available input sources in a specific time range (or a time range of interest) to determine location coordinates of the UE (e.g., best guess location coordinates, estimate location coordinates, etc.). In response to estimating the location coordinates, the example machine-readable instructions and/or the example operations 5300 of FIG. 53 conclude.

Figure 54:
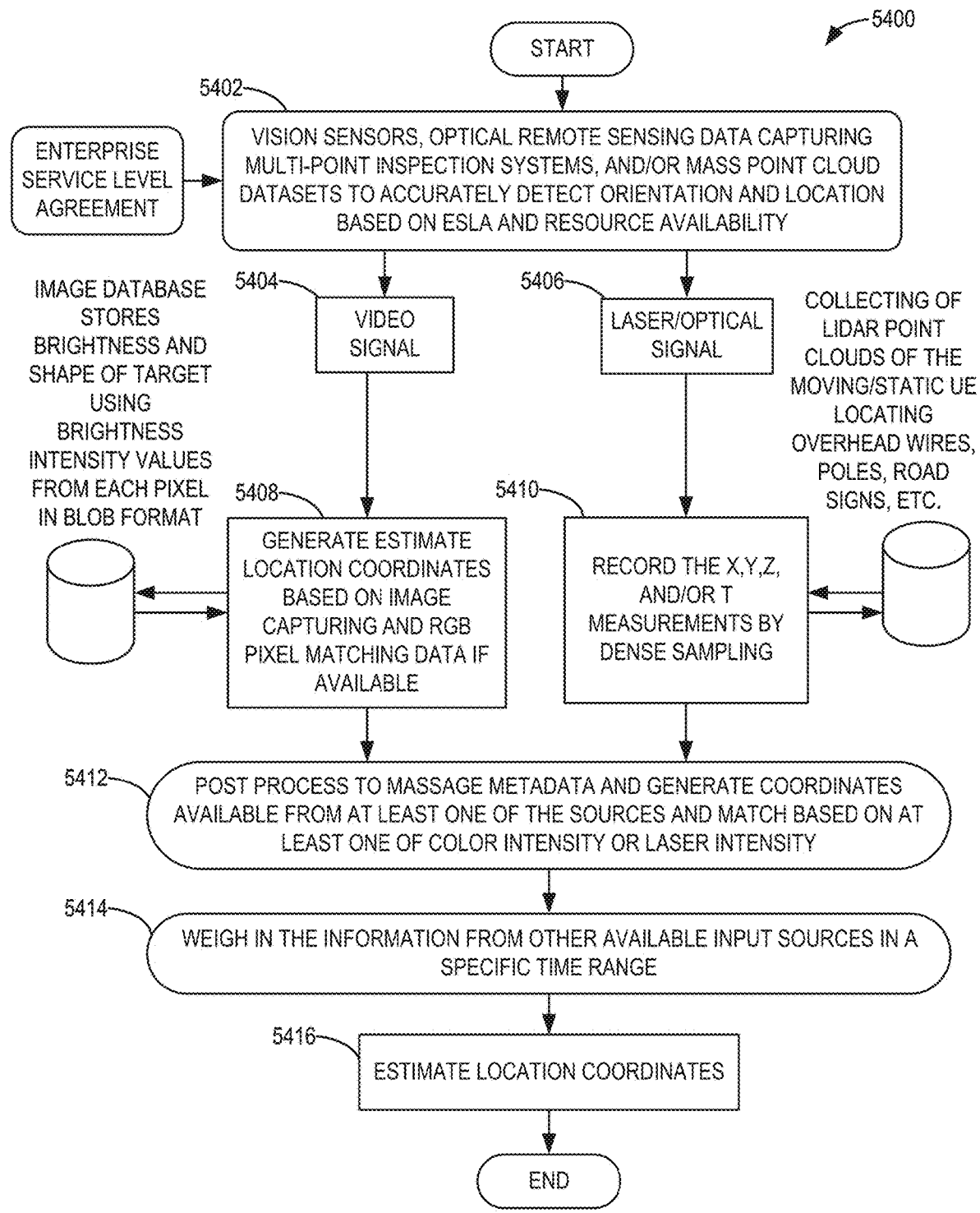
FIG. 54 is a flowchart representative of example machine-readable instructions and/or example operations that may be executed and/or instantiated by example processor circuitry to implement the example location engine circuitry of FIGS. 1 and/or 4 to determine a location of a device and/or an object based on at least one of camera or LIDAR sensor data.

FIG. 54 is a flowchart representative of example machine-readable instructions and/or example operations 5400 that may be executed and/or instantiated by processor circuitry to implement the example location engine circuitry 140 of FIGS. 1 and/or 4 to determine a location of a device and/or an object based on at least one of camera or LIDAR sensor data. The example machine-readable instructions and/or the example operations 5400 of FIG. 54 begin at block 5402, at which the location engine circuitry 140 obtains data from vision sensors, optical remote sensing data capturing multipoint inspection systems, and/or mass point cloud datasets to detect (e.g., accurately detect) an orientation and/or location of an object based on an ESLA and/or resource (e.g., hardware, software, and/or firmware resource) availability.

In response to an identification of a video signal based on the obtained data (identified by block 5404), the location engine circuitry 140 generates estimate location coordinates (e.g., best estimated coordinates) based on image capturing and red-green-blue (RGB) pixel matching data (if available) (identified by block 5408). The location engine circuitry 140 can retrieve brightness data, shape data, etc., associated with the object using brightness intensity values from pixel(s) in a binary large object (BLOB) format.

In response to an identification of a laser and/or optical signal (e.g., a signal from a LIDAR system or sensor(s)) based on the obtained data (identified by block 5406), the location engine circuitry 140 records measurements (e.g., x-, y-, z-coordinate measurements and/or t time measurements) by dense sampling (identified by block 5410). In some examples, the measurements include an x-, y-, and/or z-coordinate in a Cartesian plane (e.g., x-, y-, and/or z-Cartesian coordinate). The location engine circuitry 140 records a collection of LIDAR point clouds of moving or static objects (e.g., UEs), located overhead wires, poles, road signs, etc., in a database.

In response to at least one of generating coordinates or recording measurements, the location engine circuitry 140 post processes to massage metadata and generate coordinates available from at least one of the videos signal source or the laser signal source and match based on at least one of color intensity or laser intensity (identified by block 5412). The location engine circuitry 140 weighs in the information from other available input sources in a specific time range (or a time range of interest) (identified by block 5414) to estimate location coordinates of the object (e.g., best guess location coordinates, estimate location coordinates, etc.) (identified by block 5416). In response to estimating the location coordinates at block 5416, the example machine-readable instructions and/or the example operations 5400 of FIG. 54 conclude.

Figure 55:
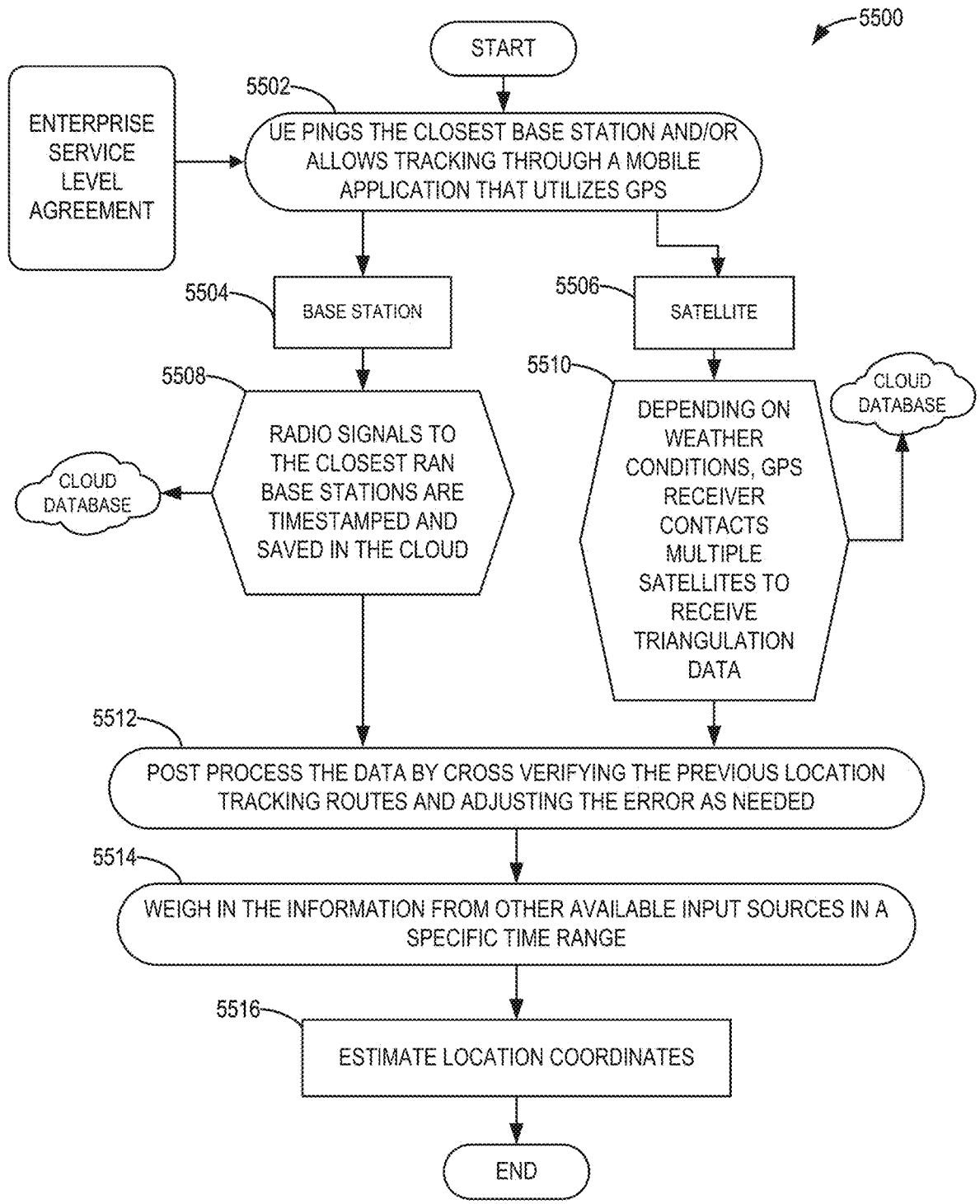
FIG. 55 is a flowchart representative of example machine-readable instructions and/or example operations that may be executed and/or instantiated by example processor circuitry to implement the example location engine circuitry of FIGS.

FIG. 55 is a flowchart representative of example machine-readable instructions and/or example operations 5500 that may be executed and/or instantiated by processor circuitry to implement the example location engine circuitry 140 of FIGS. 1 and/or 4 to determine a location of a device and/or an object based on at least one of radio access network or satellite communication data (e.g., cellular data, GEO data, GNSS data, and/or LEO data). The example machine-readable instructions and/or the example operations 5500 of FIG. 55 begin at block 5502, at which a UE pings a closest base station and/or allows tracking through a mobile application that utilizes GPS based on an ESLA. The location engine circuitry 140 obtains data from a base station that a UE pinged (identified by block 5504). For example, the UE may generate the data via a cellular connection with the base station. The location engine circuitry 140 obtains data from a satellite that is tracking the UE through a mobile application that utilizes GPS (identified by block 5506). For example, the satellite may be an LEO satellite and/or a GEO satellite.

In response to receiving data from the base station, the location engine circuitry 140 timestamps radio signals to the closest RAN base stations and store the timestamp(s) in a database (e.g., a cloud database) (identified by block 5508). In response to receiving data from the satellite, the location engine circuitry 140 receives triangulation data from the GPS receiver and store the triangulation data in a database (e.g., a cloud database) (identified by block 5510).

The location engine circuitry 140 post processes the data by cross verifying the previous location tracking routes and adjusting an error as needed (identified by block 5512). The location engine circuitry 140 weighs in the information from other available input sources in a specific time range (or a time range of interest) (identified by block 5512) to estimate location coordinates of the object (e.g., best guess location coordinates, estimate location coordinates, etc.) (identified by block 5514). In response to estimating the location coordinates, the example machine-readable instructions and/or the example operations 5500 of FIG. 55 conclude.

FIG. 56 is a flowchart representative of example machine-readable instructions and/or example operations 5600 that may be executed and/or instantiated by processor circuitry to implement the example location engine circuitry 140 of FIGS. 1 and/or 4 to track a location of a device and/or an object. The example machine-readable instructions and/or the example operations 5600 of FIG. 56 begin at block 5602, at which the location engine circuitry 140 selects an object of interest to locate. For example, the device identification circuitry 430 (FIG. 4) can select the second industrial machine 112 of FIG. 1 to locate.

At block 5604, the location engine circuitry 140 locates the object using a machine-learning model based on multi-spectrum, multi-modal data from sensor(s). For example, the direction determination circuitry 480 (FIG. 4) and/or the location determination circuitry 490 (FIG. 4) can locate the second industrial machine 112 based on executing and/or instantiating the ML model(s) 496 (FIG. 4) using the multi-spectrum, multi-modal data 494, or portion(s) thereof, as ML input(s).

At block 5606, the location engine circuitry 140 generates a motion vector of the object. For example, the direction determination circuitry 480 can determine a motion vector of the second industrial machine 112 based on a direction, a speed, etc., of the second industrial machine 112. In some examples, the direction determination circuitry 480 can determine the direction, the speed, etc., of the second industrial machine based on data from the second industrial machine 112, sensor data associated with the second industrial machine 112, etc., and/or any combination(s) thereof.

At block 5608, the location engine circuitry 140 executes anomaly detection based on the motion vector. For example, the event generation circuitry 470 (FIG. 4) can determine whether there is anomalous behavior, an anomaly condition present in the indoor environment 104 of FIG. 1, etc., based on the motion vector of the second industrial machine 112. In some examples, the event generation circuitry 470 can execute and/or instantiate the ML model(s) 496 with the motion vector as ML input(s) to generate ML output(s), which can include the determination of the anomalous behavior, the anomaly condition, etc.

At block 5610, the location engine circuitry 140 determines whether tracking of the object has been interrupted. For example, the direction determination circuitry 480 and/or the location determination circuitry 490 can determine that a line of sight of the second industrial machine 112 has been obstructed, the second industrial machine 112 is no longer communicating and/or connected to device(s) in the indoor environment 104, etc.

If, at block 5610, the location engine circuitry 140 determines that the tracking of the object has not been interrupted, control proceeds to block 5616 to generate an event to cause action(s) based on the location of the object. If, at block 5610, the location engine circuitry 140 determines that the tracking of the object has been interrupted, then, at block 5612, the location engine circuitry 140 selects data from one(s) of the sensor(s) for a location prediction algorithm. For example, the direction determination circuitry 480 and/or the location determination circuitry 490 can select data from one(s) of sensor(s) or other device(s) in the outdoor environment 102, the indoor environment 104, and/or, more generally, the location determination environment 100 of FIG. 1.

At block 5614, the location engine circuitry 140 predicts a location of the object using the location prediction algorithm based on at least one of the motion vector or the selected data. For example, the TOA determination circuitry 440 (FIG. 4) can calculate TOA measurements associated with TOA data in connection with the second industrial machine 112. In some examples, the AOA determination circuitry 460 (FIG. 4) can calculate AOA measurements associated with AOA data in connection with the second industrial machine 112. In some examples, the location determination circuitry 490 can determine the location of the second industrial machine 112 based on at least one of the TOA measurements, the AOA measurements, or the motion vector of the second industrial machine 112 based on data from one(s) of sensor(s) or other device(s) in the outdoor environment 102, the indoor environment 104, and/or, more generally, the location determination environment 100 of FIG. 1.

At block 5616, the location engine circuitry 140 generates an event to cause action(s) based on the location of the object. For example, the event generation circuitry 470 can generate an event to cause one or more actions to occur in connection with the device based on at least one of the direction or the location of the device.

At block 5618, the location engine circuitry 140 determines whether to select another object to locate. For example, the device identification circuitry 430 can determine to locate the first industrial machine 110 of FIG. 1. If, at block 5618, the location engine circuitry 140 determines to select another object to locate, control returns to block 5602 to select an object of interest to locate. Otherwise, the example machine-readable instructions and/or the example operations 5600 of FIG. 56 conclude.

FIG. 57 is a flowchart representative of example machine-readable instructions and/or example operations 5700 that may be executed and/or instantiated by processor circuitry to implement the example location engine circuitry 140 of FIGS. 1 and/or 4 to output a location of a device and/or an object based on weights of information from available input sources. In some examples, the example machine-readable instructions and/or the example operations 5700 of FIG. 57 can implement the associated operations of at least one of the example machine-readable instructions and/or the example operations 5300 of FIG. 53 (e.g., at least block 5314), the example machine-readable instructions and/or the example operations 5400 of FIG. 54 (e.g., at least block 5414), and/or the example machine-readable instructions and/or the example operations 5500 of FIG. 55 (e.g., at least block 5514) to weigh in the information from other available input sources in a specific time range. The example machine-readable instructions and/or the example operations 5700 of FIG. 57 begin at block 5702, at which the location engine circuitry 140 receives a request for a location for an object. For example, the interface circuitry 410 (FIG. 4) can receive a request for a location of a UE in a network environment.

At block 5704, the location engine circuitry 140 determines a location determination policy. For example, the interface circuitry 410 can receive a policy associated with the network environment, which may include priority requirements (e.g., throughput, latency, etc.), QoS requirements, reliability requirements, resiliency requirements, etc., and/or any combination(s) thereof. In some examples, the policy can be stored at the Edge or in a cloud data center or any other location in a network environment. In some examples, the policy can be implemented using an SLA as disclosed herein. In some examples, the policy can include network connectivity requirements associated with the network environment status 3600 of FIG. 36.

At block 5706, the location engine circuitry 140 determines a network environment status. For example, at least one of the interface circuitry 410, the parser circuitry 420 (FIG. 4), the device identification circuitry 430 (FIG. 4), or the location determination circuitry 490 (FIG. 4) can execute and/or instantiate the network environment status 3600 of FIG. 36 to identify data sources from which data can be obtained for location determination of the object. In some examples, the location determination circuitry 490 can utilize the network environment status 3600 to generate the location determination data source decision tree 3700 of FIG. 37.

At block 5708, the location engine circuitry 140 generates a location decision tree baseline. For example, the location determination circuitry 490 can execute and/or instantiate the machine learning model(s) 496 (FIG. 4) to generate the location determination data source decision tree 3700 of FIG. 37.

At block 5710, the location engine circuitry 140 prunes the location decision tree based on the network environment status for the request. For example, the location determination circuitry 490 can execute and/or instantiate the machine learning model(s) 496 to identify one(s) of the data sources that are not available to provide data.

At block 5712, the location engine circuitry 140 generates a location determination output for the object based on the pruned location decision tree. For example, the location determination circuitry 490 can generate a location, a position, etc., of the object based on the pruned location decision tree.

At block 5714, the location engine circuitry 140 evaluates the location determination output based on the location determination policy. For example, the location determination circuitry 490 can determine whether the location of the object comports with and/or otherwise satisfies requirements set forth in the location determination policy.

At block 5716, the location engine circuitry 140 determines whether to regenerate the location decision tree baseline based on the evaluation. For example, the location determination circuitry 490 can determine that the location determination output does not satisfy the location determination policy and thereby necessitating a regeneration of the location determination data source decision tree 3700.

If, at block 5716, the location engine circuitry 140 determines to regenerate the location decision tree baseline based on the evaluation, control returns to block 5708. Otherwise, control proceeds to block 5718. At block 5718, the location engine circuitry 140 outputs a location of the object. For example, the location determination circuitry 490 can determine a location, a position, etc., (e.g., an angle, a direction, a set of coordinates, etc.) of the object.

At block 5720, the location engine circuitry 140 determines whether another request is received for the location of the object. If, at block 5720, the location engine circuitry 140 determines that another request is received for the location of the object, control returns to block 5702. Otherwise, the example machine-readable instructions and/or the example operations 5700 of FIG. 57 conclude.

FIG. 58 is a flowchart representative of example machine-readable instructions and/or example operations 5800 that may be executed and/or instantiated by processor circuitry to implement the example location engine circuitry 140 of FIGS. 1 and/or 4 to initialize an example location determination system. The example machine-readable instructions and/or the example operations 5800 of FIG. 58 begin at block 5802, at which the location engine circuitry 140 starts a precision time protocol (PTP) server. For example, the interface circuitry 410 (FIG. 4) can initialize (e.g., by transmitting a wake-up packet, signal, command, etc.) a PTP server based on PTP as disclosed herein.

At block 5804, the location engine circuitry 140 starts a core server. For example, the interface circuitry 410 can initialize a core server (e.g., a 5G core server) as disclosed herein.

At block 5806, the location engine circuitry 140 starts a location engine server. For example, the interface circuitry 410 can initialize a server that includes and/or implements the location engine circuitry 140.

At block 5808, the location engine circuitry 140 starts a radio unit with PTP synchronization. For example, the interface circuitry 410 can initialize a radio unit (RU) or any other radio hardware, software, and/or firmware as disclosed herein.

At block 5810, the location engine circuitry 140 determines whether the radio unit is downlinking radiofrequency data. For example, the interface circuitry 410 can determine whether the radio unit is receiving radiofrequency data (e.g., cellular data) from a UE or any other radiofrequency-enabled device.

If, at block 5810, the location engine circuitry 140 determines that the radio unit is not downlinking radiofrequency data, control returns to block 5808. Otherwise, control proceeds to block 5812. At block 5812, the location engine circuitry 140 starts a vRAN interface. For example, the interface circuitry 410 can initialize a vRAN or vRAN interface as disclosed herein.

At block 5814, the location engine circuitry 140 starts a radio access network centralized unit. For example, the interface circuitry 410 can initialize a CU or RAN-CU as disclosed herein.

At block 5816, the location engine circuitry 140 starts a radio access network distributed unit. For example, the interface circuitry 410 can initialize a DU or RAN-DU as disclosed herein.

At block 5818, the location engine circuitry 140 determines whether a radiofrequency downlink is active. For example, the interface circuitry 410 can determine whether at least one of the vRAN interface, the CU, or the DU is receiving radiofrequency data (e.g., cellular data) from a UE or any other radiofrequency-enabled device.

If, at block 5818, the location engine circuitry 140 determines that a radiofrequency downlink is not active, control waits at block 5818. Otherwise, control proceeds to block 5820. At block 5820, the location engine circuitry 140 initiates user equipment to send sounding reference signal data. For example, the interface circuitry 410 can transmit a wake-up packet, signal, command, etc., to a UE or any other radiofrequency enabled device as disclosed herein to begin sending SRS data. In response to initiating the user equipment to send sounding reference signal data at block 5820, the example machine-readable instructions and/or the example operations 5800 of FIG. 58 conclude.

FIG. 59 is a flowchart representative of example machine-readable instructions and/or example operations 5900 that may be executed and/or instantiated by processor circuitry to implement the example location engine circuitry 140 of FIGS. 1 and/or 4 to determine a location of a device and/or an object based on a service level agreement. The example machine-readable instructions and/or the example operations 5900 of FIG. 59 begin at block 5902, at which the location engine circuitry 140 determines whether to poll new complete user equipment sounding reference signal (SRS) data. For example, the interface circuitry 410 (FIG. 4) can determine whether to poll and/or solicit new complete SRS data associated with one or more UEs.

If, at block 5902, the location engine circuitry 140 determines not to poll new complete user equipment sounding reference signal (SRS) data, control waits at block 5902. Otherwise, control proceeds to block 5904.

At block 5904, the location engine circuitry 140 determines whether a fast path is enabled by a service level agreement. For example, the event generation circuitry 470 (FIG. 4) can determine whether an SLA that is in effect for a particular application allows the processing of SRS data with improved efficiency and throughput with reduced latency. In some examples, the event generation circuitry 470 can determine that the fast path is enabled and corresponds to a hardware efficient SRS data processing feature, which can be implemented by DLB circuitry as disclosed herein.

If, at block 5904, the location engine circuitry 140 determines that a fast path is enabled by a service level agreement, control proceeds to block 5906. At block 5906, the location engine circuitry 140 enqueues the UE SRS data with dynamic load balancer (DLB) circuitry. For example, the event generation circuitry 470 can enqueue the UE SRS data using a hardware implemented dynamic load balancer as disclosed herein.

At block 5908, the location engine circuitry 140 determines a location estimate based on the UE SRS data. For example, the location determination circuitry 490 (FIG. 4) can determine an estimate of a location of a UE that supplied the SRS data based on the UE SRS data.

At block 5910, the location engine circuitry 140 dequeues the location estimate with the DLB circuitry. For example, the event generation circuitry 470 can dequeue the location estimate using hardware. In response to dequeuing the location estimate with the DLB circuitry at block 5910, control proceeds to block 5916.

If, at block 5904, the location engine circuitry 140 determines that a fast path is not enabled by a service level agreement, control proceeds to block 5912. At block 5912, the location engine circuitry 140 executes an instruction to copy the UE SRS data to a new memory location, which may be carried out with reduced efficiency with respect to the fast path as disclosed above. For example, the parser circuitry 420 (FIG. 4) can execute and/or instantiate a MEMCPY instruction to copy the UE SRS data to memory, one or more mass storage devices, etc.

At block 5914, the location engine circuitry 140 determines a location estimate. For example, the location determination circuitry 490 can determine an estimate of a location of a UE that supplied the SRS data based on the UE SRS data.

At block 5916, the location engine circuitry 140 outputs the location estimate to a location service. For example, the interface circuitry 410 can provide the estimate of the location of the UE to a GUI executed and/or instantiated by an application/service as disclosed herein.

At block 5918, the location engine circuitry 140 determines whether to continue monitoring a network environment. If, at block 5918, the location engine circuitry 140 determines to continue monitoring the network environment, control returns to block 5902. Otherwise, the example machine-readable instructions and/or the example operations 5900 of FIG. 59 conclude.

FIG. 60 is a flowchart representative of example machine-readable instructions and/or example operations 6000 that may be executed and/or instantiated by processor circuitry to implement the example location engine circuitry 140 of FIGS. 1 and/or 4 to output a location determination to a graphical user interface. The example machine-readable instructions and/or the example operations 6000 of FIG. 60 begin at block 6002, at which the location engine circuitry 140 determines whether a new location determination is available. For example, the location determination circuitry 490 (FIG. 4) can determine whether a new location for an object is available. If, at block 6002, the location engine circuitry 140 determines that a new location determination is not available, control waits at block 6002. Otherwise, control proceeds to block 6004.

At block 6004, the location engine circuitry 140 retrieves the location determination from a location engine server. For example, the interface circuitry 410 (FIG. 4) can retrieve the new location determination for the object from a server (e.g., a server that can include and/or implement the location engine circuitry 140 or portion(s) thereof) via a network.

At block 6006, the location engine circuitry 140 updates a graphical user interface based on the location determination. For example, the location determination circuitry 490 can render the new location determination for the object using a GUI executed and/or instantiated by an application/service.

At block 6008, the location engine circuitry 140 determines whether to continue monitoring for a new location determination. If, at block 6008, the location engine circuitry 140 determines to continue monitoring for a new location determination, control returns to block 6002. Otherwise, the example machine-readable instructions and/or the example operations 6000 of FIG. 60 conclude.

FIG. 61 is a flowchart representative of example machine-readable instructions and/or example operations 6100 that may be executed and/or instantiated by processor circuitry to implement the example location engine circuitry 140 of FIGS. 1 and/or 4 to generate a notification that communication data is available for consumption. The example machine-readable instructions and/or the example operations 6100 of FIG. 61 begin at block 6102, at which the location engine circuitry 140 determines whether new sounding reference signal (SRS) data and/or sensor data is available. For example, the interface circuitry 410 (FIG. 4) can determine whether at least one of new SRS data associated with a UE or sensor data from sensor(s) monitoring the UE (or a user associated with the UE) are available for location determination. If, at block 6102, the location engine circuitry 140 determines that new SRS data and/or sensor data is not available, control waits at block 6102. Otherwise, control proceeds to block 6104.

At block 6104, the location engine circuitry 140 completes a payload for location determination. For example, the event generation circuitry 470 (FIG. 4) can generate and/or complete a payload by including the SRS data, the sensor data, and/or a UE identifier in a payload of one or more data packets.

At block 6106, the location engine circuitry 140 determines whether a fast path is enabled by a service level agreement. For example, the event generation circuitry 470 can determine whether an SLA that is in effect for a particular application allows the processing of SRS data and/or sensor data with improved efficiency, improved throughput, and/or reduced latency. In some examples, the event generation circuitry 470 can determine that the fast path is enabled and corresponds to a hardware efficient SRS data processing feature, which may be implemented by DLB circuitry as disclosed herein.

If, at block 6106, the location engine circuitry 140 determines that a fast path is enabled by a service level agreement, control proceeds to block 6108. At block 6108, the location engine circuitry 140 enqueues the SRS data and/or the sensor data with dynamic load balancer circuitry. For example, the event generation circuitry 470 can enqueue the SRS data and/or the sensor data using hardware. In some examples, the event generation circuitry 470 can enqueue the SRS data and/or the sensor data by enqueuing a data pointer to a queue implemented using hardware with the data pointer referencing a UE associated with the SRS data and/or the sensor data. In some examples, the data pointer can point and/or otherwise reference a memory location at which the SRS data and/or the sensor data associated with the UE is stored. In response to enqueueing the SRS data and/or the sensor data with dynamic load balancer circuitry at block 6108, control proceeds to block 6112.

If, at block 6106, the location engine circuitry 140 determines that a fast path is not enabled by a service level agreement, control proceeds to block 6110. At block 6110, the location engine circuitry 140 executes an instruction to copy the UE SRS data to a new memory location, which can be carried out with reduced efficiency with respect to the fast path as disclosed above. For example, the parser circuitry 420 (FIG. 4) can execute a MEMCPY instruction to copy the UE SRS data to memory, one or more mass storage devices, etc.

At block 6112, the location engine circuitry 140 notifies an application/service of a new symbol. For example, the interface circuitry 410 can notify, inform, alert, etc., an application/service associated with location determination that a new symbol (e.g., an SRS symbol, an SRS location symbol, etc.) is ready to process. In some examples, the location determination circuitry 490 (FIG. 4) can determine a location of an object in response to the notification of the new symbol by retrieving the SRS data and/or the sensor data. For example, the symbol can be implemented with a discrete symbol as utilized in digital communication systems (e.g., radiofrequency and/or cellular communication systems). In some examples, the symbol can refer to, correspond to, and/or otherwise be representative of SRS data for one or more UEs.

At block 6114, the location engine circuitry 140 determines whether to continue monitoring for new SRS data and/or sensor data. If, at block 6114, the location engine circuitry 140 determines to continue monitoring for new SRS data and/or sensor data, control returns to block 6102. Otherwise, the example machine-readable instructions and/or the example operations 6100 of FIG. 61 conclude.

FIG. 62 is a flowchart representative of example machine-readable instructions and/or example operations 6200 that may be executed and/or instantiated by processor circuitry to implement the example location engine circuitry 140 of FIGS. 1 and/or 4 to determine a location of a device and/or an object based on at least one of on-premises or off-premises determination(s). The example machine-readable instructions and/or example operations 6200 begin at block 6202, at which the location engine circuitry 140 obtains wireless data associated with target object at a data receiver. For example, the interface circuitry 410 (FIG. 4) can obtain wireless data, such as SRS data, associated with a plurality of UEs including the UE 1502 from the PLDC 1524 of FIG. 15A.

At block 6204, the location engine circuitry 140 parses the wireless data at the data receiver based on identifier of the target object. For example, the parser circuitry 420 (FIG. 4) can extract portion(s) of the SRS data that correspond to the UE 1502 based on an identifier of the UE 1502 that is included in the portion(s) of the SRS data.

At block 6206, the location engine circuitry 140 determines whether to offload the wireless data for off-premises location determination. For example, the interface circuitry 410, the parser circuitry 420, the location determination circuitry 490 (FIG. 4), etc., can determine to offload the SRS data of the UE 1502 to the location/edge server 1510 of FIG. 15A for location determination of the UE 1502 of FIG. 15A. Alternatively, the interface circuitry 410, the parser circuitry 420, the location determination circuitry 490, etc., can determine to carry out a location determination of the UE 1502 on the RAN 1506 of FIG. 15A.

If, at block 6206, the location engine circuitry 140 determines to offload the wireless data for off-premises location determination, control proceeds to block 6208. At block 6208, the location engine circuitry 140 transfers the wireless data off-premises. For example, the interface circuitry 410 can transfer, transmit, and/or output the SRS data of the UE 1502 to the location/edge server 1510 of FIG. 15A for location determination of the UE 1502 of FIG. 15A. After transfer of the wireless data off-premises, control proceeds to block 6212.

At block 6212, the location engine circuitry 140 determines a location of the target object based on the location measurements off-premises. For example, the location determination circuitry 490 of the location engine circuitry 140 of the location/edge server 1510 of FIG. 15A can determine the location of the UE 1502 based on the SRS data. After determining a location of the target object based on the location measurements off-premises at block 6212, control proceeds to block 6214.

If, at block 6206, the location engine circuitry 140 determines not to offload the wireless data for off-premises location determination, control proceeds to block 6210. At block 6210, the location engine circuitry 140 determines a location of the target object based on the wireless data at the data receiver. For example, the location determination circuitry 490 of the location engine circuitry 140 of the RAN 1506 can determine the location of the UE 1502 based on the SRS data associated with the UE 1502. After a determination of a location of the target object based on the wireless data at the data receiver at block 6210, control proceeds to block 6214.

At block 6214, the location engine circuitry 140 determines whether to continue monitoring for new wireless data. If, at block 6214, the location engine circuitry 140 determines to continue monitoring for new wireless data, control returns to block 6202. Otherwise, the example machine-readable instructions and/or the example operations 6200 of FIG. 62 conclude.

FIG. 63A is a flowchart representative of example machine-readable instructions and/or example operations 6300 that may be executed and/or instantiated by processor circuitry to implement the example location engine circuitry 140 of FIGS. 1 and/or 4 to access cellular data based on a policy. The example machine-readable instructions and/or the example operations 6300 of FIG. 63A begin at block 6302, at which the location engine circuitry 140 initializes a programmable location data collector (PLDC). For example, the parser circuitry 420 (FIG. 4) can execute and/or instantiate a PLDC, such as the PLDC 1524 of FIG. 15A.

At block 6304, the location engine circuitry 140 configures the PLDC based on a policy. For example, the parser circuitry 420 can configure the PLDC 1524 to parse 5G L1 data (e.g., SRS data) substantially instantaneously with the receipt of the 5G L1 data by the interface circuitry 410 (FIG. 4) based on an SLA. In some examples, the parser circuitry 420 can configure the PLDC 1524 to parse 5G L1 data periodically (e.g., every minute, every hour, every day, etc.) based on an SLA.

At block 6306, the location engine circuitry 140 determines whether a time period based on the policy to access cellular data has elapsed. For example, the parser circuitry 420 and/or the PLDC 1524 can determine that the time period to access 5G L1 data indicated by an SLA is one hour. In some examples, the parser circuitry 420 and/or the PLDC 1524 can determine that one hour has elapsed since the last access of the 5G L1 data and thereby the parser circuitry 420 is to access the available 5G L1 data received by the interface circuitry 410. In some examples, the parser circuitry 420 and/or the PLDC 1524 can access the 5G L1 data substantially instantaneously with the receipt of new 5G L1 data (e.g., the parser circuitry 420 can access the 5G L1 data every clock cycle, computational cycle, etc.).

If, at block 6306, the location engine circuitry 140 determines that the time period based on the policy to access cellular data has not elapsed, control proceeds to block 6314. If, at block 6306, the location engine circuitry 140 determines that the time period based on the policy to access cellular data has elapsed, then, at block 6308, the location engine circuitry 140 enqueues the cellular data with dynamic load balancer (DLB) circuitry. For example, the event generation circuitry 470 (FIG. 4) can enqueue the 5G L1 data using hardware. In some examples, the event generation circuitry 470 can enqueue the 5G L1 data by enqueuing a data pointer to a queue implemented using hardware with the data pointer referencing a UE associated with the 5G L1 data. In some examples, the data pointer can point and/or otherwise reference a memory location at which the 5G L1 data associated with the UE is stored.

At block 6310, the location engine circuitry 140 stores the cellular data for access by a logical entity. For example, the event generation circuitry 470 can store and/or otherwise copy the 5G L1 data to a new memory or mass storage location. In some examples, a logical entity such as other hardware, software, and/or firmware can access the copied 5G L1 data. For example, an API can be invoked by an application to access the copied 5G L1 data for location determination operations in connection with one or more UEs. In some examples, a VM instantiated by a RAN (e.g., a RAN server) that polls and/or otherwise requests the copied 5G L1 data for location determination operations in connection with one or more UEs.

At block 6312, the location engine circuitry 140 dequeues the cellular data with the DLB circuitry. For example, the event generation circuitry 470 can dequeue the 5G L1 data by dequeuing the data pointer from the queue in response to receiving an indication that the 5G L1 data has been stored in the new memory or mass storage location.

At block 6314, the location engine circuitry 140 determines whether to change the policy based on a machine learning recommendation. For example, the location determination circuitry 490 (FIG. 4) can determine, using the ML model(s) 496 (FIG. 4), that a change to the SLA is needed, based on the 5G L1 data, for improved efficiency and/or accuracy of location determination operations in connection with one or more UEs.

If, at block 6314, the location engine circuitry 140 determines to change the policy based on a machine learning recommendation, control returns to block 6304. Otherwise, control proceeds to block 6316. At block 6316, the location engine circuitry 140 determines whether to continue monitoring for new cellular data. If, at block 6316, the location engine circuitry 140 determines to continue monitoring for new cellular data, control returns to block 6306. Otherwise, the example machine-readable instructions and/or the example operations 6300 of FIG. 63A conclude.

FIG. 63B is a flowchart representative of example machine-readable instructions and/or example operations 6320 that may be executed and/or instantiated by example processor circuitry to implement the example location engine circuitry 140 of FIGS. 1 and/or 4 to output a location of user equipment based on a location measurement. The example machine-readable instructions and/or the example operations 6320 of FIG. 63B begin at block 6322, at which the location engine circuitry 140 obtains a request for user equipment (UE) location. For example, the interface circuitry 410 (FIG. 4) can obtain a request for a location of UE.

At block 6324, the location engine circuitry 140 obtains an identifier of UE. For example, the device identification circuitry 430 (FIG. 4) can obtain an identifier of UE. Example UE identifiers include a cryptographic identifier and/or an attestable cryptographic identifier. Example attestable cryptographic identifiers include a device identifier composition engine (DICE) identifier, a trusted platform module (TPM) identifier, a DICE protection environment (DPE) identifier, and/or other hardware rooted cryptographic key-based identifiers and/or identifiers that can be generated based on a key generated from a hardware rooted cryptographic seed.

At block 6326, the location engine circuitry 140 obtains antenna identifier(s) associated with the UE identifier. For example, the TOA determination circuitry 440 (FIG. 4) can determine identifier(s) of antenna(s) that is/are associated with the UE identifier.

At block 6328, the location engine circuitry 140 determines a location of antenna(s) corresponding to the antenna identifier(s). For example, the TOA determination circuitry 440 can determine a location of antenna(s) that correspond to the identifier(s).

At block 6330, the location engine circuitry 140 obtains sounding reference signal (SRS) capabilities of the UE. For example, the device identification circuitry 430 can obtain and/or determine SRS capabilities of the UE. In some examples, the device identification circuitry 430 also obtains and/or determines attestation measurements that attest to the integrity of the SRS capabilities.

At block 6332, the location engine circuitry 140 sets an SRS configuration for the UE. For example, the device identification circuitry 430 can determine and/or set an SRS configuration for the UE. In some examples, the SRS configuration can include a measurement frequency and/or any other SRS setting, parameter, etc. An example process that may be carried out to execute and/or instantiate block 6332 is described below in connection with FIG. 63C.

At block 6334, the location engine circuitry 140 enables the UE to transmit SRS(s) (sounding reference signal(s)) to enable SRS-based location determination. For example, the interface circuitry 410 can transmit a direction, an instruction, a PUT message, etc., to the UE and/or the RAN in communication with the UE to cause the UE to transmit SRS data for utilization in location determination of the UE.

At block 6336, the location engine circuitry 140 obtains location measurements of the UE. For example, the interface circuitry 410 can obtain location measurements of the UE from the UE, a RAN associated with the UE, etc.

At block 6338, the location engine circuitry 140 outputs a location of the UE based on the location measurements. For example, the location determination circuitry 490 (FIG. 4) can determine a location of the UE based on the location measurements. In some examples, the location determination circuitry 490 can execute and/or instantiate the ML model(s) 496 using the location measurements as inputs to generate output(s), which can include a location of the UE. In some examples, the interface circuitry 410 can output the location of the UE to a different device, which can execute and/or instantiate a location application and/or service.

At block 6340, the location engine circuitry 140 determines whether to continue monitoring for UE location requests. If, at block 6340, the location engine circuitry 140 determines to continue monitoring for UE location requests, control returns to block 6322. Otherwise, the example machine-readable instructions and/or the example operations 6320 of FIG. 63B conclude.

FIG. 63C is a flowchart representative of example machine-readable instructions and/or example operations 6350 that may be executed and/or instantiated by example processor circuitry to implement the example location engine circuitry of FIGS. 1 and/or 4 to set a sounding reference signal configuration for user equipment. In some examples, the machine-readable instructions and/or the operations 6350 can be executed and/or instantiated to implement block 6332 of FIG. 63B. The example machine-readable instructions and/or the example operations 6350 begin at block 6352 at which the location engine circuitry 140 determines if the UE opted-in to location measurement generation. For example, the device identification circuitry 430 (FIG. 4) can determine if a UE opted-in for the UE to provide and/or output cellular data, such as SRS data, that can be utilized for determining a location of the UE.

If, at block 6352, the location engine circuitry 140 determines that the UE did not opt-in to location measurement generation, the example machine-readable instructions and/or the example operations 6350 of FIG. 63C conclude. For example, the UE may not be configured to generate and/or transmit SRS data based on the opt-out preference.

At block 6354, the location engine circuitry 140 determines whether a state of a UE power source is a data input for location measurement generation. For example, the device identification circuitry 430 can determine whether a battery charge level of a battery of a UE is a consideration for whether the UE is to generate and/or transmit SRS data.

If, at block 6354, the location engine circuitry 140 determines that a state of a UE power source is not a data input for location measurement generation, control proceeds to block 6360. If, at block 6354, the location engine circuitry 140 determines that a state of a UE power source is a data input for location measurement generation, control proceeds to block 6356.

At block 6356, the location engine circuitry 140 determines a state of a UE power source. For example, the device identification circuitry 430 can identify a battery charge level of a battery associated of the UE. In some examples, the device identification circuitry 430 also obtains and/or determines attestation measurements that attest to the integrity of the state of the UE power source. Additionally or alternatively, the device identification circuitry 430 can obtain and/or determine attestation measurements of logic and/or firmware that assess the state of the UE power source.

At block 6357, the location engine circuitry 140 obtains SRS capabilities of the UE. For example, the device identification circuitry 430 can obtain and/or determine SRS capabilities of the UE. In some examples, the device identification circuitry 430 also obtains and/or determines attestation measurements that attest to the integrity of the SRS capabilities. As described above, SRS capabilities of a UE depend on the capability of the UE to provide SRS data. For example, a smart phone may have more SRS capabilities as compared to a wired and/or wireless infant monitor due to the sophistication of technology included in and/or the physical properties (e.g., battery capacity) of the smart phone as compared to the infant monitor. Additionally, as described above, example SRS capabilities include a frequency at which a UE can provide location data. In some examples, SRS capabilities of a UE may change depending on the state of a UE power source. For example, a UE may be associated with a table indicating power levels of a UE power source and corresponding SRS capabilities of the UE. In such an example, at block 6357, the device identification circuitry 430 accesses such a table for the UE and determines corresponding SRS capabilities for the UE based on the state of the UE power source (e.g., as determined at block 6356).

At block 6358, the location engine circuitry 140 determines whether the state of the UE power source satisfies a threshold. For example, the device identification circuitry 430 can determine that a battery charge level of a battery of a UE is 15% where 0% is not charged and 100% is fully charged. In some examples, the device identification circuitry 430 can determine that the battery charge level of 15% does not satisfy a battery charge level threshold of 25% because 15% is less than 25%.

If, at block 6358, the location engine circuitry 140 determines that the state of the UE power source does not satisfy a threshold, the example machine-readable instructions and/ or the example operations conclude. For example, the UE may not be configured to generate and/or transmit SRS data based on a likelihood that the UE may turn off (e.g., is incapable) due to low battery charge level if the UE is to generate and/or transmit SRS data, which can be battery and/or otherwise power intensive.

If, at block 6358, the location engine circuitry 140 determines that the state of the UE power source satisfies a threshold, control proceeds to block 6360. At block 6360, the location engine circuitry 140 generates an SRS configuration for the UE based on the state of the UE power source. For example, the device identification circuitry 430 can generate an SRS configuration that, when utilized by the UE, can cause the UE to generate and/or transmit SRS data at a measurement frequency of 1 Hz. In some examples, the SRS configuration is based on a battery charge level of a battery of the UE. For example, the SRS configuration generated by the device identification circuitry 430 corresponds to the SRS capabilities of the UE (e.g., as determined at block 6357) given the state of the UE power source (e.g., as determined at block 6356). Additionally, for example, the device identification circuitry 430 can increase the measurement frequency if the battery charge level is relatively high (e.g., 70%, 80%, 90%, etc.). In some examples, the device identification circuitry 430 can decrease the measurement frequency if the battery charge level is relatively low (e.g., 30%, 40%, 50%, etc.) in an effort to elongate the time period at which the battery has sufficient charge to power the UE.

At block 6362, the location engine circuitry 140 executes a machine learning model using at least one of the UE opt-in, UE power source state, or SRS configuration as inputs. For example, the device identification circuitry 430 can execute and/or instantiate the ML model(s) 496 (FIG. 4) using at least one of the UE opt-in, UE power source state, or SRS configuration as model inputs to generate model outputs, which can include change(s) to the SRS configuration. In some examples, the output of the ML model(s) includes attestation measurements that attest to the capabilities of the ML model(s) (e.g., trained and/or untrained).

At block 6364, the location engine circuitry 140 determines whether an output of the ML model indicates a change to the SRS configuration. For example, the device identification circuitry 430 can determine that the model outputs include a recommendation to change one or more aspects, portions, etc., of the SRS configuration to achieve an improved and/or otherwise optimal SRS configuration.

If, at block 6364, the location engine circuitry 140 determines that an output of the ML model does not indicate a change to the SRS configuration, control proceeds to block 6368. If, at block 6364, the location engine circuitry 140 determines that an output of the ML model indicates a change to the SRS configuration, control proceeds to block 6366.

At block 6366, the location engine circuitry 140 changes the SRS configuration for the UE based on the output of the ML model. For example, the device identification circuitry 430 can change the SRS configuration based on the recommendation from the ML model(s) 496.

At block 6368, the location engine circuitry 140 sets the SRS configuration for the UE. For example, the interface circuitry 410 can transmit a message (e.g., a PUSH message, a cellular message, etc.) to the UE to cause the UE to adopt and/or install the SRS configuration. After setting the SRS configuration for the UE at block 6368, the example machine-readable instructions and/or the example operations 6350 of FIG. 63C conclude.

FIG. 63D is a flowchart representative of example machine-readable instructions and/or example operations 6370 that may be executed and/or instantiated by example processor circuitry to implement the example location engine circuitry 140 of FIGS. 1 and/or 4 to trigger location determination of user equipment based on a detection of sounding reference signal data. The example machine-readable instructions and/or example operations 6370 begin at block 6372 at which the location engine circuitry 140 obtains cellular data from user equipment. For example, the interface circuitry 410 (FIG. 4) can obtain 5G cellular data from a 5G-enabled device and/or object.

At block 6374, the location engine circuitry 140 detects whether the cellular data includes sounding reference signal data. For example, the parser circuitry 420 (FIG. 4) can detect that the 5G cellular data includes SRS data as disclosed herein.

If, at block 6374, the location engine circuitry 140 detects that the cellular data does not include sounding reference signal data, control proceeds to block 6378. Otherwise, control proceeds to block 6376.

At block 6376, the location engine circuitry 140 triggers a determination of a location of the user equipment based on the detection. For example, the TOA determination circuitry 440 (FIG. 4) can calculate and/or measure TOA measurements based on the detection of the SRS data. In some examples, the location determination circuitry 490 (FIG. 4) can determine a location of the user equipment based on the TOA measurements.

At block 6378, the location engine circuitry 140 determines whether to continue monitoring for cellular data from user equipment. For example, the interface circuitry 410 can determine whether to additional 5G cellular data is received from user equipment. If, at block 6378, the location engine circuitry 140 determines to continue monitoring for cellular data from user equipment, control returns to block 6372. Otherwise, the example machine-readable instructions and/or the example operations 6370 of FIG. 63D conclude.

FIG. 64 is a block diagram of an example of components that may be present in an IoT device 6450 for implementing the techniques described herein. In some examples, the IoT device 6450 may implement the location engine circuitry 140 of FIGS. 1 and/or 4. The IoT device 6450 may include any combinations of the components shown in the example or referenced in the disclosure above. The components may be implemented as ICs, portions thereof, discrete electronic devices, or other modules, logic, hardware, software, firmware, or a combination thereof adapted in the IoT device 6450, or as components otherwise incorporated within a chassis of a larger system. Additionally, the block diagram of FIG. 64 is intended to depict a high-level view of components of the IoT device 6450. However, some of the components shown may be omitted, additional components may be present, and different arrangement of the components shown may occur in other implementations.

The IoT device 6450 may include processor circuitry in the form of, for example, a processor 6452, which may be a microprocessor, a multi-core processor, a multithreaded processor, an ultra-low voltage processor, an embedded processor, or other known processing elements. The processor 6452 may be a part of a system on a chip (SoC) in which the processor 6452 and other components are formed into a single integrated circuit, or a single package, such as the Edison™ or Galileo™ SoC boards from Intel. As an example, the processor 6452 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 6452 may communicate with a system memory 6454 over an interconnect 6456 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 6458 may also couple to the processor 6452 via the interconnect 6456. In an example the storage 6458 may be implemented via a solid state disk drive (SSDD). Other devices that may be used for the storage 6458 include flash memory cards, such as SD cards, microSD cards, xD picture cards, and the like, and USB flash drives. In low power implementations, the storage 6458 may be on-die memory or registers associated with the processor 6452. However, in some examples, the storage 6458 may be implemented using a micro hard disk drive (HDD). Further, any number of new technologies may be used for the storage 6458 in addition to, or instead of, the technologies described, such resistance change memories, phase change memories, holographic memories, or chemical memories, among others.

The components may communicate over the interconnect 6456. The interconnect 6456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 6456 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 6462, 6466, 6468, or 6470. Accordingly, in various examples, applicable means for communicating (e.g., receiving, transmitting, etc.) may be embodied by such communications circuitry.

The interconnect 6456 may couple the processor 6452 to a mesh transceiver 6462, for communications with other mesh devices 6464. The mesh transceiver 6462 may use any number of frequencies and protocols, such as 2.4 Gigahertz (GHz) transmissions under the IEEE 802.15.4 standard, using the BLE standard, as defined by the Bluetooth® Special Interest Group, or the ZigBee® standard, among others. Any number of radios, configured for a particular wireless communication protocol, may be used for the connections to the mesh devices 6464. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 6462 may communicate using multiple standards or radios for communications at different range. For example, the IoT device 6450 may communicate with close devices, e.g., within about 10 meters, using a local transceiver based on BLE, or another low power radio, to save power. More distant mesh devices 6464, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 6466 may be included to communicate with devices or services in the cloud 6400 via local or wide area network protocols. The wireless network transceiver 6466 may be a LPWA transceiver that follows the IEEE 802.15.4, or IEEE 802.15.4g standards, among others. The IoT device 6450 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 6462 and wireless network transceiver 6466, as disclosed herein. For example, the radio transceivers 6462 and 6466 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 6462 and 6466 may include radios that are compatible with any number of 3GPP (Third Generation Partnership Project) specifications, notably LTE, Long-Term-Evolution Advanced (LTE-A), and Long-Term-Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g., a 5G communication systems, a GSM radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 6466, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 6468 may be included to provide a wired communication to the cloud 6400 or to other devices, such as the mesh devices 6464. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 6468 may be included to allow connect to a second network, for example, a NIC 6468 providing communications to the cloud over Ethernet, and a second NIC 6468 providing communications to other devices over another type of network.

The interconnect 6456 may couple the processor 6452 to an external interface 6470 that is used to connect external devices or subsystems. The external devices may include sensors 6472, such as accelerometers, level sensors, flow sensors, optical light sensors, camera sensors, temperature sensors, a global positioning system (GPS) sensors, pressure sensors, barometric pressure sensors, and the like. The external interface 6470 further may be used to connect the IoT device 6450 to actuators 6474, such as power switches, valve actuators, an audible sound generator, a visual warning device, and the like.

In some optional examples, various input/output (I/O) devices may be present within, or connected to, the IoT device 6450. For example, a display or other output device 6484 may be included to show information, such as sensor readings or actuator position. An input device 6486, such as a touch screen or keypad may be included to accept input. An output device 6486 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 6450.

A battery 6476 may power the IoT device 6450, although in examples in which the IoT device 6450 is mounted in a fixed location, it may have a power supply coupled to an electrical grid. The battery 6476 may be a lithium ion battery, or a metal-air battery, such as a zinc-air battery, an aluminum-air battery, a lithium-air battery, and the like.

A battery monitor/charger 6478 may be included in the IoT device 6450 to track the state of charge (SoCh) of the battery 6476. The battery monitor/charger 6478 may be used to monitor other parameters of the battery 6476 to provide failure predictions, such as the state of health (SoH) and the state of function (SoF) of the battery 6476. The battery monitor/charger 6478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 6478 may communicate the information on the battery 6476 to the processor 6452 over the interconnect 6456. The battery monitor/charger 6478 may also include an analog-to-digital (ADC) convertor that allows the processor 6452 to directly monitor the voltage of the battery 6476 or the current flow from the battery 6476. The battery parameters may be used to determine actions that the IoT device 6450 may perform, such as transmission frequency, mesh network operation, sensing frequency, and the like.

A power block 6480, or other power supply coupled to a grid, may be coupled with the battery monitor/charger 6478 to charge the battery 6476. In some examples, the power block 6480 may be replaced with a wireless power receiver to obtain the power wirelessly, for example, through a loop antenna in the IoT device 6450. A wireless battery charging circuit, such as an LTC4020 chip from Linear Technologies of Milpitas, CA, among others, may be included in the battery monitor/charger 6478. The specific charging circuits chosen depends on the size of the battery 6476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 6458 may include instructions 6482 in the form of software, firmware, or hardware commands to implement the techniques described herein. Although such instructions 6482 are shown as code blocks included in the memory 6454 and the storage 6458, it may be understood that any of the code blocks may be replaced with hardwired circuits, for example, built into an ASIC.

In an example, the instructions 6482 provided via the memory 6454, the storage 6458, or the processor 6452 may be embodied as a non-transitory, machine-readable medium 6460 including code to direct the processor 6452 to perform electronic operations in the IoT device 6450. The processor 6452 may access the non-transitory, machine-readable medium 6460 over the interconnect 6456. For instance, the non-transitory, machine-readable medium 6460 may be embodied by devices described for the storage 6458 of FIG. 64 or may include specific storage units such as optical disks, flash drives, or any number of other hardware devices. The non-transitory, machine-readable medium 6460 may include instructions to direct the processor 6452 to perform a specific sequence or flow of actions, for example, as described with respect to the flowchart(s) and block diagram(s) of operations and functionality depicted above.

Also in a specific example, the instructions 6482 on the processor 6452 (separately, or in combination with the instructions 6482 of the machine-readable medium 6460) may configure execution or operation of a trusted execution environment (TEE) 6490. In an example, the TEE 6490 operates as a protected area accessible to the processor 6452 for secure execution of instructions and secure access to data. Various implementations of the TEE 6490, and an accompanying secure area in the processor 6452 or the memory 6454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 6450 through the TEE 6490 and the processor 6452.

FIG. 65 is a block diagram of an example processor platform 6500 structured to execute and/or instantiate the example machine-readable instructions and/or the example operations of FIGS. 48, 49, 50, 51, 52, 53, 54, 55, 56, 57, 58, 59, 60, 61, 62, and/or 63 to implement the location engine circuitry 140 of FIGS. 1 and/or 4. The processor platform 6500 can be, for example, a server, a CU, a DU, a core server (e.g., a 5G core server), an RU, an RRU, a personal computer, a workstation, a self-learning machine (e.g., a neural network), or any other type of computing device.

The processor platform 6500 of the illustrated example includes processor circuitry 6512. The processor circuitry 6512 of the illustrated example is hardware. For example, the processor circuitry 6512 can be implemented by one or more integrated circuits, logic circuits, FPGAs microprocessors, CPUs, GPUs, DSPs, and/or microcontrollers from any desired family or manufacturer. The processor circuitry 6512 may be implemented by one or more semiconductor based (e.g., silicon based) devices. In this example, the processor circuitry 6512 implements the parser circuitry 420, the device identification circuitry 430 (identified by DEVICE ID CIRCUITRY), the TOA determination circuitry 440 (identified by TOA DET CIRCUITRY), the TDOA determination circuitry 450 (identified by TDOA DET CIRCUITRY), the AOA determination circuitry 460 (identified by AOA DET CIRCUITRY), the event generation circuitry 470 (identified by EVENT GEN CIRCUITRY), the direction determination circuitry 480 (identified by DIRECTION DET CIRCUITRY), and the location determination circuitry 490 (identified by LOCATION DET CIRCUITRY) of FIG. 4.

The processor circuitry 6512 of the illustrated example includes a local memory 6513 (e.g., a cache, registers, etc.). The processor circuitry 6512 of the illustrated example is in communication with a main memory including a volatile memory 6514 and a non-volatile memory 6516 by a bus 6518. In some examples, the bus 6518 can implement the bus 498 of FIG. 4. The volatile memory 6514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 6516 may be implemented by flash memory and/or any other desired type of memory device. Access to the main memory 6514, 6516 of the illustrated example is controlled by a memory controller 6517.

The processor platform 6500 of the illustrated example also includes interface circuitry 6520. The interface circuitry 6520 may be implemented by hardware in accordance with any type of interface standard, such as an Ethernet interface, a USB interface, a Bluetooth® interface, an NFC interface, a PCI interface, and/or a PCIe interface.

In the illustrated example, one or more input devices 6522 are connected to the interface circuitry 6520. The input device(s) 6522 permit(s) a user to enter data and/or commands into the processor circuitry 6512. The input device(s) 6522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 6524 are also connected to the interface circuitry 6520 of the illustrated example. The output device(s) 6524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 6520 of the illustrated example, thus, typically includes a graphics driver card, a graphics driver chip, and/or graphics processor circuitry such as a GPU.

The interface circuitry 6520 of the illustrated example also includes a communication device such as a transmitter, a receiver, a transceiver, a modem, a residential gateway, a WAP, and/or a network interface to facilitate exchange of data with external machines (e.g., computing devices of any kind) by a network 6526. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 6520 implements the interface circuitry 410 of FIG. 4.

The processor platform 6500 of the illustrated example also includes one or more mass storage devices 6528 to store software and/or data. Examples of such mass storage devices 6528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 6528 implements the datastore 492 of FIG. 4, which includes the multi-spectrum, multi-modal data 494 (identified by MS, MM DATA) and the ML model(s) 496 of FIG. 4.

The machine-executable instructions 6532, which may be implemented by the machine-readable instructions of FIGS. 48, 49, 50, 51, 52, 53, 54, 55, 56, 57, 58, 59, 60, 61, 62, and/or 63 may be stored in the mass storage device 6528, in the volatile memory 6514, in the non-volatile memory 6516, and/or on a removable non-transitory computer-readable storage medium such as a CD or DVD.

FIG. 66 is a block diagram of an example implementation of the processor circuitry 6512 of FIG. 65. In this example, the processor circuitry 6512 of FIG. 65 is implemented by a general purpose microprocessor 6600. The general purpose microprocessor circuitry 6600 execute some or all of the machine-readable instructions of the flowcharts of FIGS. 48, 49, 50, 51, 52, 53, 54, 55, 56, 57, 58, 59, 60, 61, 62, and/or 63 to effectively instantiate the location engine circuitry 140 as logic circuits to perform the operations corresponding to those machine-readable instructions. For example, the microprocessor 6600 may implement multi-core hardware circuitry such as a CPU, a DSP, a GPU, an XPU, etc. Although it may include any number of example cores 6602 (e.g., 1 core), the microprocessor 6600 of this example is a multi-core semiconductor device including N cores. The cores 6602 of the microprocessor 6600 may operate independently or may cooperate to execute machine-readable instructions. For example, machine code corresponding to a firmware program, an embedded software program, or a software program may be executed by one of the cores 6602 or may be executed by multiple ones of the cores 6602 at the same or different times. In some examples, the machine code corresponding to the firmware program, the embedded software program, or the software program is split into threads and executed in parallel by two or more of the cores 6602. The software program may correspond to a portion or all of the machine-readable instructions and/or the operations represented by the flowcharts of FIGS. 48, 49, 50, 51, 52, 53, 54, 55, 56, 57, 58, 59, 60, 61, 62, and/or 63.

The cores 6602 may communicate by a first example bus 6604. In some examples, the first bus 6604 may implement a communication bus to effectuate communication associated with one(s) of the cores 6602. For example, the first bus 6604 may implement at least one of an Inter-Integrated Circuit (I2C) bus, a Serial Peripheral Interface (SPI) bus, a PCI bus, or a PCIe bus. Additionally and/or alternatively, the first bus 6604 may implement any other type of computing or electrical bus. The cores 6602 may obtain data, instructions, and/or signals from one or more external devices by example interface circuitry 6606. The cores 6602 may output data, instructions, and/or signals to the one or more external devices by the interface circuitry 6606. Although the cores 6602 of this example include example local memory 6620 (e.g., Level 1 (L1) cache that may be split into an L1 data cache and an L1 instruction cache), the microprocessor 6600 also includes example shared memory 6610 that may be shared by the cores (e.g., Level 2 (L2) cache)) for high-speed access to data and/or instructions. Data and/or instructions may be transferred (e.g., shared) by writing to and/or reading from the shared memory 6610. The local memory 6620 of each of the cores 6602 and the shared memory 6610 may be part of a hierarchy of storage devices including multiple levels of cache memory and the main memory (e.g., the main memory 6514, 6516 of FIG. 65). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 6602 may be referred to as a CPU, DSP, GPU, etc., or any other type of hardware circuitry. Each core 6602 includes control unit circuitry 6614, arithmetic and logic (AL) circuitry (sometimes referred to as an ALU) 6616, a plurality of registers 6618, the L1 cache 6620, and a second example bus 6622. Other structures may be present. For example, each core 6602 may include vector unit circuitry, single instruction multiple data (SIMD) unit circuitry, load/store unit (LSU) circuitry, branch/jump unit circuitry, floating-point unit (FPU) circuitry, etc. The control unit circuitry 6614 includes semiconductor-based circuits structured to control (e.g., coordinate) data movement within the corresponding core 6602. The AL circuitry 6616 includes semiconductor-based circuits structured to perform one or more mathematic and/or logic operations on the data within the corresponding core 6602. The AL circuitry 6616 of some examples performs integer based operations. In other examples, the AL circuitry 6616 also performs floating point operations. In yet other examples, the AL circuitry 6616 may include first AL circuitry that performs integer based operations and second AL circuitry that performs floating point operations. In some examples, the AL circuitry 6616 may be referred to as an Arithmetic Logic Unit (ALU). The registers 6618 are semiconductor-based structures to store data and/or instructions such as results of one or more of the operations performed by the AL circuitry 6616 of the corresponding core 6602. For example, the registers 6618 may include vector register(s), SIMD register(s), general purpose register(s), flag register(s), segment register(s), machine specific register(s), instruction pointer register(s), control register(s), debug register(s), memory management register(s), machine check register(s), etc. The registers 6618 may be arranged in a bank as shown in FIG. 66. Alternatively, the registers 6618 may be organized in any other arrangement, format, or structure including distributed throughout the core 6602 to shorten access time. The second bus 6622 may implement at least one of an I2C bus, a SPI bus, a PCI bus, or a PCIe bus Each core 6602 and/or, more generally, the microprocessor 6600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 6600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 67 is a block diagram of another example implementation of the processor circuitry 6512 of FIG. 65. In this example, the processor circuitry 6512 is implemented by FPGA circuitry 6700. The FPGA circuitry 6700 can be used, for example, to perform operations that could otherwise be performed by the example microprocessor 6600 of FIG. 66 executing corresponding machine-readable instructions. However, once configured, the FPGA circuitry 6700 instantiates the machine-readable instructions in hardware and, thus, can often execute the operations faster than they could be performed by a general purpose microprocessor executing the corresponding software.

More specifically, in contrast to the microprocessor 6600 of FIG. 66 described above (which is a general purpose device that may be programmed to execute some or all of the machine-readable instructions represented by the flowcharts of FIGS. 48, 49, 50, 51, 52, 53, 54, 55, 56, 57, 58, 59, 60, 61, 62, and/or 63 but whose interconnections and logic circuitry are fixed once fabricated), the FPGA circuitry 6700 of the example of FIG. 67 includes interconnections and logic circuitry that may be configured and/or interconnected in different ways after fabrication to instantiate, for example, some or all of the machine-readable instructions represented by the flowcharts of FIGS. 48, 49, 50, 51, 52, 53, 54, 55, 56, 57, 58, 59, 60, 61, 62, and/or 63. In particular, the FPGA 6700 may be thought of as an array of logic gates, interconnections, and switches. The switches can be programmed to change how the logic gates are interconnected by the interconnections, effectively forming one or more dedicated logic circuits (unless and until the FPGA circuitry 6700 is reprogrammed). The configured logic circuits enable the logic gates to cooperate in different ways to perform different operations on data received by input circuitry. Those operations may correspond to some or all of the software represented by the flowcharts of FIGS. 48, 49, 50, 51, 52, 53, 54, 55, 56, 57, 58, 59, 60, 61, 62, and/or 63. As such, the FPGA circuitry 6700 may be structured to effectively instantiate some or all of the machine-readable instructions of the flowcharts of FIGS. 48, 49, 50, 51, 52, 53, 54, 55, 56, 57, 58, 59, 60, 61, 62, and/or 63 as dedicated logic circuits to perform the operations corresponding to those software instructions in a dedicated manner analogous to an ASIC. Therefore, the FPGA circuitry 6700 may perform the operations corresponding to the some or all of the machine-readable instructions of FIGS. 48, 49, 50, 51, 52, 53, 54, 55, 56, 57, 58, 59, 60, 61, 62, and/or 63 faster than the general purpose microprocessor can execute the same.

In the example of FIG. 67, the FPGA circuitry 6700 is structured to be programmed (and/or reprogrammed one or more times) by an end user by a hardware description language (HDL) such as Verilog. The FPGA circuitry 6700 of FIG. 67, includes example input/output (I/O) circuitry 6702 to obtain and/or output data to/from example configuration circuitry 6704 and/or external hardware (e.g., external hardware circuitry) 6706. For example, the configuration circuitry 6704 may implement interface circuitry that may obtain machine-readable instructions to configure the FPGA circuitry 6700, or portion(s) thereof. In some such examples, the configuration circuitry 6704 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 6706 may implement the microprocessor 6600 of FIG. 66. The FPGA circuitry 6700 also includes an array of example logic gate circuitry 6708, a plurality of example configurable interconnections 6710, and example storage circuitry 6712. The logic gate circuitry 6708 and interconnections 6710 are configurable to instantiate one or more operations that may correspond to at least some of the machine-readable instructions of FIGS. 48, 49, 50, 51, 52, 53, 54, 55, 56, 57, 58, 59, 60, 61, 62, and/or 63 and/or other desired operations. The logic gate circuitry 6708 shown in FIG. 67 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 6708 to enable configuration of the electrical structures and/or the logic gates to form circuits to perform desired operations. The logic gate circuitry 6708 may include other electrical structures such as look-up tables (LUTs), registers (e.g., flip-flops or latches), multiplexers, etc.

The interconnections 6710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 6708 to program desired logic circuits.

The storage circuitry 6712 of the illustrated example is structured to store result(s) of the one or more of the operations performed by corresponding logic gates. The storage circuitry 6712 may be implemented by registers or the like. In the illustrated example, the storage circuitry 6712 is distributed amongst the logic gate circuitry 6708 to facilitate access and increase execution speed.

The example FPGA circuitry 6700 of FIG. 67 also includes example Dedicated Operations Circuitry 6714. In this example, the Dedicated Operations Circuitry 6714 includes special purpose circuitry 6716 that may be invoked to implement commonly used functions to avoid the need to program those functions in the field. Examples of such special purpose circuitry 6716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 6700 may also include example general purpose programmable circuitry 6718 such as an example CPU 6720 and/or an example DSP 6722. Other general purpose programmable circuitry 6718 may additionally and/or alternatively be present such as a GPU, an XPU, etc., that can be programmed to perform other operations.

Although FIGS. 66 and 67 illustrate two example implementations of the processor circuitry 6512 of FIG. 65, many other approaches are contemplated. For example, as mentioned above, modern FPGA circuitry may include an on-board CPU, such as one or more of the example CPU 6720 of FIG. 67. Therefore, the processor circuitry 6512 of FIG. 65 may additionally be implemented by combining the example microprocessor 6600 of FIG. 66 and the example FPGA circuitry 6700 of FIG. 67. In some such hybrid examples, a first portion of the machine-readable instructions represented by the flowcharts of FIGS. 48, 49, 50, 51, 52, 53, 54, 55, 56, 57, 58, 59, 60, 61, 62, and/or 63 may be executed by one or more of the cores 6602 of FIG. 66 and a second portion of the machine-readable instructions represented by the flowcharts of FIGS. 48, 49, 50, 51, 52, 53, 54, 55, 56, 57, 58, 59, 60, 61, 62, and/or 63 may be executed by the FPGA circuitry 6700 of FIG. 67.

Although FIGS. 66 and 67 illustrate two example implementations of the processor circuitry 6512 of FIG. 65, many other approaches are contemplated. For example, as mentioned above, modern FPGA circuitry may include an on-board CPU, such as one or more of the example CPU 6720 of FIG. 67. Therefore, the processor circuitry 6512 of FIG. 65 may additionally be implemented by combining the example microprocessor 6600 of FIG. 66 and the example FPGA circuitry 6700 of FIG. 67. In some such hybrid examples, a first portion of the machine-readable instructions represented by the flowcharts of FIGS. 48, 49, 50, 51, 52, 53, 54, 55, 56, 57, 58, 59, 60, 61, 62, and/or 63 may be executed by one or more of the cores 6602 of FIG. 66, a second portion of the machine-readable instructions represented by the flowcharts of FIGS. 48, 49, 50, 51, 52, 53, 54, 55, 56, 57, 58, 59, 60, 61, 62, and/or 63 may be executed by the FPGA circuitry 6700 of FIG. 67, and/or a third portion of the machine-readable instructions represented by the flowcharts of FIGS. 48, 49, 50, 51, 52, 53, 54, 55, 56, 57, 58, 59, 60, 61, 62, and/or 63 may be executed by an ASIC. It should be understood that some or all of the location engine circuitry 140 of FIGS. 1 and/or 4 may, thus, be instantiated at the same or different times. Some or all of the location engine circuitry 140 may be instantiated, for example, in one or more threads executing concurrently and/or in series. Moreover, in some examples, some or all of the location engine circuitry 140 of FIGS. 1 and/or 4 may be implemented within one or more virtual machines and/or containers executing on the microprocessor.

In some examples, the processor circuitry 6512 of FIG. 65 may be in one or more packages. For example, the processor circuitry 6600 of FIG. 66 and/or the FPGA circuitry 6700 of FIG. 67 may be in one or more packages. In some examples, an XPU may be implemented by the processor circuitry 6512 of FIG. 65, which may be in one or more packages. For example, the XPU may include a CPU in one package, a DSP in another package, a GPU in yet another package, and an FPGA in still yet another package.

Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

The illustrated example of FIG. 68 depicts an example of an infrastructure processing unit (IPU) 6800. In some examples, the IPU 6800 is structured to execute and/or instantiate the example machine-readable instructions and/or the example operations of FIGS. 48, 49, 50, 51, 52, 53, 54, 55, 56, 57, 58, 59, 60, 61, 62, and/or 63 to implement the location engine circuitry 140 of FIGS. 1 and/or 4.

In the illustrated example of FIG. 68, the IPU 6800 includes or otherwise accesses secure resource managing circuitry 6802, network interface controller (NIC) circuitry 6804, security and root of trust circuitry 6806, resource composition circuitry 6808, time stamp managing circuitry 6810, memory and storage 6812, processing circuitry 6814, accelerator circuitry 6816, and/or translator circuitry 6818. Any number and/or combination of other structure(s) can be used such as but not limited to compression and encryption circuitry 6820, memory management and translation unit circuitry 6822, compute fabric data switching circuitry 6824, security policy enforcing circuitry 6826, device virtualizing circuitry 6828, telemetry, tracing, logging and monitoring circuitry 6830, quality of service circuitry 6832, searching circuitry 6834, network functioning circuitry (e.g., routing, firewall, load balancing, network address translating (NAT), etc.) 6836, reliable transporting, ordering, retransmission, congestion controlling circuitry 6838, and high availability, fault handling and migration circuitry 6840 shown in FIG. 68. Different examples can use one or more structures (components) of the example IPU 6800 together or separately. For example, compression and encryption circuitry 6820 can be used as a separate service or chained as part of a data flow with vSwitch and packet encryption.

In some examples, IPU 6800 includes a field programmable gate array (FPGA) 6870 structured to receive commands from an CPU, XPU, or application via an API and perform commands/tasks on behalf of the CPU, including workload management and offload or accelerator operations. The illustrated example of FIG. 68 may include any number of FPGAs configured and/or otherwise structured to perform any operations of any IPU described herein.

Example compute fabric circuitry 6850 provides connectivity to a local host or device (e.g., server or device (e.g., xPU, memory, or storage device)). Connectivity with a local host or device or smartNTC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 6860 provides connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 6800, IPU 6800 is a root of a system (e.g., rack of servers or data center) and manages compute resources (e.g., CPU, xPU, storage, memory, other IPUs, and so forth) in the IPU 6800 and outside of the IPU 6800. Different operations of an IPU are described below.

In some examples, the IPU 6800 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 6800 is selected to perform a workload, secure resource managing circuitry 6802 offloads work to a CPU, xPU, or other device and the IPU 6800 accelerates connectivity of distributed runtimes, reduce latency, CPU and increases reliability.

In some examples, secure resource managing circuitry 6802 runs a service mesh to decide what resource is to execute workload, and provide for L7 (application layer) and remote procedure call (RPC) traffic to bypass kernel altogether so that a user space application can communicate directly with the example IPU 6800 (e.g., IPU 6800 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 6800 dynamically selects itself to run a given workload (e.g., microservice) within a composable infrastructure including an IPU, xPU, CPU, storage, memory, and other devices in a node.

In some examples, communications transit through media interfacing circuitry 6860 of the example IPU 6800 through a NIC/smartNIC (for cross node communications) or loopback back to a local service on the same host. Communications through the example media interfacing circuitry 6860 of the example IPU 6800 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 6800 prioritizes its processing to minimize the stalling of the requesting application. In some examples, the IPU 6800 schedules the prioritized message request issuing the event to execute a SQL query database and the example IPU constructs microservices that issue SQL queries and the queries are sent to the appropriate devices or services.

A block diagram illustrating an example software distribution platform 6905 to distribute software such as the example machine-readable instructions 6482 of FIG. 64 and/or the example machine-readable instructions 6532 of FIG. 65 to hardware devices owned and/or operated by third parties is illustrated in FIG. 69. The example software distribution platform 6905 may be implemented by any computer server, data facility, cloud service, etc., capable of storing and transmitting software to other computing devices. The third parties may be customers of the entity owning and/or operating the software distribution platform 6905. For example, the entity that owns and/or operates the software distribution platform 6905 may be a developer, a seller, and/or a licensor of software such as the example machine-readable instructions 6482 of FIG. 64 and/or the example machine-readable instructions 6532 of FIG. 65. The third parties may be consumers, users, retailers, OEMs, etc., who purchase and/or license the software for use and/or re-sale and/or sub-licensing. In the illustrated example, the software distribution platform 6905 includes one or more servers and one or more storage devices. The storage devices store the machine-readable instructions 6482, 6532, which may correspond to the example machine-readable instructions 4800, 4900, 5000, 5100, 5200, 5300, 5400, 5500, 5600, 5700, 5800, 5900, 6000, 6100, 6200, 6300, 6320, 6350, 6370 of FIGS. 48, 49, 50, 51, 52, 53, 54, 55, 56, 57, 58, 59, 60, 61, 62, 63A, 63B, 63C, and/or 63D, as described above. The one or more servers of the example software distribution platform 6905 are in communication with a network 6910, which may correspond to any one or more of the Internet and/or any of the example networks 142, 1114, 4210, 4510, 4600, described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 6482, 6532 from the software distribution platform 6905. For example, the software, which may correspond to the example machine-readable instructions 4800, 4900, 5000, 5100, 5200, 5300, 5400, 5500, 5600, 5700, 5800, 5900, 6000, 6100, 6200, 6300, 6320, 6350, 6370 of FIGS. 48, 49, 50, 51, 52, 53, 54, 55, 56, 57, 58, 59, 60, 61, 62, 63A, 63B, 63C, and/or 63D, may be downloaded to the example IoT device 6450, which is to execute the machine-readable instructions 6482, and/or the example processor platform 6500, which is to execute the machine-readable instructions 6532, to implement the location engine circuitry 140 of FIGS. 1 and/or 4. In some example, one or more servers of the software distribution platform 6905 periodically offer, transmit, and/or force updates to the software (e.g., the example machine-readable instructions 6482 of FIG. 64 and/or the example machine-readable instructions 6532 of FIG. 65) to ensure improvements, patches, updates, etc., are distributed and applied to the software at the end user devices.

From the foregoing, it will be appreciated that example systems, methods, apparatus, and articles of manufacture have been disclosed that implement triggerable data driven location detection and/or determination. Disclosed systems, methods, apparatus, and articles of manufacture utilize AI/ML, techniques on diverse data sources (e.g., RFID, Bluetooth, Wi-Fi, cellular, wired line, satellite, etc.) along with environmental sensors (e.g., cameras, temperature sensors, etc.) to increase and/or otherwise improve precision and accuracy of location determination of objects, such as UEs. Disclosed example systems, methods, apparatus, and articles of manufacture utilize AI/ML techniques to identify, determine, and/or otherwise predict anomalies based on previous data and patterns and/or live data and patterns. Disclosed example systems, methods, apparatus, and articles of manufacture use AI/ML techniques to configure and/or set up combination(s) of sensors based on geographical information. Disclosed example systems, methods, apparatus, and articles of manufacture determine which one(s) of sensor(s) may be utilized for location detection of an object with improved accuracy for an area, location, etc., in which the object is situated, and the determination may be based on resource availability. Disclosed example systems, methods, apparatus, and articles of manufacture determine a measurement periodicity associated with objects of interest for location determination based on respective locations of the objects of interest.

Disclosed example systems, methods, apparatus, and articles of manufacture improve location determination of objects based on reduced information and match the reduced information to available data from various environmental sensors to thereby decrease a total time to locate an object. Disclosed systems, methods, apparatus, and articles of manufacture improve the efficiency of computing devices adapted, configured, and/or otherwise instantiated for location detection of objects by using less total time and/or resources by implementing the location detection on reduced information. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for triggerable data driven location detection and/or determination are disclosed herein. Further examples and combinations thereof include the following:

Example 1 includes an apparatus for data driven location determination, the apparatus comprising at least one memory, machine-readable instructions, and processor circuitry to at least one of execute or instantiate the machine-readable instructions to at least execute a machine-learning model to generate an output based on at least one of multi-spectral data or multi-modal data input to the machine-learning model, the at least one of the multi-spectral data or the multi-modal data associated with a target device or a target object, the output to be representative of a location of the at least one of the target device or the target object, publish the location of the at least one of the target device or the target object to a datastore for application access, and cause an action based on the location of the at least one of the target device or the target object.

In Example 2, the subject matter of Example 1 can optionally include that the output is to be representative of a Cartesian coordinate location of the at least one of the target device or the target object.

In Example 3, the subject matter of Examples 1-2 can optionally include that the at least one of the target device or the target object is assigned to at least one of a terrestrial network or a non-terrestrial network.

In Example 4, the subject matter of Examples 1-3 can optionally include that the target device is not assigned to at least one of a terrestrial network or a non-terrestrial network, and the target object is assigned to the at least one of the terrestrial network or the non-terrestrial network.

In Example 5, the subject matter of Examples 1-4 can optionally include that the target device is assigned to at least one of a terrestrial network or a non-terrestrial network, and the target object is not assigned to the at least one of the terrestrial network or the non-terrestrial network.

In Example 6, the subject matter of Examples 1-5 can optionally include that the at least one of the multi-spectral data or the multi-modal data includes at least one of sounding reference signal data, signal-to-noise ratio data, or channel impulse response data.

In Example 7, the subject matter of Examples 1-6 can optionally include that the at least one of the multi-spectral data or the multi-modal data includes at least one of first data generated by a network, second data generated by the at least one of the target device or the target object, or third data generated by a sensor that is to monitor the at least one the target device or the target object.

In Example 8, the subject matter of Examples 1-7 can optionally include that the processor circuitry is to obtain the multi-spectral data from interface circuitry, the multi-spectral data including first data based on a first wireless spectrum and second data based on a second wireless spectrum, the first wireless spectrum different from the second wireless spectrum.

In Example 9, the subject matter of Examples 1-8 can optionally include that the first wireless spectrum is based on a first frequency associated with a fifth generation cellular network and the second wireless spectrum is based on a second frequency associated with a Wireless Fidelity network.

In Example 10, the subject matter of Examples 1-9 can optionally include that the processor circuitry is to obtain the multi-modal data from interface circuitry, the multi-modal data including first data from a first sensor of a first type and second data from a second sensor of a second type, the first type different from the second type.

In Example 11, the subject matter of Examples 1-10 can optionally include that at least one of the first sensor or the second sensor is an air pressure sensor, a camera, a carbon monoxide sensor, a humidity sensor, a light sensor, a motion sensor, a temperature sensor, or a water sensor.

In Example 12, the subject matter of Examples 1-11 can optionally include that at least one of the first sensor or the second sensor is associated with a radio-frequency identification system, a Bluetooth system, a Wireless Fidelity system, a cellular system, or a satellite system.

In Example 13, the subject matter of Examples 1-12 can optionally include that the processor circuitry is to generate the action to cause the at least one of the target device or the target object to change at least of a direction or a speed of the at least one of the target device or the target object.

In Example 14, the subject matter of Examples 1-13 can optionally include that the processor circuitry is to identify the at least one of the target device or the target object based on an identifier included in the at least one of the multi-spectral data or the multi-modal data, enqueue a data pointer to a hardware-implemented data queue, the data pointer based on the identifier, the data pointer to reference the at least one of the multi-spectral data or the multi-modal data, and after a computational operation is performed on the at least one of the multi-spectral data or the multi-modal data, dequeue the data pointer from the hardware-implemented data queue.

In Example 15, the subject matter of Examples 1-14 can optionally include that the processor circuitry is to generate the output based on a policy, the policy including at least one of location accuracy error, a two-dimension location dimension configuration, a three-dimension location dimension configuration, or a wall clock response.

In Example 16, the subject matter of Examples 1-15 can optionally include that the at least one of the multi-spectral data or the multi-modal data includes sounding reference signal (SRS) data, and the processor circuitry is to determine a first time-of-arrival associated with the SRS data at a first antenna of a base station, determine a second time-of-arrival associated with the SRS data at a second antenna of the base station, and determine the location of the at least one of the target device or the target object based on the first time-of-arrival and the second time-of-arrival.

In Example 17, the subject matter of Examples 1-16 can optionally include that the at least one of the multi-spectral data or the multi-modal data includes sounding reference signal (SRS) data, and the processor circuitry is to determine a first time-of-arrival associated with the SRS data at a first antenna of a first base station, determine a second time-of-arrival associated with the SRS data at a second antenna of a second base station, and determine the location of the at least one of the target device or the target object based on the first time-of-arrival and the second time-of-arrival.

In Example 18, the subject matter of Examples 1-17 can optionally include that the at least one of the multi-spectral data or the multi-modal data includes sounding reference signal (SRS) data, and the processor circuitry is to determine a first time-of-arrival associated with the SRS data at a first antenna of a first base station, determine a second time-of-arrival associated with the SRS data at a second antenna of a second base station, determine a time-difference-of-arrival based on the first time-of-arrival and the second time-of-arrival, and determine the location of the at least one of the target device or the target object based on the time-difference-of-arrival.

In Example 19, the subject matter of Examples 1-18 can optionally include that the at least one of the multi-spectral data or the multi-modal data includes sounding reference signal (SRS) data, and the processor circuitry is to determine a first time-of-arrival associated with the SRS data at a first antenna of a first base station, determine a second time-of-arrival associated with the SRS data at a second antenna of the first base station, determine a third time-of-arrival associated with the SRS data at a third antenna of a second base station, determine a fourth time-of-arrival associated with the SRS data at a fourth antenna of the second base station, determine a time-difference-of-arrival based on the first time-of-arrival, the second time-of-arrival, the third time-of-arrival, and the fourth time-of-arrival, and determine the location of the at least one of the target device or the target object based on the time-difference-of-arrival.

In Example 20, the subject matter of Examples 1-19 can optionally include that the at least one of the multi-spectral data or the multi-modal data includes sounding reference signal (SRS) data, and the processor circuitry is to determine a first angle-of-arrival associated with the SRS data at a first antenna of a base station, determine a second angle-of-arrival associated with the SRS data at a second antenna of the base station, and determine the location of the target device or the target object based on the first angle-of-arrival and the second angle-of-arrival.

In Example 21, the subject matter of Examples 1-20 can optionally include that the at least one of the multi-spectral data or the multi-modal data includes sounding reference signal (SRS) data, and the processor circuitry is to determine a first angle-of-arrival associated with the SRS data at a first antenna of a first base station, determine a second angle-of-arrival associated with the SRS data at a second antenna of a second base station, and determine the location of the at least one of the target device or the target object based on the first angle-of-arrival and the second angle-of-arrival.

In Example 22, the subject matter of Examples 1-21 can optionally include that the location is a first location, and the processor circuitry is to determine that the first location is associated with a first measurement periodicity, determine that the at least one of the target device or the target object is associated with a second location and a second measurement periodicity, and change the second measurement periodicity associated with the at least one of the target device or the target object to the first measurement periodicity based on the location.

In Example 23, the subject matter of Examples 1-22 can optionally include that the processor circuitry is to determine that the at least one of the multi-spectral data or the multi-modal data is to include first data, second data, and third data, and after a determination that a sensor associated with the first data is unavailable, execute the machine-learning model with at least one of the second data or the third data as the input to the machine-learning model.

In Example 24, the subject matter of Examples 1-23 can optionally include that the output is a first output, the location is a first location, and the processor circuitry is to execute the machine-learning model to generate a second output based on the first location, the second output to be representative of a second location of the at least one of the target device or the target object.

In Example 25, the subject matter of Examples 1-24 can optionally include that the at least one of the multi-spectral data or the multi-modal data includes ephemeral data, and the processor circuitry is to generate the output before the ephemeral data becomes stale.

In Example 26, the subject matter of Examples 1-25 can optionally include that the target device is an active target device or a passive target device.

In Example 27, the subject matter of Examples 1-26 can optionally include that the target device is a passive target device.

In Example 28, the subject matter of Examples 1-27 can optionally include that the target object is an active target object.

In Example 29, the subject matter of Examples 1-28 can optionally include that the target object is a passive target object.

In Example 30 includes at least one machine-readable storage medium comprising instructions that, when executed, cause programmable circuitry to at least one of execute or instantiate the instructions to at least instantiate a machine-learning model to generate an output based on at least one of multi-spectral data or multi-modal data input to the machine-learning model, the at least one of the multi-spectral data or the multi-modal data associated with a target device or a target object, the output to be representative of a location of the at least one of the target device or the target object, output the location of the at least one of the target device or the target object to a datastore for application access, and trigger an action based on the location of the at least one of the target device or the target object.

In Example 31, the subject matter of Example 30 can optionally include that the output corresponds to a Cartesian coordinate location of the at least one of the target device or the target object.

In Example 32, the subject matter of Examples 30-31 can optionally include that the at least one of the target device or the target object is associated with at least one of a terrestrial network or a non-terrestrial network.

In Example 33, the subject matter of Examples 30-32 can optionally include that the target device is not associated with at least one of a terrestrial network or a non-terrestrial network, and the target object is associated with the at least one of the terrestrial network or the non-terrestrial network.

In Example 34, the subject matter of Examples 30-33 can optionally include that the target device is associated with at least one of a terrestrial network or a non-terrestrial network, and the target object is not associated with the at least one of the terrestrial network or the non-terrestrial network.

In Example 35, the subject matter of Examples 30-34 can optionally include that the at least one of the multi-spectral data or the multi-modal data includes at least one of sounding reference signal data, signal-to-noise ratio data, or channel impulse response data.

In Example 36, the subject matter of Examples 30-35 can optionally include that the at least one of the multi-spectral data or the multi-modal data includes at least one of first data associated with a network, second data associated with the at least one of the target device or the target object, or third data associated with a sensor that is to monitor the at least one the target device or the target object.

In Example 37, the subject matter of Examples 30-36 can optionally include that the programmable circuitry is to obtain the multi-spectral data from a network interface, the multi-spectral data including first data based on a first wireless spectrum and second data based on a second wireless spectrum, the first wireless spectrum different from the second wireless spectrum.

In Example 38, the subject matter of Examples 30-37 can optionally include that the first wireless spectrum is based on a first frequency associated with a fifth generation cellular network and the second wireless spectrum is based on a second frequency associated with a Wireless Fidelity network.

In Example 39, the subject matter of Examples 30-38 can optionally include that the programmable circuitry is to obtain the multi-modal data from a network interface, the multi-modal data including first data from a first sensor of a first type and second data from a second sensor of a second type, the first type different from the second type.

In Example 40, the subject matter of Examples 30-39 can optionally include that at least one of the first sensor or the second sensor is an air pressure sensor, a camera, a carbon monoxide sensor, a humidity sensor, a light sensor, a motion sensor, a temperature sensor, or a water sensor.

In Example 41, the subject matter of Examples 30-40 can optionally include that at least one of the first sensor or the second sensor is associated with a radio-frequency identification system, a Bluetooth system, a Wireless Fidelity system, a cellular system, or a satellite system.

In Example 42, the subject matter of Examples 30-41 can optionally include that the programmable circuitry is to create the action to trigger the at least one of the target device or the target object to change at least of a direction or a speed of the at least one of the target device or the target object.

In Example 43, the subject matter of Examples 30-42 can optionally include that the programmable circuitry is to identify the at least one of the target device or the target object based on an identifier included in the at least one of the multi-spectral data or the multi-modal data, insert a data pointer to a hardware-implemented data queue, the data pointer based on the identifier, the data pointer to reference the at least one of the multi-spectral data or the multi-modal data, and after a computational operation is performed on the at least one of the multi-spectral data or the multi-modal data, remove the data pointer from the hardware-implemented data queue.

In Example 44, the subject matter of Examples 30-43 can optionally include that the programmable circuitry is to generate the output based on a policy, the policy including at least one of location accuracy error, a two-dimension location dimension configuration, a three-dimension location dimension configuration, or a wall clock response.

In Example 45, the subject matter of Examples 30-44 can optionally include that the at least one of the multi-spectral data or the multi-modal data includes sounding reference signal (SRS) data, and the programmable circuitry is to determine a first time-of-arrival associated with the SRS data at a first antenna of a base station, determine a second time-of-arrival associated with the SRS data at a second antenna of the base station, and output the location of the at least one of the target device or the target object based on the first time-of-arrival and the second time-of-arrival.

In Example 46, the subject matter of Examples 30-45 can optionally include that the at least one of the multi-spectral data or the multi-modal data includes sounding reference signal (SRS) data, and the programmable circuitry is to determine a first time-of-arrival associated with the SRS data at a first antenna of a first base station, determine a second time-of-arrival associated with the SRS data at a second antenna of a second base station, and output the location of the at least one of the target device or the target object based on the first time-of-arrival and the second time-of-arrival.

In Example 47, the subject matter of Examples 30-46 can optionally include that the at least one of the multi-spectral data or the multi-modal data includes sounding reference signal (SRS) data, and the programmable circuitry is to determine a first time-of-arrival associated with the SRS data at a first antenna of a first base station, determine a second time-of-arrival associated with the SRS data at a second antenna of a second base station, determine a time-difference-of-arrival based on the first time-of-arrival and the second time-of-arrival, and output the location of the at least one of the target device or the target object based on the time-difference-of-arrival.

In Example 48, the subject matter of Examples 30-47 can optionally include that the at least one of the multi-spectral data or the multi-modal data includes sounding reference signal (SRS) data, and the programmable circuitry is to determine a first time-of-arrival associated with the SRS data at a first antenna of a first base station, determine a second time-of-arrival associated with the SRS data at a second antenna of the first base station, determine a third time-of-arrival associated with the SRS data at a third antenna of a second base station, determine a fourth time-of-arrival associated with the SRS data at a fourth antenna of the second base station, determine a time-difference-of-arrival based on the first time-of-arrival, the second time-of-arrival, the third time-of-arrival, and the fourth time-of-arrival, and determine the location of the at least one of the target device or the target object based on the time-difference-of-arrival.

In Example 49, the subject matter of Examples 30-48 can optionally include that the at least one of the multi-spectral data or the multi-modal data includes sounding reference signal (SRS) data, and the programmable circuitry is to determine a first angle-of-arrival associated with the SRS data at a first antenna of a base station, determine a second angle-of-arrival associated with the SRS data at a second antenna of the base station, and output the location of the target device or the target object based on the first angle-of-arrival and the second angle-of-arrival.

In Example 50, the subject matter of Examples 30-49 can optionally include that the at least one of the multi-spectral data or the multi-modal data includes sounding reference signal (SRS) data, and the programmable circuitry is to determine a first angle-of-arrival associated with the SRS data at a first antenna of a first base station, determine a second angle-of-arrival associated with the SRS data at a second antenna of a second base station, and output the location of the at least one of the target device or the target object based on the first angle-of-arrival and the second angle-of-arrival.

In Example 51, the subject matter of Examples 30-50 can optionally include that the location is a first location, and the programmable circuitry is to determine that the first location is associated with a first measurement periodicity, determine that the at least one of the target device or the target object is associated with a second location and a second measurement periodicity, and reconfigure the second measurement periodicity associated with the at least one of the target device or the target object to the first measurement periodicity based on the location.

In Example 52, the subject matter of Examples 30-51 can optionally include that the programmable circuitry is to determine that the at least one of the multi-spectral data or the multi-modal data is to include first data, second data, and third data, and after a determination that a sensor associated with the first data is unavailable, instantiate the machine-learning model with at least one of the second data or the third data as the input to the machine-learning model.

In Example 53, the subject matter of Examples 30-52 can optionally include that the output is a first output, the location is a first location, and the programmable circuitry is to execute the machine-learning model to generate a second output based on the first location, the second output to be representative of a second location of the at least one of the target device or the target object.

In Example 54, the subject matter of Examples 30-53 can optionally include that the at least one of the multi-spectral data or the multi-modal data includes ephemeral data, and the programmable circuitry is to generate the output before the ephemeral data becomes stale.

In Example 55, the subject matter of Examples 30-54 can optionally include that the target device is an active target device or a passive target device.

In Example 56, the subject matter of Examples 30-55 can optionally include that the target device is a passive target device.

In Example 57, the subject matter of Examples 30-56 can optionally include that the target object is an active target object.

In Example 58, the subject matter of Examples 30-57 can optionally include that the target object is a passive target object.

Example 59 includes an apparatus for data driven location determination, the apparatus comprising means for executing a machine-learning model to generate an output based on at least one of multi-spectral data or multi-modal data input to the machine-learning model, the at least one of the multi-spectral data or the multi-modal data associated with a target device or a target object, the output to be representative of a location of the at least one of the target device or the target object, means for generating an event based on the location of the at least one of the target device or the target object, the means for generating to publish the location of the at least one of the target device or the target object to a datastore for application access, and cause an action associated with the at least one of the target device or the target object based on the event.

In Example 60, the subject matter of Example 59 can optionally include that the output is to be representative of a Cartesian coordinate location of the at least one of the target device or the target object.

In Example 61, the subject matter of Examples 59-60 can optionally include that the at least one of the target device or the target object is coupled to at least one of a terrestrial network or a non-terrestrial network.

In Example 62, the subject matter of Examples 59-61 can optionally include that the target device is not coupled to at least one of a terrestrial network or a non-terrestrial network, and the target object is coupled to the at least one of the terrestrial network or the non-terrestrial network.

In Example 63, the subject matter of Examples 59-62 can optionally include that the target device is coupled to at least one of a terrestrial network or a non-terrestrial network, and the target object is not coupled to the at least one of the terrestrial network or the non-terrestrial network.

In Example 64, the subject matter of Examples 59-63 can optionally include that the at least one of the multi-spectral data or the multi-modal data includes at least one of sounding reference signal data, signal-to-noise ratio data, or channel impulse response data.

In Example 65, the subject matter of Examples 59-64 can optionally include that the at least one of the multi-spectral data or the multi-modal data includes at least one of first data output from a network, second data output from the at least one of the target device or the target object, or third data output from a sensor that is to monitor the at least one the target device or the target object.

In Example 66, the subject matter of Examples 59-65 can optionally include means for receiving the multi-spectral data, the multi-spectral data including first data based on a first wireless spectrum and second data based on a second wireless spectrum, the first wireless spectrum different from the second wireless spectrum.

In Example 67, the subject matter of Examples 59-66 can optionally include that the first wireless spectrum is based on a first frequency associated with a fifth generation cellular network and the second wireless spectrum is based on a second frequency associated with a Wireless Fidelity network.

In Example 68, the subject matter of Examples 59-67 can optionally include means for receiving the multi-modal data, the multi-modal data including first data from a first sensor of a first type and second data from a second sensor of a second type, the first type different from the second type.

In Example 69, the subject matter of Examples 59-68 can optionally include that at least one of the first sensor or the second sensor is an air pressure sensor, a camera, a carbon monoxide sensor, a humidity sensor, a light sensor, a motion sensor, a temperature sensor, or a water sensor.

In Example 70, the subject matter of Examples 59-69 can optionally include that at least one of the first sensor or the second sensor is associated with a radio-frequency identification system, a Bluetooth system, a Wireless Fidelity system, a cellular system, or a satellite system.

In Example 71, the subject matter of Examples 59-70 can optionally include that the means for generating is to generate the action to cause the at least one of the target device or the target object to change at least of a direction or a speed of the at least one of the target device or the target object.

In Example 72, the subject matter of Examples 59-71 can optionally include means for identifying the at least one of the target device or the target object based on an identifier included in the at least one of the multi-spectral data or the multi-modal data, and means for parsing to enqueue a data pointer to a hardware-implemented data queue, the data pointer based on the identifier, the data pointer to reference the at least one of the multi-spectral data or the multi-modal data, and after a computational operation is performed on the at least one of the multi-spectral data or the multi-modal data, dequeue the data pointer from the hardware-implemented data queue.

In Example 73, the subject matter of Examples 59-72 can optionally include that the means for executing is to generate the output based on a policy, the policy including at least one of location accuracy error, a two-dimension location dimension configuration, a three-dimension location dimension configuration, or a wall clock response.

In Example 74, the subject matter of Examples 59-73 can optionally include that the at least one of the multi-spectral data or the multi-modal data includes sounding reference signal (SRS) data, and further including means for determining to determine a first time-of-arrival associated with the SRS data at a first antenna of a base station, and determine a second time-of-arrival associated with the SRS data at a second antenna of the base station, and wherein the means for executing is to determine the location of the at least one of the target device or the target object based on the first time-of-arrival and the second time-of-arrival.

In Example 75, the subject matter of Examples 59-74 can optionally include that the at least one of the multi-spectral data or the multi-modal data includes sounding reference signal (SRS) data, and further including means for determining to determine a first time-of-arrival associated with the SRS data at a first antenna of a first base station, and determine a second time-of-arrival associated with the SRS data at a second antenna of a second base station, and wherein the means for executing is to determine the location of the at least one of the target device or the target object based on the first time-of-arrival and the second time-of-arrival.

In Example 76, the subject matter of Examples 59-75 can optionally include that the at least one of the multi-spectral data or the multi-modal data includes sounding reference signal (SRS) data, and further including first means for determining to determine a first time-of-arrival associated with the SRS data at a first antenna of a first base station, and determine a second time-of-arrival associated with the SRS data at a second antenna of a second base station, second means for determining to determine a time-difference-of-arrival based on the first time-of-arrival and the second time-of-arrival, and wherein the means for executing is to determine the location of the at least one of the target device or the target object based on the time-difference-of-arrival.

In Example 77, the subject matter of Examples 59-76 can optionally include that the at least one of the multi-spectral data or the multi-modal data includes sounding reference signal (SRS) data, and the first means for determining is to determine a first time-of-arrival associated with the SRS data at a first antenna of a first base station, determine a second time-of-arrival associated with the SRS data at a second antenna of the first base station, determine a third time-of-arrival associated with the SRS data at a third antenna of a second base station, and determine a fourth time-of-arrival associated with the SRS data at a fourth antenna of the second base station, second means for determining a time-difference-of-arrival based on the first time-of-arrival, the second time-of-arrival, the third time-of-arrival, and the fourth time-of-arrival, and the means for executing is to determine the location of the at least one of the target device or the target object based on the time-difference-of-arrival.

In Example 78, the subject matter of Examples 59-77 can optionally include that the at least one of the multi-spectral data or the multi-modal data includes sounding reference signal (SRS) data, and further including means for determining to determine a first angle-of-arrival associated with the SRS data at a first antenna of a base station, determine a second angle-of-arrival associated with the SRS data at a second antenna of the base station, and wherein the means for executing is to determine the location of the target device or the target object based on the first angle-of-arrival and the second angle-of-arrival.

In Example 79, the subject matter of Examples 59-78 can optionally include that the at least one of the multi-spectral data or the multi-modal data includes sounding reference signal (SRS) data, and further including means for determining to determine a first angle-of-arrival associated with the SRS data at a first antenna of a first base station, determine a second angle-of-arrival associated with the SRS data at a second antenna of a second base station, and wherein the means for executing is to determine the location of the at least one of the target device or the target object based on the first angle-of-arrival and the second angle-of-arrival.

In Example 80, the subject matter of Examples 59-79 can optionally include that the location is a first location, and the means for executing is to determine that the first location is associated with a first measurement periodicity, determine that the at least one of the target device or the target object is associated with a second location and a second measurement periodicity, and change the second measurement periodicity associated with the at least one of the target device or the target object to the first measurement periodicity based on the location.

In Example 81, the subject matter of Examples 59-80 can optionally include that the means for executing is to determine that the at least one of the multi-spectral data or the multi-modal data is to include first data, second data, and third data, and after a determination that a sensor associated with the first data is unavailable, execute the machine-learning model with at least one of the second data or the third data as the input to the machine-learning model.

In Example 82, the subject matter of Examples 59-81 can optionally include that the output is a first output, the location is a first location, and the means for executing is to execute the machine-learning model to generate a second output based on the first location, the second output to be representative of a second location of the at least one of the target device or the target object.

In Example 83, the subject matter of Examples 59-82 can optionally include that the at least one of the multi-spectral data or the multi-modal data includes ephemeral data, and the means for executing is to generate the output before the ephemeral data becomes stale.

In Example 84, the subject matter of Examples 59-83 can optionally include that the target device is an active target device or a passive target device.

In Example 85, the subject matter of Examples 59-84 can optionally include that the target device is a passive target device.

In Example 86, the subject matter of Examples 59-85 can optionally include that the target object is an active target object.

In Example 87, the subject matter of Examples 59-86 can optionally include that the target object is a passive target object.

Example 88 includes a method for data driven location determination, the method comprising executing a machine-learning model to generate an output based on at least one of multi-spectral data or multi-modal data input to the machine-learning model, the at least one of the multi-spectral data or the multi-modal data associated with a target device or a target object, the output to be representative of a location of the at least one of the target device or the target object, publishing the location of the at least one of the target device or the target object to a datastore for application access, and causing an action based on the location of the at least one of the target device or the target object to be performed by the at least one of the target device or the target device.

In Example 89, the subject matter of Example 88 can optionally include that the output is representative of a Cartesian coordinate location of the at least one of the target device or the target object.

In Example 90, the subject matter of Examples 88-89 can optionally include that the at least one of the target device or the target object is connected to at least one of a terrestrial network or a non-terrestrial network.

In Example 91, the subject matter of Examples 88-90 can optionally include that the target device is not connected to at least one of a terrestrial network or a non-terrestrial network, and the target object is connected to the at least one of the terrestrial network or the non-terrestrial network.

In Example 92, the subject matter of Examples 88-91 can optionally include that the target device is connected to at least one of a terrestrial network or a non-terrestrial network, and the target object is not connected to the at least one of the terrestrial network or the non-terrestrial network.

In Example 93, the subject matter of Examples 88-92 can optionally include that the at least one of the multi-spectral data or the multi-modal data includes at least one of sounding reference signal data, signal-to-noise ratio data, or channel impulse response data.

In Example 94, the subject matter of Examples 88-93 can optionally include that the at least one of the multi-spectral data or the multi-modal data includes at least one of first data generated by a network, second data generated by the at least one of the target device or the target object, or third data generated by a sensor that is to monitor the at least one the target device or the target object.

In Example 95, the subject matter of Examples 88-94 can optionally include obtaining the multi-spectral data from a network, the multi-spectral data including first data based on a first wireless spectrum and second data based on a second wireless spectrum, the first wireless spectrum different from the second wireless spectrum.

In Example 96, the subject matter of Examples 88-95 can optionally include that the first wireless spectrum is based on a first frequency associated with a fifth generation cellular network and the second wireless spectrum is based on a second frequency associated with a Wireless Fidelity network.

In Example 97, the subject matter of Examples 88-96 can optionally include obtaining the multi-modal data from a network, the multi-modal data including first data from a first sensor of a first type and second data from a second sensor of a second type, the first type different from the second type.

In Example 98, the subject matter of Examples 88-97 can optionally include that at least one of the first sensor or the second sensor is an air pressure sensor, a camera, a carbon monoxide sensor, a humidity sensor, a light sensor, a motion sensor, a temperature sensor, or a water sensor.

In Example 99, the subject matter of Examples 88-98 can optionally include that at least one of the first sensor or the second sensor is associated with a radio-frequency identification system, a Bluetooth system, a Wireless Fidelity system, a cellular system, or a satellite system.

In Example 100, the subject matter of Examples 88-99 can optionally include generating the action to cause the at least one of the target device or the target object to change at least of a direction or a speed of the at least one of the target device or the target object.

In Example 101, the subject matter of Examples 88-100 can optionally include identifying the at least one of the target device or the target object based on an identifier included in the at least one of the multi-spectral data or the multi-modal data, enqueueing a data pointer to a hardware-implemented data queue, the data pointer based on the identifier, the data pointer to reference the at least one of the multi-spectral data or the multi-modal data, and after a computational operation is performed on the at least one of the multi-spectral data or the multi-modal data, dequeuing the data pointer from the hardware-implemented data queue.

In Example 102, the subject matter of Examples 88-101 can optionally include generating the output based on a policy, the policy including at least one of location accuracy error, a two-dimension location dimension configuration, a three-dimension location dimension configuration, or a wall clock response.

In Example 103, the subject matter of Examples 88-102 can optionally include that the at least one of the multi-spectral data or the multi-modal data includes sounding reference signal (SRS) data, and the method further including determining a first time-of-arrival associated with the SRS data at a first antenna of a base station, determining a second time-of-arrival associated with the SRS data at a second antenna of the base station, and presenting the location of the at least one of the target device or the target object on a graphical user interface based on the first time-of-arrival and the second time-of-arrival.

In Example 104, the subject matter of Examples 88-103 can optionally include that the at least one of the multi-spectral data or the multi-modal data includes sounding reference signal (SRS) data, and the method further including determining a first time-of-arrival associated with the SRS data at a first antenna of a first base station, determining a second time-of-arrival associated with the SRS data at a second antenna of a second base station, and displaying the location of the at least one of the target device or the target object on a display device based on the first time-of-arrival and the second time-of-arrival.

In Example 105, the subject matter of Examples 88-104 can optionally include that the at least one of the multi-spectral data or the multi-modal data includes sounding reference signal (SRS) data, and the method further including determining a first time-of-arrival associated with the SRS data at a first antenna of a first base station, determining a second time-of-arrival associated with the SRS data at a second antenna of a second base station, determining a time-difference-of-arrival based on the first time-of-arrival and the second time-of-arrival, and determining the location of the at least one of the target device or the target object based on the time-difference-of-arrival.

In Example 106, the subject matter of Examples 88-105 can optionally include that the at least one of the multi-spectral data or the multi-modal data includes sounding reference signal (SRS) data, and the method further includes determining a first time-of-arrival associated with the SRS data at a first antenna of a first base station, determining a second time-of-arrival associated with the SRS data at a second antenna of the first base station, determining a third time-of-arrival associated with the SRS data at a third antenna of a second base station, determining a fourth time-of-arrival associated with the SRS data at a fourth antenna of the second base station, determining a time-difference-of-arrival based on the first time-of-arrival, the second time-of-arrival, the third time-of-arrival, and the fourth time-of-arrival, and determining the location of the at least one of the target device or the target object based on the time-difference-of-arrival.

In Example 107, the subject matter of Examples 88-106 can optionally include that the at least one of the multi-spectral data or the multi-modal data includes sounding reference signal (SRS) data, and the method further including determining a first angle-of-arrival associated with the SRS data at a first antenna of a base station, determining a second angle-of-arrival associated with the SRS data at a second antenna of the base station, and generating a graphical user interface associated with the location of the target device or the target object based on the first angle-of-arrival and the second angle-of-arrival.

In Example 108, the subject matter of Examples 88-107 can optionally include that the at least one of the multi-spectral data or the multi-modal data includes sounding reference signal (SRS) data, and the method further including determining a first angle-of-arrival associated with the SRS data at a first antenna of a first base station, determining a second angle-of-arrival associated with the SRS data at a second antenna of a second base station, and determining the location of the at least one of the target device or the target object based on the first angle-of-arrival and the second angle-of-arrival.

In Example 109, the subject matter of Examples 88-108 can optionally include that the location is a first location, and the method further including determining that the first location is associated with a first measurement periodicity, determining that the at least one of the target device or the target object is associated with a second location and a second measurement periodicity, and adjusting the second measurement periodicity associated with the at least one of the target device or the target object to the first measurement periodicity based on the location.

In Example 110, the subject matter of Examples 88-109 can optionally include determining that the at least one of the multi-spectral data or the multi-modal data is to include first data, second data, and third data, and after determining that a sensor associated with the first data is unavailable, executing the machine-learning model with at least one of the second data or the third data as the input to the machine-learning model.

In Example 111, the subject matter of Examples 88-110 can optionally include that the output is a first output, the location is a first location, and the method further includes executing the machine-learning model to generate a second output based on the first location, the second output to be representative of a second location of the at least one of the target device or the target object.

In Example 112, the subject matter of Examples 88-111 can optionally include that the at least one of the multi-spectral data or the multi-modal data includes ephemeral data, and the method further includes generating the output before the ephemeral data becomes stale.

In Example 113, the subject matter of Examples 88-112 can optionally include that the target device is an active target device or a passive target device.

In Example 114, the subject matter of Examples 88-113 can optionally include that the target device is a passive target device.

In Example 115, the subject matter of Examples 88-114 can optionally include that the target object is an active target object.

In Example 116, the subject matter of Examples 88-115 can optionally include that the target object is a passive target object.

Example 117 includes a method comprising obtaining location sounding reference signal (SRS) measurements for a target device based on a detection of SRS data in cellular data received by a radio unit, determining at least one of time-of-arrival or time-difference-of-arrival measurements based on the location SRS measurements, and determining a location of the target device based on the at least one of time-of-arrival or the time-difference-of-arrival measurements.

In Example 118, the subject matter of Example 117 can optionally include obtaining a request for the location of the target device.

In Example 119, the subject matter of Examples 117-118 can optionally include obtaining the request from an Application Programming Interface.

In Example 120, the subject matter of Examples 117-119 can optionally include obtaining an identifier of the target device.

In Example 121, the subject matter of Examples 117-120 can optionally include obtaining an antenna identifier of an antenna associated with the target device.

In Example 122, the subject matter of Examples 117-121 can optionally include determining an antenna location of the antenna that corresponds to the antenna identifier.

In Example 123, the subject matter of Examples 117-122 can optionally include obtaining SRS capabilities of the target device.

In Example 124, the subject matter of Examples 117-123 can optionally include setting an SRS configuration of the target device.

In Example 125, the subject matter of Examples 117-124 can optionally include enabling location SRS measurements for the target device.

In Example 126, the subject matter of Examples 117-125 can optionally include obtaining location measurements of the target device.

In Example 127, the subject matter of Examples 117-126 can optionally include outputting the location of the target device based on the location measurements.

In Example 128, the subject matter of Examples 117-127 can optionally include outputting the location of the target device to at least one of a location-based application or service.

In Example 129, the subject matter of Examples 117-128 can optionally include determining whether the target device opted-in to location measurement generation.

In Example 130, the subject matter of Examples 117-129 can optionally include determining whether a state of a power source of the target device is a data input for location measurement generation.

In Example 131, the subject matter of Examples 117-130 can optionally include determining a state of a battery of the target device.

In Example 132, the subject matter of Examples 117-131 can optionally include determining whether a state of a battery of the target device satisfies a threshold.

In Example 133, the subject matter of Examples 117-132 can optionally include generating an SRS configuration for the target device based on at least one of the target device opting-in to location measurement generation or a determination that a battery of the target device satisfies a threshold.

In Example 134, the subject matter of Examples 117-133 can optionally include executing a machine-learning model using at least one of the target device opt-in, target device power source state, or an SRS configuration as model inputs.

In Example 135, the subject matter of Examples 117-134 can optionally include changing an SRS configuration of the target device based on an output from a machine-learning model.

In Example 136, the subject matter of Examples 117-135 can optionally include automatically triggering determining the location of the target device based on the detection of the SRS data in the cellular data.

Example 137 is at least one computer-readable medium comprising instructions to perform the method of any of Examples 88-116 or Examples 117-136.

Example 138 is at least one machine-readable medium comprising instructions to perform the method of any of Examples 88-116 or Examples 117-136.

Example 139 includes an apparatus comprising interface circuitry, machine-readable instructions, and processor circuitry to at least one of execute or instantiate the machine-readable instructions to cause transmission of a sounding reference signal (SRS) configuration to a radio access network (RAN), the SRS configuration for a target device in communication with a radio unit (RU) associated with the RAN, cause transmission of a value to the RAN to cause the RAN to compute at least one set of time-of-arrival (TOA) measurements or time-difference-of-arrival (TDOA) measurements for the target device based on detection of SRS data in cellular data received by antennas of the RU, the cellular data from the target device, the at least one set of the TOA measurements or the TDOA measurements based on the SRS configuration for the target device, and estimate a location of the target device based on the at least one set of the TOA measurements or the TDOA measurements.

In Example 140, the subject matter of Example 139 can optionally include that the processor circuitry is to, based on a first request for the location of the target device, cause transmission of a second request to the RAN to obtain an identifier of the target device.

In Example 141, the subject matter of Examples 139-140 can optionally include that the processor circuitry is to obtain at least one of a first identifier of a first antenna or a second identifier of a second antenna from the RAN, the RU including at least one of the first antenna or the second antenna, the target device having access to at least one of the first antenna or the second antenna.

In Example 142, the subject matter of Example 141 can optionally include that the processor circuitry is to cause transmission of a request to the RAN to obtain at least one of a first location of the first antenna or a second location of the second antenna.

In Example 143, the subject matter of Examples 139-142 can optionally include that the processor circuitry is to cause transmission of a request to the RAN to obtain capabilities of the target device.

In Example 144, the subject matter of Examples 139-143 can optionally include that the processor circuitry is to determine the SRS configuration based on a state of a power source of the target device.

In Example 145, the subject matter of Examples 139-144 can optionally include that the processor circuitry is to determine the SRS configuration based on at least one of an opt-in preference associated with the target device, a state of a power source of the target device, or at least one of a current or a historical SRS configuration for the target device.

Example 146 includes a non-transitory computer-readable medium comprising instructions to cause processor circuitry to at least cause transmission of a sounding reference signal (SRS) configuration to a radio access network (RAN), the SRS configuration for a target device in communication with a radio unit (RU) associated with the RAN, cause transmission of a value to the RAN to cause the RAN to compute at least one set of time-of-arrival (TOA) measurements or time-difference-of-arrival (TDOA) measurements for the target device based on detection of SRS data in cellular data received by antennas of the RU, the cellular data from the target device, the at least one set of the TOA measurements or the TDOA measurements based on the SRS configuration for the target device, and estimate a location of the target device based on the at least one set of the TOA measurements or the TDOA measurements.

In Example 147, the subject matter of Example 146 can optionally include that the instructions are to cause the processor circuitry to, based on a first request for the location of the target device, cause transmission of a second request to the RAN to obtain an identifier of the target device.

In Example 148, the subject matter of Examples 146-147 can optionally include that the instructions are to cause the processor circuitry to obtain at least one of a first identifier of a first antenna or a second identifier of a second antenna from the RAN, the RU including at least one of the first antenna or the second antenna, the target device having access to at least one of the first antenna or the second antenna.

In Example 149, the subject matter of Example 148 can optionally include that the instructions are to cause the processor circuitry to cause transmission of a request to the RAN to obtain at least one of a first location of the first antenna or a second location of the second antenna.

In Example 150, the subject matter of Examples 146-149 can optionally include that the instructions are to cause the processor circuitry to cause transmission of a request to the RAN to obtain capabilities of the target device.

In Example 151, the subject matter of Examples 146-150 can optionally include that the instructions are to cause the processor circuitry to determine the SRS configuration based on a state of a power source of the target device.

In Example 152, the subject matter of Examples 146-151 can optionally include that the instructions are to cause the processor circuitry to determine the SRS configuration based on at least one of an opt-in preference associated with the target device, a state of a power source of the target device, or at least one of a current or a historical SRS configuration for the target device.

Example 153 includes a method comprising transmitting, via interface circuitry, a sounding reference signal (SRS) configuration to a radio access network (RAN), the SRS configuration for a target device in communication with a radio unit (RU) associated with the RAN, transmitting, via the interface circuitry, a value to the RAN to cause the RAN to compute at least one set of time-of-arrival (TOA) measurements or time-difference-of-arrival (TDOA) measurements for the target device based on detection of SRS data in cellular data received by antennas of the RU, the cellular data from the target device, the at least one set of the TOA measurements or the TDOA measurements based on the SRS configuration for the target device, and estimating, by executing an instruction with processor circuitry, a location of the target device based on the at least one set of the TOA measurements or the TDOA measurements.

In Example 154, the subject matter of Example 153 can optionally include, based on a first request for the location of the target device, transmitting a second request to the RAN to obtain an identifier of the target device.

In Example 155, the subject matter of Examples 153-154 can optionally include obtaining at least one of a first identifier of a first antenna or a second identifier of a second antenna from the RAN, the RU including at least one of the first antenna or the second antenna, the target device having access to at least one of the first antenna or the second antenna.

In Example 156, the subject matter of Example 155 can optionally include transmitting a request to the RAN to obtain at least one of a first location of the first antenna or a second location of the second antenna.

In Example 157, the subject matter of Examples 153-156 can optionally include transmitting a request to the RAN to obtain capabilities of the target device.

In Example 158, the subject matter of Examples 153-157 can optionally include determining the SRS configuration based on a state of a power source of the target device.

In Example 159, the subject matter of Examples 153-158 can optionally include determining the SRS configuration based on at least one of an opt-in preference associated with the target device, a state of a power source of the target device, or at least one of a current or a historical SRS configuration for the target device.

Example 160 includes a method comprising determining, by executing an instruction with processor circuitry, a state of a power source of a target device, the target device in communication with a radio unit of a radio access network (RAN), at least one of executing or instantiating a machine learning (ML) model based on at least one of an opt-in preference associated with the target device, the state of the power source, or a first sounding reference signal (SRS) configuration for the target device, adjusting, by executing an instruction with the processor circuitry, the first SRS configuration based on an output of the ML model to generate a second SRS configuration for the target device, and transmitting, to the RAN, the second SRS configuration for the target device.

In Example 161, the subject matter of Example 160 can optionally include determining the opt-in preference associated with the target device.

In Example 162, the subject matter of Examples 160-161 can optionally include determining the state of the power source based on determining that the state of the power source is a data input for location measurement generation for the target device.

In Example 163, the subject matter of Examples 160-162 can optionally include determining at least one capability of the target device to transmit SRS data to an antenna of the radio unit of the RAN.

In Example 164, the subject matter of Example 163 can optionally include generating the first SRS configuration for the target device based on the state of the power source and the at least one capability of the target device.

In Example 165, the subject matter of Examples 163-164 can optionally include determining whether the state of the power source satisfies a threshold associated with a likelihood that the target device is capable of transmitting the SRS data based on the state of the power source.

In Example 166, the subject matter of Example 165 can optionally include, based on the state of the power source satisfying the threshold, generating the first SRS configuration for the target device based on the state of the power source.

Example 167 is at least one computer-readable medium comprising instructions to perform the method of any of Examples 160-166.

Example 168 is an apparatus to perform the method of any of Examples 160-166.

Example 169 is edge server processor circuitry to perform the method of any of Examples 88-116, Examples 117-136, or Examples 139-168.

Example 170 is an edge cloud processor circuitry to perform the method of any of Examples 88-116, Examples 117-136, or Examples 139-168.

Example 171 is edge node processor circuitry to perform the method of any of Examples 88-116, Examples 117-136, or Examples 139-168.

Example 172 is location engine circuitry to perform the method of any of Examples 88-116, Examples 117-136, or Examples 139-168.

Example 173 is a programmable location data collector to perform the method of any of Examples 88-116, Examples 117-136, or Examples 139-168.

Example 174 is programmable location data collection circuitry to perform the method of any of Examples 88-116, Examples 117-136, or Examples 139-168.

Example 175 is an apparatus comprising processor circuitry to perform the method of any of Examples 88-116, Examples 117-136, or Examples 139-168.

Example 176 is an apparatus comprising programmable circuitry to perform the method of any of Examples 88-116, Examples 117-136, or Examples 139-168.

Example 177 is an apparatus comprising one or more edge gateways to perform the method of any of Examples 88-116, Examples 117-136, or Examples 139-168.

Example 178 is an apparatus comprising one or more edge switches to perform the method of any of Examples 88-116, Examples 117-136, or Examples 139-168.

Example 179 is an apparatus comprising at least one of one or more edge gateways or one or more edge switches to perform the method of any of Examples 88-116, Examples 117-136, or Examples 139-168.

Example 180 is an apparatus comprising accelerator circuitry to perform the method of any of Examples 88-116, Examples 117-136, or Examples 139-168.

Example 181 is an apparatus comprising one or more graphics processor units to perform the method of any of Examples 88-116, Examples 117-136, or Examples 139-168.

Example 182 is an apparatus comprising one or more Artificial Intelligence processors to perform the method of any of Examples 88-116, Examples 117-136, or Examples 139-168.

Example 183 is an apparatus comprising one or more machine learning processors to perform the method of any of Examples 88-116, Examples 117-136, or Examples 139-168.

Example 184 is an apparatus comprising one or more neural network processors to perform the method of any of Examples 88-116, Examples 117-136, or Examples 139-168.

Example 185 is an apparatus comprising one or more digital signal processors to perform the method of any of Examples 88-116, Examples 117-136, or Examples 139-168.

Example 186 is an apparatus comprising one or more general purpose processors to perform the method of any of Examples 88-116, Examples 117-136, or Examples 139-168.

Example 187 is an apparatus comprising network interface circuitry to perform the method of any of Examples 88-116, Examples 117-136, or Examples 139-168.

Example 188 is an Infrastructure Processor Unit to perform the method of any of Examples 88-116, Examples 117-136, or Examples 139-168.

Example 189 is dynamic load balancer circuitry to perform the method of any of Examples 88-116, Examples 117-136, or Examples 139-168.

Example 190 is radio unit circuitry to perform the method of any of Examples 88-116, Examples 117-136, or Examples 139-168.

Example 191 is remote radio unit circuitry to perform the method of any of Examples 88-116, Examples 117-136, or Examples 139-168.

Example 192 is radio access network circuitry to perform the method of any of Examples 88-116, Examples 117-136, or Examples 139-168.

Example 193 is one or more base stations to perform the method of any of Examples 88-116, Examples 117-136, or Examples 139-168.

Example 194 is base station circuitry to perform the method of any of Examples 88-116, Examples 117-136, or Examples 139-168.

Example 195 is user equipment circuitry to perform the method of any of Examples 88-116, Examples 117-136, or Examples 139-168.

Example 196 is one or more Internet-of-Things devices to perform the method of any of Examples 88-116, Examples 117-136, or Examples 139-168.

Example 197 is one or more fog devices to perform the method of any of Examples 88-116, Examples 117-136, or Examples 139-168.

Example 198 is a software distribution platform to distribute machine-readable instructions that, when executed by processor circuitry, cause the processor circuitry to perform the method of any of Examples 88-116, Examples 117-136, or Examples 139-168.

Example 199 is edge cloud circuitry to perform the method of any of Examples 88-116, Examples 117-136, or Examples 139-168.

Example 200 is distributed unit circuitry to perform the method of any of Examples 88-116, Examples 117-136, or Examples 139-168.

Example 201 is central or centralized unit circuitry to perform the method of any of Examples 88-116, Examples 117-136, or Examples 139-168.

Example 202 is core server circuitry to perform the method of any of Examples 88-116, Examples 117-136, or Examples 139-168.

Example 203 is satellite circuitry to perform the method of any of Examples 88-116, Examples 117-136, or Examples 139-168.

Example 204 is at least one of one more GEO satellites or one or more LEO satellites to perform the method of any of Examples 88-116, Examples 117-136, or Examples 139-168.

Example 205 is an autonomous vehicle to perform the method of any of Examples 88-116, Examples 117-136, or Examples 139-168.

Example 206 is a robot to perform the method of any of Examples 88-116, Examples 117-136, or Examples 139-168.

Example 207 is circuitry to execute and/or instantiate instructions to implement FLEXRAN™ protocol to perform the method of any of Examples 88-116, Examples 117-136, or Examples 139-168.

Example 208 is circuitry to execute and/or instantiate instructions to implement a virtual radio access network protocol to perform the method of any of Examples 88-116, Examples 117-136, or Examples 139-168.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   interface circuitry;
   machine-readable instructions; and
   at least one processor circuit to at least one of execute or instantiate the machine-readable instructions to:
      determine a sounding reference signal (SRS) configuration for a target device in communication with a radio unit (RU) associated with a radio access network (RAN), the SRS configuration determined based on at least one of an opt-in preference associated with the target device, a state of a power source of the target device, or at least one of an initial or a historical SRS configuration for the target device;
      cause transmission of the SRS configuration to the RAN to cause the RAN to compute at least one of time-of-arrival (TOA) measurements or time-difference-of-arrival (TDOA) measurements for the target device based on detection of SRS data in cellular data received by antennas of the RU, the cellular data from the target device, the at least one of the TOA measurements or the TDOA measurements based on the SRS configuration for the target device; and
      estimate a location of the target device based on the SRS configuration and the at least one of the TOA measurements or the TDOA measurements.

2. The apparatus of claim 1, wherein one or more of the at least one processor circuit is to obtain an identifier, from the RAN, of an antenna that received SRS data, the RU including the antenna.

3. The apparatus of claim 1, wherein one or more of the at least one processor circuit is to cause transmission of a request to the RAN to obtain capabilities of the target device.

4. The apparatus of claim 1, wherein the SRS configuration includes a frequency with which the location of the target device is to be estimated.

5. The apparatus of claim 1, wherein the SRS configuration includes a period for estimating the location of the target device.

6. The apparatus of claim 1, wherein one or more of the at least one processor circuit is to execute a machine learning model based on the at least one of the opt-in preference, the state of the power source of the target device, or the at least one of the initial or the historical SRS configuration to determine the SRS configuration for the target device.

7. The apparatus of claim 1, wherein one or more of the at least one processor circuit is to:
   determine the SRS configuration for the target device at a first time; and
   at a second time, adjust the SRS configuration based on a change in the at least one of the opt-in preference, the state of the power source of the target device, or the at least one of the initial or the historical SRS configuration to determine the SRS configuration for the target device.

8. A non-transitory computer-readable medium comprising instructions to cause at least one processor circuit to at least:
   determine a sounding reference signal (SRS) configuration for a target device in communication with a radio unit (RU) associated with a radio access network (RAN), the SRS configuration determined based on at least one of an opt-in preference associated with the target device, a state of a power source of the target device, or at least one of an initial or a historical SRS configuration for the target device;
   cause transmission of the SRS configuration to the RAN to cause the RAN to compute at least one of time-of-arrival (TOA) measurements or time-difference-of-arrival (TDOA) measurements for the target device based on detection of SRS data in cellular data received by antennas of the RU, the cellular data from the target device, the at least one of the TOA measurements or the TDOA measurements based on the SRS configuration for the target device; and
   estimate a location of the target device based on the SRS configuration and the at least one of the TOA measurements or the TDOA measurements.

9. The non-transitory computer-readable medium of claim 8, wherein the instructions are to cause one or more of the at least one processor circuit to obtain an identifier, from the RAN, of an antenna that received SRS data, the RU including the antenna.

10. The non-transitory computer-readable medium of claim 8, wherein the instructions are to cause one or more of the at least one processor circuit to cause transmission of a request to the RAN to obtain capabilities of the target device.

11. The non-transitory computer-readable medium of claim 8, wherein the SRS configuration includes a frequency with which the location of the target device is to be estimated.

12. The non-transitory computer-readable medium of claim 8, wherein the SRS configuration includes a period for estimating the location of the target device.

13. The non-transitory computer-readable medium of claim 8, wherein the instructions are to cause one or more of the at least one processor circuit to determine the SRS configuration for the target device based on evaluation of the at least one of the opt-in preference, the state of the power source of the target device, or the at least one of the initial or the historical SRS configuration with a machine learning model.

14. The non-transitory computer-readable medium of claim 8, wherein the instructions are to cause one or more of the at least one processor circuit to:
   determine the SRS configuration for the target device at a first time; and
   at a second time, adjust the SRS configuration based on a change in the at least one of the opt-in preference, the state of the power source of the target device, or the at least one of the initial or the historical SRS configuration to determine the SRS configuration for the target device.

15. A method comprising:
   determining, by executing an instruction with at least one processor circuit, a sounding reference signal (SRS) configuration for a target device in communication with a radio unit (RU) associated with a radio access network (RAN), the SRS configuration determined based on at least one of an opt-in preference associated with the target device, a state of a power source of the target device, or at least one of an initial or a historical SRS configuration for the target device;

transmitting, via interface circuitry, the SRS configuration to the RAN to cause the RAN to compute at least one of time-of-arrival (TOA) measurements or time-difference-of-arrival TDOA) measurements for the target device based on detection of SRS data in cellular data received by antennas of the RU, the cellular data from the target device, the at least one of the TOA measurements or the TDOA measurements based on the SRS configuration for the target device; and estimating, by executing an instruction with one or more of the at least one processor circuit, a location of the target device based on the SRS configuration and the at least one of the TOA measurements or the TDOA measurements.

16. The method of claim 15, including obtaining an identifier, from the RAN, of an antenna that received SRS data, the RU including the antenna.

17. The method of claim 15, including transmitting a request to the RAN to obtain capabilities of the target device.

18. The method of claim 15, wherein the SRS configuration includes a frequency with which the location of the target device is to be estimated.

19. The method of claim 15, wherein the SRS configuration includes a period for estimating the location of the target device.

20. The method of claim 15, including determining the SRS configuration for the target device by executing a machine learning model based on the at least one of the opt-in preference, the state of the power source of the target device, or the at least one of the initial or the historical SRS configuration.

* * * * *